United States Patent [19]
Hernday et al.

[11] Patent Number: 5,041,997
[45] Date of Patent: Aug. 20, 1991

[54] LIGHTWAVE COMPONENT ANALYZER

[75] Inventors: Paul R. Hernday; Roger W. Wong; Hugo Vifian, all of Santa Rosa, Calif.

[73] Assignee: Hewlett-Packard Company, Palo Alto, Calif.

[21] Appl. No.: 390,570

[22] Filed: Aug. 7, 1989

Related U.S. Application Data

[63] Continuation-in-part of Ser. No. 307,866, Feb. 6, 1989, abandoned.

[51] Int. Cl.$^5$ .............................................. G06F 15/46
[52] U.S. Cl. ........................... 364/571.01; 356/73.1; 364/550
[58] Field of Search ................. 364/571.01-571.08, 364/525, 550; 371/20.1, 20.3; 356/73.1, 447; 73/1 R

[56] References Cited

U.S. PATENT DOCUMENTS

| | | | |
|---|---|---|---|
| 4,199,816 | 4/1980 | Humphrey | 364/525 |
| 4,249,244 | 2/1981 | Shofner et al. | 364/525 |
| 4,726,676 | 2/1988 | Maslaney et al. | 356/73.1 |
| 4,799,789 | 1/1989 | Tsukamoto et al. | 356/73.1 |
| 4,816,767 | 3/1989 | Cannon et al. | 364/571.04 |
| 4,866,644 | 9/1989 | Shenk et al. | 364/571.02 |
| 4,873,655 | 10/1989 | Kondraske | 364/571.02 |

OTHER PUBLICATIONS

"Optical Attenuation Testing in Field & Factory", Chapman et al., Int Wire & Cable Symp., 18-20 Nov. 1980, pp. 279-289.

TEK Products 1988, Tektronix Corp (1987) pp. 155-156.

Primary Examiner—Kevin J. Teska
Attorney, Agent, or Firm—William C. Milks, III

[57] ABSTRACT

A lightwave component analyzer comprising at least an internal optical receiver and preferably also comprising an internal optical source which are selectively connectable by switches configurable by means of an internal or an external instrument controller for calibration and performance of electro-optical, opto-electrical, and optical measurements. The switches are arranged in a switch matrix. The configurable switch matrix is connected by the instrument controller in response to selection of a measurement by a user to facilitate calibration of, and test measurements of devices under test with, the lightwave component analyzer.

20 Claims, 33 Drawing Sheets

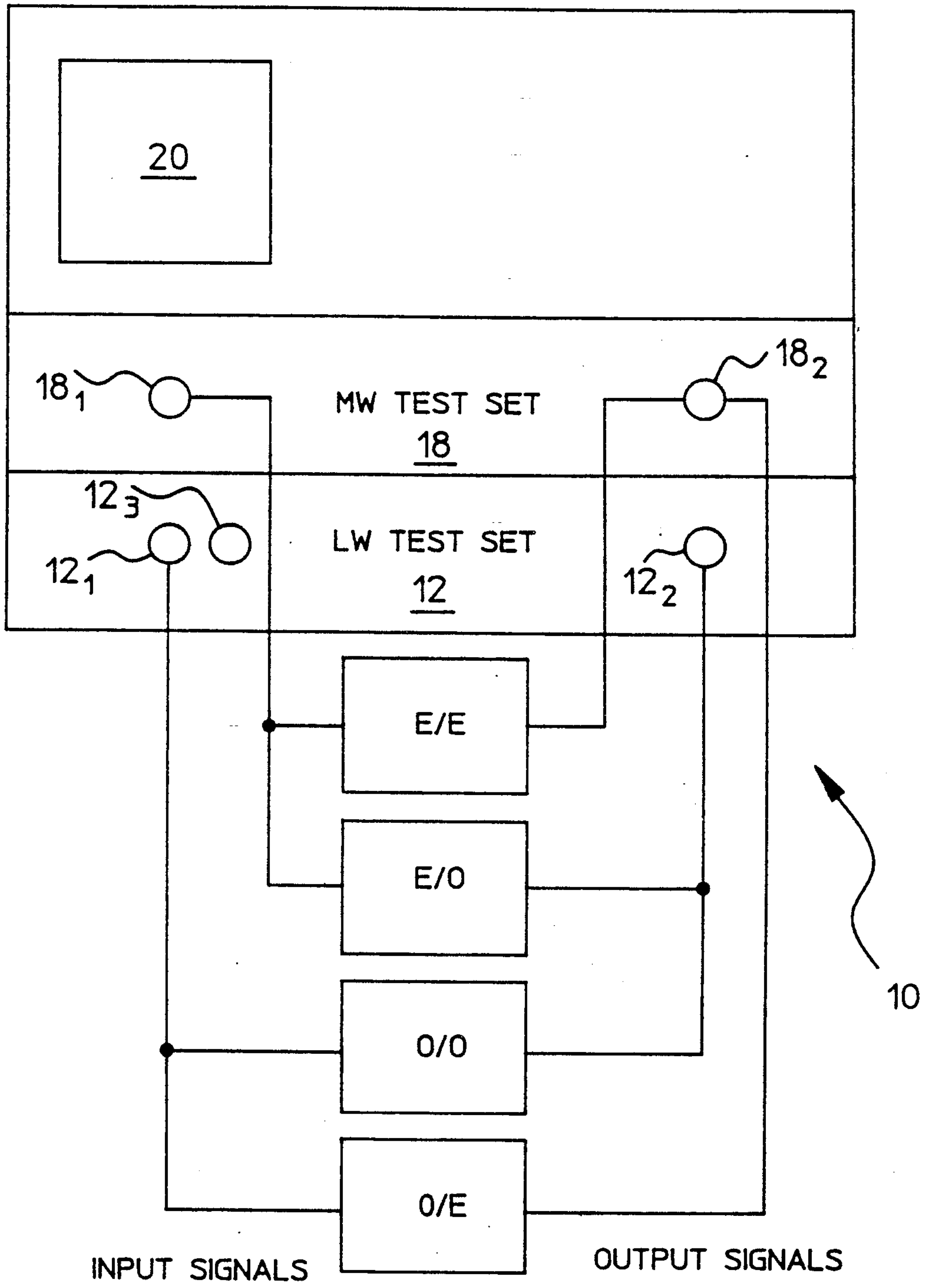
FIG_ 1

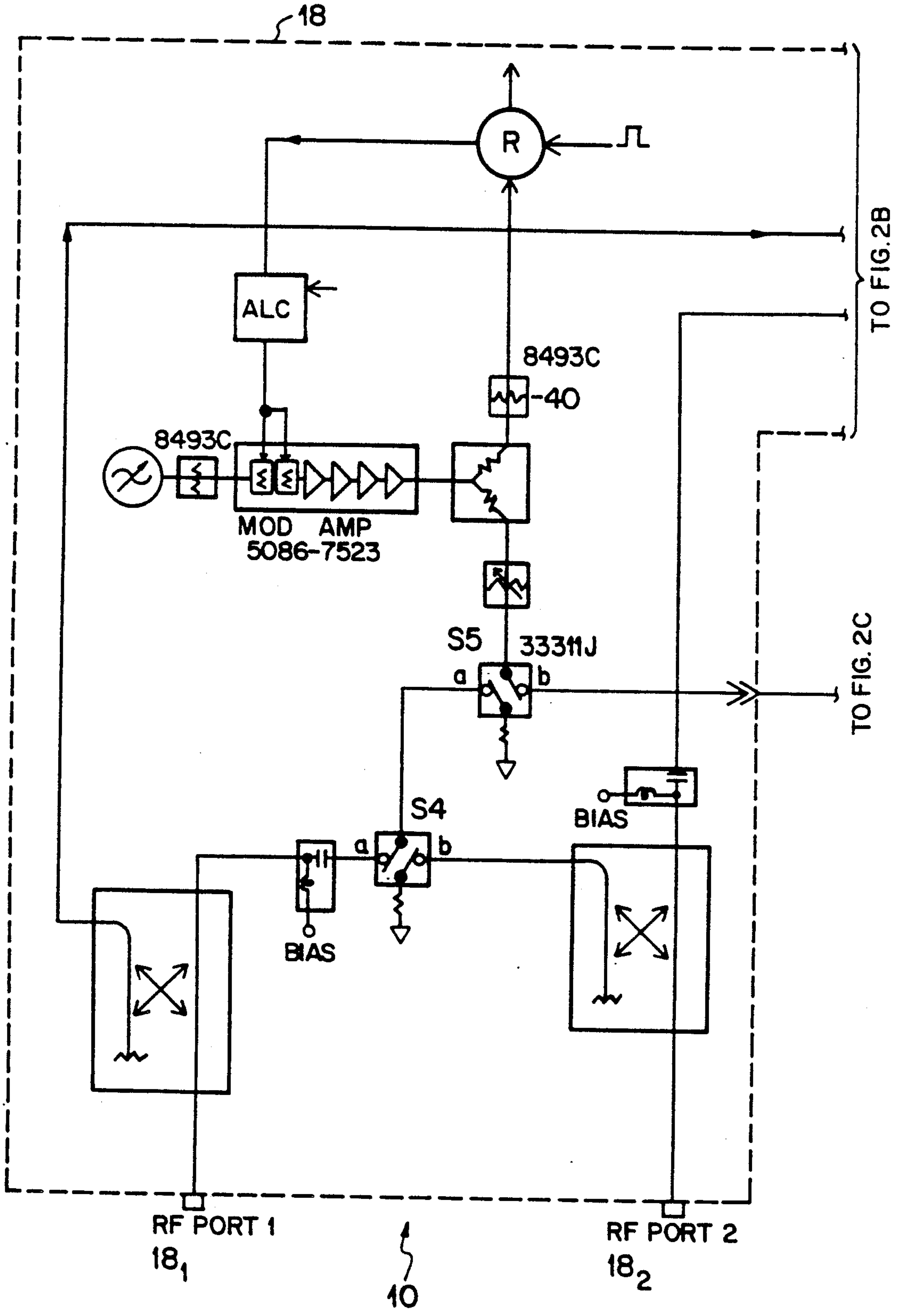
FIG _2A

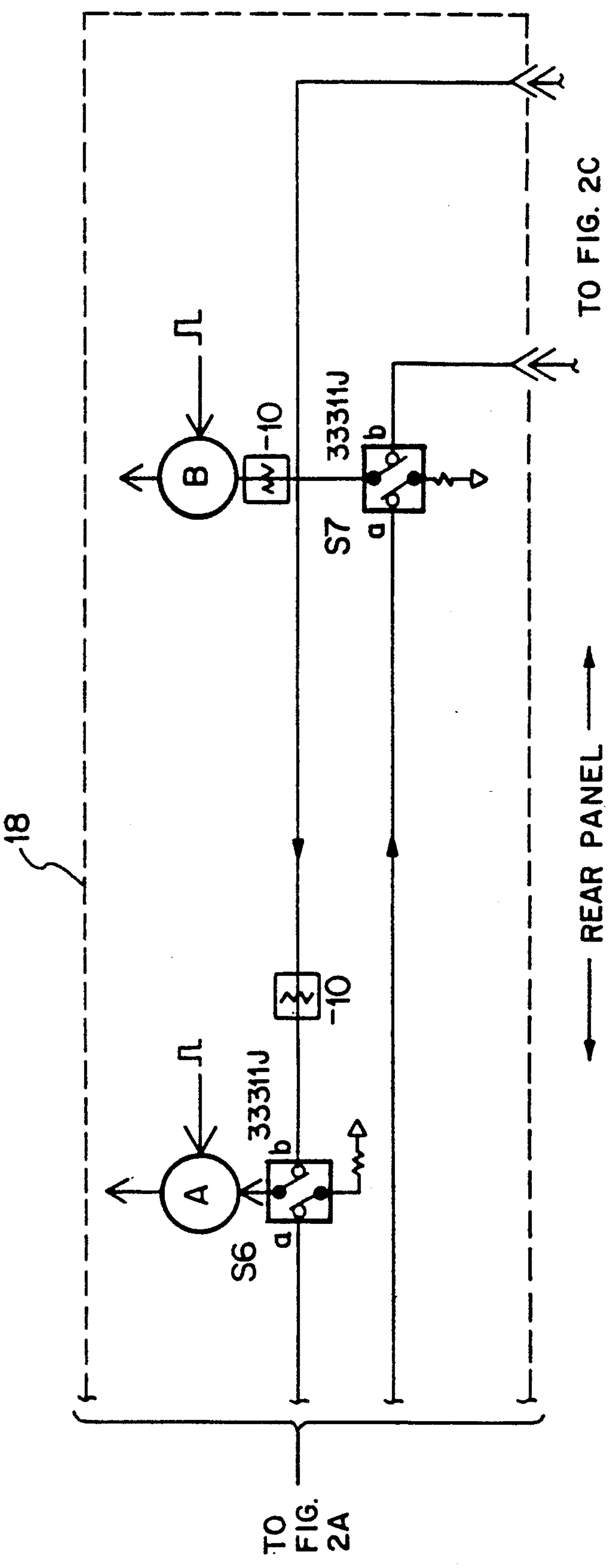
FIG_2B

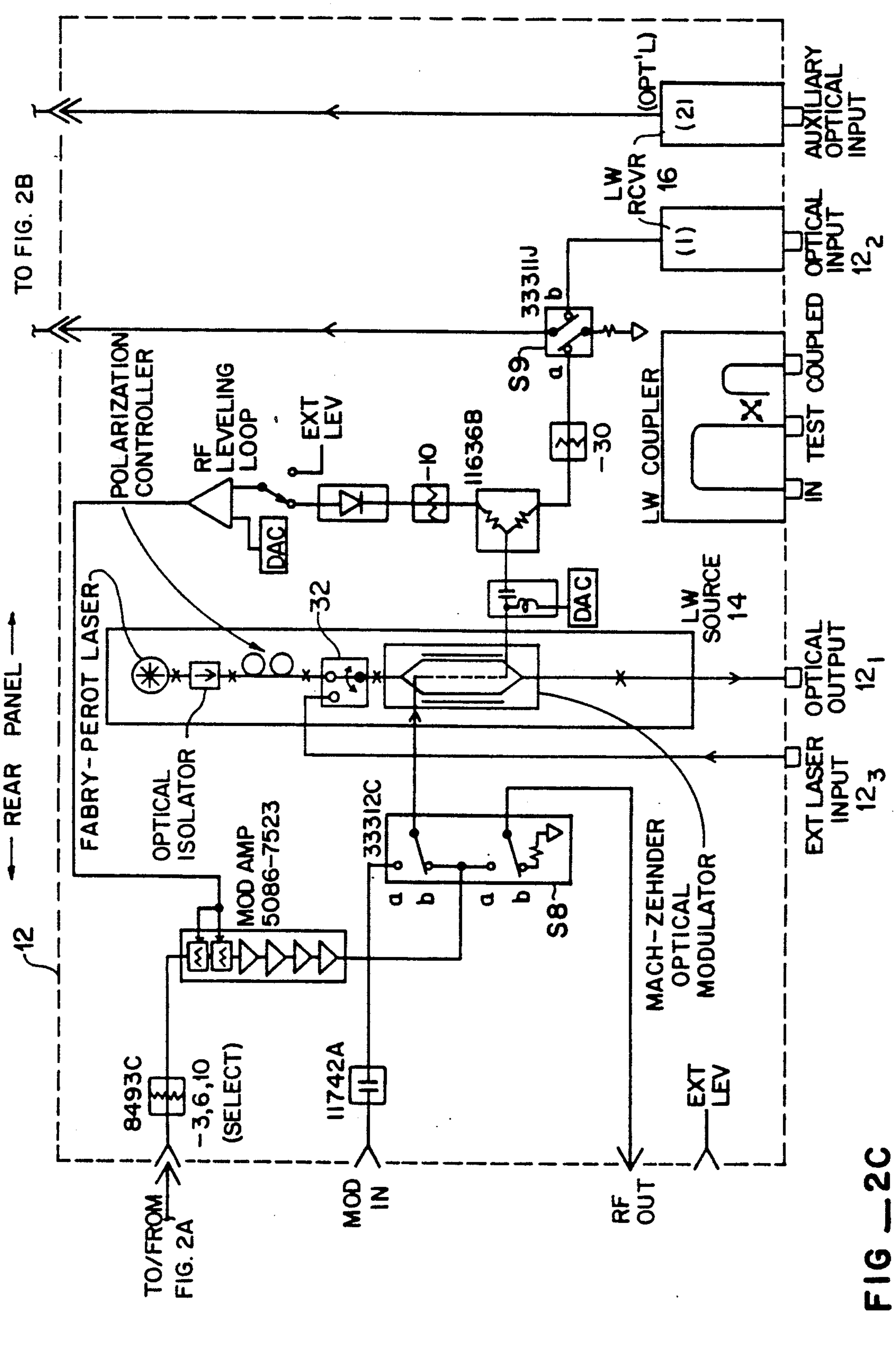
FIG — 2C

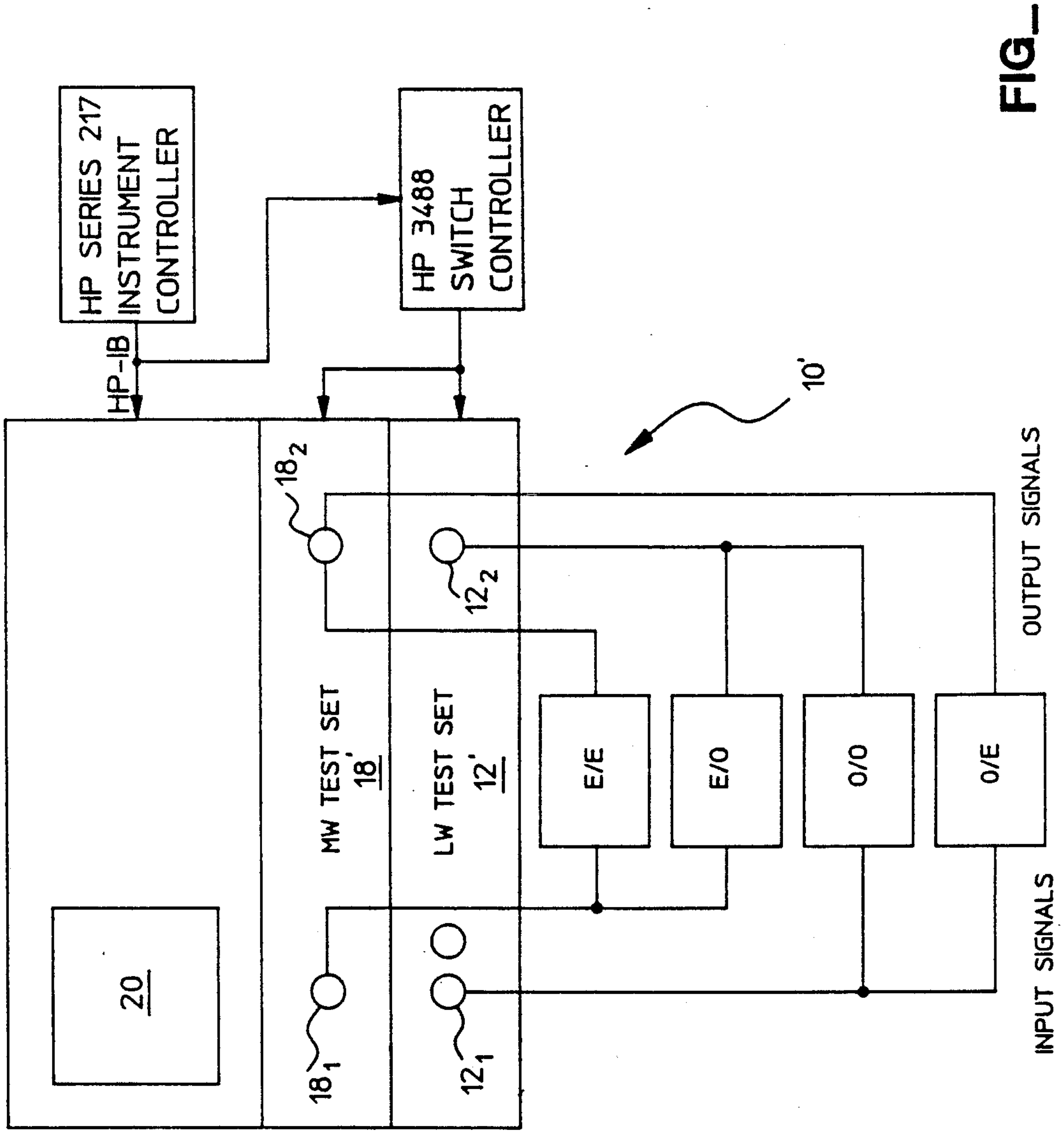
FIG_ 3

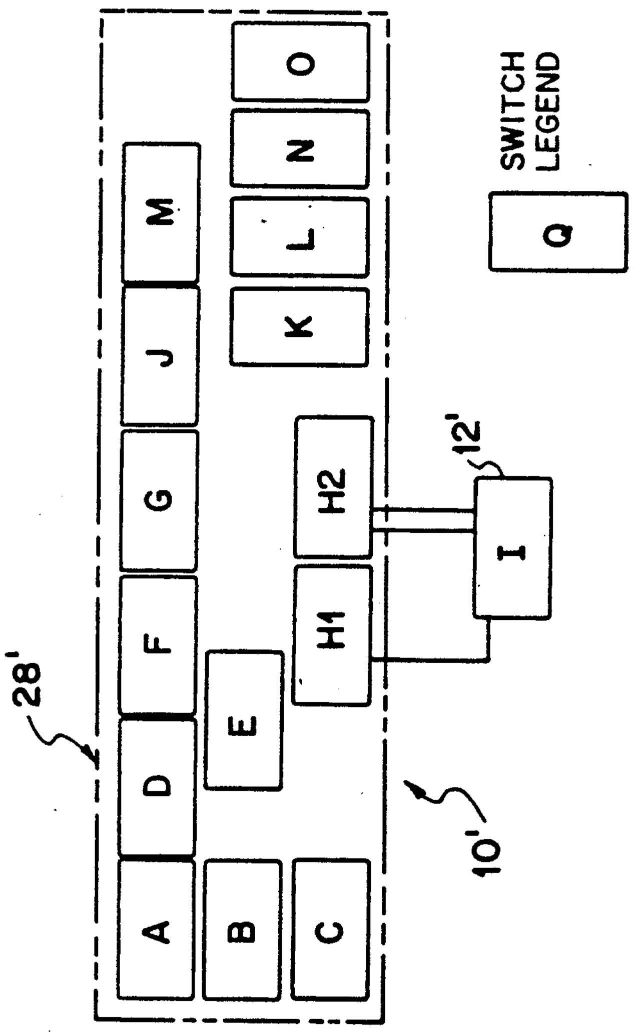
FIG_4

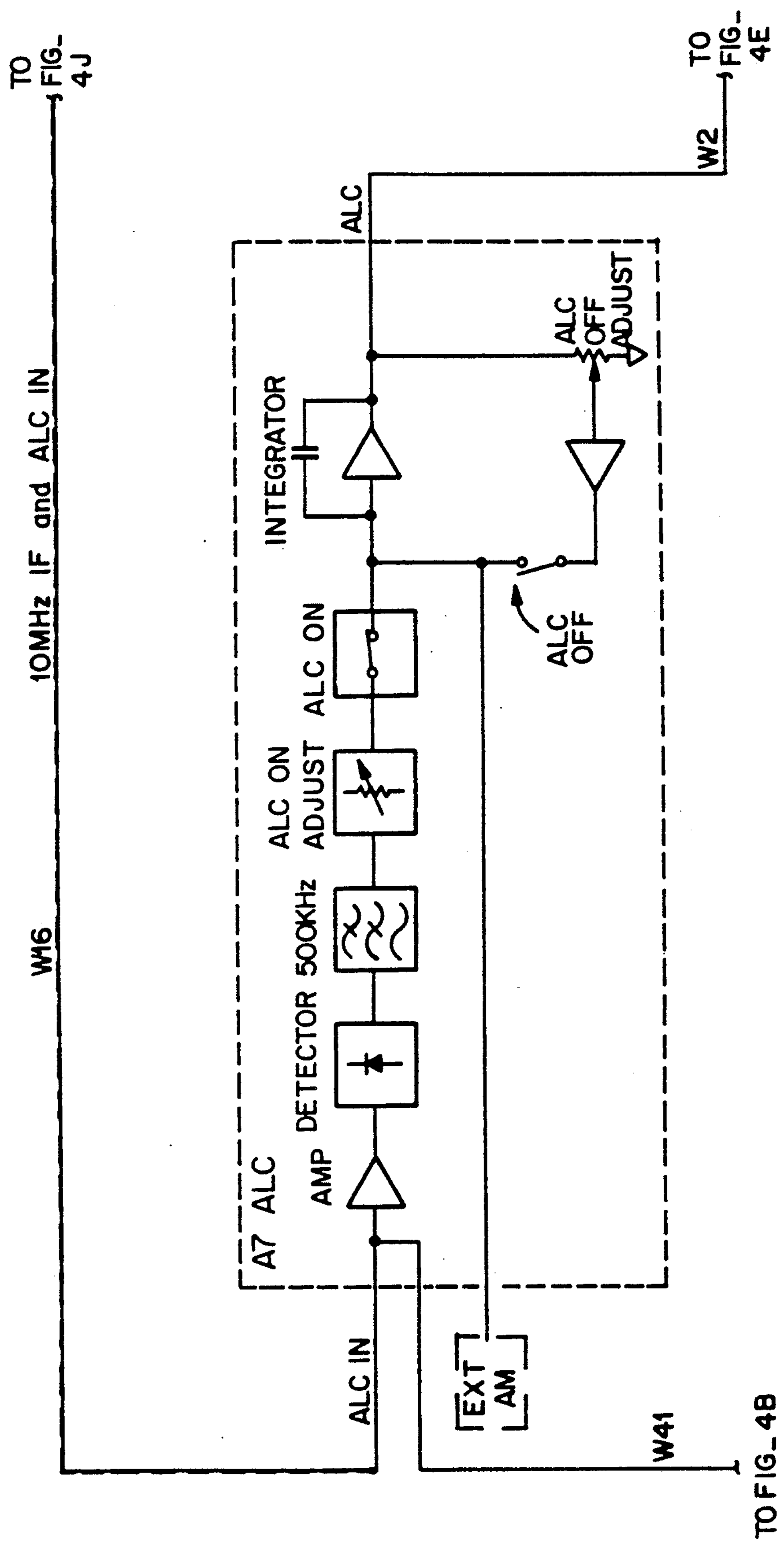
FIG_ 4A

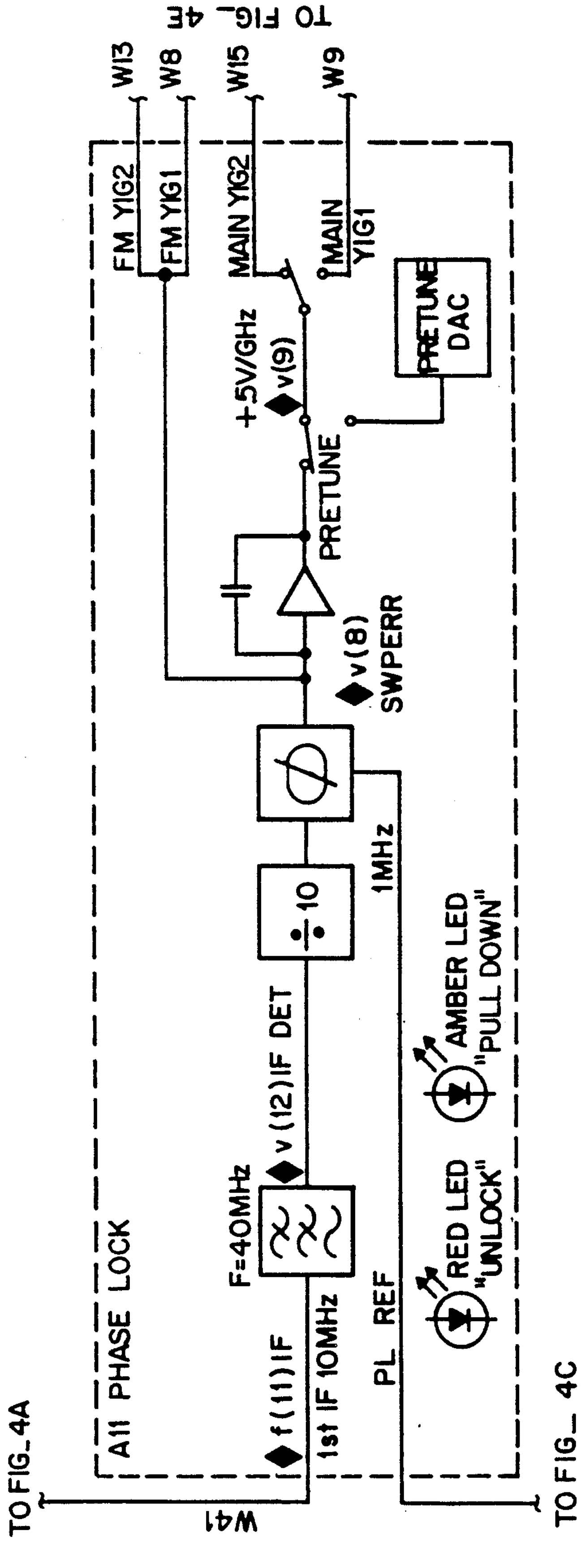
FIG_ 4B

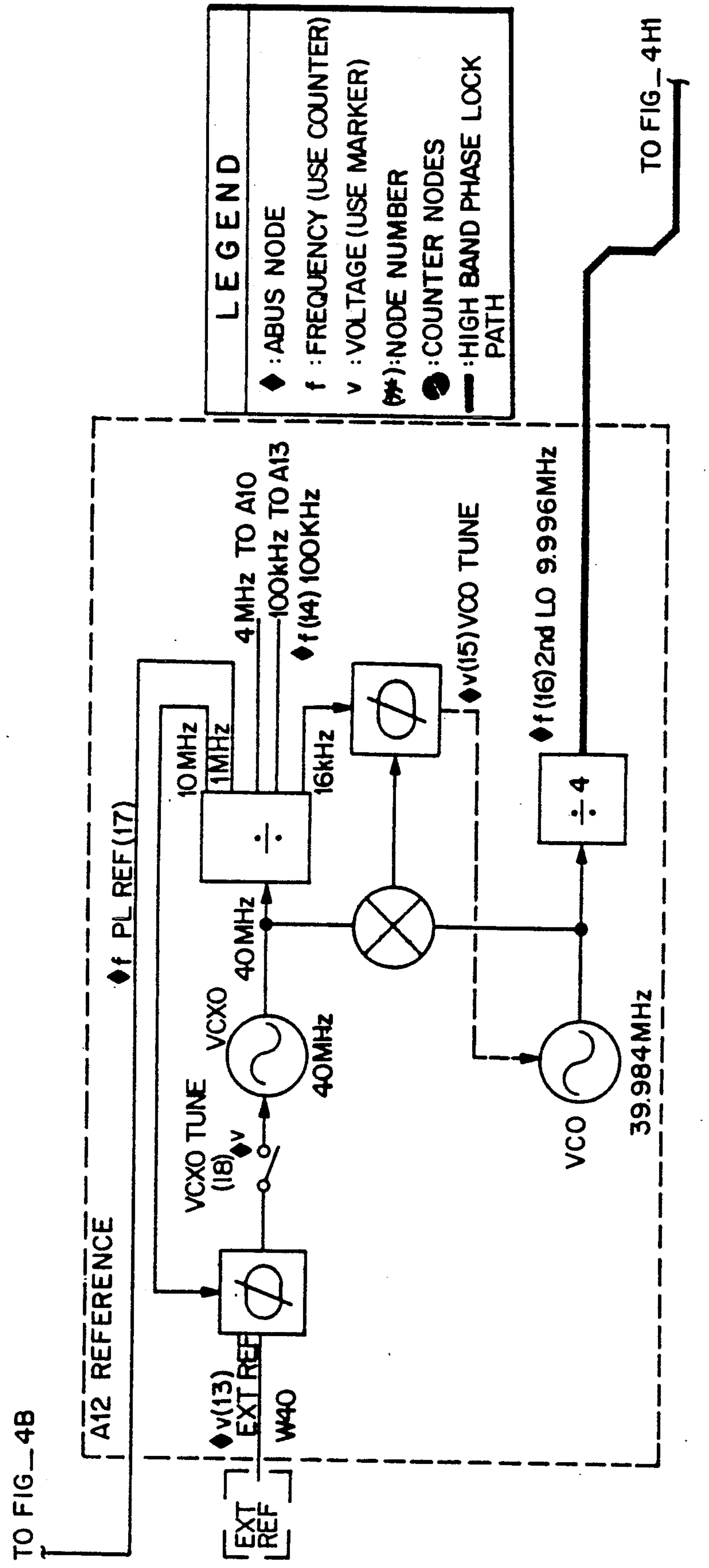
FIG_ 4C

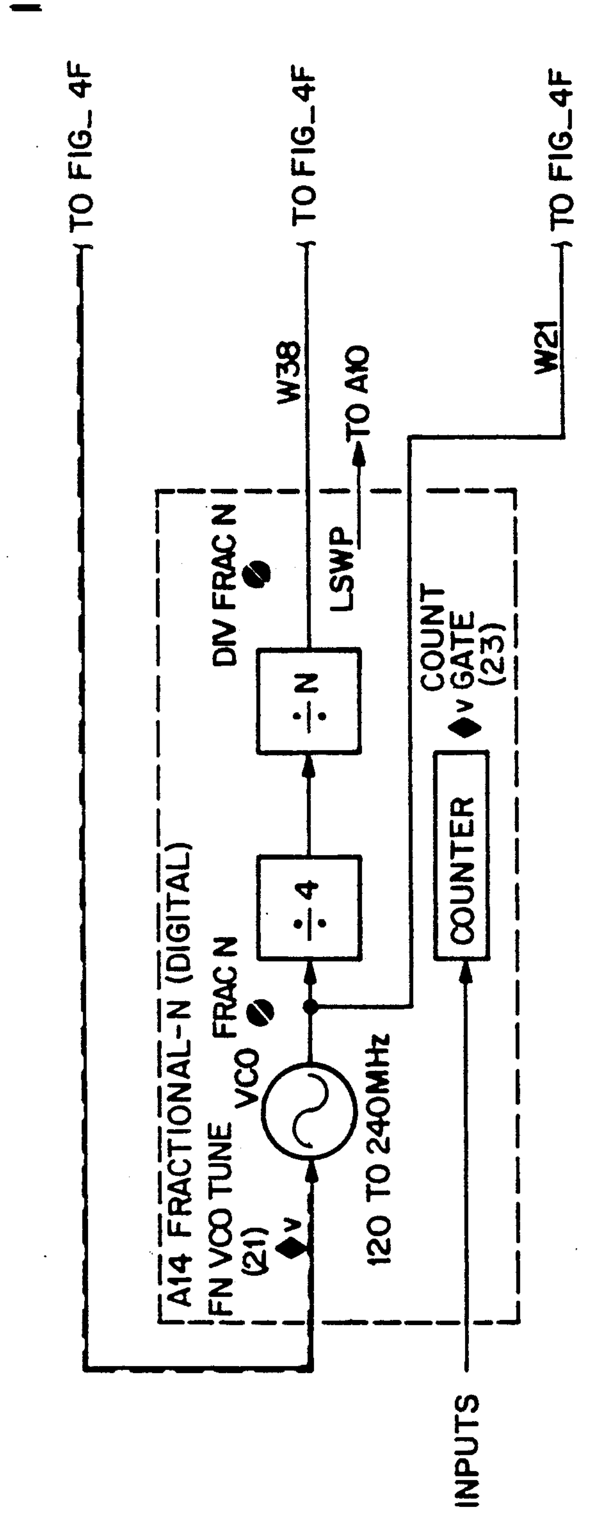
FIG_4D

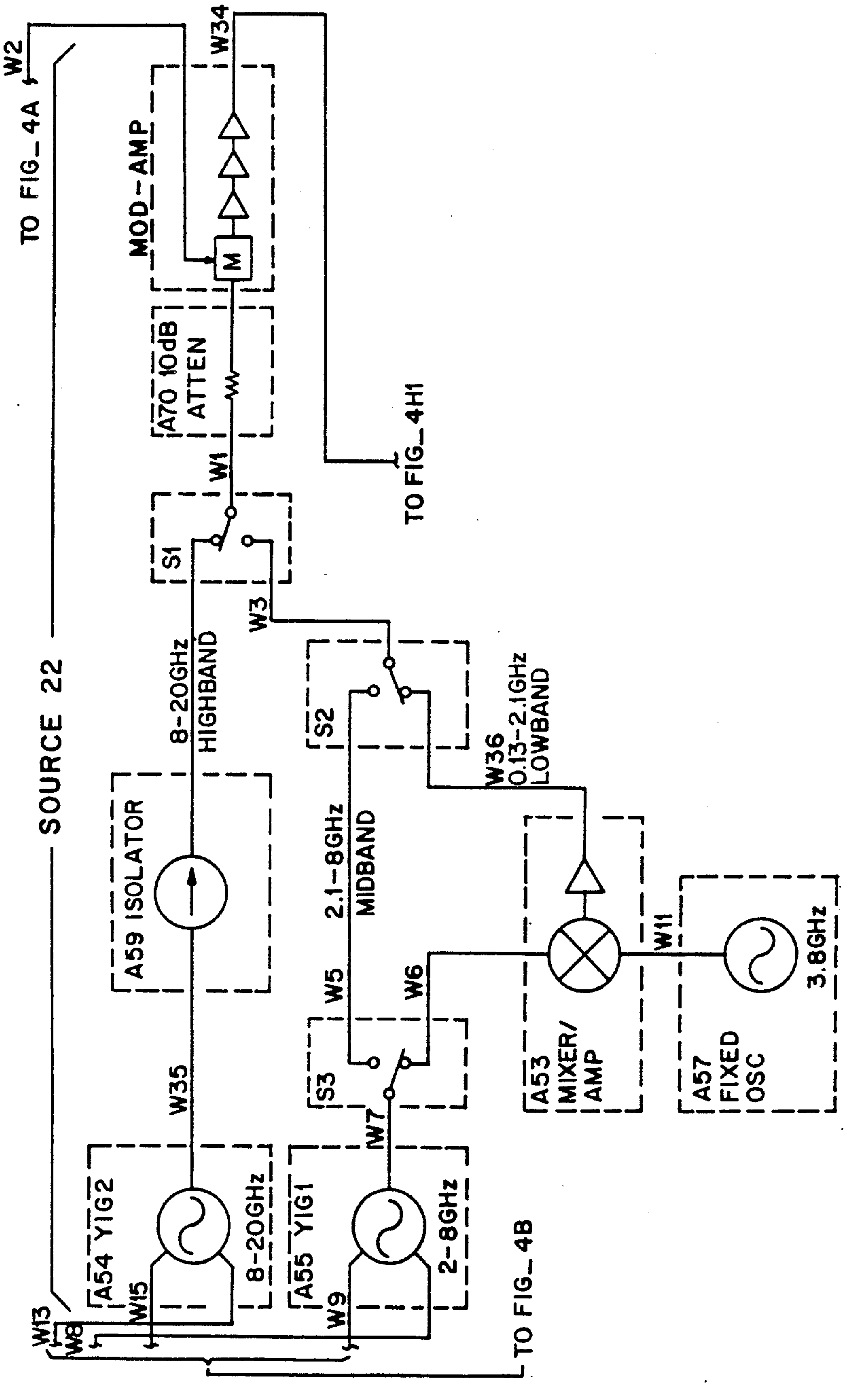
FIG_4E

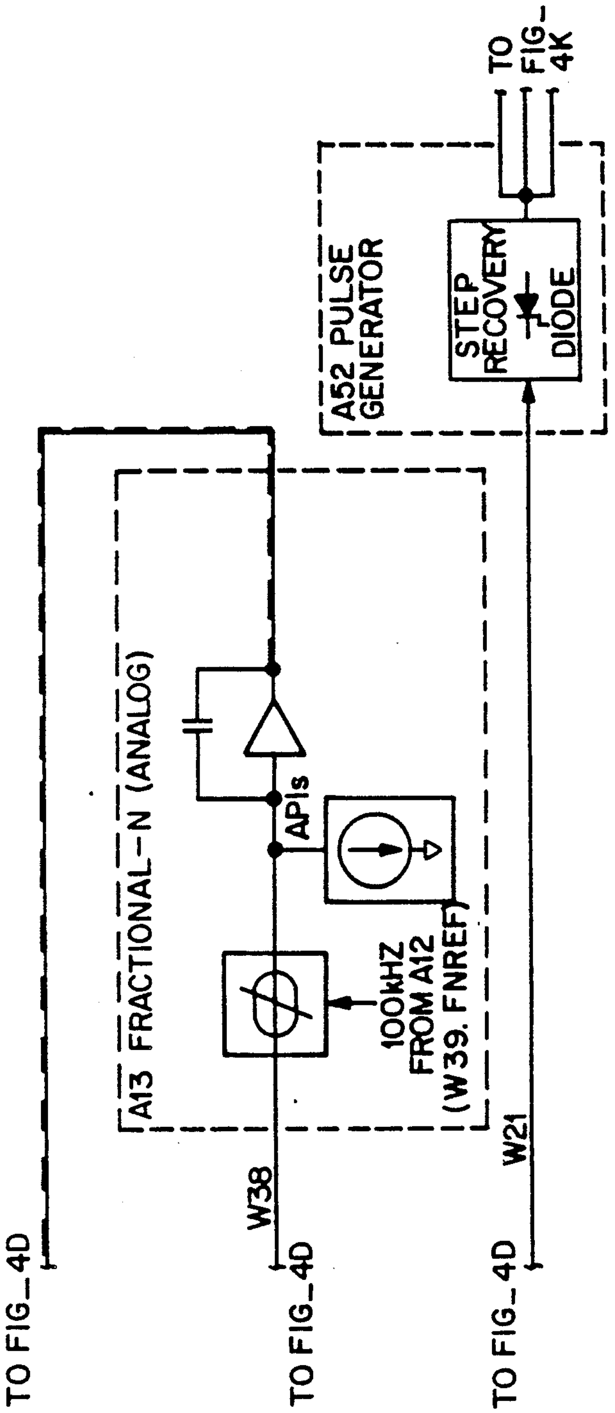
FIG_4F

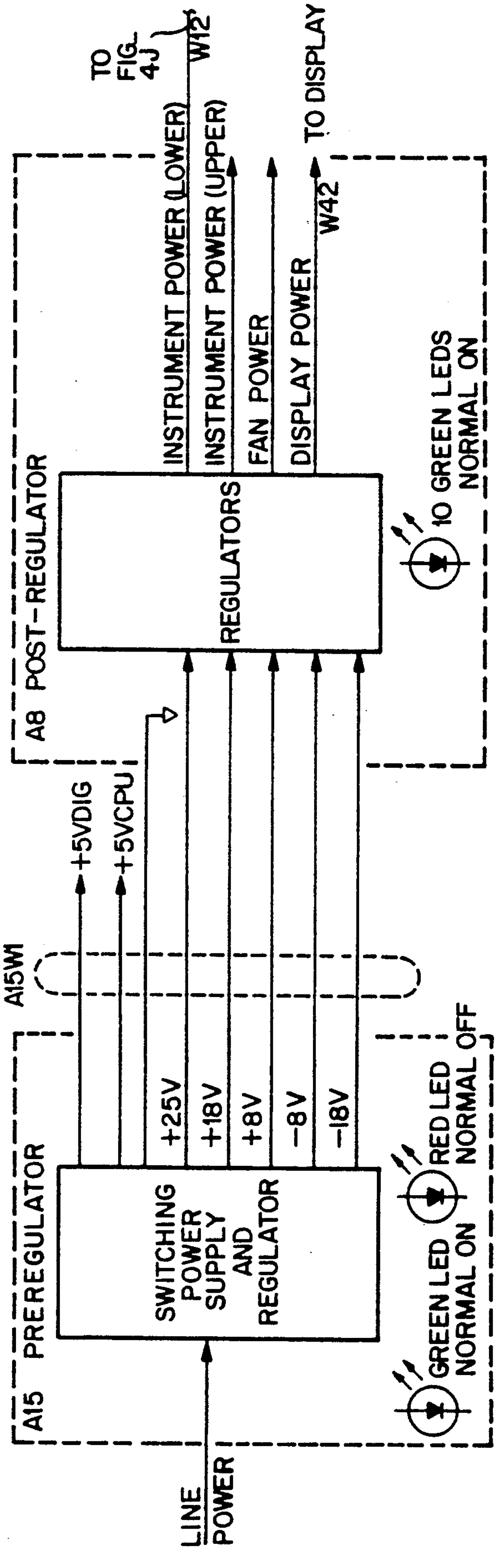
FIG_ 4G

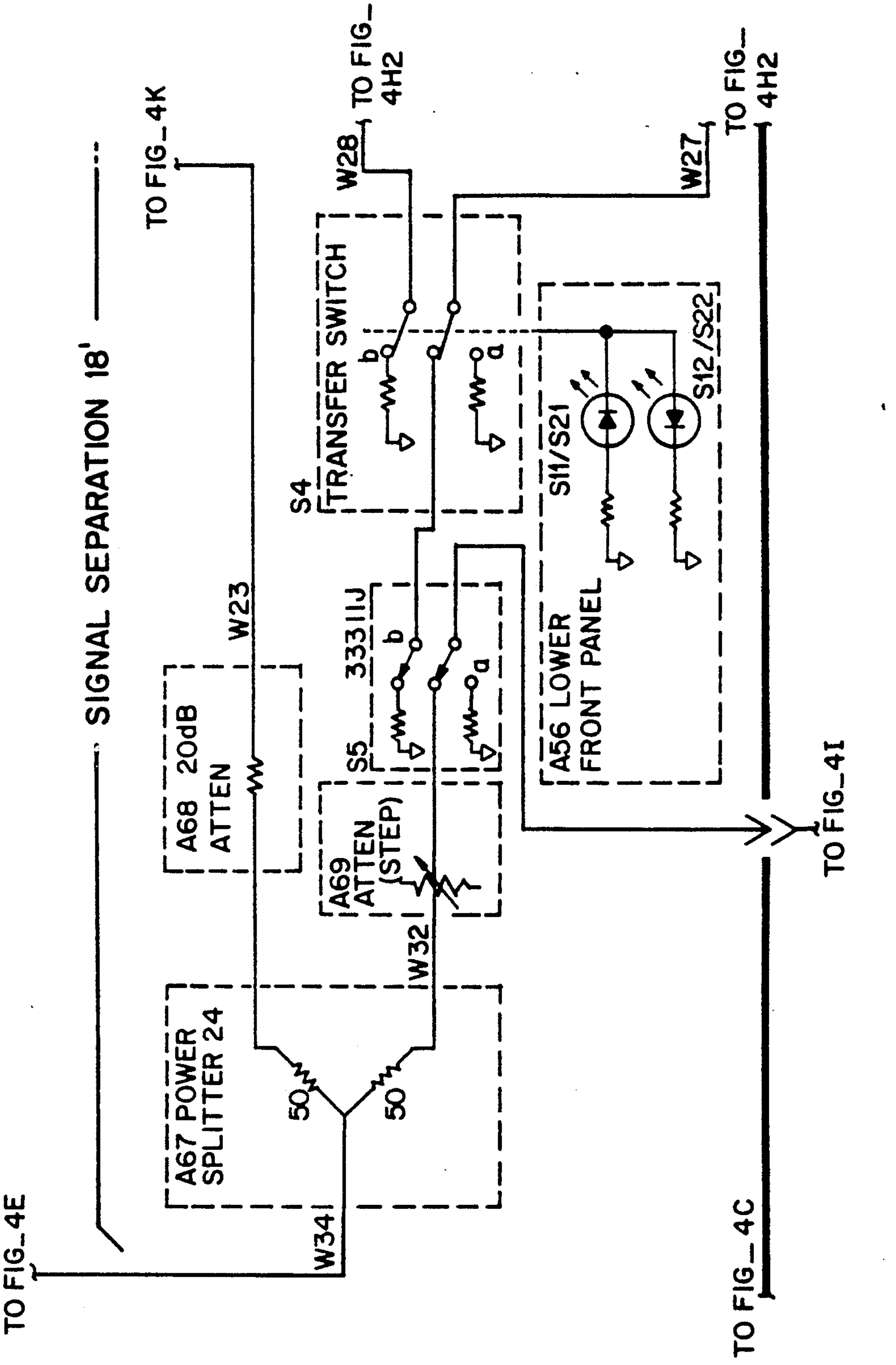
FIG_ 4H1

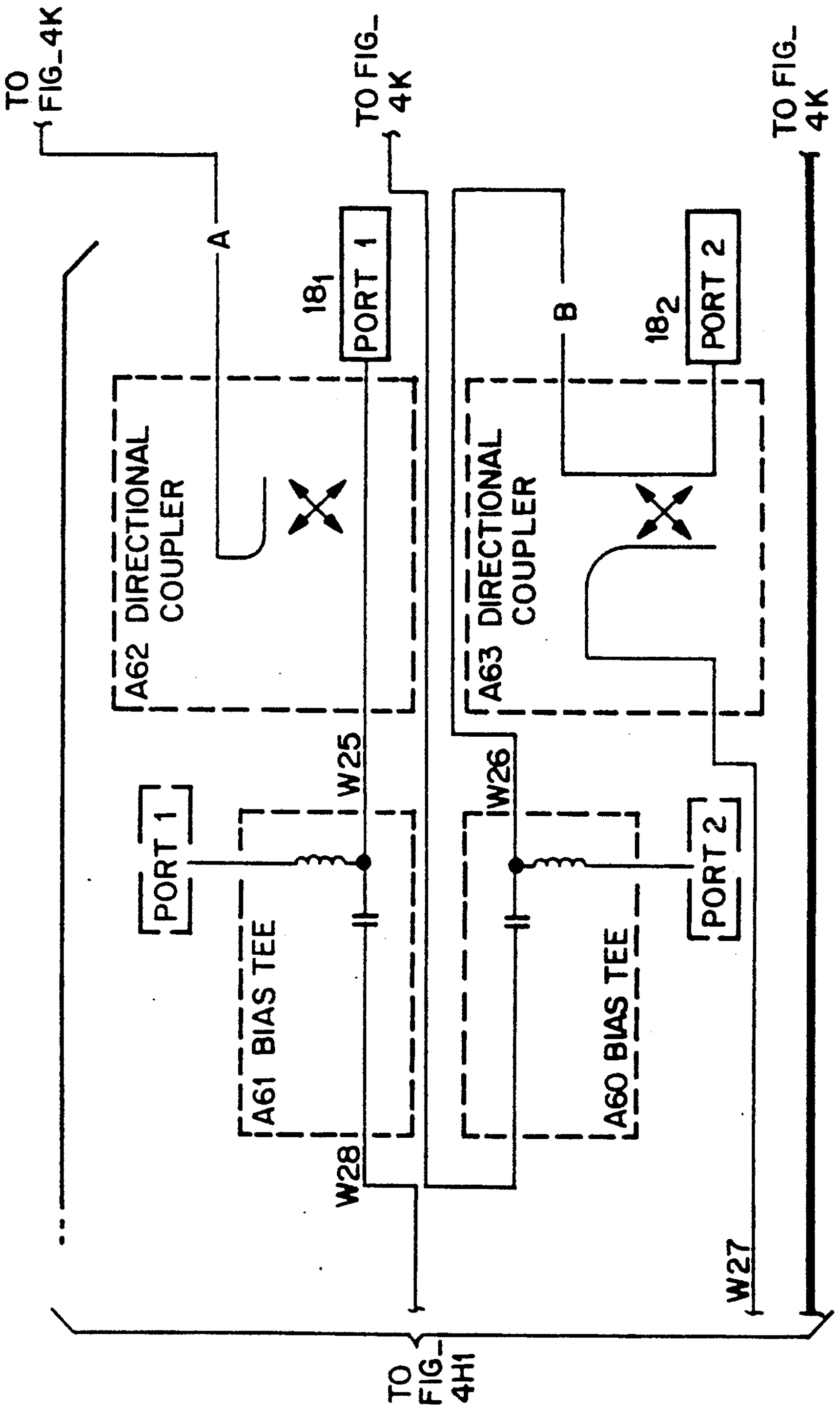
FIG_4H2

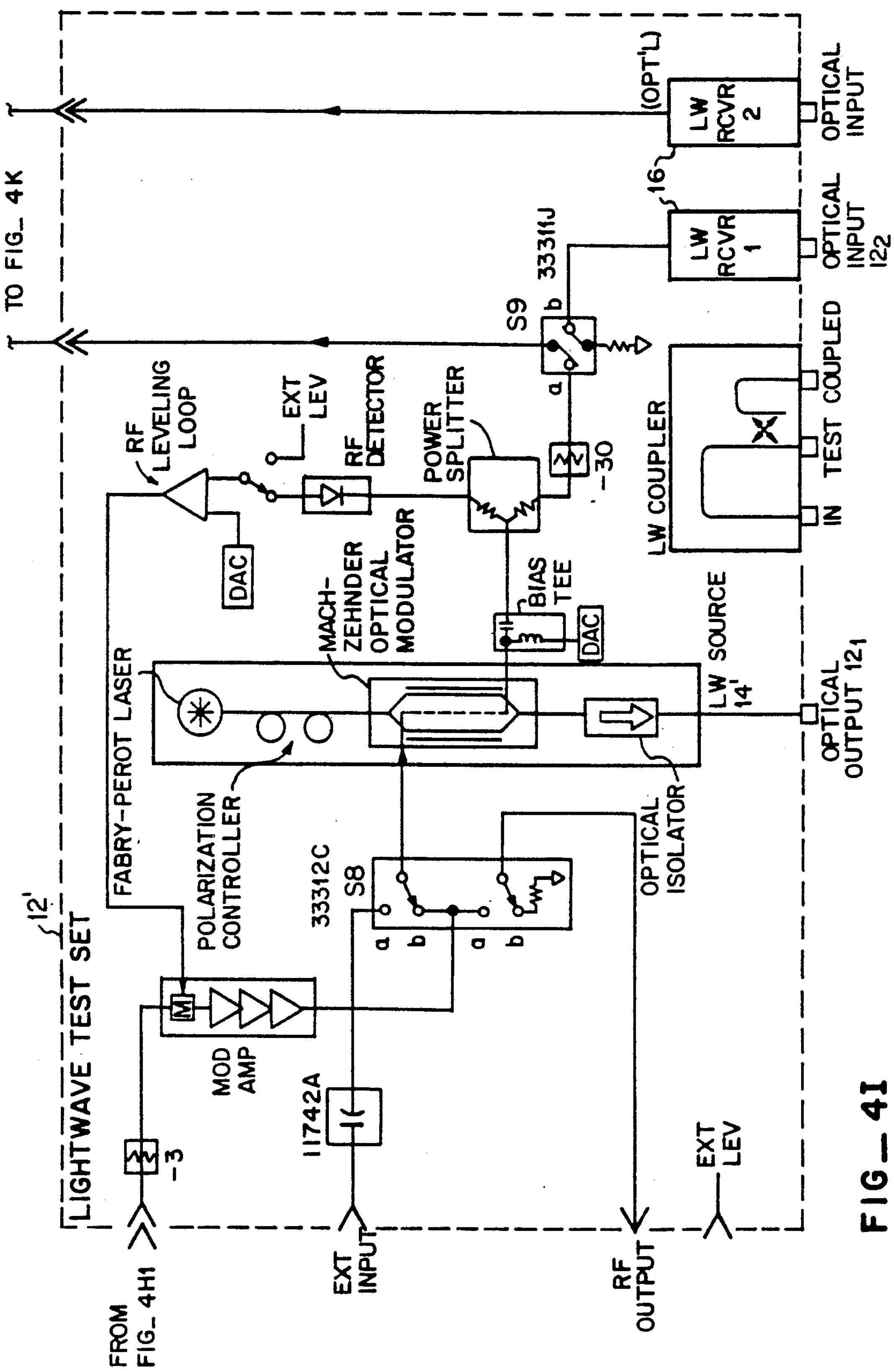
FIG_ 4I

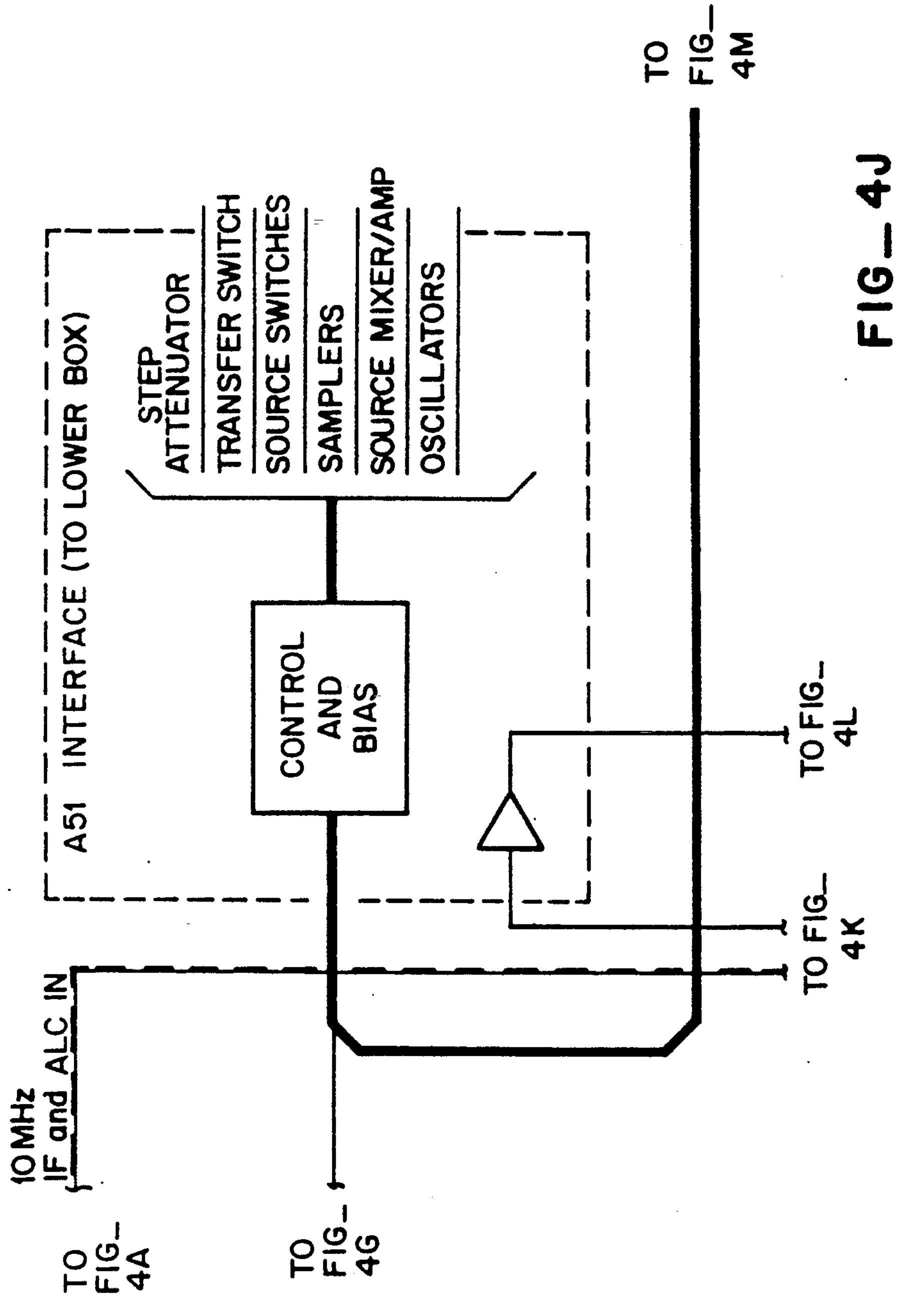
FIG_ 4J

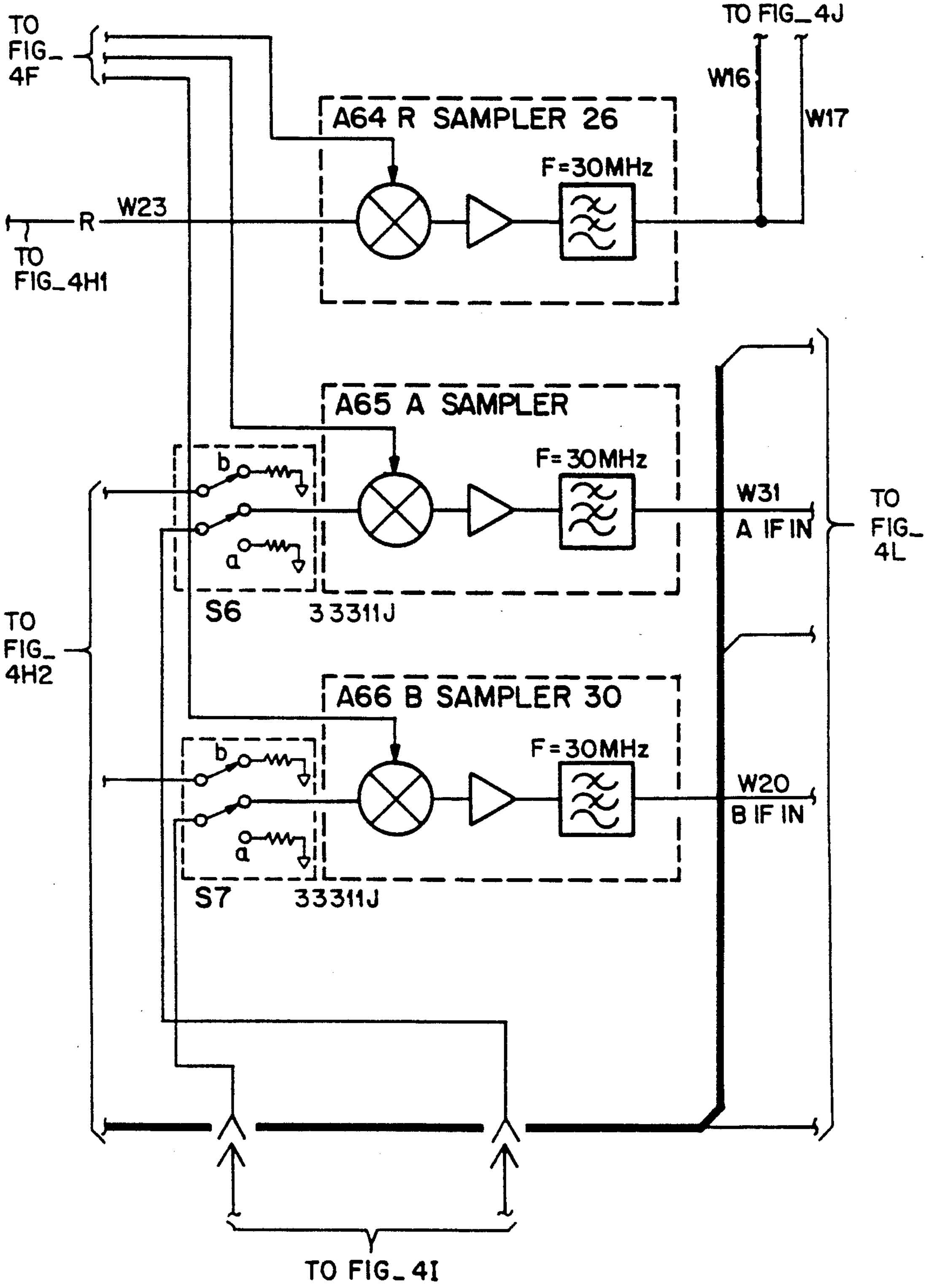
FIG_4K

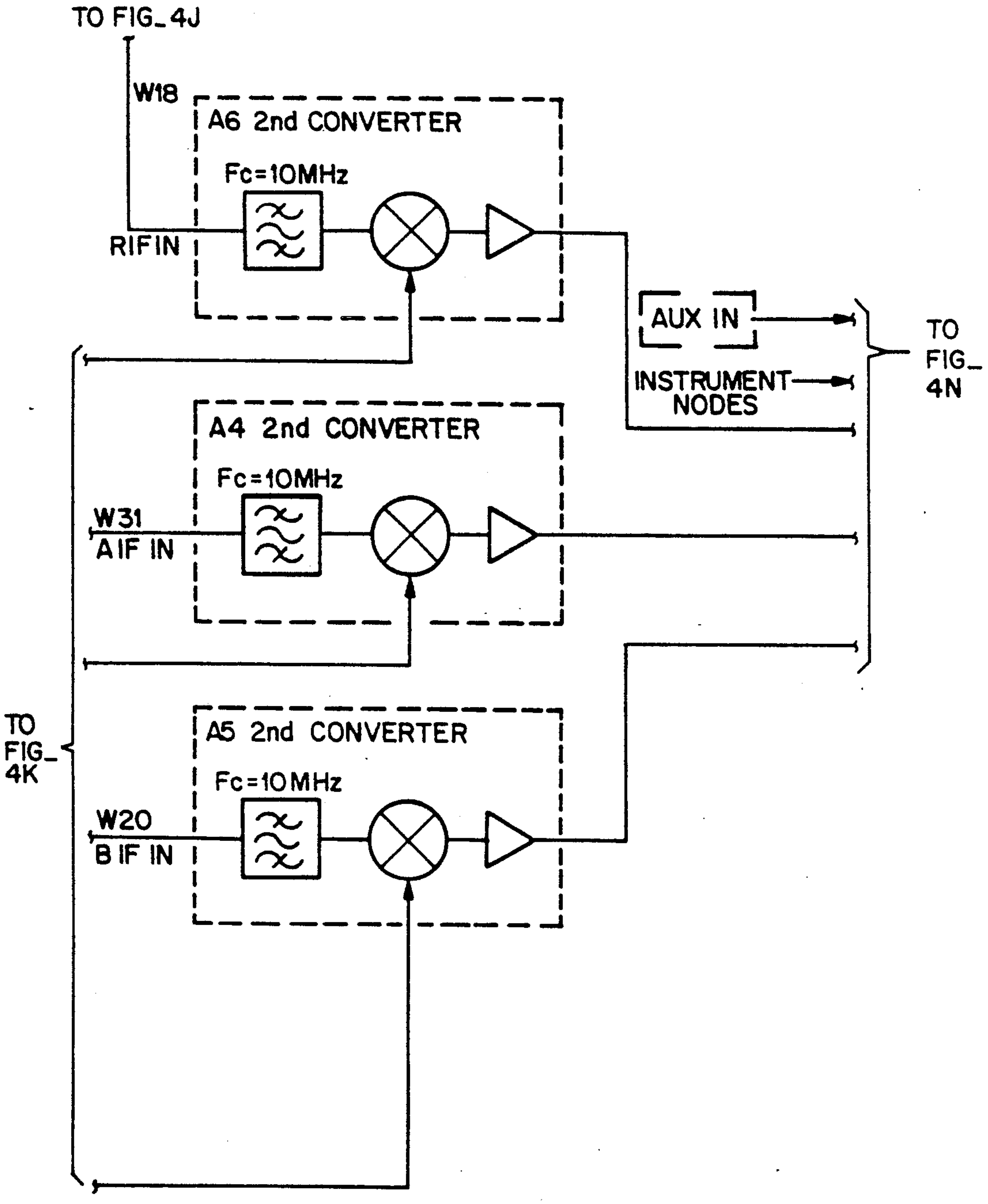
FIG_4L

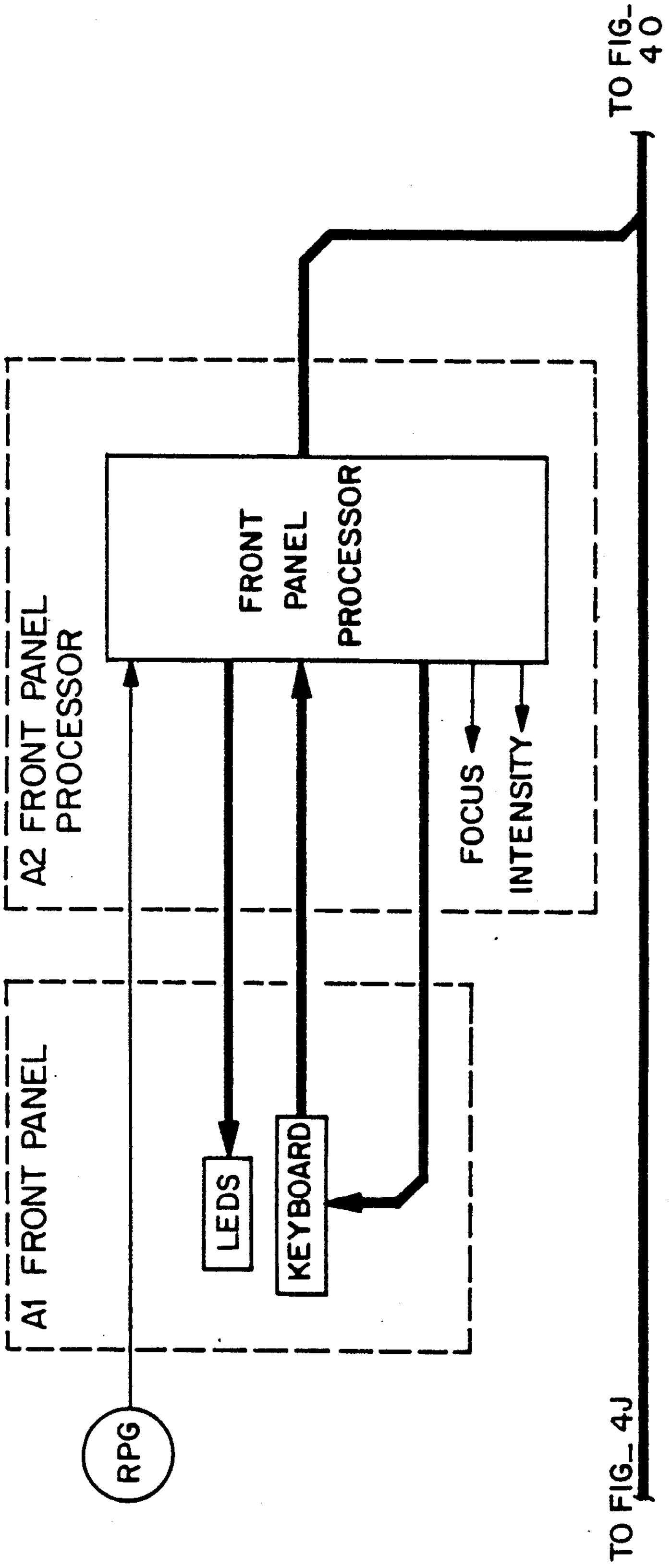
FIG_ 4M

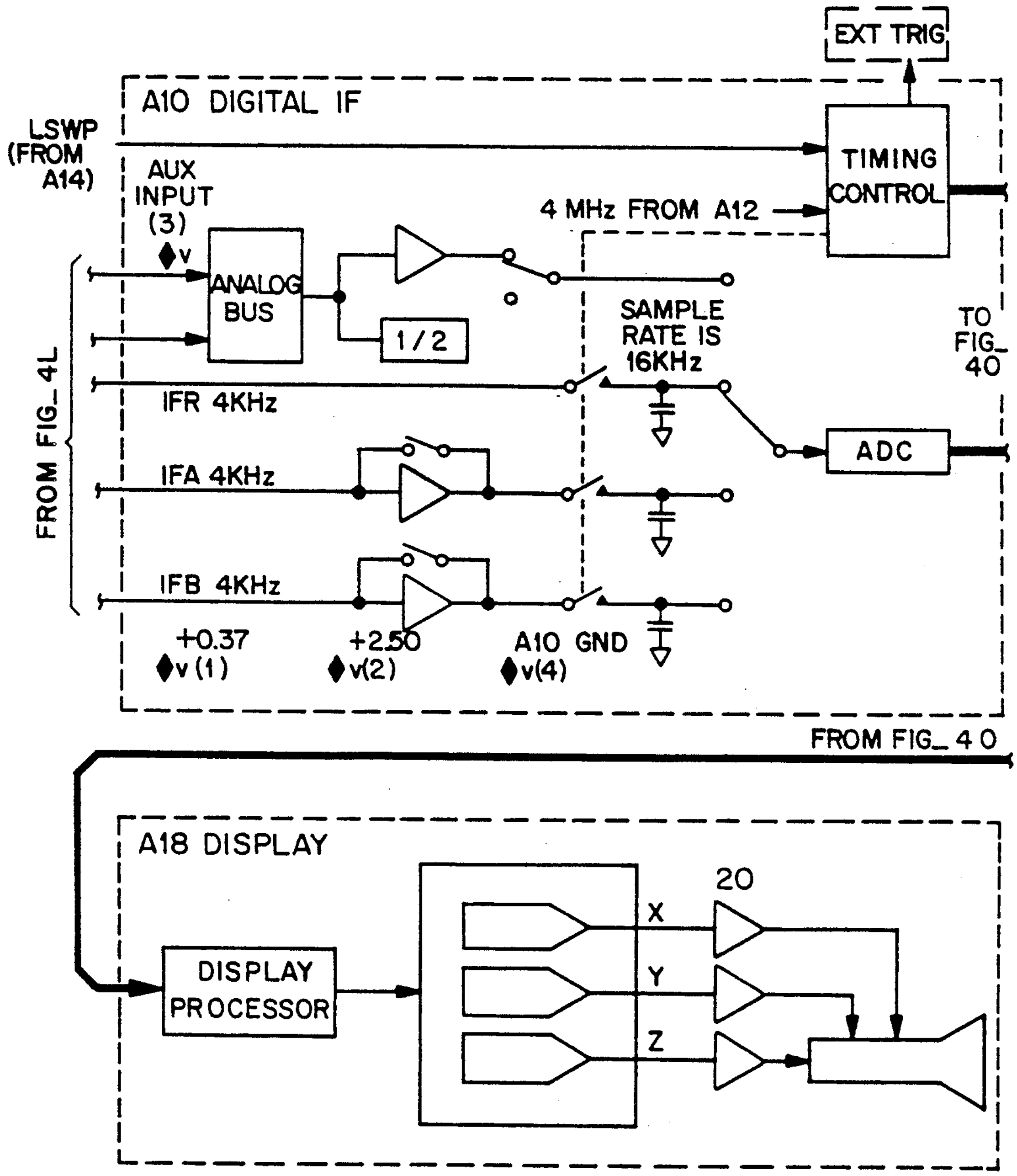
FIG_ 4N

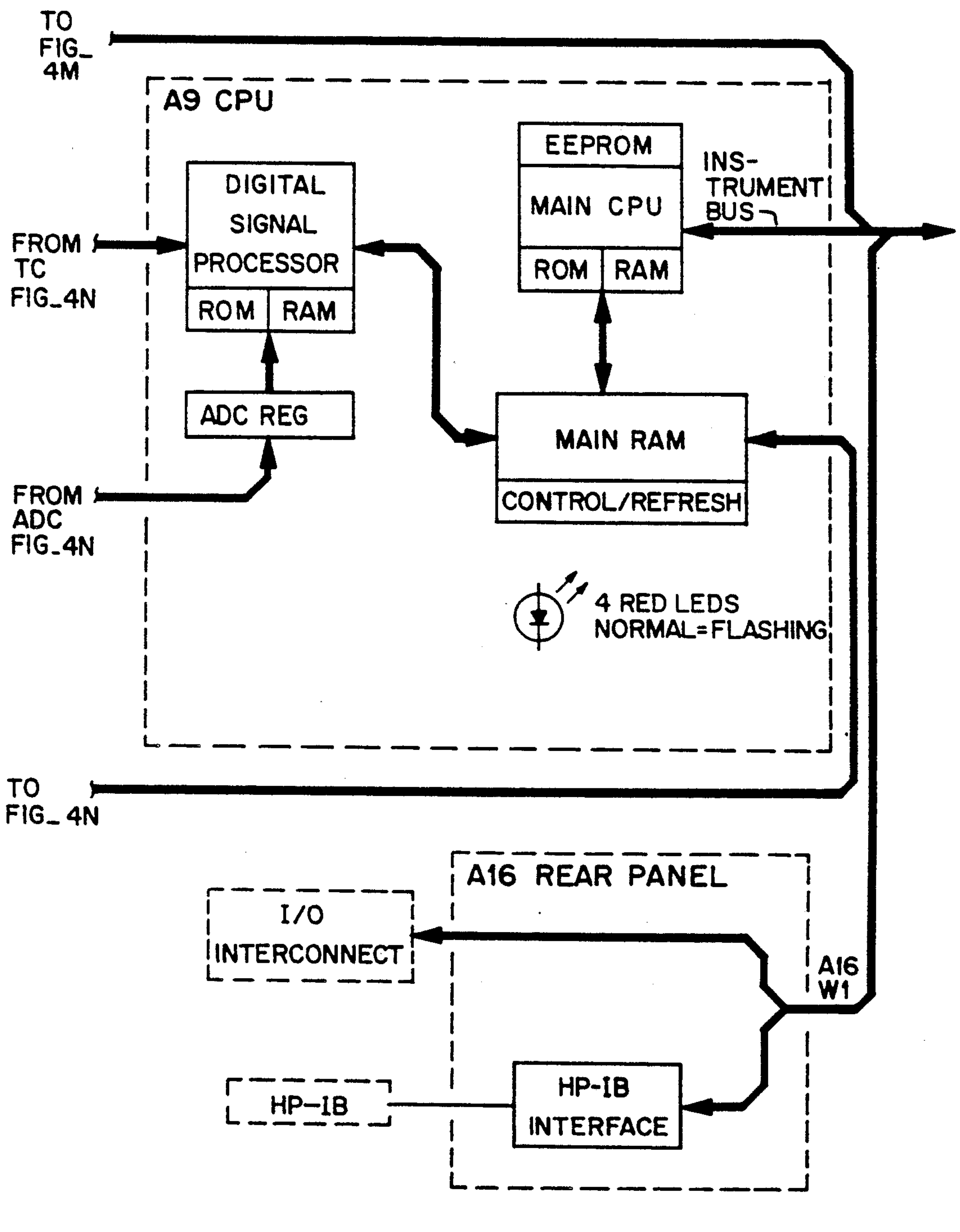
FIG_40

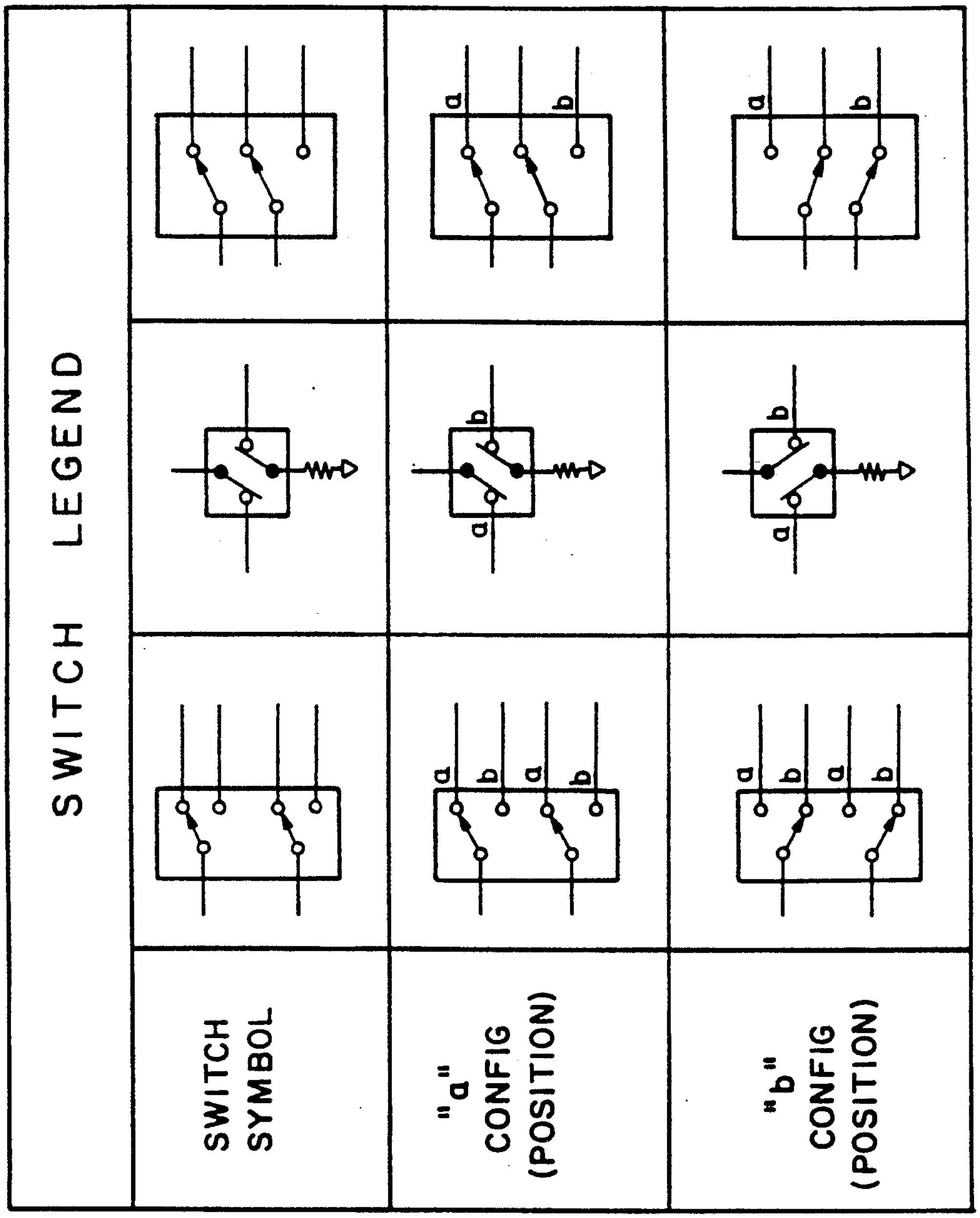
FIG_ 4Q

| DEVICE TYPE | DRIVE PORT | THRU PORT | REFL. PORT | S4 | S6 | S7 | S9 | S8 | S5 | THRU SAMPLR. | REFL. SAMPLR |
|---|---|---|---|---|---|---|---|---|---|---|---|
| E--->E | RF1 | RF2 | RF1 | a | a | a | b | b | a | B | A |
| E--->O | RF1 | LWR1 | RF1 | a | a | b | b | b | a | B | A |
| O--->E | LWS/LWC | RF2 | LWR2 | a | b | a | b | b | b | B | A |
| O--->O | LWS/LWC | LWR1 | LWR2 | a | b | b | b | b | b | B | A |

FIG_ 5

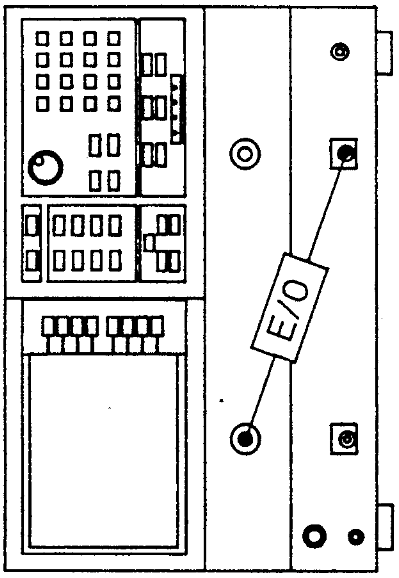
FIG_ 6A
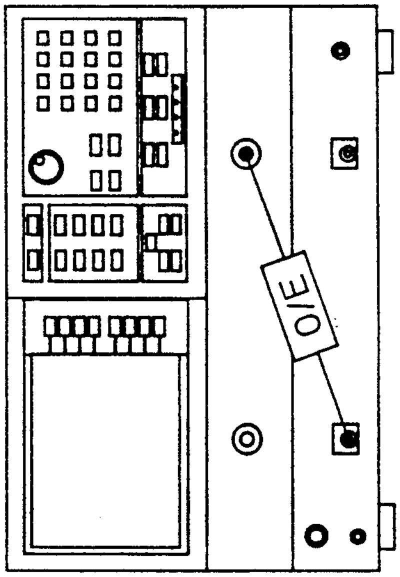
FIG_ 6B
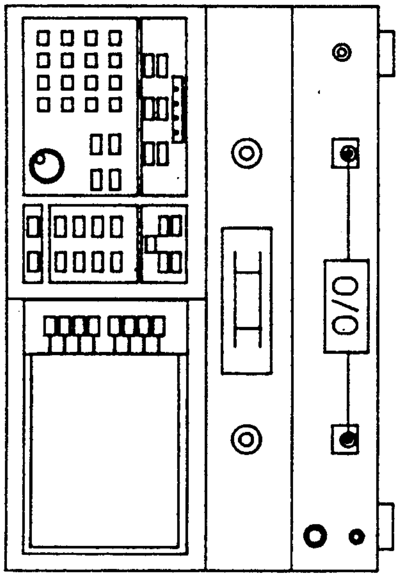
FIG_ 6C
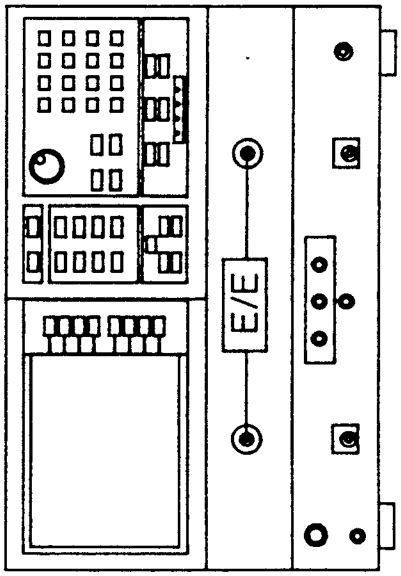
FIG_ 6D

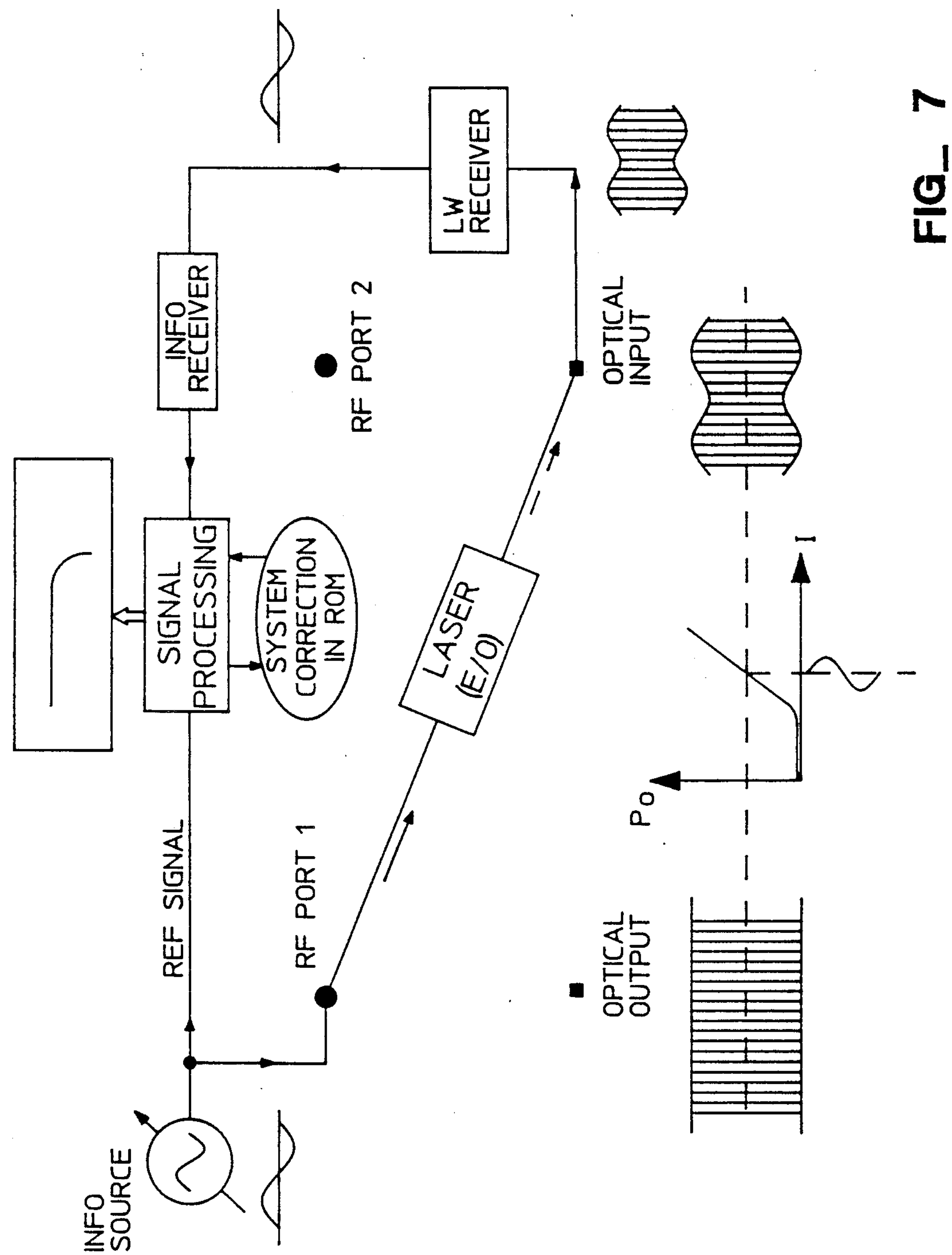
FIG_ 7

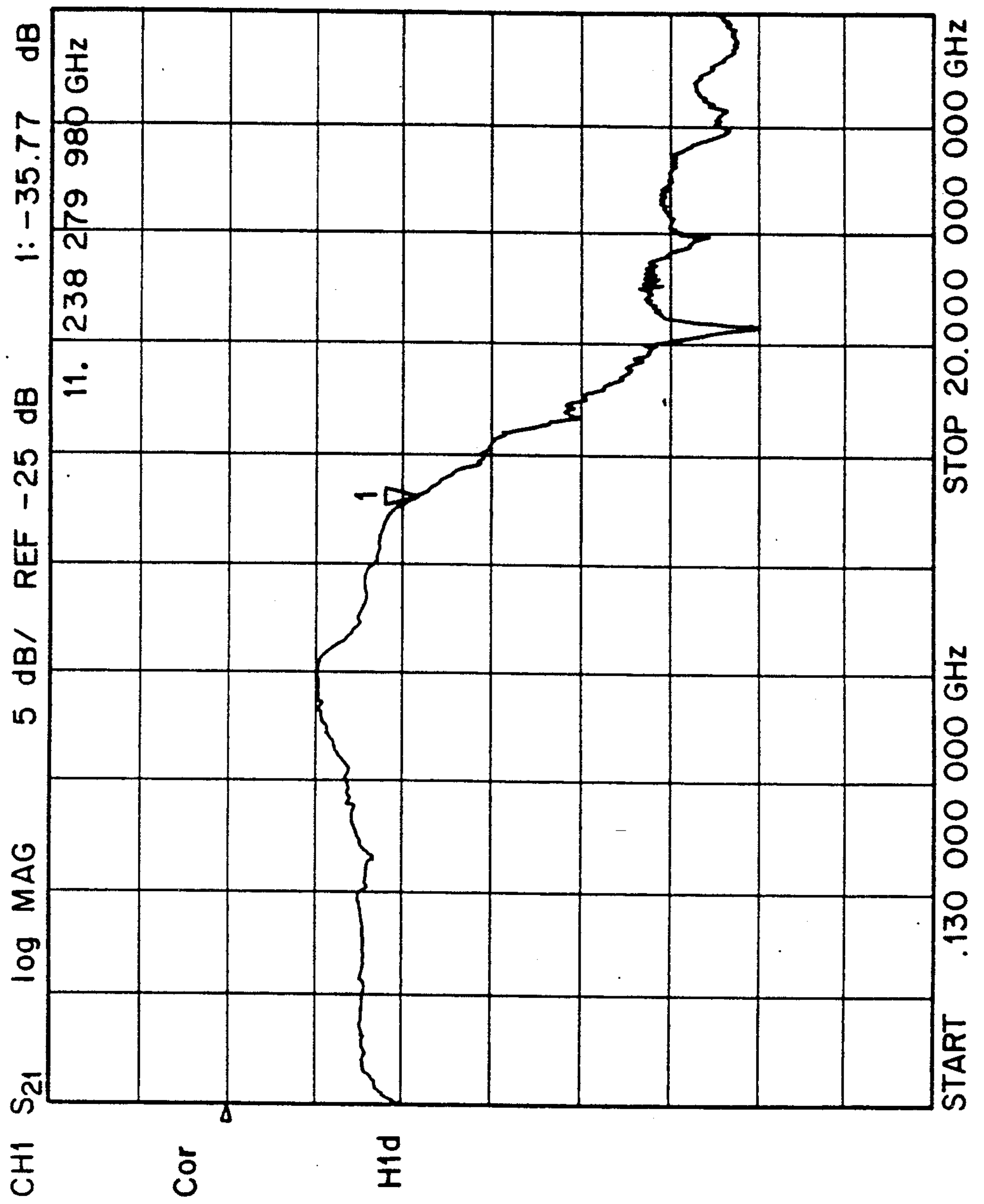
RESPONSIVITY OF ORTEL 3515A FIBEROPTIC TRANSMITTER
FIG_8

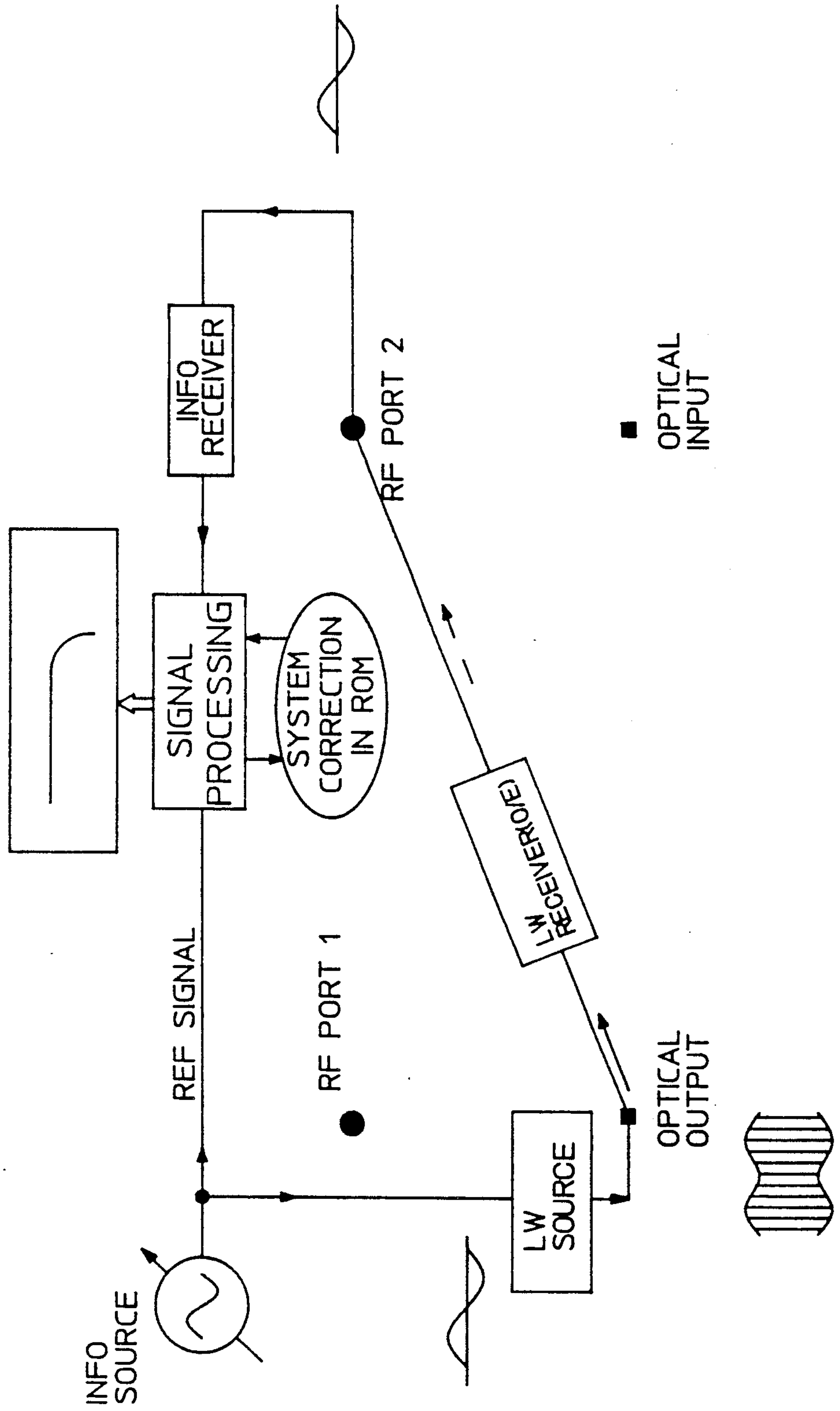
FIG_ 9

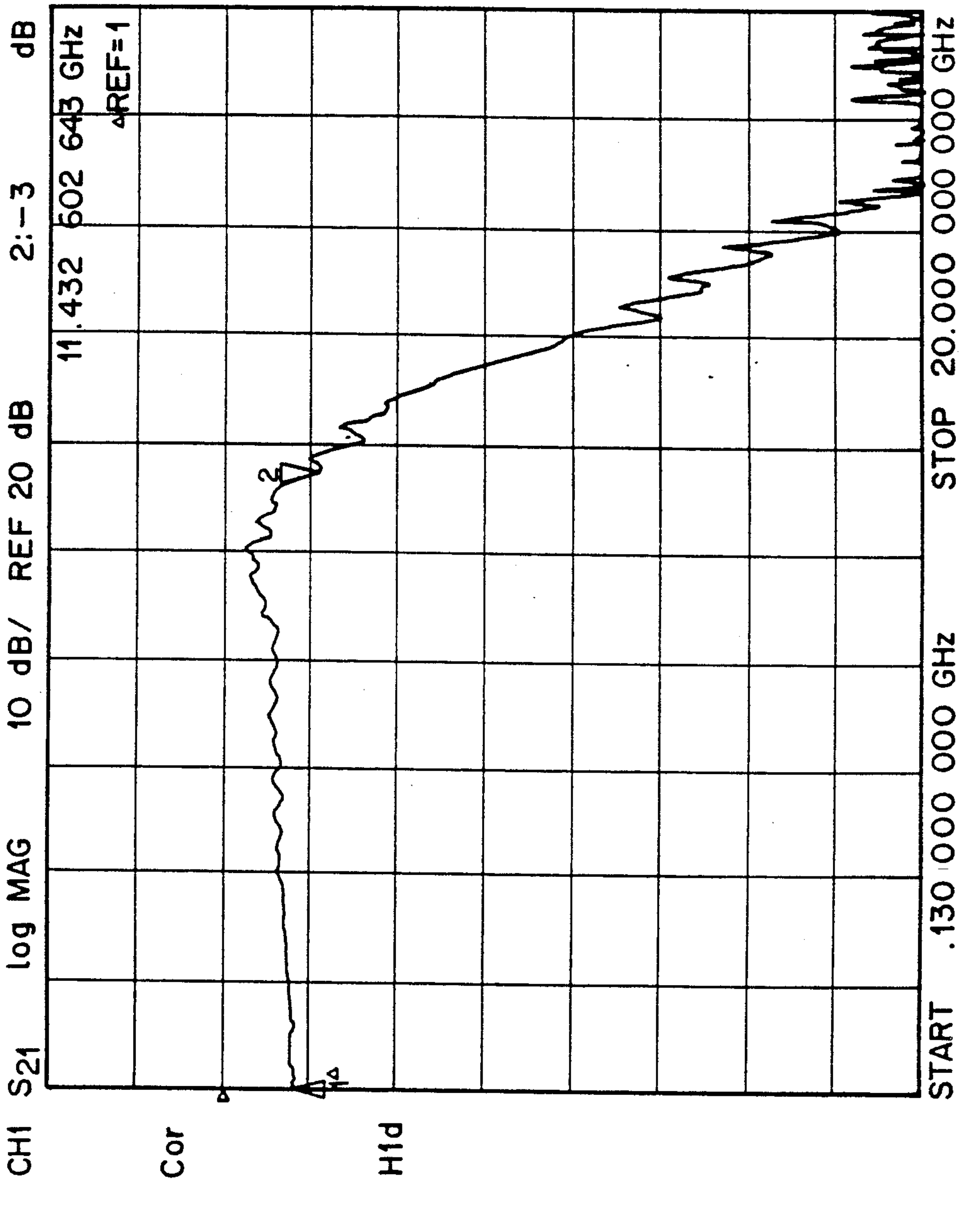
PROTOTYPE OF AMPLIFIED 6 GHz LW RECEIVER
FIG_10

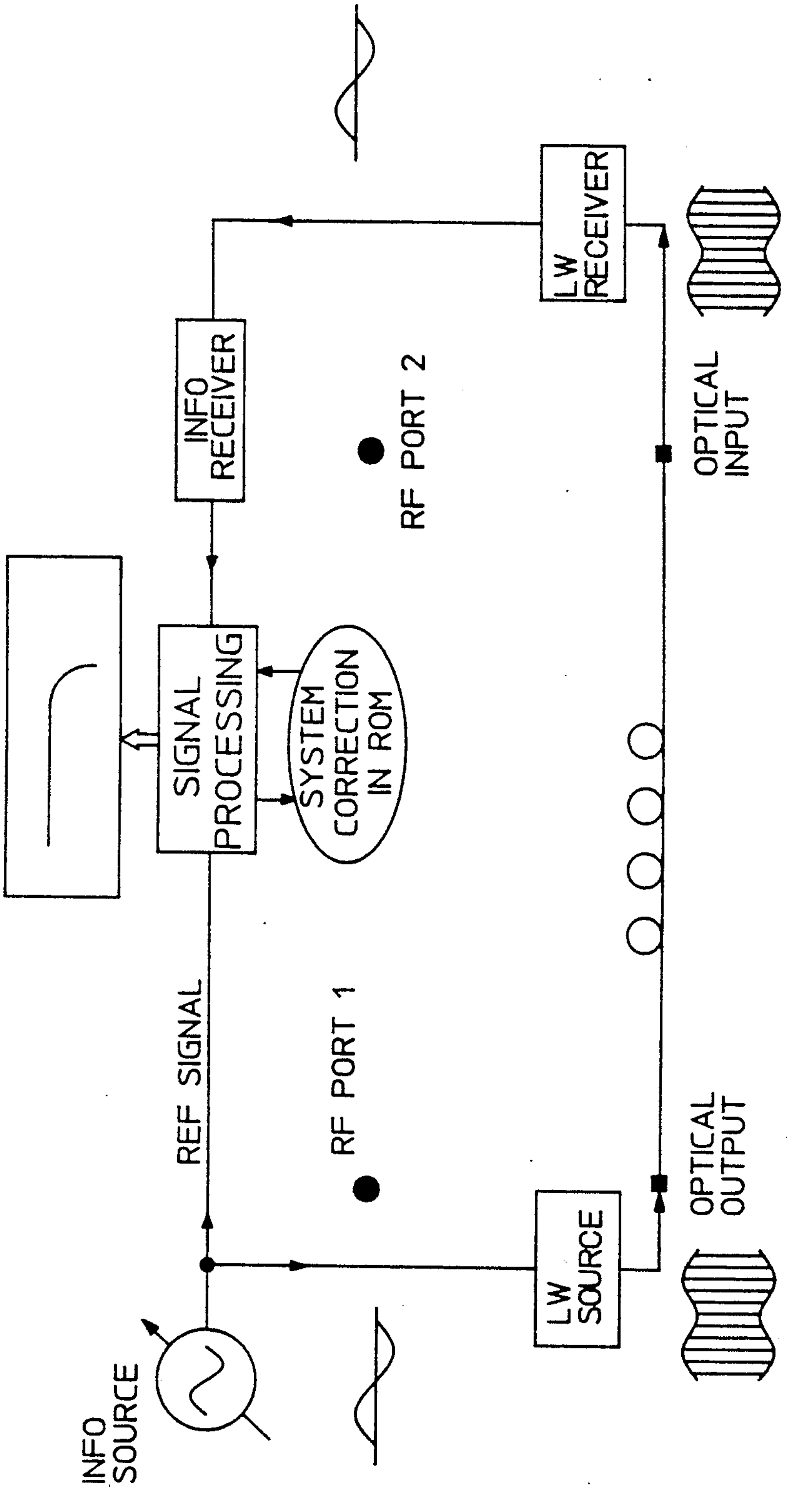
FIG_ 11

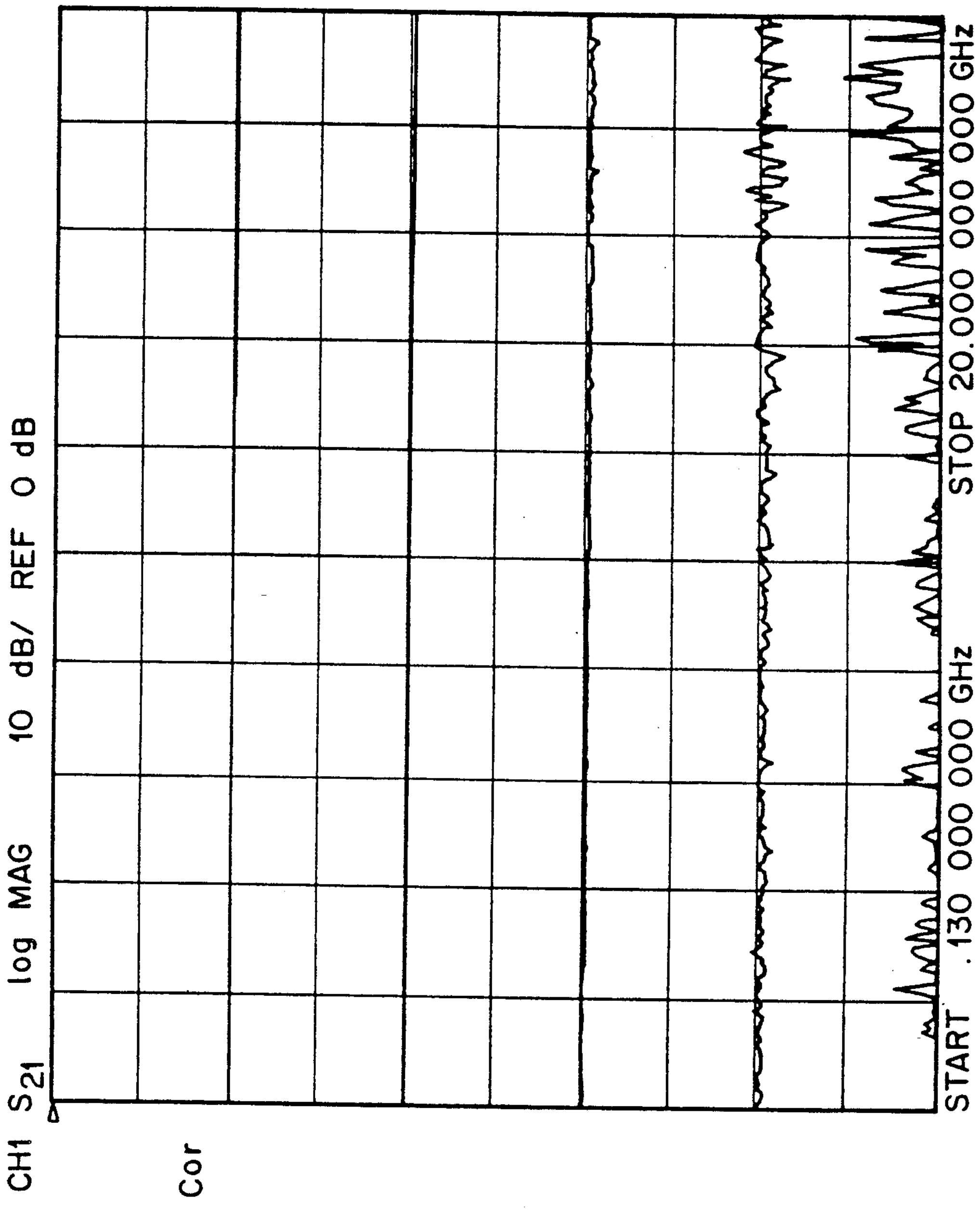
DYNAMIC RANGE IN O/O MODE
FIG_12

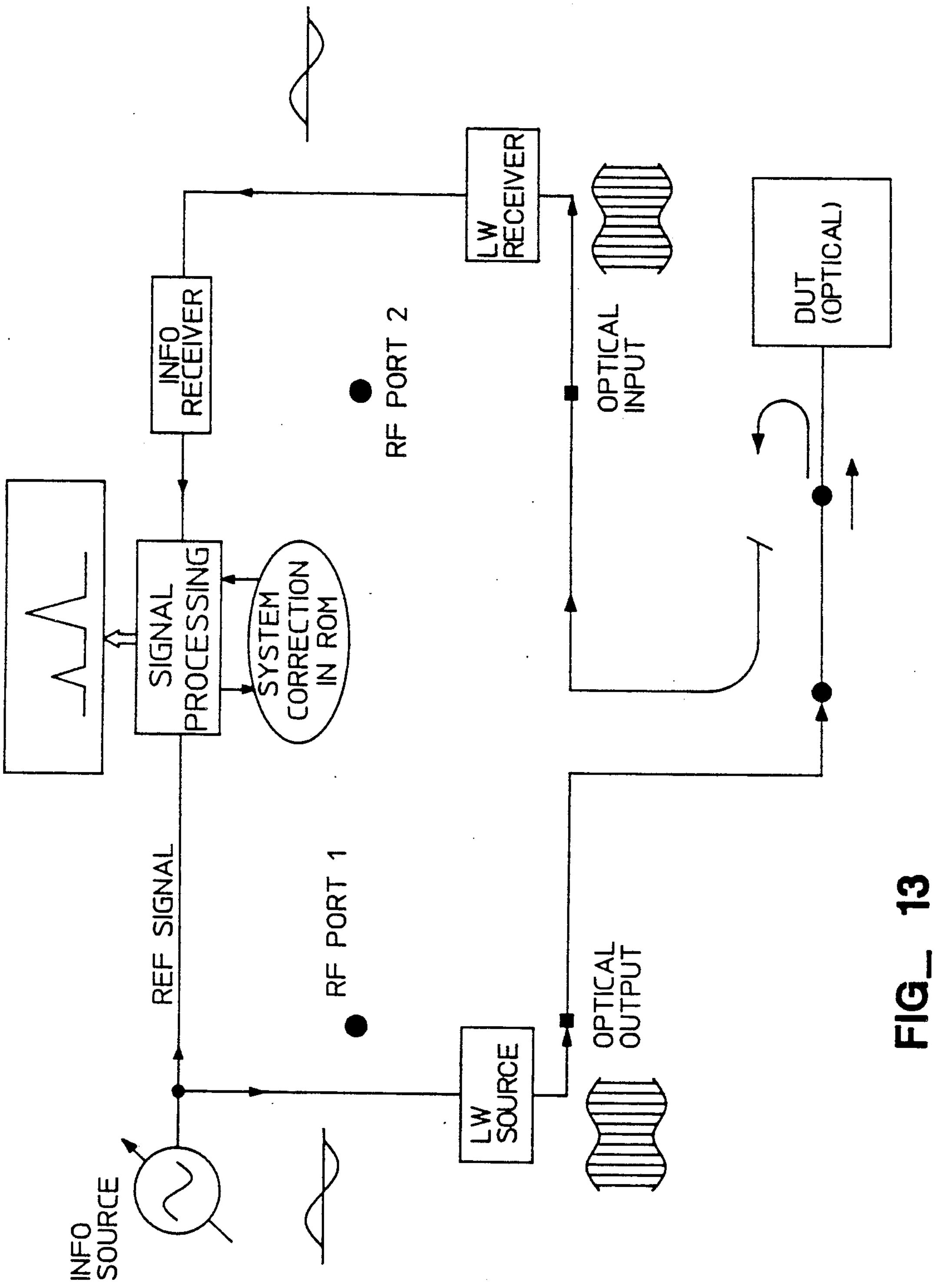
FIG_ 13

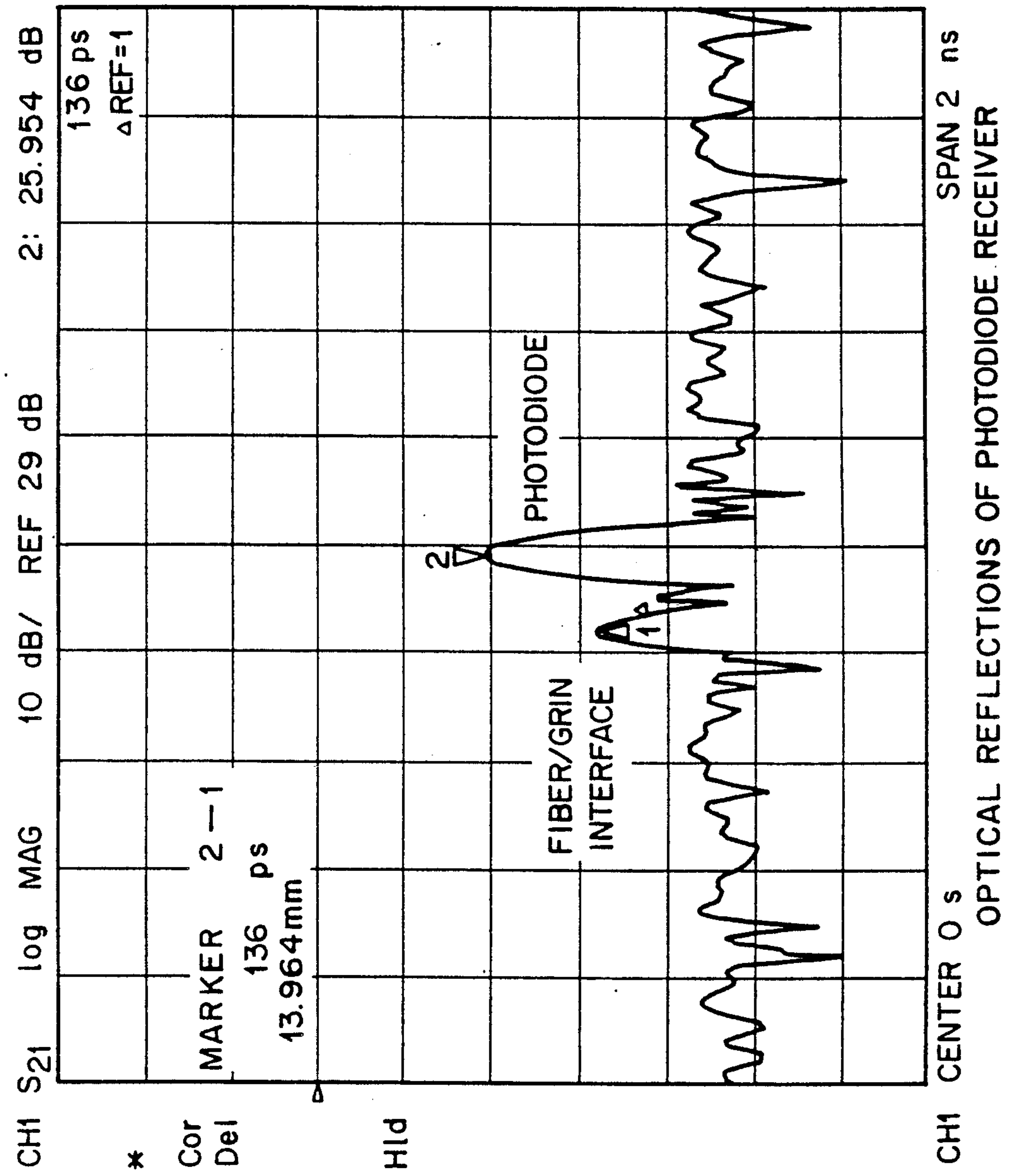
FIG_14

LIGHTWAVE COMPONENT ANALYZER

CROSS-REFERENCE TO RELATED APPLICATION

This patent application is a continuation-in-part of U.S. patent application Ser. No. 07,/307,866, filed on Feb. 6, 1989, in the names of Paul R. Hernday, Roger W. Wong, and Hugo Vifian, entitled "LIGHTWAVE COMPONENT ANALYZER HAVING AN INTEGRATED OPTICAL SOURCE AND RECEIVER", and assigned to the same assignee as this application, now abandoned.

BACKGROUND OF THE INVENTION

This invention relates to electronic test instruments and, more particularly, to electronic instrumentation for signal measurements during tests performed on electrical, electro-optical, opto-electrical, and/or optical systems, subsystems, and associated components. Specifically, the invention is directed to an integrated electronic test instrument for accurately performing these tests, including methods for calibrating, and measuring with, such an instrument. One embodiment of the invention provides a lightwave component analyzer having at least an internal optical receiver and preferably also having an internal optical source which are selectively connectable by switches configurable by means of an internal or an external instrument controller for calibration and performance of at least electro-optical, opto-electrical, and optical measurements. The switches are arranged in a switch matrix. The configurable switch matrix is connected by the instrument controller in response to selection of a measurement by a user to facilitate calibration of, and measurements with, the lightwave component analyzer.

An exemplary use of the invention is in the field of optical and electrical signal measurements in connection with fiber optic systems. With higher bit rates and wider-band modulations becoming prevalent in fiber optic systems, the designers and manufacturers of these systems, as well as subsystems and associated components, need to be able to characterize performance at increasingly higher modulation rates. Some new fiber optic systems now operate at speeds of one GBPS and higher, which are equivalent to RF and low microwave frequencies.

Various test systems have been developed to meet these measurement needs. One such test system is the HP 8702A lightwave component measurement system produced by Hewlett-Packard Company, Network Measurements Division, Santa Rosa, Calif. This system comprises an internal electrical source incorporated into an analyzer for performing electrical calibration and measurements, but the system comprises a discrete optical source and a discrete optical receiver for performing electro-optical (E/O), opto-electrical (O/E), and optical calibration and measurements. This system has the significant advantage that it incorporates a technique for calibrating the test system for performing the desired signal measurements by calibrating the optical source and receiver (or electro-optical and opto-electrical converters) in terms of their modulation (or demodulation) transfer characteristics. However, this system requires the user to manually connect and disconnect the discrete elements of the test system in particular calibration and measurement configurations for performing desired calibrations and measurements (other than strictly electrical calibrations and measurements), which complicates operation and requires familiarity with the system on the part of the user or a high initial level of user expertise. This has resulted in reduced throughput during testing.

SUMMARY OF THE INVENTION

The present invention provides in various embodiments an integrated lightwave component analyzer for calibrated absolute and relative measurements of modulation and/or demodulation transfer characteristics of electro-optical (E/O), opto-electrical (O/E), and optical devices and for measuring the responses of fiber optic systems, subsystems, and associated components for characterizing their performance. Accordingly, the lightwave component analyzer can measure modulation (demodulation) bandwidth, modulation (demodulation) transfer functions, loss, delay, dispersion, length, and reflections of fiber optic system components, such as lasers, optical receivers, modulators, demodulators, optical fiber cable, and fiber components, based on frequency domain measurements, with improved accuracy and ease.

One embodiment of the lightwave component analyzer in accordance with the invention comprises an internal optical source and an internal optical receiver. A switch matrix is incorporated into the lightwave component analyzer together with the optical source and receiver for providing the appropriate connections of the optical source and receiver circuits for calibrating the lightwave component analyzer and measuring E/O, O/E, and optical devices, and, preferably, electrical devices, with ease. The switch matrix is preferably configurable by means of an internal instrument controller. Alternatively, an external instrument controller can be utilized.

The integrated character of the lightwave component analyzer in accordance with the invention provides many advantages over a non-integrated system, such as the HP 8702A lightwave component measurement system. The chief advantages are improved accuracy, repeatability, and ease of use. Convenience is realized in factory calibration, field service calibration, user calibration, and in actual measurements.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings:

FIG. 1 is a block diagram of a lightwave component analyzer in accordance with one embodiment of the invention having an internal optical source and an internal optical receiver and incorporating a switch matrix configurable by means of an internal instrument controller for performing calibration and test measurements;

FIG. 2, comprising FIGS. 2A-2C, is a schematic diagram of the lightwave component analyzer shown in FIG. 1 illustrating the internal optical source and receiver and configurable switch matrix;

FIG. 3 is a block diagram of a lightwave component analyzer in accordance with another embodiment of the invention having an internal optical source and an internal optical receiver and incorporating a switch matrix configurable by means of an external instrument controller for performing calibration and test measurements;

FIG. 4 is an interconnection diagram for FIGS. 4A–4O and 4Q comprising a schematic diagram of the lightwave component analyzer shown in FIG. 3 illustrating the internal optical source and receiver and configurable switch matrix;

FIG. 5 is a table illustrating the appropriate positions of the switches shown in FIGS. 2 and 4 for performing electro-optical (E/O), opto-electrical (O/E), and/or optical (O/O), as well as electrical (E/E), test measurements;

FIG. 6, comprising FIGS. 6A–6D, illustrates connections of devices for E/O, O/E, O/O, and E/E test measurements with the lightwave component analyzers shown in FIGS. 1 and 3;

FIG. 7 is a simplified block diagram for measurements on an E/O device with the lightwave component analyzers shown in FIGS. 1 and 3;

FIG. 8 illustrates data from an exemplary E/O device measurement in accordance with FIG. 7;

FIG. 9 is a simplified block diagram for measurements on an O/E device with the lightwave component analyzers shown in FIGS. 1 and 3;

FIG. 10 illustrates data from an exemplary O/E device measurement in accordance with FIG. 9;

FIG. 11 is a simplified block diagram for transmission measurements on an optical device with the lightwave component analyzers shown in FIGS. 1 and 3;

FIG. 12 illustrates data from an exemplary optical device transmission measurement in accordance with FIG. 11;

FIG. 13 is a simplified block diagram for reflection measurements on an optical device with the lightwave component analyzers shown in FIGS. 1 and 3; and FIG. 14 illustrates data from an exemplary reflection measurement in accordance with FIG. 13.

DETAILED DESCRIPTION OF THE PREFERRED EMBODIMENTS

FIG. 1 shows one embodiment of an integrated lightwave component analyzer, generally indicated by the numeral 10. As shown in FIGS. 1 and 2, the lightwave component analyzer 10 comprises an optical, or lightwave, test set 12 having an internal optical, or lightwave, receiver 16 and preferably having an internal optical, or lightwave, source 14. The lightwave test set 12 also preferably comprises optical, or lightwave, test ports $12_1$ and $12_2$. All of the elements of the lightwave component analyzer 10, including the lightwave source 14 and the lightwave receiver 16, are extensively characterized so that high levels of precision in lightwave measurements are achieved when the lightwave component analyzer is calibrated. Preferably, the lightwave component analyzer 10 also comprises an electrical test set 18 for electrical measurements. The electrical test set 18 also preferably comprises electrical test ports $18_1$ and $18_2$.

The lightwave component analyzer 10 preferably comprises essentially a 20 GHz vector network analyzer, for example, an HP 8720A vector network analyzer available from Hewlett-Packard Company, Network Measurements Division, Santa Rosa, Calif., specifically tailored for lightwave measurements. An optical source (the lightwave source 14) and receiver (the lightwave receiver 16) are incorporated into the vector network analyzer by expanding an extant electrical test set (the electrical test set 18) to incorporate an optical test set (the lightwave test set 12) having optical test ports (the lightwave test ports $12_1$ and $12_2$) and preferably housing the optical source and receiver. Accordingly, the lightwave component analyzer 10 preferably includes both the electrical test set 18 and the lightwave test set 12 so that electrical, E/O, O/E, and optical calibrations and test measurements can be performed.

The electro-optical characteristics of the lightwave source 14 and the opto-electrical characteristics of the lightwave receiver 16 in a test setup have to be sensitive, stable, and repeatable. Also, their modulation bandwidths need to be wider than that of a device under test (DUT) connected to the lightwave test port(s) $12_1$ and $12_2$ and/or the electrical test port(s) $18_1$ and $18_2$. Most of the HP 8720A vector network analyzer is leveraged and reused for the analyzer and information processing portion, as well as the microwave electrical test set portion, of the lightwave component analyzer 10. Conversely, the lightwave test set 12 is entirely new to the lightwave component analyzer 10. The lightwave source 14 and the lightwave receiver 16 incorporated into the lightwave test set 12 preferably have the following performance characteristics.

The lightwave source 14 provides an optical modulation signal source which preferably generates a high-stability, 1 Hz-resolution synthesized signal that can be swept from 130 MHz to 20 GHz. As shown in FIG. 2, the lightwave source 14 preferably comprises a laser operating at 1300 nm followed by an optical isolator, a polarization controller, and a Mach-Zehnder interferometer optical modulator. The optical modulator is driven by a high power microwave signal. A modulation source in the HP 8720A vector network analyzer provides 130 kHz to 20 GHz signals to the RF port of the optical modulator to modulate the lightwave source 14.

The lightwave source 14 is preferably calibrated at the factory and in the field using an approach known as the two-tone technique. This technique is described in a poster paper by Roger Jungerman shown at OFC in New Orleans, La., during January, 1988. The two-tone technique takes advantage of the inherent nonlinearity in the transfer characteristic of the optical modulator. Two closely-spaced RF frequencies are applied to the RF port of the optical modulator. The optical beam carries a modulation component at the difference frequency. As the pair of frequencies is swept over the range of the optical modulator, the beat frequency amplitude traces out the frequency response of the modulator.

Modulation bandwidth of the lightwave source 14 is greater than 20 GHz, with better than +/−3 dB flatness. The intensity-modulated light signal from the lightwave source 14 is applied to either lightwave test port $12_1$ and $12_2$ of the lightwave test set 12 for calibration of the lightwave component analyzer 10 or to the lightwave test port $12_1$ for a test measurement of a DUT.

The lightwave receiver 16 is a high-stability, high-resolution precision receiver with 50 dB dynamic range which allows measurements over a wide dynamic range and enables the lightwave component analyzer 10 to operate with an optical sensitivity of −50 dBm. The lightwave receiver 16 operates with single-mode optical fiber cable. Its optical detector is preferably a PIN photodiode. The lightwave receiver 16 has a modulation bandwidth that preferably extends to 20 GHz, with +/−3 dB flatness to 10 GHz, rolling off to −12 dB at 20 GHz. Minimum detectable optical signal (for modulations up to 20 GHz) is −50 dBm, and the typical optical dynamic range exceeds 40 dB. The 20 GHz modulation bandwidths of the lightwave source 14 and the lightwave receiver 16 provide ample margin for typical test measurements on a DUT.

The lightwave receiver 16 demodulates the modulated optical signal for processing in the lightwave component analyzer 10. The transmission and reflection characteristics of a DUT are then displayed, preferably on a cathode ray tube (CRT) 20 included in the lightwave component analyzer 10. The transmission and reflection data can be displayed either as a function of the RF modulation frequency or as a function of time or distance.

Considered in more detail, calibration and test measurements for E/O, O/E, and optical devices in accordance with the invention involve switchably connecting the lightwave source 14 and the lightwave receiver 16 and the other portions of the lightwave component analyzer 10, as preferably shown in the schematic diagram of FIG. 2. As shown in FIG. 2, the lightwave component analyzer 10 preferably incorporates the lightwave source 14 and the lightwave receiver 16 together with a switch matrix in the lightwave component analyzer. The lightwave component analyzer 10 includes a modulation source 22 which generates a 130 MHz to 20 GHz electrical signal. The electrical signal is preferably input to a power splitter 24 which initially feeds a selected portion of the electrical signal generated by the modulation source 22 to an electro-optical (E/O) transducer in the form of the lightwave source 14. Another portion of the electrical signal generated by the modulation source 22 is fed as a reference signal to one input port of a sampler 26 included in a tuned vector receiver 28 incorporated into the lightwave component analyzer 10.

The lightwave source 14 converts the electrical signal generated by the modulation source 22 to an optical signal. The optical signal produced by the lightwave source 14 is initially input to at least one opto-electrical (O/E) transducer in the form of the lightwave receiver 16 during calibration. After calibration, a DUT in the form of an opto-electrical fiber optic system, subsystem, or associated component can have its input(s) connected to the lightwave test port(s) $12_1$ and $12_2$ of the lightwave test set 12 at the output(s) of the lightwave source 14 and its output(s) connected to the electrical test port(s) $18_1$ and $18_2$ of the electrical test set 18 so that the DUT can be tested, as shown in FIGS. 6B and 9.

The lightwave receiver 16 reconverts the received optical signal to an electrical signal. The electrical signal produced by the lightwave receiver 16 is fed to another sampler 30 of the tuned vector receiver 28 during calibration. After calibration, a DUT in the form of an electro-optical fiber optic system, subsystem, or associated component can have its input(s) connected to the electrical test ports $18_1$ and $18_2$ of the electrical test set 18 and its output(s) connected to the lightwave test port(s) $12_1$ and $12_2$ of the lightwave test set 12 at the input(s) of the lightwave receiver 16 so that the DUT can be tested, as shown in FIGS. 6A and 7.

Optical calibrations and test measurements are performed by connections across the lightwave test ports $12_1$ and $12_2$ of the lightwave test set 12, as shown in FIGS. 6C and 11. Optical reflection (one port optical) calibrations and test measurements are also performed by connections to the lightwave test ports $12_1$ and $12_2$ of the lightwave test set 12, as shown in FIG. 13.

Ease of use is achieved by implementing in RF switching many of the interconnections that would otherwise typically be manually performed by a user in a non-integrated test system, such as the HP 8702A lightwave component measurement system. With the integrated approach implemented in the lightwave component analyzer 10, a user is able to measure an electrical (E/E), electro-optical (E/O), opto-electrical (O/E), or optical (O/O) device easily. The measurement procedure is simpler than when performing the measurement with a non-integrated test system. For example, in the case of electro-optical measurements, the number of steps needed to calibrate and measure an E/O device is eight steps versus fourteen steps for a non-integrated test system.

There are several novel features of the hardware which distinguish the lightwave component analyzer 10 from both the HP 8720A vector network analyzer and the HP 8702A lightwave component measurement system. These features are the addition of a switch matrix comprising five additional RF switches in the electrical test set 18 and the lightwave test set 12 and the complete integration of the lightwave hardware into the lightwave component analyzer 10, preferably into the lightwave test set. The RF switches are preferably controlled through the normal user interface of the leveraged HP 8720A vector network analyzer and is resident microprocessor-based internal instrument controller in response to user selection of various calibration and test measurements.

Considered in more detail, the differences that exist between the electrical test set 18 and the microwave test set in the HP 8720A vector network analyzer are as follows. RF switches S5, S6, and S7 are added. Also, a higher power microwave modulator and amplifier combination comprises the modulation source 22 to increase the RF power at port 1 to +10 dBm (from −10 dBm in the HP 8720A vector network analyzer). Furthermore, a new ALC circuit is added to interface amplifier combination. Additionally, the RF attenuator before the R channel input is increased to 40 dB to optimize the RF power into the R channel.

As shown in FIG. 2, the optical source chain of the lightwave source 14 comprises a CW semiconductor Fabry-Perot laser followed by an optical isolator, a polarization controller, and a Mach-Zehnder optical modulator. The polarization controller is needed to apply linearly polarized light at the appropriate angle to the input of the optical modulator. The optical modulator is the device in the optical chain which superimposes the amplitude modulation envelope onto the CW laser light. The most important advantage of implementing the lightwave source 14 by means of an optical modulator instead of directly modulating the laser diode is that minimal fm chirp is generated with the optical modulator, which would otherwise occur when directly modulating a laser diode.

The optical isolator is present to stabilize the lightwave source 14 from back-reflected light which can be caused by any reflection interface in the measurement configuration, i.e., the optical modulator, optical connector interfaces, and test devices including optical launches into photodiodes, laser chip launches into fiber, etc.

An RF leveling loop is connected from the optical modulator to the microwave modulator-amplifier of the lightwave test set 12. The primary function of the RF leveling loop is to control the RF power drive into the optical modulator so that the modulated optical power is maximized and the modulation frequency response of the lightwave source 14 is optimally smooth.

As shown in FIGS. 1 and 2, the lightwave test set 12 preferably further comprises an additional optical, or lightwave, test port $12_3$. Furthermore, the lightwave test set 12 further comprises an optical switch 32. If the optical switch 32 is positioned as shown in FIG. 2, the internal Fabry-Perot laser provides light to be modulated. If a user desires light of a different optical frequency to be modulated, however, the user merely actuates the optical switch 32 to the other position shown in FIG. 2 and connects the output of an external laser (not shown) to the lightwave test port $12_3$.

The utilization of the six RF switches (S4 through S9) allows the routing of the RF input and output signals appropriately so that measurements of electrical, electro-optical, opto-electrical, and optical devices can be performed by a user more repeatably and easily. The RF switches S4, S5, S6, and S7 preferably reside in the electrical test set 18 and multiplex the HP 8720A vector network analyzer functions between RF and lightwave measurements. The RF switches S8 and S9 preferably reside in the lightwave test set 12. The RF switch S9 provides a way to monitor the RF power throughput of the optical modulator and indirectly a way to predict the modulated optical power as a function of frequency. The use of the RF output port of the optical modulator to obtain this signal avoids the need for a power tap preceding the modulator, allowing full power to be applied to the modulator. The modulated RF signal is derived from the synthesized RF modulation source 22 through switch S5 in series with an attenuation pad and a modulator-amplifier in the lightwave test set 12 and through the RF switch S8 to the RF drive port of the optical modulator.

FIG. 5 shows a table of RF switch settings for the lightwave component analyzer 10 configured to perform test measurements. The legend shown in FIG. 4Q facilitates an understanding of the connections which configure the switch matrix for performing these measurements.

FIG. 5 shows the RF switch configurations when measuring each device type, i.e., electrical (E/E), electro-optical (E/O), opto-electrical (O/E), and optical (O/O). With the switch matrix, measurements (E/E, E/O, O/E, and O/O) can be performed more accurately, repeatably, and easily. If different samplers are available, either the input and/or the output can be sampled. Accordingly, two test measurements can be performed simultaneously. A significant advantage which is a consequence of the internal RF switches is better measurement repeatability than if the RF connections were preformed manually. The repeatability of manual RF connections and disconnections is on the order of a few tenths of a decibel, as opposed to a few hundredths of a decibel repeatability for RF switches. Measurements require less time, as the number of steps in the measurement process is decreased by 40%.

In addition to fewer steps to perform a measurement, the calibration process is more intuitive and logical. Calibration requires the connection of an RF cable and lightwave cable. To perform the measurement of an E/O or O/E device, a user simply disconnects the appropriate end of the RF and lightwave cables and connects the DUT. By including features of a conventional S-parameter calibration, the user can reduce uncertainty caused by imperfect electrical port match. The process requires little technical knowledge of the operation of the lightwave component analyzer 10.

Since the lightwave source 14 and the lightwave receiver 16 are integrated into the lightwave component analyzer 10, a unique calibration can be stored in the internal instrument memory. Accordingly, a user is allowed faster, more convenient, and easier calibrations and test measurements.

Calibration in connection with strictly electrical measurements is performed as in the HP 8720A vector network analyzer. Calibration in connection with electro-optical (E/O), opto-electrical (O/E), and optical measurements involves the lightwave component analyzer 10, lightwave source 14, and lightwave receiver 16. When the lightwave component analyzer 10 is used to characterize an E/O, O/E, or optical device, an initial calibration reference is established based on the known characteristics of the lightwave source 14 and the lightwave receiver 16.

Both the lightwave source 14 and the lightwave receiver 16 are earlier characterized in terms of their modulation (and demodulation) transfer characteristics (both absolute magnitude and phase) at the factory. The calibration data for accurate characterization of the lightwave source 14 and the lightwave receiver 16 are preferably measured at the time of construction or later maintenance and stored in EEPROMS in internal instrument memory. The lightwave component analyzer 10 incorporates firmware which can combine the calibration data arrays for use in subsequent measurements of fiber optic systems, subsystems, and associated component test measurements.

A user calibration measurement is then performed on the lightwave component analyzer 10 including the lightwave source 14 and/or the lightwave receiver 16, as well as the associated electrical and/or optical connections provided by the RF switch matrix, and error correction data are produced in the internal instrument controller by combining the factory and user calibration data, and the error correction data are then stored in the lightwave component analyzer internal instrument memory. The modulation (or demodulation) transfer characteristics are preferably given in terms of the responsivity magnitude and phase versus modulation frequency.

The internal instrument controller firmware of the lightwave component analyzer 10 incorporates coded instructions to perform the needed FF switch connections for the calibration process and while measuring the response characteristics of a DUT during desired test measurements. A calibration or measurement can be performed easily and quickly by user selection of the desired calibration or measurement by actuation of a hard or soft key on the normal user interface of the leveraged HP 8720A vector network analyzer. The following pages contain a copy of the firmware for the HP 8720A vector network analyzer internal instrument controller, which is executed to perform calibration and test measurements in accordance with the embodiment of the invention shown in Figs. 1 and 2.

This module contains instructions to control measurement of calibration standards. This module also calculates error correction coefficients after the calibration standards are measured.

```
M68KL,P,"cal"
BEGIN

#FILE crins;     & oeo_cal_ary_ready &
#FILE cdommenu;  & Clist_freq, Clog_freq
                     &
#FILE cchtable;
#FILE cparams;
#FILE ccalmenu;
#FILE cmenu;
#FILE cresp;
                 & hd_cal_title, ch_e_coeff_base
                   &
COMMENT                  ch_frequency_span, ch_
 average_factor
                         Cresponse_type, Cclass_
 done, Ccorrection
                         Comit_isol, Ccal_s_refl,
 Ccal_refl
                         Ccal_s_thru, Ccal_thru,
 Ccal_s_isol, Ccal_isol
                         Cport1_std1, Cport2_st
 d3, Cif_avg
                         PORT_ONE_REFL, PORT_TWO_
 REFL
                         CAL_TWO_TERM_MENU, SAVE_
 MENU, STD_CLASS_MENU
                         CAL_MENU, CAL_MENU3, CAL_
```

```
 MENU2, CAL_TYPE_MENU   ;
#FILE cdebugc2; & cal_debug
                      &
#FILE fterm;    & CRLF, WSTR, WHEX, WHex
                      &
#FILE fterm3;   & WNUM, WREAL, WCPX
                      &
#FILE ftime2;   & user3_zero
                      &
#FILE cmessag0; & exceeded_available_memory,
 null_message         &
#FILE cmsgcal;  & test_set_not_valid, not_
 finished_caling          &
                     & no_cal_in_progress,
 connect_std, slide_load    &
                     & press_done, press_save,
 comp_cal_coeff           &
                     & measuring_std, select_
 delete_cal_set             &
                     & more_slides_needed, slide_
 mem_stolen             &
#FILE futil3;   & tell, warn, beep_done
                      &
#FILE futil2;   & clr_msg
                      &
#FILE fcal0;    & save_cal, unused_set
                      &
  & fcal00;
                      &
  & fcal01;       corr_off, corr_on
                      &
#FILE ccal;     & response, two_term, one_port_
 on_1               &
                     & one_port_on_2, two_port,
 s_two_port             &
                     & undefined_cal, std_open,
 std_load, std_thru     &
                     & std_z, done_1_port, done_
 reflection             &
                     & done_trans, done_isol,
 done_class               &
                     & done_two_term
                           &
#FILE fsweep;   & abort_swp, n_swp
                      &
#FILE fmenu;    &
                      &
  & fmenu1;      prev_menu, gen_menu, present_
 menu, prior_menu   &
  & fmenu2;      h_cmd, h_off
                      &
  & fmenu3;
```

```
                    &
#FILE fstimuli; & e_freq_at_pt, pt_at_freq
                    &
  & cstimuli;
                    &
#FILE fchdata;  & curr_e_ch, num_of_groups
                    &
#FILE fchtable; & entry_ch_int, e_ch_quad,
 entry_ch_dbl, ch_bit   &
                   & e_ch_bit
                          &
#FILE fcontvar; &
                    &
  & ccontvar;     generic_param
                    &
  & fcontv1;       param, ch, raw_base, dp_raw_base
          &
#FILE ftlib3;   & clr_status_bit
                    &
#FILE ctlib;    & WFGR, WFGF
                    &
#FILE fsize;    & num_mpts, e_ary_size
                    &
#FILE fmemmgr;  &
                    &
  & cmemmgr;
                    &
    & cmemmgr2;   slide_load_arrays_id, error_
 coeff_id           &
  & fmemmgr3;     release_mem, mem_stolen, mem_
 taken             &
                   & release_mem_if
                          &
  & fmemmgr0;
                    &
#FILE cheader;  & header_size
                    &
#FILE cstdmenu; & Cck7mm
                    &
#FILE fstds;    & last_class_element, h_last_
 class              &
                   & h_last_element, set_std_
 lass, std_measd     &
                   & freq_covered, standard_ specs
             &
                   & define_opt_std
                    &
  & cstds;        sliding, media_bit, load_bit,
 port1_1st_std     &
  COMMENT             isoln_fwd_std, trans_fwd_
 std, port2_1st_std
                      isoln_rev_std, trans_rev_
```

```
std, freq_resp_std
                              two_term_response_std,
two_term_offset_std
                              port_offset, port_size,
f_min_index, z0_index
                              delay_index, loss_index,
c0_index, c1_index
                              c2_index, c3_index, z_
index, type_index
                              type2_index
                                   ;
#FILE fstddata; & set_cal_kit, preset_kit_tbl
                              &
#FILE cparam;   & elec_device, opt_device, eo_
device, oe_device  &
#FILE fparam;   & new_param, dev_type
                              &
#FILE facttbl2; & get_param
                              &
#FILE crtitle;  & cal_title_size
                              &
#FILE fmain;    & fini_tell
                              &
#FILE ctestset; & LTS_sw6 &
#FILE ftestset; & ts_present
                              &
#FILE fcommand; & cmd_token
                              &
#FILE factive;  &
                              &
  & cactive;
                              &
  & factv1;       select_act_fcn
                              &

#FILE factv3;   & chk_upd_dom
                              &
#FILE cdisp;    & Cdual_chan &
#FILE fdatap5;  & upd_el_del_list &
#FILE ctrace0;  & update_raw &
#FILE ftrace;   & ch_part &
#FILE fmath0;   & speed_of_light &
#FILE fkernel;  & wait, send &
#FILE fkernel4; & signal_init &
#FILE fiocnfig; & eeprom2 base address &
#FILE fswptbl;  & start_freq_of_band &
#FILE ceeprom9;  & eeprom2 constants and oeo_
offset_tbl &
#FILE fguided;   & draw_cal &
#FILE cguid;  & for CgstdX, Cgcal_XXX &

TYPELENGTH USER3: 8;
```

```
SUBROUTINE upd_all_segs;  EXTERNAL.L;
               & in slists &

EXTERNAL INTEGER ARRAY tgrp_num[1:2];
PROCEDURE new_num_grps(channel,num);
   VALUE   channel,num;
   INTEGER channel,num;
                 EXTERNAL.L;

PROCEDURE copy_user3( from_addr, to_addr, size );
   VALUE from_addr, to_addr, size;
   DOUBLE from_addr, to_addr;
   INTEGER size;
                   EXTERNAL;
SUBROUTINE CNV1E_save;
                   EXTERNAL;
USER3 PROCEDURE CNV1e(cpx); VALUE cpx; COMPLE
 X cpx;   EXTERNAL;
USER3 PROCEDURE MPYE;
    EXTERNAL;
USER3 PROCEDURE fst_trig(angle); VALUE angle;
  DOUBLE angle;   EXTERNAL;
DOUBLE PROCEDURE arctan(tan); VALUE tan; USER
 3 tan;   EXTERNAL.L;
SUBROUTINE fetch_CNVE1;
                   EXTERNAL;
SUBROUTINE inc_fetch_CNVE1;
                   EXTERNAL;
REAL PROCEDURE SQRT( x );         VALUE x;
 REAL x;           EXTERNAL;
COMPLEX PROCEDURE exp_cmplx(val); VALUE val;
 COMPLEX val;      EXTERNAL;
REAL PROCEDURE ATAN(R); VALUE R; REAL R;
 EXTERNAL.L;
REAL PROCEDURE  SIN(R); VALUE R; REAL R;
 EXTERNAL.L;
REAL PROCEDURE TENX(X); VALUE X; REAL X;
 EXTERNAL.L;
REAL PROCEDURE LOG10(X); VALUE X; REAL X;
 EXTERNAL.L;

PROCEDURE  cal_done( type );
   VALUE   type;
   INTEGER type;
                    FORWARD;

EXTERNAL REAL  TwoPi, system_z0;


#EJECT;
INTEGER CONSTANT user3_length      := 6,
```

```
                min_num_of_slides := 5,
                real_size         := 4,
                slide_data_blk    := 7 * real_
 size,
                num_pts_bk_pt     := 20;

REAL    CONSTANT unscale_c0 := 1.0@-15,
                 unscale_c  := 1.0@-18,
                 skin_coeff :=-158533.09;
                   & - ( 2*SQRT(freq_radians_
 skin) ) &

COMPLEX CONSTANT complex_1  := {1.0,0.0};


GLOBAL INTEGER cal_type;

GLOBAL BOOLEAN cal_in_progress,
               meas_std_data;
GLOBAL DOUBLE  cal_coeff_addr;
     & for input_cal_coeff &

GLOBAL INTEGER slid_load_used;   & 1    if
 sliding load used in cal,   &
                                 & 0     if
 not... for stestlc, the    &
                                 & system
 verification routines        &
                                 & initialized
 to   0   in set_cal_type&
BOOLEAN re_cal;
BYTE ARRAY old_cal_title[-1:cal_title_size];

INTEGER cal_stds_remaining,
        num_slides,
        old_param,
        temp_num_of_groups,
        pt_count,
        std_count,
        last_class,
        cal_dev_type;
BOOLEAN refl_computed;
DOUBLE  slide_data_ptr,
        data_source,
        data_destination;

COMMENT number of points in each band of oeo
 cal data;
INTEGER TABLE pts_per_band := 0,0,10,10,29,38
 ,74,152,167,177,342,602;

COMMENT number of point at the first of each
```

```
 band;
INTEGER TABLE band_first_pt := 0,0,0,10,20,49
 ,87,161,313,480,657,999;

BYTE    TABLE    check_done    :=
                 done_reflection, done_reflec
 tion, done_reflection,
                 done_isol,
                 done_trans,  done_trans,
                 done_reflection, done_reflec
 tion, done_reflection,
                 done_isol,
                 done_trans,  done_trans,
                 done_trans,
                 done_two_term, done_two_term
 ;  & check this out dds &
INTEGER TABLE    needed_mask  :=          &
  indexed by cal_done type &
      %7,        &done_1_port          &
          & bit patterns &
    %1C7,        &done_reflection      &
    %C30,        &done_trans           &
    %208,        &done_isol            &
    %FFF,        &done_2_port          &
      %1,        &done_response        &
   %6000,        &done_two_term        &
    %1C7,        &done_oe_refl         &
   %002F,        &done_eo_match        &
   %01FF;        &done_oe_match        &
INTEGER TABLE  cal_stds_needed :=
     & indexed by cal_type &
        0,      & place holder    &
           & bit patterns &
        1,      & response        &
   %6000,       & two term        &
      %7,       & one-port port 1 &
      %7,       & one-port port 2 &
    %FFF,       & two-port        &
    %03F,       & s_two_port &
    %02F,       & eo_match &
    %1FF;       & oe_match &
GLOBAL
BYTE TABLE cal_arrays :=
     & indexed by cal_type &
        0,      & place holder    &
      & number of arrays &
        1,      & response        &
        2,      & two term        &
        3,      & one-port port 1 &
        3,      & one-port port 2 &
       12,      & two-port        &
       12,      & s_two_port &
```

```
        5,      & eo_match         &
        9;      & oe_match         &

BYTE TABLE dev_arrays :=
     & indexed by dev_type &
        0,      & e/e &
    & number of extra stds &
        0,      & o/o &
        1,      & o/e &
        2;      & e/o &

INTEGER TABLE eo_class_order :=  & classes are
 stored in this order &
        0,      & port1_1st_std    := 0 &
        1,      & port1_2nd_std    := 1 &
        2,      & port1_3rd_std    := 2 &
        3,      & isoln_fwd_std    := 3 &
        0,      & match_fwd_std    := 4 unuse d &
        4;      & trans_fwd_std    := 5 &

INTEGER TABLE oe_class_order :=  & classes are
 stored in this order &
        6,      & port1_1st_std    := 0 &
        7,      & port1_2nd_std    := 1 &
        8,      & port1_3rd_std    := 2 &
        3,      & isoln_fwd_std    := 3 &
        4,      & match_fwd_std    := 4 &
        5,      & trans_fwd_std    := 5 &
        0,      & port2_1st_std    := 6 &
        1,      & port2_2nd_std    := 7 &
        2;      & port2_3rd_std    := 8 &

INTEGER TABLE calibrate_menu :=     & indexed
  by dev_type &
       CAL_E_MENU,    & elec_device &
       CAL_O_MENU,    & opt_device  &
       CAL_EO_MENU,   & eo_device &
       CAL_OE_MENU;   & oe_device &

INTEGER TABLE  cal_menus :=
     & indexed by cal_type &
       0,                 & place holder    &

       STD_CLASS_MENU,    & response  &
       CAL_TWO_TERM_MENU, & two_term temp &
       PORT_ONE_REFL,     & one_port port 1 &

       PORT_TWO_REFL,     & one_port port 2 &

       CAL_MENU2,         & two port        &

       CAL_MENU3,         & simple two port &
```

```
        EO_MATCH_MENU,       & eo match          &

        OE_MATCH_MENU;       & oe_match          &


INTEGER TABLE cal_done_menu :=
   & indexed by cal_type &
        0,
        CAL_TYPE_MENU,
        CAL_TYPE_MENU,
        CAL_TYPE_MENU,
        CAL_TYPE_MENU,
        CAL_MENU2,
        CAL_MENU3,
        EO_MATCH_MENU,       & eo match          &

        OE_MATCH_MENU;       & oe_match          &


COMMENT This is the error coefficient mem id
 into which the active
         calibration is being stored;

GLOBAL INTEGER cal_mem_id;



#EJECT; COMMENT
                    cal_size
***************************************************
*                                                 *
* Array size required for error coefficient       *
* arrays and array header for the calibration     *
* type.                                           *
*                                                 *
* NOTE:  Now defined only for current entry ch -  *
*        check other usages                       *
*                                                 *
***************************************************
;
DOUBLE PROCEDURE cal_size( type );
   VALUE   type;
   INTEGER type;
   BEGIN & cal_size &
   cal_size :=   INTEGER(cal_arrays[type]+
                  dev_arrays[dev_type[curr_e_
 ch]]) * DOUBLE( e_ary_size)
                  + header_size;
   END;  & cal_size &
```

```
COMMENT
            cal_ary_offset
***************************************************
*                                                 *
* 1 <= array_number <= 12                         *
*    NOTE:  Now defined only for curr_e_ch        *
*           check other usages                    *
*                                                 *
***************************************************
;
DOUBLE PROCEDURE  cal_ary_offset( array_number,
 type );
   VALUE   array_number, type;
   INTEGER array_number, type;
                      ENTRY;
   BEGIN & cal_ary_offset  &

      cal_ary_offset := (IF array_number <= cal_
 arrays[type] THEN
                 DOUBLE( array_number-1 )*DOUBLE
 ( e_ary_size )
                             ELSE
                                -1);

   END;  & cal_ary_offset  &


#EJECT;
COMMENT
***************************************************
***************************************************
;


COMMENT
               restore_param
***************************************************
***************************************************
;
SUBROUTINE restore_param;
   BEGIN & restore_param &
      new_param( old_param );
   END;  & restore_param &



#EJECT; COMMENT
        deallocate_cal_array
***************************************************
***************************************************
;
SUBROUTINE deallocate_cal_array;
```

```
   BEGIN & deallocate_cal_array &
      release_mem( slide_load_arrays_id );
      cal_coeff_addr := 0;
   END;  & deallocate_cal_array &


COMMENT
               terminate_cal
***************************************************
***************************************************
;
SUBROUTINE terminate_cal;
                      ENTRY;
   BEGIN & terminate_cal &

      deallocate_cal_array;
      cal_type := undefined_cal;
      cal_in_progress := FALSE;

   END;  & terminate_cal &


COMMENT
        cal_mem_allocated
***************************************************
***************************************************
;
BOOLEAN PROCEDURE cal_mem_allocated;
                  ENTRY;
BEGIN
  DOUBLE dummy;
  cal_mem_allocated := TRUE;
  IF mem_taken ( dummy, cal_mem_id ) THEN
     BEGIN
        cal_mem_allocated := FALSE;
        terminate_cal;
        & display message &
     END;
END cal_mem_allocated;


#EJECT; COMMENT
          allocate_cal_array
***************************************************
***************************************************
;
BOOLEAN PROCEDURE allocate_cal_array( type );

   VALUE   type;
```

```
  INTEGER type;
  BEGIN & allocate_cal_array &
     DOUBLE calsize;

     IF cal_coeff_addr <> 0 THEN
        deallocate_cal_array;

     & set up memory for calibration &
     cal_mem_id := error_coeff_id - 1 + unused_
set;
     IF cal_mem_id >= error_coeff_id THEN
     BEGIN
       calsize := cal_size( type );
       mem_stolen( cal_coeff_addr, cal_mem_id,
calsize );
     END
     ELSE
       warn( select_delete_cal_set );
     IF cal_coeff_addr <> 0 THEN
        BEGIN
           cal_coeff_addr := cal_coeff_addr
+ header_size;
        END
     ELSE & allocation error &
        BEGIN
           warn( exceeded_available_memory )
;
           gen_menu( CAL_MENU );
        END;

     allocate_cal_array := ( cal_coeff_addr
<> 0 );

  END;  & allocate_cal_array &


#EJECT; COMMENT
               allocate_cal
***************************************************
***************************************************
;
BOOLEAN PROCEDURE allocate_cal( type );
   VALUE   type;
   INTEGER type;
                     ENTRY;
   BEGIN & allocate_cal &
      BOOLEAN  result;

      cal_type := type;
      cal_in_progress := FALSE;
      num_slides := 0;
```

```
      refl_computed := FALSE;
      result := allocate_cal_array( type );
      IF result THEN
        BEGIN
          h_off( Cresponse_type, Cclass_done )   ;
          h_off( Cgstd1, Cgstd5 );
          h_off( Cgcal_none, Cgcal_two_port );

          old_param := get_param( curr_e_ch );

        END
       ELSE                            & there is
  not enough ram space      &
          BEGIN & else &
             warn( exceeded_available_memory )   ;
             terminate_cal;
          END;  & else &

      allocate_cal := result;

   END;  & allocate_cal &
```

```
COMMENT
                    i_cal
***************************************************
***************************************************
;
SUBROUTINE i_cal;
                   ENTRY;
   BEGIN & i_cal &
      cal_mem_id := error_coeff_id;
      deallocate_cal_array;
      cal_type := undefined_cal;
      meas_std_data :=
      cal_in_progress := FALSE;
   END;  & i_cal &
```

The following instructions initiate measurements of calibration standards for a specified type of error correction.

```
#EJECT; COMMENT
                 set_cal_type
***************************************************
***************************************************
;
PROCEDURE  set_cal_type( type );
   VALUE   type;
   INTEGER type;
```

```
  BEGIN & set_cal_type &
   BYTE POINTER bptr;

      IF cal_in_progress AND (dev_type[curr_e_
ch] <> cal_dev_type) THEN
         sel_ck( e_ch_bitmap( Cck7mm ) );

      set_cal_kit( dev_type[curr_e_ch] );
      & Update cal kit for lightwave parameters &

      cal_dev_type := dev_type[curr_e_ch];

      & For list freq. mode, turn on all &
      & segments prior to a calibration  &
      IF e_ch_bit( Clist_freq )= 1  THEN
         upd_all_segs;

      slid_load_used:=0;& "Sliding load not used"
flag initialization &

      IF ( type = two_port AND NOT ts_present ) OR
         ( type = s_two_port AND ts_present ) THEN
         warn( test_set_not_valid );
      re_cal := ( ( e_ch_bit( Ccorrection ) = 1 ) AND
                  ( type = cal_type ) );
      IF re_cal THEN  & save old cal title &
        BEGIN
          STPNTR( bptr, entry_ch_dbl( ch_e_
coeff_base )
                              - header_size + hd_cal_
title );
          MOVE old_cal_title := bptr, +( cal_
title_size + 1 );
        END
       ELSE          & clear old cal title &
          old_cal_title[0] := 0;
       old_cal_title[-1] := cal_title_size;

      old_param := get_param( curr_e_ch );

      IF ((type = two_port) OR (type=s_two_port))

                                            AND (old_
param >= 4) THEN
          new_param( IF old_param = 6 THEN 1 ELSE 0 )
      ELSE IF type = eo_match AND (old_param<
>0 AND old_param<>15 AND
                                        old_param<
>16) THEN
         new_param( eol_parm + e_ch_bit(Co_port) )
       ELSE IF type = oe_match AND (old_param<
>3 AND old_param<>17 AND
```

```
                              old_param<
>18) THEN
      new_param( oel_parm + e_ch_bit(Ce_port) )
    ELSE IF old_param <= 3 THEN
      BEGIN
        IF      type = one_port_on_1 THEN new_
param( 0 )
        ELSE IF type = one_port_on_2 THEN new_
param( 3 );
      END;

    corr_off( curr_e_ch );

    & allocate_cal sets cal_type &
    IF (cal_in_progress := allocate_cal( type ))
THEN
       BEGIN & if &
          cal_stds_remaining   := cal_stds_
needed[ type ];

          IF ( (cal_type <> two_port) AND
               (cal_type <> s_two_port) AND

               (cal_type <> eo_match) AND
               (cal_type <> oe_match) ) THEN
                  tell( connect_std );

          IF cal_type = response THEN
             set_std_class( freq_resp_std )

          ELSE
             gen_menu( cal_menus[type] );
       END;  & if &

  END;  & set_cal_type &


#EJECT; COMMENT
              set_gcal_type
***************************************************
***************************************************
;
PROCEDURE  set_gcal_type( kit, type );
   VALUE   kit, type;
   INTEGER kit, type;
                      ENTRY;
   BEGIN & set_gcal_type &
    BYTE POINTER bptr;

      IF cal_in_progress AND (dev_type[curr_e_
 ch] <> cal_dev_type) THEN
         sel_ck( e_ch_bitmap( Cck7mm ) );
```

```
     set_gcal_kit( kit );
     & Update cal kit for lightwave parameters &

     cal_dev_type := dev_type[curr_e_ch];

     slid_load_used:=0;& "Sliding load not used"
flag initialization &

     re_cal := ( ( e_ch_bit( Ccorrection ) = 1 ) AND
                 ( type = cal_type ) );
     IF re_cal THEN  & save old cal title &
       BEGIN
         STPNTR( bptr, entry_ch_dbl( ch_e_coeff_ base )

                        - header_size + hd_cal_ title );

         MOVE old_cal_title := bptr, +( cal_
title_size + 1 );
       END
      ELSE          & clear old cal title &
         old_cal_title[0] := 0;
      old_cal_title[-1] := cal_title_size;

     old_param := get_param( curr_e_ch );

     COMMENT
     IF (type = two_port) AND (old_param >=  4) THEN
        new_param( IF old_param = 6 THEN 1 ELSE 0 )
     ELSE IF type = eo_match AND (old_param<
>0 AND old_param<>15 AND
                                      old_param<
>16) THEN
       new_param( eol_parm + e_ch_bit(Co_port) )
     ELSE IF type = oe_match AND (old_param<
>3 AND old_param<>17 AND
                                      old_param< >18)  THEN

       new_param( oel_parm + e_ch_bit(Ce_port) )
     ELSE IF old_param <= 3 THEN
       BEGIN
         IF      type = one_port_on_1 THEN new_
param( 0 )
         ELSE IF type = one_port_on_2 THEN new_
param( 3 )
       END;

     corr_off( curr_e_ch );

     & allocate_cal sets cal_type &
     IF (cal_in_progress := allocate_cal( type ))
THEN
```

```
        BEGIN & if &
           cal_stds_remaining    := cal_stds_
needed[ type ];

     set_gstd_class( freq_resp_std );

     draw_cal;
        END;  & if &

  END;  & set_gcal_type &


#EJECT; COMMENT
                    resume_cal
***************************************************
***************************************************
;
SUBROUTINE resume_cal;
   BEGIN & resume_cal &
      IF cal_in_progress THEN
         BEGIN & if &
            IF cal_mem_allocated THEN
               gen_menu( cal_menus[cal_type] );
         END   & if &
      ELSE
         warn( no_cal_in_progress );
   END;  & resume_cal &


SUBROUTINE clr_msg_and_in_progress;
   BEGIN
   clr_msg ( comp_cal_coeff );
   cal_in_progress := FALSE;     & needs to be
 false after a "compute" &
   END;


PROCEDURE show_calc_disp ( curr_pt );
    VALUE curr_pt; INTEGER curr_pt;
BEGIN
  INTEGER tell_msg_no;

  CASE (( curr_pt / num_pts_bk_pt ) MOD 2 ) OF
  BEGIN
      tell_msg_no := null_message   ;
      tell_msg_no := comp_cal_coeff ;
  END of case statement;
  tell ( tell_msg_no );
END;
```

```
#EJECT; COMMENT
              move_slide_val
**************************************************
*                                                *
* move_slide_val is used to move data to/from    *
* local stack to more long term memory           *
* IT IS VERY DEPENDENTED ON THE ALLOCATION ORDER *
* OF THE LOCAL STACK                             *
**************************************************
;
PROCEDURE move_slide_val( from_adr, to_adr );
   VALUE from_adr, to_adr;
                                         DOUBLE
 from_adr, to_adr;
   BEGIN
      INTEGER POINTER from = from_adr,
                      to   = to_adr;

      MOVE to := from,+(slide_data_blk/2);

   END move_slide_val;

SUBROUTINE patch_return_from_slide_menu;
  BEGIN
   present_menu := prior_menu;
   IF last_class_element > 1 THEN
      gen_menu( STD_CLASS_MENU )
     ELSE
      gen_menu( cal_menus[ cal_type ] );
  END;

SUBROUTINE check_slide_arrays;
   BEGIN
   IF mem_stolen( slide_data_ptr, slide_load_
 arrays_id,
                                      slide_data_
 blk * pt_count ) THEN
      BEGIN
      IF ( num_slides > 0 )  OR  ( slide_data_
 ptr = 0 ) THEN
         BEGIN    & truly a memory problem, not
 1st request &
         num_slides := 0;
         warn( slide_mem_stolen );
         patch_return_from_slide_menu;
         END ;   & real memory problem &
      END ;      & mem_stolen true  &
   END check_slide_arrays;


#EJECT; COMMENT
```

```
load_slid
**************************************************
**************************************************
;
PROCEDURE load_slid;
BEGIN
REAL ARRAY    values[ 0 : ( slide_data_blk /
 real_size )  - 1 ];
REAL           x,  y,  x2,  y2,  x2_y2,
              sx = values[ 0 ]     ,sy = values
 [ 1 ],
              sx2= values[ 2 ]     ,sy2= values
 [ 3 ], sxy = values[ 4 ],
              sx3_y2x = values[ 5 ],sy3_x2y =
  values[ 6 ];
DOUBLE add_src, add_dst;

add_src := data_source;
check_slide_arrays;

IF slide_data_ptr # 0 THEN
   BEGIN
   add_dst := slide_data_ptr ;

   REPEAT pt_count DO
      BEGIN
      IF  num_slides = 0 THEN
             sx := sy := sx2 := sy2 := sxy :=
  sx3_y2x := sy3_x2y := 0.0
       ELSE  move_slide_val( add_dst ,  ADRS(
  values )  );

      ASSEMBLE(              MOVE.L add_src,R
 8;    JSR    fetch_CNVE1;
          MOVE.L   R0, x;   MOVE.L  R1, y;
       ADD.L  #6, add_src);

      x2     := x * x;
      y2     := y * y;
      x2_y2 := x2 + y2;
      sx      := sx  +  x;              sy
   := sy   + y;
      sxy     := sxy + (x*y);
      sx2     := sx2 + x2;              sy2
   := sy2  + y2;
      sx3_y2x:= sx3_y2x + (x * x2_y2);  sy3_x
 2y:= sy3_x2y + (y * x2_y2);

      move_slide_val( ADRS( values ),  add_ds t );
      add_dst  := add_dst  + slide_data_blk;
      END loop;
```

```
   num_slides := num_slides + 1 ;
   release_mem_if( slide_load_arrays_id );

   END;& array space available &
END load_slid;



#EJECT; COMMENT
                compute_load
***************************************************
*                                                 *
* PROBLEMS:  Due to the limited numerical resolu- *
* tion a potential problem may occur.  The input  *
* values are points on a circle, and terms to the *
* third power occur, this means the input resolu- *
* tion is approx 8 bits.  So the circle finding   *
* routine will find the center of the circle to   *
* -48db of the data.                              *
*    i.e. -- Do NOT expect more than approx -48db *
* accuracy on the circle compaired to the worst   *
* case data value.                                *
*    NOTE:  Also num of slides have some effect   *
* on the resolution.                              *
***************************************************
;
PROCEDURE compute_load;
BEGIN
REAL              tx, ty, tx2, ty2, txy, tx3_y2x,
  ty3_x2y;
REAL              x, y, det, sx_tx, sy_ty;
REAL ARRAY        values[ 0 : ( slide_data_blk /
 real_size )   - 1 ];
REAL              sx = values[ 0 ]      ,sy = values
 [ 1 ],
                  sx2= values[ 2 ]      ,sy2= values
 [ 3 ], sxy = values[ 4 ],
                  sx3_y2x = values[ 5 ],sy3_x2y =
  values[ 6 ];
DOUBLE  add_dst, add_src;

IF ( pt_count  > 0 ) THEN check_slide_arrays
 ;

add_src  := slide_data_ptr    ;
add_dst  := data_destination  ;
#EJECT;
IF num_slides < min_num_of_slides THEN
   BEGIN & if not enough slides &
   release_mem_if( slide_load_arrays_id );
   warn( more_slides_needed );
   END   & if not enough slides &
```

```
ELSE
  BEGIN & else enough slides &
  tell( comp_cal_coeff );
  IF pt_count > 0 THEN
   REPEAT pt_count DO
     BEGIN
     move_slide_val( add_src ,  ADRS( values )  );

     tx  :=  sx / num_slides ;          ty
  := sy / num_slides  ;
     tx2 :=  sx2 - ( sx_tx := sx * tx );
     ty2 :=  sy2 - ( sy_ty := sy * ty );
     txy :=  sxy -   sx * ty ;

     tx3_y2x := sx3_y2x + ( tx * ( 2.0 * sx_
 tx - 3.0*sx2 - sy2 ) )
                         - ( 2.0 * ty *  txy ) ;
     ty3_x2y := sy3_x2y + ( ty * ( 2.0 * sy_
 ty - 3.0*sy2 - sx2 ) )
                         - ( 2.0 * tx *  txy ) ;
     det      := .5 / ( ( tx2 * ty2 ) - ( txy
 * txy ) ) ;

     x        := tx + det * ( ( ty2 * tx3_y2x
 ) - ( txy * ty3_x2y ) ) ;
     y        := ty + det * ( ( tx2 * ty3_x2y
 ) - ( txy * tx3_y2x ) ) ;

     ASSEMBLE(   MOVE.L  add_dst, R8;     MOV
 E.L  x, R0;  MOVE.L y,  R1;
                 JSR     CNV1E_save;      MOV
 E.L  R8, add_dst );

     add_src   := add_src  + slide_data_blk;
     END;
   num_slides  := 0;
   h_last_element;
   IF freq_covered THEN  tell( press_done )
      ELSE tell( connect_std );
   patch_return_from_slide_menu;
   release_mem( slide_load_arrays_id );
   END;  & else enough slides &

END compute_load;
```

The following instructions store data acquired during measurements of calibration standards.

```
#EJECT; COMMENT
                  take_data
***************************************************
***************************************************
```

```
;
PROCEDURE take_data;
   BEGIN & take_data &
   BOOLEAN is_sliding, std_in_band;
   REAL    fmin,  fmax;
   INTEGER class, iclass, pt_start, pt_stop ;

   INTEGER temp,
           std_int;
   BYTE std_type;

   IF cal_mem_allocated THEN

   BEGIN & if cal_mem_allocated &
      std_int := std_measd( fmin, fmax, class );
      is_sliding := TBIT( std_int , load_bit) ;
      std_type := BYTE( RIGHT(std_int,8) );

    IF cal_dev_type=eo_device OR cal_dev_type=
 oe_device THEN
      BEGIN
        IF (std_type = std_receiver OR std_type =
 std_source) AND
           std_count > 0 THEN
               & put extra arrays for these
 standards after all the &
               & regular cal arrays &
           iclass := cal_arrays[cal_type]+(std_
 count-1)
        ELSE
          IF cal_type = response THEN
           BEGIN
           iclass := 0;
           class := 0;
           END
          ELSE IF cal_type = two_term THEN
           iclass := two_term_offset_std - class
          ELSE IF cal_type=eo_match THEN
           iclass := eo_class_order[class]
          ELSE IF cal_type = oe_match THEN
           iclass := oe_class_order[class];
      END
    ELSE
      BEGIN
         IF cal_type = one_port_on_2 THEN
            class := class - port_offset
         ELSE IF cal_type = response THEN
            class := 0;
         IF class >= two_term_response_std THEN
            iclass := two_term_offset_std - class
           ELSE
            iclass := class;
```

```
     END;

     std_in_band   :=  TRUE;
     IF (iclass  > (cal_arrays[cal_type] + std_
count-1)) OR
        ( iclass  <  0 ) THEN
        std_in_band:=FALSE; & detection of
invalid cal cmd&

     IF e_ch_quad( ch_frequency_span ) = 0 THEN
        BEGIN
          pt_start := 0;
          pt_stop := num_mpts[ curr_e_ch ] - 1;
        END
     ELSE
        BEGIN
          pt_start  :=  pt_at_freq( QUAD( fm in ) );
          pt_stop   :=  pt_at_freq( QUAD( fm
ax ) );
        END;
                          & the following is to make
sure take_data banding
                              agrees  with standard_
specs in std_act
                              problems when buckets
step < 1 Hz      &

     IF NOT(fmin <= REAL(e_freq_at_pt(pt_start)))
        THEN IF pt_start < num_mpts[ curr_e_
ch ] THEN
                  pt_start := pt_start + 1
              ELSE std_in_band := FALSE;

     IF NOT(fmax >= REAL(e_freq_at_pt(pt_stop)))
        THEN    IF pt_stop  >   0    THEN
   pt_stop  := pt_stop  - 1
                                          ELSE
std_in_band := FALSE;

     pt_count  := pt_stop - pt_start + 1;

     IF ( pt_count >  0 )  AND  std_in_band
 THEN
        BEGIN

        data_source :=dp_raw_base[curr_e_ch,
  generic_param ]
                   + DOUBLE(   pt_start * user3_
length );

        IF std_type=std_source OR std_type=std_
receiver THEN
```

```
            BEGIN
            data_destination := cal_coeff_addr
                  + DOUBLE( iclass ) * DOUBLE
( e_ary_size )
                              + DOUBLE (pt_start
* user3_length );
            std_count := std_count + 1;
            send( oeo_cal_ary_ready );
            END
         ELSE
            data_destination := cal_coeff_addr
                     + DOUBLE( iclass ) * DOUBLE
( e_ary_size )
                              + DOUBLE (pt_start
* user3_length );


         IF is_sliding THEN
             load_slid
          ELSE
             BEGIN


             copy_user3( data_source, data_
destination, pt_count );
             h_last_element;
             END;
         END pt_count > 0
       ELSE  BEGIN
             pt_count := 0;
             h_last_element;
             END;

      IF freq_covered OR is_sliding THEN
         BEGIN
            IF is_sliding THEN
               BEGIN
               IF pt_count <= 0 THEN num_slides
:= min_num_of_slides;
               IF num_slides < min_num_of_slides
                  THEN tell( slide_load)
                ELSE   tell( press_done );
               END;
            cal_stds_remaining := RBIT( cal_stds_
remaining, class );
            last_class := class;
         END
       ELSE tell( connect_std );

      COMMENT meas_std_data remains true until
all sweeps are
             taken for the std;
```

```
     IF std_count=0 OR (std_type=std_source
 AND std_count=3) OR
         (std_type=std_receiver AND std_count
 =2) THEN
         meas_std_data := FALSE;


   END;  & if cal_mem_allocated &

   END;  & take_data &


#EJECT;
PROCEDURE zero_std( std );

   VALUE std;  INTEGER std;
BEGIN

  cal_stds_remaining := RBIT( cal_stds_remaining,
 std );
  IF cal_in_progress THEN
     user3_zero( cal_coeff_addr
                  + DOUBLE( std )*DOUBLE( e_
 ary_size ),
                    num_mpts[ curr_e_ch ]);
END zero_std;


SUBROUTINE omit_2_isolation;
BEGIN
  zero_std( isoln_fwd_std );
  zero_std( isoln_rev_std );
  h_cmd(Comit_isol);
  beep_done;
  tell( press_done ) ;
END omit_2_isolation;

SUBROUTINE omit_1_isolation;
BEGIN
  zero_std( isoln_fwd_std );
  h_cmd(Comit_isol);
  beep_done;
  tell( press_done );
END omit_1_isolation;

SUBROUTINE omit_isolation;
  IF cal_type = eo_match THEN
    omit_1_isolation
  ELSE IF cal_type = oe_match THEN
    omit_1_isolation
  ELSE
    omit_2_isolation;
```

```
#EJECT; COMMENT
                    z_to_s
***************************************************
***************************************************
;
COMPLEX PROCEDURE z_to_s( z );          VALUE
  z;     COMPLEX z;
BEGIN
  z_to_s  :=  ( z - system_z0 ) / ( z + system_
 z0 );
END z_to_s;

#EJECT;
COMMENT
                 circ_interp
***************************************************
*                                                 *
* Given a set of input parameters, read in an     *
* array of data, execute an interpolation algor-  *
* ithm on it and then write out the results to    *
* another array.                                  *
*                                                 *
***************************************************
;
COMPLEX PROCEDURE circ_interp( freq, array );

   VALUE freq, array;
   REAL freq;
   INTEGER array;
BEGIN
   INTEGER band,pt;
   REAL
      start_freq,stop_freq,ratio,
      Ax, Ay, Bx, By,
      P1x, P1y, P2x, P2y, P3x, P3y,
      M1, M2, B1, B2, Cx, Cy;
   DOUBLE fetch_ptr = REGISTER 8;
   DOUBLE Ang,Ang1,Ang2,Ang3,Theta,data_addr;

   USER3 Center,P1t,P2t,P1,P2;
   COMPLEX result;
   BOOLEAN pos_theta;
   INTEGER CONSTANT max_band := 11;  & must
 match table in sswptbl &

   data_addr := ADRS(eeprom2_base) + oeo_offset_
 tbl[array-1] +

              oeo_hd_sz;
```

```
  COMMENT determine band containing freq;
  band := 0;
  start_freq := REAL( start_freq_of_band[band] )
* 100000.;
  WHILE (freq > start_freq) AND (band <= max_
band) DO
     BEGIN
     band := band + 1;
     start_freq := REAL( start_freq_of_band
[band] ) * 100000.;
     END;
  band := band-1;
  stop_freq := start_freq;
  start_freq := REAL(start_freq_of_band[band])
* 100000.;

  ratio := (freq - start_freq)/(stop_freq -
start_freq);
  pt := INTEGER(( ratio * REAL(pts_per_band
[band])) MOD 1.0) +

     band_first_pt[band];

  IF freq=start_freq OR freq=stop_freq THEN

     BEGIN
     fetch_ptr := data_addr + (pt*user3_length);
     fetch_CNVE1;
     ASSEMBLE( MOVEM.L R0/R1, result );
     END
  ELSE
  BEGIN & freq<>start freq<>stop &

     IF (pt-band_first_pt[band]) > pts_per_band
[band]/2 THEN
        pt := pt-1; & backward, else forward &

      pos_theta := FALSE;

        fetch_ptr := (pt*user3_length)+data_addr;
        fetch_CNVE1;
        ASSEMBLE (MOVE.L  R0,P1x);
        ASSEMBLE (MOVE.L  R1,P1y);

        fetch_ptr := user3_length+data_addr;
        fetch_CNVE1;
        ASSEMBLE (MOVE.L  R0,P2x);
        ASSEMBLE (MOVE.L  R1,P2y);

        fetch_ptr := user3_length+data_addr;
        fetch_CNVE1;
        ASSEMBLE (MOVE.L  R0,P3x);
```

```
ASSEMBLE (MOVE.L  R1,P3y);

Ax := (P1x+P2x)/2;
Ay := (P1y+P2y)/2;
Bx := (P2x+P3x)/2;
By := (P2y+P3y)/2;

IF P2y=P1y THEN P2y := P1y+.0000001;
M1 := (P1x-P2x)/(P2y-P1y);
IF P3y=P2y THEN P3y := P2y+.0000001;
M2 := (P2x-P3x)/(P3y-P2y);
B1 := Ay- (M1*Ax);
B2 := By- (M2*Bx);
IF M1=M2 THEN M2 := M2+.00001;
Cy := ((B2*M1)-(B1*M2))/(M1-M2);
IF M1=0 THEN Cx := (B1-B2)/M2
        ELSE Cx := (Cy-B1)/M1;


P1 := CNV1e(COMPLEX (P1x , P1y));
Center := CNV1e(COMPLEX (Cx,Cy));

P1t := CNV1e(COMPLEX (P1x-Cx, P1y-Cy) );
Ang1 := arctan (P1t);
   & arctan (P2t) &
Ang2 := arctan (CNV1e(COMPLEX (P2x-Cx,
P2y-Cy)));
IF Ang2 > Ang1 THEN
BEGIN     & positive angle between P1
and P2 &
   pos_theta := TRUE;
   Ang := Ang2 - Ang1;
END
ELSE
BEGIN     & negative angle between P1
and P2 &
   pos_theta := FALSE;
   Ang := Ang1 - Ang2;
END;
  & assume phase change between two
adjacent frequency &
  & points is not greater than 180
degrees   &
IF TBIT (Ang, 17) THEN
BEGIN
   Ang := %40000 - Ang;   & Ang := 360deg
- Ang &
     & take the complement of pos_theta &
   IF pos_theta THEN pos_theta := FALSE
                 ELSE pos_theta := TRUE;
END;
```

```
    Theta := Ang * ratio;

    IF Theta > 7 THEN  & 7 = .01 degree, very
small angle &
    BEGIN
         & convert theta to special complex
angle representation &
         & e^j*theta=COS(theta)+j*SIN(theta) &
       fst_trig (Theta);
       IF NOT pos_theta THEN
       BEGIN
          & Need fst trig results for negative
Theta &
          & SIN(-Theta) = -SIN(Theta), COS(-
Theta)= COS(Theta) &
         ASSEMBLE ( SWAP    R0;
                    NEG.W   R0;
                    SWAP    R0);
       END;
         COMMENT do complex multiple (rotation
on complex plane)
              (e^j*theta) * P1t
                  fst_trig result already in
R0-R1;
       ASSEMBLE( MOVEM.L  P1t,R2-R3);
       MPYE;

         COMMENT do complex addition(translate
on complex plane)
                  Pinterp + Center
                  MPYE result already in R0-R 1;
       ASSEMBLE( MOVEM.L  Center,R2-R3);
       ASSEMBLE (JSRX ADDE; JSRX CNVE1; MOVE
M.L R0/R1,result );
    END
    ELSE
    BEGIN
       ASSEMBLE( MOVEM.L P1, R0/R1 );
       ASSEMBLE (JSRX CNVE1; MOVEM.L R0/R1,
result );
    END;

  END freq<>start freq<>stop;

         circ_interp := result;
         END;
```

The following is a mathematical model for electrical calibration standards.

```
#EJECT; COMMENT
```

```
                std_act_elec
***************************************************
***************************************************
;
COMPLEX PROCEDURE std_act_elec( freq,  std_addrs );
                                              VALUE
 freq,  std_addrs;
                                                REAL
 freq; DOUBLE std_addrs;
BEGIN
INTEGER type;
REAL    freq_radians, f1, skin_factor, delay,
  z_mech;
COMPLEX result, skin_cpx, S11, S21, exp, R, R
 _exp, denom;
REAL POINTER std_coeff;
BYTE POINTER std_type = std_coeff;
REAL real_result = result, imag_result = result
 + 4;
DOUBLE d= std_coeff;
                   & DEBUG &


SUBROUTINE offset_result;
BEGIN
   IF delay # 0.0 THEN
      BEGIN
      z_mech      := std_coeff[    z0_index ]   ;

      IF TBIT( std_type[ type2_index ], media_
 bit ) THEN
         BEGIN  &wavegide&
         f1   := std_coeff[ f_min_index ]  /
 freq;
              & denormalize delay to fmax and
  compute for present freq &
         delay:= delay * SQRT( (1.0 - ( f1 *
 f1 )) );
         skin_factor := 0.0;
         END   &waveguide&
        ELSE     & coax    &
         skin_factor := std_coeff[  loss_inde x ] /
                            ( SQRT( freq_radians )
 * z_mech * skin_coeff );

      skin_cpx := COMPLEX( 1.0 - skin_factor,
 skin_factor );
      R   :=  z_to_s( z_mech * skin_cpx );
      exp :=
         exp_cmplx( COMPLEX( 0.0 , -delay * freq_
 radians ) * skin_cpx );
```

```
      IF type # std_thru THEN
         BEGIN
         R_exp    := R * exp;
         denom    := complex_1 - ( R_exp * R_
 exp );
         denom    := 1.0 / denom;
         S11      := (  R  - ( R_exp * exp )
 ) * denom;
         S21      := ( exp - ( R_exp *  R  )
 ) * denom;
         result := S11 + ( ( S21 * S21 * result )
                         / ( complex_1 - ( S1
 1 * result ) ) );
         END & not a thru &
       ELSE result := exp;  & is a thru &
      END non zero delay;
END offset_result;



STPNTR( std_coeff, std_addrs );

freq_radians := TwoPi * freq;
type   := std_type[ type_index  ];


delay    := std_coeff[ delay_index ];

result   := 0.0;

IF type = std_thru THEN
        &thru& BEGIN
               real_result := 1.0;
               END
 ELSE
    BEGIN
    IF type = std_open  THEN
        &open&BEGIN
              f1 :=  freq * 1@-9;
              imag_result := (std_coeff[c0_index]
 * unscale_c0)
                           + ( f1 * unscale_c
 * ( std_coeff[c1_index]
                           + ( f1 * ( std_
 coeff[c2_index]
                           + ( f1 * std_coeff
 [c3_index] ) ) ) ) );
                                      & order
 importmant -- overflow prob&
               IF ABS( imag_result ) < 1.@-20
  THEN imag_result :=1.@-20;
               imag_result := -1.0 / ( imag_
```

```
 result * freq_radians );
             END
    ELSE IF type = std_load  THEN
        &load& real_result := system_z0
    ELSE IF type = std_z     THEN
        & z  & real_result := std_coeff[ z_index ]
    ; COMMENT unneeded
     ELSE IF type = std_short THEN
        &short&        &default value are correct
 &   ;

  result := z_to_s( result );
  END not a thru;

  offset_result;


    std_act_elec := result;
END std_act_elec;
```

The following are mathematical models for optical calibration standards.

```
#EJECT; COMMENT
                std_act_opt
***************************************************
***************************************************
;
COMPLEX PROCEDURE std_act_opt( freq, std_addrs );
   VALUE freq, std_addrs;
   REAL freq;
   DOUBLE std_addrs;


   BEGIN
   INTEGER type;
   REAL freq_radians, delay, loss_dB, loss,
 reflect;
   COMPLEX result, exp;
   REAL POINTER std_coeff;
   BYTE POINTER std_type = std_coeff;


   SUBROUTINE offset_result;
   BEGIN
      IF delay <> 0.0 THEN
      BEGIN
      IF std_type <> std_opt_thru THEN delay
 := delay *2.;
      exp := exp_cmplx( COMPLEX( 0.0, -(delay
  * freq_radians) ) );
      result := result*exp;
```

```
     END;

   END offset_delay;


   STPNTR( std_coeff, std_addrs );
   freq_radians := TwoPi * freq;
   type := std_type[ type_index ];

   delay := std_coeff[ length_index ] * std_coeff
 [ n_index ]
              / speed_of_light;

   loss_dB := std_coeff[ length_index ] * std_
 coeff[ loss_index ];
   loss := TENX( -0.1*loss_dB );

   IF std_coeff[ refl_index ] <> 0.0 THEN
      reflect := 0.01*std_coeff[ refl_index ]

    ELSE
      BEGIN
      reflect := (std_coeff[n_index] - 1.0)/(
 std_coeff[n_index] + 1.0);
      reflect := reflect*reflect;
      END;

   result := complex_1;

   IF type = std_opt_thru THEN
     result := result * loss
   ELSE & type <> std_opt_thru &
     result := result * loss * loss * reflect ;

   offset_result;

   std_act_opt := result;
END std_act_opt;
```

The following are mathematical models for calibration of opto-electrical devices.

```
#EJECT;
COMPLEX PROCEDURE std_act_rcvr( freq, std_addrs,
 pt );
   VALUE freq, std_addrs, pt;
   REAL freq;
   INTEGER pt;
   DOUBLE std_addrs;

   BEGIN
   INTEGER type,ary_size;
```

```
   REAL freq_rad,B;
   COMPLEX result, exp;
   REAL POINTER std_coeff;
   BYTE POINTER std_type = std_coeff;
   QUAD fstart,fspan;
   DOUBLE ptr = REGISTER 8;

   STPNTR( std_coeff, std_addrs );
   type := std_type[ type_index ];

   freq_rad := TwoPi * freq;

   IF type = std_receiver THEN
      BEGIN
      ary_size := num_mpts[curr_e_ch]*user3_
 length;
      circ_interp( freq, e_ch_bit(Co_port)+1 );
 & interp ary 1 or 2 &
      ASSEMBLE( MOVE.L R0,R2; MOVE.L R1,R3 );
   & calf in R2/R3 &
      ptr := cal_coeff_addr + ary_size*cal_arrays
 [cal_type] +

       pt*user3_length;
      fetch_CNVE1;  & cal_2 in R0/R1 &
      ASSEMBLE( JSRX DVR1;  MOVEM.L R0/R1, result
 );  & calf/cal_2 &
      END
   ELSE
      result := COMPLEX( 1.0, 0.0 );

   std_act_rcvr := result;
END;
```

The following are mathematical models for calibration of electro-optical devices.

```
#EJECT;
COMPLEX PROCEDURE std_act_src( freq, std_addrs,
 pt );
   VALUE freq, std_addrs, pt;
   REAL freq;
   DOUBLE std_addrs;
   INTEGER pt;
   BEGIN
   INTEGER type, ary_size;
   COMPLEX result, exp;
   REAL POINTER std_coeff;
   BYTE POINTER std_type = std_coeff;
   DOUBLE ptr = REGISTER 8;

   STPNTR( std_coeff, std_addrs );
```

```
   type := std_type[ type_index ];


   IF type = std_source THEN
      BEGIN
      ary_size := num_mpts[curr_e_ch]*user3_
 length;
      circ_interp( freq, 3 );   & calf2 &
      ASSEMBLE( MOVE.L R0,R2; MOVE.L R1,R3 );

      ptr := cal_coeff_addr + ary_size*cal_
 arrays[cal_type] +

       pt*user3_length;
      fetch_CNVE1;  & cal_2 in R0/R1 &
      ASSEMBLE( JSRX DVR1 );         & calf2
 / cal_2 &
      ASSEMBLE( MOVE.L R0,R2; MOVE.L R1,R3 );
   & calf2 / cal_2 &
      ptr := ptr + ary_size;
      fetch_CNVE1;   & cal_3 &
      ASSEMBLE( JSRX MPY1 );   & cal_3 * calf
 2 / cal_2 &
      ASSEMBLE( MOVEM.L R0/R1,result );
      END
   ELSE IF type = std_refl_sens THEN
      result := COMPLEX( 1.0, 0.0 )
   ELSE
      result := COMPLEX( 1.0, 0.0 );

   std_act_src := result;
END;

COMPLEX PROCEDURE std_act( freq, class, pt );

   VALUE freq, class, pt;
   REAL freq;
   INTEGER class, pt;
   BEGIN
   BYTE POINTER std_type;
   DOUBLE std_addrs;
   INTEGER type;

   std_addrs := standard_specs( freq, class ) ;
   STPNTR( std_type, std_addrs );
   type   := std_type[ type_index ];

   IF type < std_optical THEN
      std_act := std_act_elec( freq, std_addrs )
   ELSE IF type <= std_opt_thru THEN
      std_act := std_act_opt( freq, std_addrs )
   ELSE IF type <= std_thru_rcvr THEN
```

```
      std_act := std_act_src( freq, std_addrs, pt )
   ELSE IF type <= std_thru_src THEN
      std_act := std_act_rcvr( freq, std_addrs,
 pt )
   ELSE std_act := COMPLEX(0.0,0.0);
   END;
```

The following instructions calculate error correction coefficients for frequency response correction.

```
#EJECT; COMMENT
     compute_freq_resp_coeff
**************************************************
**************************************************
;
PROCEDURE compute_freq_resp_coeff;
BEGIN
DOUBLE add;
INTEGER index;
COMPLEX coeff, meas ;
   add := cal_coeff_addr;
   tell( comp_cal_coeff );
   FOR index := 0  UNTIL num_mpts[ curr_e_ch ] -
 1 DO
        BEGIN

        ASSEMBLE(MOVE.L add   ,R8; JSR fetch_
 CNVE1; MOVEM.L R0-R1,meas);

        coeff:=meas/ std_act( REAL( e_freq_at_
 pt( index ) ),
                                          freq_resp_
 std, index );

        ASSEMBLE(MOVE.L  add,       R8;
                 MOVEM.L coeff,  R0-R1;    JS
 R CNV1E_save );

        add := add + user3_length;

        IF NOT(index MOD num_pts_bk_pt) THEN
 show_calc_disp ( index );
        END loop;
   clr_msg_and_in_progress;
END;
```

The following instructions calculate error correction coefficients for response and isolation correction, that is, for two-term error correction.

```
#EJECT; COMMENT
```

```
      compute_two_term_coeff
*************************************************
*                                               *
* First array is offset, second array is        *
* frequency response.                           *
*************************************************
;
PROCEDURE compute_two_term_coeff;
BEGIN
DOUBLE add;
INTEGER index, offset;
COMPLEX coeff, meas, meas2 ;
   add := cal_coeff_addr;
   offset := e_ary_size;
   tell( comp_cal_coeff );
   FOR index := 0  UNTIL num_mpts[ curr_e_ch
 ] - 1 DO
        BEGIN

        ASSEMBLE(MOVE.L add , R8; JSR fetch_CNVE1;
 MOVEM.L R0-R1, meas2;
                ADD.W offset, R8; JSR fetch_CNVE1;
 MOVEM.L R0-R1, meas);

        coeff:=std_act( REAL( e_freq_at_pt( index
 ) ),
                       two_term_response_std,
 index )/( meas-meas2);

        ASSEMBLE(MOVE.L  add,      R8;  ADD.
 W offset, R8;
                 MOVEM.L coeff,  R0-R1;  JSR
 CNV1E_save );

        add := add + user3_length;

        IF NOT(index MOD num_pts_bk_pt) THEN
 show_calc_disp ( index );
        END loop;
   clr_msg_and_in_progress;
END;
```

The following instructions calculate error correction coefficients for one-port error correction.

```
#EJECT; COMMENT
        compute_1_port_coeff
*************************************************
*************************************************
;
PROCEDURE compute_1_port_coeff( first_std_class );
                        VALUE first_std_class;
```

```
 INTEGER first_std_class;
BEGIN
DOUBLE add;
INTEGER offset, index;
REAL    freq;
COMPLEX meas1     , meas2     , meas3     ,
        act_1     , act_2     , act_3     ,
        term21_21, term32_32, term13_13,
        term21_3 , term32_1 , term13_2 ,
        coeff1   ,   coeff2 ,   coeff3 ,
        det,
        term21=coeff1,term32=coeff2,term13=coeff3;


   add := cal_coeff_addr;
   offset := e_ary_size;
   IF NOT cal_in_progress  & only occurs on port2
 of 2port reflection&
     THEN add := cal_coeff_addr + DOUBLE(port_
 offset)*DOUBLE(offset) ;
   tell( comp_cal_coeff );


#EJECT;
   FOR index := 0  UNTIL num_mpts[ curr_e_ch ] -
 1 DO
        BEGIN
        freq  :=  REAL( e_freq_at_pt( index ) );

        act_1 := std_act(  freq, first_std_class,
 index );
        act_2 := std_act(  freq, first_std_class
 + 1 ,index);
        act_3 := std_act(  freq, first_std_class
 + 2 ,index);

        ASSEMBLE(MOVE.L add   ,R8;JSR fetch_CNVE1;
 MOVEM.L R0-R1,meas1;
             MOVE.W offset,R9;JSR inc_fetch_CNVE1;
 MOVEM.L R0-R1,meas2;
                                JSR inc_fetch_CNVE1;
 MOVEM.L R0-R1,meas3 );

        term21 := meas2 - meas1;
        term32 := meas3 - meas2;
        term13 := meas1 - meas3;

        term21_3  := term21 * act_3;
        term32_1  := term32 * act_1;
        term13_2  := term13 * act_2;

        term21_21 := term21 * act_2 * act_1;
```

```
        term32_32 := term32 * act_3 * act_2;
        term13_13 := term13 * act_1 * act_3;

        det   := 1.0 / (term21_21  +  term32_
32  +  term13_13);

        coeff1:=(term21_21*meas3 +  term32_32
*meas1  +  term13_13*meas2)
                    * det;
                &directivity&

        coeff2:=-(term21_3       +  term32_1
         +  term13_2)
                    * det;
                &source match&

        coeff3:= coeff1 * coeff2 +
              ( (term21_3* meas3 +  term32_1
*meas1  +  term13_2 *meas2)
                    * det  );
                &tracking&


        ASSEMBLE(MOVE.L  add,   R8;
                 MOVEM.L coeff1,R0-R1; JSR CNV1E_
 save ;
                 MOVE.L  add,   R8;    ADD.W
 offset,R8;
                 MOVEM.L coeff2,R0-R1; JSR CNV1E_
 save ;
                 MOVE.L  add,   R8;    ADD.W
 offset,R8; ADD.W offset,R8;
                 MOVEM.L coeff3,R0-R1; JSR CNV1E_
 save );


        add := add + user3_length;
        IF NOT(index MOD num_pts_bk_pt) THEN
 show_calc_disp ( index );
    END loop;

   clr_msg_and_in_progress;
   refl_computed := TRUE;

END compute_1_port_coeff;
```

The following instructions calculate error correction coefficients for full two-port error correction, that is, for twelve-term error correction.

```
#EJECT; COMMENT
        compute_2_port_coeff
```

```
*************************************************
*                                               *
* Order (structure) of error coeffs is VERY     *
* important  ( see acorrect )                   *
*  e     e     e     e     e     e     e        *
*  e     e     e     e     e                    *
*   DF    SF    RF    XF    LF    TF    DR      *
*   SR    RR    XR    LR    TR                  *
*                                               *
*************************************************
end of comment;
PROCEDURE compute_2_port_coeff;
BEGIN
DOUBLE  add,  add2;
INTEGER offset, coeff_offset, index, port;
COMPLEX coeff1    ,    coeff2 ,   coeff3 ,
        coeff4    ,    coeff5 ,   coeff6 ,
        meas4     ,     meas5 ,    meas6 ,
                                   act_6 ;

   add := cal_coeff_addr;
   tell( comp_cal_coeff );
   offset := e_ary_size;

   FOR port := 1 TO 2 DO
     BEGIN
     IF port = 2 THEN add := cal_coeff_addr +

                             DOUBLE( port_
 offset )*DOUBLE( offset );

     IF ( (cal_type = s_two_port) AND (port = 2) ) THEN

      copy_user3( cal_coeff_addr, add, port_size *
                               num_mpts[ curr_e_ch ])
     ELSE
     FOR index := 0  UNTIL num_mpts[ curr_e_ch ] - 1 DO
        BEGIN
        act_6 := std_act( REAL( e_freq_at_pt( index )),
                    (IF port=1 THEN trans_fwd_
 std ELSE trans_rev_std),
                     index );

        ASSEMBLE(MOVE.L add,   R8;JSR fetch_CNVE1;
 MOVEM.L R0-R1,coeff1;
             MOVE.W offset,R9;JSR inc_fetch_CNVE1;
 MOVEM.L R0-R1,coeff2;
                             JSR inc_fetch_CNVE1;
 MOVEM.L R0-R1,coeff3;
                             JSR inc_fetch_CNVE1;
 MOVEM.L R0-R1,meas4;
                             JSR inc_fetch_CNVE1;
```

```
MOVEM.L R0-R1,meas5;
                                        JSR inc_fetch_CNVE1;
MOVEM.L R0-R1,meas6 );

       coeff5 :=  meas5 - coeff1;
       coeff5 :=  coeff5 / ( coeff3  + ( coeff2 *
coeff5 ) );
                                                   &
load match &

       coeff6 :=  ( meas6 - meas4) * ( complex_1
- (coeff2 * coeff5) )/

                    act_6;
                                                   &
transmission tracking &
       coeff5 := coeff5 / ( act_6 * act_6 );
   &correct for thru&
       & no math needed to done to xtalk coeff&

       add2   := add + ALEFT( DOUBLE( offset) , 2 );
&4*offset&
       ASSEMBLE(MOVE.L  add2,   R8;
                MOVEM.L coeff5,R0-R1; JSR CNV1E_
save  ;
                MOVE.L  add2,   R8;    ADD.W
 offset,R8;
                MOVEM.L coeff6,R0-R1; JSR CNV1E_
save );

       add := add + user3_length;

       IF NOT(index MOD num_pts_bk_pt) THEN
show_calc_disp ( index );
       END add index loop;

    END port loop;

   clr_msg_and_in_progress;

END compute_2_port_coeff;
```

The following instructions calculate error correction coefficients for response and source match error correction of electro-optical (E/O) devices.

```
#EJECT;
COMMENT
      compute_eo_match_coeff
***************************************************
*                                                 *
* Order (structure) of error coeffs is VERY       *
```

```
* important  ( see acorrect )                               *
*  e     e     e     e     e     e'     e''                 *
*   DF    SF    RF    XF    TF    TF     TF                 *
*************************************************************
;
PROCEDURE compute_eo_match_coeff;
BEGIN

DOUBLE  add,  add2;
INTEGER offset, coeff_offset, index, port;
COMPLEX coeff1   ,   coeff2 ,   coeff3 ,
        coeff4   ,   coeff5 ,
        meas4    ,    meas5 , act_5 ;

   add := cal_coeff_addr;
   tell( comp_cal_coeff );
   offset := e_ary_size;

     FOR index := 0  UNTIL num_mpts[ curr_e_ch ] - 1 DO
        BEGIN
        act_5 := std_act( REAL( e_freq_at_pt(
  index ) ),
                                 trans_fwd_std ,
                                 index );

        ASSEMBLE(MOVE.L add,   R8;JSR fetch_CNVE1;
 MOVEM.L R0-R1,coeff1;
             MOVE.W offset,R9;JSR inc_fetch_CNVE1;
 MOVEM.L R0-R1,coeff2;
                                 JSR inc_fetch_CNVE1;
 MOVEM.L R0-R1,coeff3;
                                 JSR inc_fetch_CNVE1;
 MOVEM.L R0-R1,meas4;
                                 JSR inc_fetch_CNVE1;
 MOVEM.L R0-R1,meas5 );


        coeff5 :=  ( meas5 - meas4) / act_5;
                                                    &
 transmission tracking &
        & no math needed to done to xtalk coeff&

        add2   := add + ALEFT( DOUBLE( offset) ,
 2 );   &4*offset&
        ASSEMBLE(MOVE.L  add2,   R8;
                 MOVEM.L coeff5,R0-R1; JSR CNV1E_
save  );

        add := add + user3_length;

        IF NOT(index MOD num_pts_bk_pt) THEN
show_calc_disp ( index );
```

```
        END add index loop;

        clr_msg_and_in_progress;

END;
```

The following instructions calculate error correction coefficients for response and load match error correction of opto-electrical (O/E) devices.

```
#EJECT;
COMMENT
      compute_oe_match_coeff
**************************************************
*                                                *
* Order (structure) of error coeffs is VERY      *
* important  ( see acorrect )                    *
*  e     e     e     e     e     e      e        *
*  e     e     e'                                *
*   DR    SR    RR    XF    LF    TF     DF      *
*   SF    RF    TF                               *
**************************************************
;
PROCEDURE compute_oe_match_coeff;
BEGIN

DOUBLE  add,  add2;
INTEGER offset, coeff_offset, index, port;
COMPLEX coeff7   ,    coeff8 ,   coeff9 ,
        coeff4   ,    coeff5 ,   coeff6 ,
        meas4    ,     meas5 ,    meas6 ,
                                  act_6 ;

   add := cal_coeff_addr;
   tell( comp_cal_coeff );
   offset := e_ary_size;

     FOR index := 0  UNTIL num_mpts[ curr_e_ch ]
 - 1 DO
        BEGIN
        act_6 := std_act( REAL( e_freq_at_pt(
  index ) ),
                          trans_fwd_std,
                          index );

        ASSEMBLE(MOVE.L add,   R8;JSR fetch_CNVE1;
 MOVEM.L R0-R1,coeff7;
             MOVE.W offset,R9;JSR inc_fetch_CNVE1;
 MOVEM.L R0-R1,coeff8;
                          JSR inc_fetch_CNVE1;
```

```
MOVEM.L R0-R1,coeff9;
                                      JSR inc_fetch_CNVE1;
MOVEM.L R0-R1,meas4;
                                      JSR inc_fetch_CNVE1;
MOVEM.L R0-R1,meas5;
                                      JSR inc_fetch_CNVE1;
MOVEM.L R0-R1,meas6 );

        coeff5 :=  meas5 - coeff7;
        coeff5 :=  coeff5 / ( coeff9  + ( coeff8
* coeff5 ) );
                                                        &
load match &

        coeff6 :=  ( meas6 - meas4) * ( complex_1
- (coeff8 * coeff5) )/

                         act_6;
                                                        &
transmission tracking &
        coeff5 := coeff5 / ( act_6 * act_6 );
   &correct for thru&
        & no math needed to done to xtalk coeff&

        add2   := add + ALEFT( DOUBLE( offset) ,
2 );    &4*offset&
        ASSEMBLE(MOVE.L  add2,    R8;
                  MOVEM.L coeff5,R0-R1; JSR CNV1E_
save  ;
                  MOVE.L  add2,    R8;    ADD.W
 offset,R8;
                  MOVEM.L coeff6,R0-R1; JSR CNV1E_
save );

        add := add + user3_length;

        IF NOT(index MOD num_pts_bk_pt) THEN
show_calc_disp ( index );
        END add index loop;

        clr_msg_and_in_progress;

END;


#EJECT; COMMENT
                         cal_done
***************************************************
***************************************************
;
PROCEDURE  cal_done( type );
   VALUE   type;
```

```
INTEGER type;
                    ENTRY;
BEGIN & cal_done &

IF cal_mem_allocated THEN
  BEGIN & if cal_mem_allocated &


      IF (type = done_class ) AND NOT freq_
covered OR
          meas_std_data   THEN
         warn( not_finished_caling )
      ELSE

      IF (type = done_class ) AND ( cal_type
 # response ) THEN
         BEGIN
         h_last_class;
         IF last_class_element > 1 THEN
            prev_menu;
         IF ( (cal_stds_remaining AND  cal_stds_
needed[ cal_type ] AND
                    needed_mask[ check_done[last_
class ] ] ) = 0 ) THEN
             BEGIN
             IF (cal_type = two_port) OR (cal_
type = s_two_port) OR
                (cal_type = eo_match) OR (cal_
type = oe_match) THEN
                tell( press_done )
                ELSE tell( press_save ) ;
             END
          ELSE tell( connect_std );
         END
      ELSE IF ( (cal_stds_remaining AND needed_
mask[type]) # 0) THEN
         warn( not_finished_caling )
      ELSE
         BEGIN & enough standards done and not
a done_class &
         CASE type  OF
            BEGIN & case &
               BEGIN
            & done_1_port &
                  IF cal_type = one_port_on_ 2
THEN
                     compute_1_port_coeff( port2_
1st_std )
                   ELSE BEGIN
                     compute_1_port_coeff( port1_
1st_std );
                     IF cal_type = s_two_port
```

```
THEN
                              BEGIN & if &
                                 cal_in_progress :
= TRUE;   & not yet FALSE &
                                 h_cmd(Ccal_s_refl );
                              END  & s_two_port &
                           ELSE IF cal_type = eo_match
THEN
                              BEGIN & if &
                                 cal_in_progress :
= TRUE;   & not yet FALSE &
                                 h_cmd(Ccal_eo_refl);
                              END  & eo_match &
                           ELSE IF cal_type = oe_match
THEN
                              BEGIN & if &
                                 cal_in_progress :
= TRUE;   & not yet FALSE &
                                 h_cmd(Ccal_oe_refl);
                              END;  & oe_match &
                           END;
                     END;
                     BEGIN
              & done_reflection &
                        compute_1_port_coeff( port1_
1st_std );

      & special port2 call &
                        compute_1_port_coeff( port2_
1st_std );
                        cal_in_progress := TRUE;
             & not yet FALSE &
                        h_cmd(Ccal_refl);
                     END;
                     BEGIN
                   & done_trans &
                         IF cal_type = s_two_port
THEN
                           h_cmd(Ccal_s_thru)
                         ELSE IF cal_type = oe_match
THEN
                           h_cmd(Ccal_oe_thru)
                         ELSE
                           h_cmd(Ccal_thru);
                     END;
                     BEGIN
                    & done_isol &
                         IF cal_type = s_two_port
THEN
                           h_cmd(Ccal_s_isol)
                        ELSE IF cal_type = eo_match
THEN
```

```
                h_cmd(Ccal_eo_isol)
             ELSE IF cal_type = oe_match
THEN
                h_cmd(Ccal_oe_isol)
             ELSE
                h_cmd(Ccal_isol);
          END;
          BEGIN
       & done_2_port &
             compute_2_port_coeff;
             COMMENT  ?? dds 8/1
             cal_type := two_port;  & in
case of s_two_port &
          END;
          BEGIN                       & done_
class ( done_response ) &
             compute_freq_resp_coeff;
          END;
          BEGIN
     & done_two_term &
             compute_two_term_coeff;
          END;
          BEGIN
     & done_oe_refl  &
                & order is reversed from
 that used for full two  &
             compute_1_port_coeff( port2_
1st_std );

   & special port 1 call &
             compute_1_port_coeff( port1_
1st_std );
             cal_in_progress := TRUE;
      & not yet FALSE &
             h_cmd(Ccal_oe_refl);
          END;
          BEGIN
     & done_eo_match &
          compute_eo_match_coeff;
          END;
          BEGIN
     & done_oe_match &
          compute_oe_match_coeff;
          END;
       END;  & case &

       IF NOT cal_in_progress THEN
         BEGIN & if &
         save_cal;
         END   & if &
       ELSE
         BEGIN
```

```
                gen_menu( cal_done_menu[ cal_type
 ] );
                IF ((cal_stds_remaining AND cal_
 stds_needed[cal_type])=0)
                 THEN tell( press_save );
                END;

           END;  & not a done_class and enough
  standards done &


      END;    & if cal_mem_allocated &

      clr_status_bit (WFGR+WFGF);  & clear waiting
 for GET status bits &
      fini_tell;  & tell hpib we are done &

    END   & cal_done & ;


SUBROUTINE cal_done_reflection;
  IF cal_type = two_port THEN
     cal_done( done_reflection )
  ELSE IF cal_type = oe_match THEN
     cal_done( done_oe_refl )
  ELSE
     cal_done( done_1_port );

COMMENT
                    fin_save
***************************************************
*                                                 *
* Items to complete save routine in scal0 but     *
* required too much symbol space so were put back *
* here.                                           *
*                                                 *
***************************************************
;
PROCEDURE fin_save;
                     ENTRY;
  BEGIN
    BYTE POINTER bptr;
          STPNTR( bptr, cal_coeff_addr - header_
 size + hd_cal_title );
          bptr[-2 ] := 0;   & clear stored bit &
          MOVE bptr[-1] := old_cal_title[-1],
 +(cal_title_size+2);
          IF (cal_type = two_port) OR (cal_type =
 s_two_port) OR
             (cal_type = eo_match) OR (cal_type =
 oe_match) THEN
             restore_param;
```

```
          corr_on( cal_mem_id - (error_coeff_id -
 1));
          gen_menu( SAVE_MENU );
          cal_in_progress := FALSE;
  END fin_save;

#EJECT;
COMMENT
         cal_acquisiton_done
***************************************************
*                                                 *
* Called by control, in the control process.      *
*                                                 *
***************************************************
;
SUBROUTINE cal_acq_done;
               ENTRY;
   BEGIN & cal_acq_done &

      take_data;
      COMMENT set meas_std_data in take_data,
  set to FALSE only if
          standard is actually done.  For E/O
  and O/E cals take
          data is called more than once.  meas_
 std_data should
          remain TRUE until after the final
 measurement is made;
      IF cal_coeff_addr <> 0 AND        & cal
 memory hasn't been stolen &
         cal_in_progress THEN          &  HPIB
 crashes ?? &
         BEGIN & if &
           IF ( last_class_element <= 1 ) AND

              ( cal_type <> response )    THEN
               cal_done(done_class);
           IF NOT meas_std_data THEN beep_done;
         END;  & if &
      clr_msg( measuring_std );
      new_num_grps(curr_e_ch,temp_num_of_groups);

   END;  & cal_acq_done &
```

The following instructions request measurement of a calibration standard by 'control' process.

```
#EJECT;
COMMENT
                acq_data
```

```
**************************************************
*                                                *
* Begin data acquisition for obtaining calibra-   *
* tion data.  If swept, take one additional sweep *
* to allow for settling.  If averaging is turned  *
* on, take enough sweeps for the averaging factor *
* plus 1.                                        *
*                                                *
* Called from the command process, as with most   *
* most other cal operations.                     *
*                                                *
**************************************************
;
SUBROUTINE acq_data;
                ENTRY;
   BEGIN & acq_data &

      IF cal_in_progress THEN
         BEGIN & if cal_in_progress &

         abort_swp;  & wtp 1/31 &
         std_count := 0;
            IF NOT meas_std_data THEN
               BEGIN & if &
                  temp_num_of_groups :=
                          num_of_groups[curr_e_
 ch];
                  meas_std_data := TRUE;
               END;  & if &
            tell( measuring_std );

            tgrp_num[curr_e_ch]:=0;& resets
 averaging number &
            IF e_ch_bit( Cif_avg ) = 1   THEN

               n_swp( entry_ch_int(ch_average_
 factor) )
             ELSE
               n_swp( 1 );

         END;  & if cal_in_progress &
   &  ELSE spurious command, probably out-of-
 sequence HP-IB &

   END;  & acq_data &
```

The following instructions request a series of measurement sweeps for calibration of electro-optical (E/O) devices.

```
#EJECT;
COMMENT
               acq_data_eo
**************************************************
*                                                *
* Begin data acquisition for obtaining calibra-  *
* tion data.  If swept, take one additional sweep *
* to allow for settling.  If averaging is turned  *
* on, take enough sweeps for the averaging factor *
* plus 1.                                        *
*                                                *
* Take multiple sweeps required for E/O calibra-  *
* tion.                                          *
*                                                *
* Called from the command process, as with most   *
* other cal operations.                          *
*                                                *
**************************************************
;
PROCEDURE acq_data_eo;
                    ENTRY;
   BEGIN & acq_data_eo &
   INTEGER o_port;
   BOOLEAN sw_couple;

      IF cal_in_progress THEN
         BEGIN & if cal_in_progress &
         o_port := e_ch_bit( Co_port );
         signal_init( oeo_cal_ary_ready, 0 );

         std_count := 0;
         abort_swp;  & wtp 1/31 &
            IF NOT meas_std_data THEN
               BEGIN & if &
                  temp_num_of_groups :=
                          num_of_groups[curr_e_
 ch];
                  meas_std_data := TRUE;
               END;  & if &
         new_param( 1 );  & *** S21 -- rf cable
 *** &
            tell( measuring_std );

            tgrp_num[curr_e_ch]:=0;& resets
 averaging number &
            IF e_ch_bit( Cif_avg ) = 1   THEN

               n_swp( entry_ch_int(ch_average_
 factor) )
             ELSE
               n_swp( 1 );
            wait( oeo_cal_ary_ready );
```

```
        abort_swp;  & wtp 1/31 &
        COMMENT measure optical cable, O/O1
for E/O1, O/O2 for E/O2;
        new_param( oo1_parm + o_port );  & O
/O1 or O/O2 &
           tell( measuring_std );

           tgrp_num[curr_e_ch]:=0;& resets
averaging number &
           IF e_ch_bit( Cif_avg ) = 1   THEN

               n_swp( entry_ch_int(ch_average_
factor) )
            ELSE
               n_swp( 1 );
           wait( oeo_cal_ary_ready );

        sw_couple := e_ch_bit( Csw_couple )< >0;
        IF sw_couple THEN h_off( Csw_couple,
 Csw_couple );
        set_misc_control( LTS_sw6, TRUE ); &
 O/O1 with mod cal port &

        abort_swp;  & wtp 1/31 &
        new_param( oo1_parm );  & ** O/O1 **  &
           tell( measuring_std );

           tgrp_num[curr_e_ch]:=0;& resets
averaging number &
           IF e_ch_bit( Cif_avg ) = 1   THEN

               n_swp( entry_ch_int(ch_average_
factor) )
            ELSE
               n_swp( 1 );
        wait( oeo_cal_ary_ready );

        set_misc_control( LTS_sw6, 0 );  & reset
mod cal switch &
        IF sw_couple THEN  h_key(Csw_couple,
Csw_couple,Csw_couple);
        new_param( eo1_parm + o_port );  &
restore E/O_ &

        END;  & if cal_in_progress &
  &  ELSE spurious command, probably out-of-
sequence HP-IB &

  END;  & acq_data_eo &
```

The following instructions request a series of measurement sweeps for calibration of opto-electrical (O/E) devices.

```
#EJECT;
COMMENT
                    acq_data_oe
***************************************************
*                                                 *
* Begin data acquisition for obtaining calibra-   *
* tion data.  If swept, take one additional sweep *
* to allow for settling.  If averaging is turned  *
* on, take enough sweeps for the averaging factor *
* plus 1.                                         *
*                                                 *
* Take multiple sweeps required for O/E calibra-  *
* tion.                                           *
*                                                 *
* Called from the command process, as with most   *
* other cal operations.                           *
*                                                 *
***************************************************
;
PROCEDURE acq_data_oe;
                    ENTRY;
   BEGIN & acq_data_oe &
   INTEGER e_port;

      IF cal_in_progress THEN
         BEGIN & if cal_in_progress &
         e_port := e_ch_bit( Ce_port );
         signal_init( oeo_cal_ary_ready, 0 );

         std_count := 0;
         abort_swp;  & wtp 1/31 &
            IF NOT meas_std_data THEN
               BEGIN & if &
                  temp_num_of_groups :=
                           num_of_groups[curr_e_
 ch];
                  meas_std_data := TRUE;
               END;  & if &
         COMMENT measure rf cable - S12 for O
 /E1 and S21 for O/E2;
         new_param( 2 - e_port );  & S12 or S 21 &
            tell( measuring_std );

            tgrp_num[curr_e_ch]:=0;& resets
 averaging number &
            IF e_ch_bit( Cif_avg ) = 1   THEN
```

```
              n_swp( entry_ch_int(ch_average_
factor) )
           ELSE
              n_swp( 1 );

       wait( oeo_cal_ary_ready );
       abort_swp;  & wtp 1/31 &
       COMMENT measure optical cable - O/O1 ;
       new_param( ool_parm );    & ** O/O1 ** &
          tell( measuring_std );

          tgrp_num[curr_e_ch]:=0;& resets
averaging number &
          IF e_ch_bit( Cif_avg ) = 1   THEN

              n_swp( entry_ch_int(ch_average_
factor) )
           ELSE
              n_swp( 1 );

       wait( oeo_cal_ary_ready );
       new_param( oel_parm + e_port );  &
restore O/E_ &

       END;  & if cal_in_progress &
   &  ELSE spurious command, probably out-of-
sequence HP-IB &

   END;  & acq_data_oe &

#EJECT;
SUBROUTINE check_refl_status;
BEGIN
   tell( connect_std );
   IF refl_computed THEN
      BEGIN  & must redo all of relection &
      cal_stds_remaining := cal_stds_remaining
OR
         ( needed_mask[done_reflection] AND cal_
stds_needed[cal_type] );
      h_off(Cport1_std1, Cport2_std3 );
      h_off(Ccal_refl,Ccal_refl);
      h_off(Ccal_s_refl,Ccal_s_refl);
      refl_computed := FALSE;
      END;  & must redo all of relection &
END check_refl_status;


#FILE fcalmenu;

END$
```

```
      IF cal_debug THEN BEGIN
                  & debug &
        WSTR( "CAL: cal_mem_id" ); WHEX( cal_
mem_id );         & debug &
        CRLF; END;
                  & debug &
      IF cal_debug THEN BEGIN
                  & debug &
        WSTR( "CAL: cal_mem_id" ); WHEX( cal_
mem_id );         & debug &
        CRLF; END;
                  & debug &
             IF cal_debug THEN
               BEGIN
                WSTR( "take data, fc, rem, class,
src, dest" );
                WHEX( freq_covered );
                WHEX( cal_stds_remaining );
                WHEX( class );
                WHex( data_source, 6 );
                WHex( data_destination, 6 );
                CRLF;
               END;

             IF cal_debug THEN BEGIN
                   & debug &
             WSTR( "CAL: data_sour" );
                   & debug &
             WHex( data_source,6); CRLF;
                   & debug &
             WSTR( "CAL: data_dest" );
                   & debug &
             WHex( data_destination, 6);CRLF;
                   & debug &
             WSTR( "CAL: pt_count" ); WHEX( pt_
count ); CRLF;  & debug &
             END;
                   & debug &

IF cal_debug THEN BEGIN
                  & debug &
WSTR("std_act");WREAL(freq);WNUM(class);
                  & debug &
      WHex(d,7); WNUM( type ); CRLF; END;
                  & debug &

IF cal_debug THEN BEGIN
              & debug &
   WSTR("     ");WCPX(result);WREAL(delay);
              & debug &
   WREAL(z_mech);WREAL(system_z0);CRLF;
              & debug &
```

```
END;
            & debug &

    IF cal_debug THEN BEGIN
            & debug &
       WSTR( "act_" ); CRLF;
            & debug &
       WCPX( act_1 );  CRLF;
            & debug &
       WCPX( act_2 );  CRLF;
            & debug &
       WCPX( act_3 );  CRLF;
            & debug &
       CRLF; END;
            & debug &

    IF cal_debug THEN BEGIN
            & debug &
       WSTR( "meas" ); CRLF;
            & debug &
       WCPX( meas1 );  CRLF;
            & debug &
       WCPX( meas2 );  CRLF;
            & debug &
       WCPX( meas3 );  CRLF;
            & debug &
       CRLF; END;
            & debug &

    IF cal_debug THEN BEGIN
            & debug &
       WSTR( "coeff" ); CRLF;
            & debug &
       WCPX( coeff1 );  CRLF;
            & debug &
       WCPX( coeff2 );  CRLF;
            & debug &
       WCPX( coeff3 );  CRLF;
            & debug &
       CRLF; END;
            & debug &

            IF cal_debug THEN BEGIN
                  & debug &
            WSTR( "CAL: data_sour" );
                  & debug &
            WHex( data_source,6); CRLF;
                  & debug &
            WSTR( "CAL: data_dest" );
                  & debug &
            WHex( data_destination, 6);CRLF;
                  & debug &
```

```
            WSTR( "CAL: pt_count" ); WHEX( pt_
count ); CRLF;  & debug &
            WSTR( "CAL: index" ); WHEX( temp );
CRLF;         & debug &
            WSTR( "CAL: pt_start" ); WHEX( pt_
start ); CRLF;  & debug &
            END;
                  & debug &
```

The following is a 'CASE' statement to control softkeys used by the calibration and error correction subprograms.

```
COMMENT
  This is a software generated file !!!
  Changes must be made in SKINFO
  Run gensk to re-generate file;

SUBROUTINE p7;  ENTRY;
BEGIN

CASE cmd_token-201 OF
BEGIN
& 201 &
BEGIN
  h_toggle;
  IF e_ch_bit( Ccorrection ) = 1 THEN
   turn_corr_on
  ELSE corr_off( curr_e_ch );
END;
& 202 &
BEGIN
h_toggle;
IF e_ch_bit( Cfreq_zoom ) = 0 AND
   mem_id_addr[z_error_coeff_id_1+curr_e_ch  -  1]  <>  0
THEN
   release_mem( z_error_coeff_id_1+curr_e_ch - 1 );
END;
& 203 &
gen_menu( calibrate_menu[ dev_type[curr_e_ch] ] );
& 204 &
resume_cal;
& 205 &
;
& 206 &
BEGIN
define_opt_std( std_fresnel );
select_act_fcn( active_refl_power );
END;
& 207 &
```

```
;
& 208 &
corr_off( curr_e_ch );
& 209 &
set_cal_type( response );
& 210 &
BEGIN
set_cal_type( two_term );
END;
& 211 &
set_cal_type( one_port_on_1 );
& 212 &
set_cal_type( one_port_on_2 );
& 213 &
set_cal_type( two_port );
& 214 &
set_cal_type( eo_match );
& 215 &
set_cal_type( oe_match );
& 216 &
;
& 217 &
;
& 218 &
;
& 219 &
;
& 220 &
;
& 221 &
select_act_fcn( active_velocity_factor );
& 222 &
BEGIN
select_act_fcn( active_refractive_index );
END;
& 223 &
select_act_fcn( active_system_z0 );
& 224 &
tell( command_not_implemented );
& 225 &
;
& 226 &
;
& 227 &
BEGIN
h_toggle;
IF e_ch_bit(Clist_freq) OR
   e_ch_bit(Clog_freq) THEN
   upd_el_del_list(curr_e_ch);
IF e_ch_bit(Cdual_chan) THEN
   BEGIN
   IF ch_bit(Clist_freq,3-curr_e_ch) OR
```

```
      ch_bit(Clog_freq,3-curr_e_ch)  THEN
        upd_el_del_list(3-curr_e_ch);
   ch_part( update_raw, 3-curr_e_ch );
   END;
chk_upd_dom;
END;
& 228 &
select_act_fcn( active_ref_plane_1 );
& 229 &
select_act_fcn( active_ref_plane_2 );
& 230 &
select_act_fcn( active_ref_plane_opt );
& 231 &
select_act_fcn( active_ref_plane_B );
& 232 &
select_act_fcn( active_ref_plane_A );
& 233 &
set_std_class( port1_1st_std );
& 234 &
set_std_class( port1_2nd_std );
& 235 &
set_std_class( port1_3rd_std );
& 236 &
cal_done( done_1_port );
& 237 &
set_std_class( port2_1st_std );
& 238 &
set_std_class( port2_2nd_std );
& 239 &
set_std_class( port2_3rd_std );
& 240 &
check_refl_status;
& 241 &
tell( connect_thru );
& 242 &
tell( isolate_ports );
& 243 &
cal_done( done_2_port );
& 244 &
cal_done_reflection;
& 245 &
   set_std_class( trans_fwd_std );
& 246 &
   set_std_class( match_fwd_std  );
& 247 &
   set_std_class( trans_rev_std );
& 248 &
   set_std_class( match_rev_std );
& 249 &
cal_done( done_trans );
& 250 &
omit_isolation;
```

```
& 251 &
set_std_class( isoln_fwd_std );
& 252 &
set_std_class( isoln_rev_std );
& 253 &
cal_done(done_isol);
& 254 &
check_refl_status;
& 255 &
tell( connect_thru );
& 256 &
tell( isolate_ports );
& 257 &
set_std_class( two_term_response_std );
& 258 &
set_std_class( two_term_offset_std );
& 259 &
cal_done( done_two_term );
& 260 &
check_refl_status;
& 261 &
tell( isolate_ports );
& 262 &
cal_done(done_eo_match);
& 263 &
check_refl_status;
& 264 &
tell( connect_thru );
& 265 &
tell( isolate_ports );
& 266 &
cal_done( done_oe_match );
& 267 &
set_element( 1 );
& 268 &
set_element( 2 );
& 269 &
set_element( 3 );
& 270 &
set_element( 4 );
& 271 &
set_element( 5 );
& 272 &
set_element( 6 );
& 273 &
set_element( 7 );
& 274 &
cal_done(done_class);
& 275 &
acq_data;
& 276 &
compute_load;
```

```
END;
END p7;
```

The following constitute the parameters for calibration of standard models.

```
M68KL,P,"stddata"
BEGIN

#FILE cstds;
     & type2 values   &
#FILE ccal;
     & for std_type's &
#FILE cstds2;

EXTERNAL BYTE ARRAY cal_kit_ary.L[0:1];
EXTERNAL BOOLEAN dirty_opt_kit.L;

COMMENT
          cal_kit_descriptor
**************************************************
*    reduced  7 mm kit from 8510                 *
**************************************************
;
& calibration kit label &
BYTE    TABLE a00 := 10,03,'7,'m,'m,' ,' ,' ,
 ' ,' ,' ,' ;  & kit label &
& class lists of calibration standards &
BYTE    TABLE b00 :=  1, 2, 0, 0, 0, 0, 0, 0,
           & port1_1st_std &
                      1, 1, 0, 0, 0, 0, 0, 0,
           & port1_2nd_std &
                      3, 3, 5, 6, 0, 0, 0, 0,
           & port1_3rd_std &
                      1, 3, 0, 0, 0, 0, 0, 0,
           & isoln_fwd_std &
                      1, 4, 0, 0, 0, 0, 0, 0,
           & match_fwd_std &
                      1, 4, 0, 0, 0, 0, 0, 0,
           & trans_fwd_std &
                      1, 2, 0, 0, 0, 0, 0, 0,
           & port2_1st_std &
                      1, 1, 0, 0, 0, 0, 0, 0;
           & port2_2nd_std &
                      3, 3, 5, 6, 0, 0, 0, 0,
           & port2_3rd_std &
                      1, 3, 0, 0, 0, 0, 0, 0,
           & isoln_rev_std &
                      1, 4, 0, 0, 0, 0, 0, 0,
           & match_rev_std &
```

```
                1, 4, 0, 0, 0, 0, 0, 0,
         & trans_rev_std &
                3, 1, 2, 4, 0, 0, 0, 0,
         & freq_resp_std &
                3, 1, 2, 4, 0, 0, 0, 0,
         & two_term_resp &
                1, 3, 0, 0, 0, 0, 0, 0;
         & two_term_offs &
& class labels &
BYTE    TABLE c00 := 10,05,'O,'P,'E,'N,' ,' ,
 ' ,' ,' ,' , & port1_1st_ &
                10,05,'S,'H,'O,'R,'T,' ,
 ' ,' ,' ,' , & port1_2nd_ &
                10,05,'L,'O,'A,'D,'S,' ,
 ' ,' ,' ,' , & port1_3rd_ &
                10,10,'I,'S,'O,'L,'','N,
 ' ,'S,'T,'D, & isoln_fwd_ &
                10,04,'T,'H,'R,'U,' ,' ,
 ' ,' ,' ,' , & match_fwd_ &
                10,04,'T,'H,'R,'U,' ,' ,
 ' ,' ,' ,' , & trans_fwd_ &
                10,05,'O,'P,'E,'N,' ,' ,
 ' ,' ,' ,' , & port2_1st_ &
                10,05,'S,'H,'O,'R,'T,' ,
 ' ,' ,' ,' , & port2_2nd_ &
                10,05,'L,'O,'A,'D,'S,' ,
 ' ,' ,' ,' , & port2_3rd_ &
                10,10,'I,'S,'O,'L,'','N,
 ' ,'S,'T,'D, & isoln_rev_ &
                10,04,'T,'H,'R,'U,' ,' ,
 ' ,' ,' ,' , & match_rev_ &
                10,04,'T,'H,'R,'U,' ,' ,
 ' ,' ,' ,' , & trans_rev_ &
                10,08,'R,'E,'S,'P,'O,'N,
 'S,'E,' ,' , & freq_resp_ &
                10,08,'R,'E,'S,'P,'O,'N,
 'S,'E,' ,' , & two_T_resp &
                10,10,'I,'S,'O,'L,'','N,
 ' ,'S,'T,'D; & two_T_offs &

& std #  1 &
& xref to 8510 std #  1 for 7mm and 3.5mm (not
 Type N)&
REAL    TABLE a01 := 0, 999@9,
              & fmin, fmax &
                50.0, 0.0,  0.0,
        & Zo, delay, loss &
                0.0, 0.0, 0.0, 0.0;
        & c0, c1, c2, c3  &
BYTE    TABLE c01 := 10,06,' ,'S,'H,'O,'R,'T,
 ' ,' ,' ,' ;      & label &
BYTE    TABLE d01 := std_short, 0;
```

```
          & std_type, type2&
& std #  2 &
& xref to 8510 std #  2 for 7mm and 3.5mm (not
 Type N)&
REAL    TABLE a02 := 0, 999@9,
              & fmin, fmax &
                     50.0, 0.0,  0.0,
         & Zo, delay, loss &
                     87.2,1695,-150.5,8.89;
         & c0, c1, c2, c3  &
BYTE    TABLE c02 := 10,06,' ,'O,'P,'E,'N,' ,
 ' ,' ,' ,' ;      & label &
BYTE    TABLE d02 := std_open , 0;
          & std_type, type2&
& std #  3 &
& xref to 8510 std #  9 for 7mm and 3.5mm (not
 Type N)&
REAL    TABLE a03 := 0, 999@9,
              & fmin, fmax &
                     50.0, 0.0,  0.0,
         & Zo, delay, loss &
                     0.0, 0.0, 0.0, 0.0;
         & c0, c1, c2, c3  &
BYTE    TABLE c03 := 10,09,'B,'R,'O,'A,'D,'B,
 'A,'N,'D,' ;      & label &
BYTE    TABLE d03 := std_load,  0;
          & std_type, type2&
& std #  4 &
& xref to 8510 std # 11 for 7mm and 3.5mm (not
 Type N)&
REAL    TABLE a04 := 0, 999@9,
              & fmin, fmax &
                     50.0, 0.0,  0.0,
         & Zo, delay, loss &
                     0.0, 0.0, 0.0, 0.0;
         & c0, c1, c2, c3  &
BYTE    TABLE c04 := 10,06,' ,'T,'H,'R,'U,' ,
 ' ,' ,' ,' ;      & label &
BYTE    TABLE d04 := std_thru,  0;
          & std_type, type2&
& std #  5 &
& xref to 8510 std # 10 for 7mm and 3.5mm (not
 Type N)&
REAL    TABLE a05 := 1.999@9,999.0000@9,
              & fmin, fmax &
                     50.0, 0.0,  0.0,
         & Zo, delay, loss &
                     0.0, 0.0, 0.0, 0.0;
         & c0, c1, c2, c3  &
BYTE    TABLE c05 := 10,07,'S,'L,'I,'D,'I,'N,
 'G,' ,' ,' ;      & label &
BYTE    TABLE d05 := std_load,  sliding;
```

```
          & std_type, type2&
& std #  6 &
& xref to 8510 std # 12 for 7mm and 3.5mm (not
 Type N)&
REAL    TABLE a06 := 0,2.001@9,
             & fmin, fmax &
                   50.0, 0.0,  0.0,
         & Zo, delay, loss &
                   0.0, 0.0, 0.0, 0.0;
         & c0, c1, c2, c3  &
BYTE    TABLE c06 := 10,07,'L,'O,'W,'B,'A,'N,
 'D,' ,' ,' ;      & label &
BYTE    TABLE d06 := std_load,  0;
          & std_type, type2&
& std #  7 &
& xref to 8510 std # 14 for 7mm and 3.5mm (not
 Type N)&
REAL    TABLE a07 := 0, 999@9,
             & fmin, fmax &
                   50.0, 0.0,  0.0,
         & Zo, delay, loss &
                   0.0, 0.0, 0.0, 0.0;
         & c0, c1, c2, c3  &
BYTE    TABLE c07 := 10,01,' ,'S,'H,'O,'R,'T,
 ' ,' ,' ,' ;      & label &
BYTE    TABLE d07 := std_short, 0;
          & std_type, type2&
& std #  8 &
& xref to 8510 std # 16 for 7mm and 3.5mm (not
 Type N)&
REAL    TABLE a08 := 0, 999@9,
             & fmin, fmax &
                   50.0, 0.0,  0.0,
         & Zo, delay, loss &
                   0.0,0.0,0.0,0.0;
     &c0, c1, c2, Zterminal&
BYTE    TABLE c08 := 10,06,' ,'O,'P,'E,'N,' ,
 ' ,' ,' ,' ;      & label &
BYTE    TABLE d08 := std_open , 0;
          & std_type, type2&
& vvv Lightwave Standards vvv &
&     Optical    &
& std # 9 &
REAL    TABLE a09 := 0, 999@9,
             & fmin, fmax &
                   1.46, 0.0, 0.0,
         & n, length, loss &
                  100.,0.0,40.0,0.0;
    &c0, c1, c2, Zterminal&
BYTE    TABLE c09 := 10,09,'R,'E,'F,'L,'E,'C,
 'T,'O,'R,' ;      & label &
BYTE    TABLE d09 := std_refl , 0;
```

```
          & std_type, type2&
& std # 10 &
REAL    TABLE a10 := 0, 999@9,
              & fmin, fmax &
                     1.46, 0.0, 0.0,
      & n, length, loss &
                     3.5,0.0,0.0,0.0;
     &c0, c1, c2, Zterminal&
BYTE    TABLE c10 := 10,07,'F,'R,'E,'S,'N,'E,
 'L,' ,' ,' ;      & label &
BYTE    TABLE d10 := std_fresnel , 0;
          & std_type, type2&
& std # 11 &
REAL    TABLE a11 := 0, 999@9,
              & fmin, fmax &
                     1.46, 0.0, 0.0,
        & n, length, loss &
                     0.0,0.0,0.0,0.0;
     &c0, c1, c2, Zterminal&
BYTE    TABLE c11 := 10,06,' ,'T,'H,'R,'U,' ,
 ' ,' ,' ,' ;      & label &
BYTE    TABLE d11 := std_opt_thru , 0;
          & std_type, type2&
& vvvvvv E/O standards vvvvvv &
& std # 12 &
REAL    TABLE a12 := 0, 999@9,
              & fmin, fmax &
                     1.46, 0.0, 0.0,
        & n, length, loss &
                     0.0,0.0,0.0,0.0;
     &c0, c1, c2, Zterminal&
BYTE    TABLE c12 := 10,07,' ,'T,'H,'R,'U,'S,
 ' ,' ,' ,' ;      & label &
BYTE    TABLE d12 := std_source , 0;
          & std_type, type2&
& std # 13 &
REAL    TABLE a13 := 0, 999@9,
              & fmin, fmax &
                     1.46, 0.0, 0.0,
        & n, length, loss &
                     0.0,0.0,0.0,0.0;
     &c0, c1, c2, Zterminal&
BYTE    TABLE c13 := 10,10,'R,'E,'F,'L,' ,'S,
 'E,'N,'S,' ;      & label &
BYTE    TABLE d13 := std_refl_sens , 0;
          & std_type, type2&
& std # 14 &
REAL    TABLE a14 := 0, 999@9,
              & fmin, fmax &
                     1.46, 0.0, 0.0,
        & n, length, loss &
                     0.0,0.0,0.0,0.0;
```

```
    &c0, c1, c2, Zterminal&
BYTE    TABLE c14 := 10,10,'T,'H,'R,'U,'/,'R,
 'C,'V,'R,' ;       & label &
BYTE    TABLE d14 := std_thru_rcvr , 0;
          & std_type, type2&
& vvvvvv O/E standards vvvvvv &
& std # 15 &
REAL    TABLE a15 := 0, 999@9,
              & fmin, fmax &
                     1.46, 0.0, 0.0,
         & n, length, loss &
                     0.0,0.0,0.0,0.0;
    &c0, c1, c2, Zterminal&
BYTE    TABLE c15 := 10,07,' ,'T,'H,'R,'U,'S,
 ' ,' ,' ,' ;       & label &
BYTE    TABLE d15 := std_receiver , 0;
          & std_type, type2&
& std # 16 &
REAL    TABLE a16 := 0, 999@9,
              & fmin, fmax &
                     1.46, 0.0, 0.0,
         & n, length, loss &
                     0.0,0.0,0.0,0.0;
    &c0, c1, c2, Zterminal&
BYTE    TABLE c16 := 10,10,' ,'T,'H,'R,'U,'/,
 'S,'R,'C,' ;       & label &
BYTE    TABLE d16 := std_thru_src , 0;
          & std_type, type2&


COMMENT class lists of cal standards for TYPE
  N cal kits;

BYTE    TABLE b01 :=  2, 2, 8, 0, 0, 0, 0, 0,
           & port1_1st_std &
                      2, 1, 7, 0, 0, 0, 0, 0,
           & port1_2nd_std &
                      3, 3, 5, 6, 0, 0, 0, 0,
           & port1_3rd_std &
                      1, 3, 0, 0, 0, 0, 0, 0,
           & isoln_fwd_std &
                      1, 4, 0, 0, 0, 0, 0, 0,
           & match_fwd_std &
                      1, 4, 0, 0, 0, 0, 0, 0,
           & trans_fwd_std &
                      2, 2, 8, 0, 0, 0, 0, 0,
           & port2_1st_std &
                      2, 1, 7, 0, 0, 0, 0, 0,
           & port2_2nd_std &
                      3, 3, 5, 6, 0, 0, 0, 0,
           & port2_3rd_std &
                      1, 3, 0, 0, 0, 0, 0, 0,
```

```
& isoln_rev_std &
        1, 4, 0, 0, 0, 0, 0, 0,
& match_rev_std &
        1, 4, 0, 0, 0, 0, 0, 0,
& trans_rev_std &
        5, 1, 7, 2, 8, 4, 0, 0,
& freq_resp_std &
        5, 1, 7, 2, 8, 4, 0, 0,
& two_term_resp &
        1, 3, 0, 0, 0, 0, 0, 0;
& two_term_offs &

COMMENT b2 is number of classes to modify in
 current cal kit to
       convert to one port opt kit.
       b02 is class to be modified and the
 new class list.
        The number of lines in b02 must equal
 the value of b2;
INTEGER TABLE b2.L := 2,freq_resp_std,two_term_
 resp;
BYTE TABLE b02.L :=
                    2, 9,10, 0, 0, 0, 0, 0, &freq_
 resp_std&
                    2, 9,10, 0, 0, 0, 0, 0; &two_
 term_resp&

COMMENT b3 is number of classes to modify in
 current cal kit to
       convert to opt kit.
       b03 is new class lists. Must be in same
 order as in be;
INTEGER TABLE b3.L := 2, freq_resp_std, two_term_
 resp;
BYTE TABLE b03.L :=
                    3, 9,10,11, 0, 0, 0, 0, &freq_
 resp_std&
                    3, 9,10,11, 0, 0, 0, 0; &two_
 term_resp&

COMMENT b4 is number of classes to modify in
 current cal kit to
       convert to E/O kit.
       b04 is class to be modified and the new
 class list;
INTEGER TABLE b4.L := 3, trans_fwd_std, freq_
 resp_std, two_term_resp;
BYTE TABLE b04.L :=
                    1,12, 0, 0, 0, 0, 0, 0,   &
 trans_fwd_std&
                    2,12,13, 0, 0, 0, 0, 0,   &
 freq_resp_std&
```

```
                    2,12,13, 0, 0, 0, 0, 0;   &
 two_term_resp&

COMMENT b5 is number of classes to modify in
 current cal kit to
       convert to O/E kit.
       b05 is class to be modified and the new
 class list;
INTEGER TABLE b5.L := 3, trans_fwd_std, freq_
 resp_std, two_term_resp;
BYTE TABLE b05.L :=
                    1,15, 0, 0, 0, 0, 0, 0,   &
 trans_fwd_std&
                    1,15, 0, 0, 0, 0, 0, 0,   &
 freq_resp_std&
                    1,15, 0, 0, 0, 0, 0, 0;   &
 two_term_resp&

COMMENT
***************************************************
* The following are used by guided setup to       *
* perform calibrations                            *
***************************************************
;
COMMENT g0 is number of classes to modify in
 current cal kit to
       convert to an optical reflection.
       g00 is class to be modified and the
 new class list;
INTEGER TABLE g0.L := 1, freq_resp_std;
BYTE TABLE g00.L :=
                    2, 9,10, 0, 0, 0, 0, 0;   &
 freq_resp_std&

COMMENT g1 is number of classes to modify in
 current cal kit to
       convert to an optical transmission.
       g01 is class to be modified and the
 new class list;
INTEGER TABLE g1.L := 1, freq_resp_std;
BYTE TABLE g01.L :=
                    1,11, 0, 0, 0, 0, 0, 0;   &
 freq_resp_std&

COMMENT g2 is number of classes to modify in
 current cal kit to
       convert to an O/E transmission.
       g02 is class to be modified and the
 new class list;
INTEGER TABLE g2.L := 2, trans_fwd_std, freq_
 resp_std;
BYTE TABLE g02.L :=
```

```
                  1,15, 0, 0, 0, 0, 0, 0,   &
 trans_fwd_std&
                  1,15, 0, 0, 0, 0, 0, 0;   &
 freq_resp_std&

COMMENT g3 is number of classes to modify in
 current cal kit to
        convert to an E/O transmission.
        g03 is class to be modified and the
 new class list;
INTEGER TABLE g3.L := 2, trans_fwd_std, freq_
 resp_std;
BYTE TABLE g03.L :=
                  1,12, 0, 0, 0, 0, 0, 0,   &
 trans_fwd_std&
                  1,12, 0, 0, 0, 0, 0, 0;   &
 freq_resp_std&

COMMENT g4 is number of classes to modify in
 current cal kit to
        convert to E/O reflection sensitivity.
        g04 is class to be modified and the
 new class list;
INTEGER TABLE g4.L := 1, freq_resp_std;
BYTE TABLE g04.L :=
                  1,13, 0, 0, 0, 0, 0, 0;   &
 freq_resp_std&

COMMENT g5 is number of classes to modify in
 current cal kit to
        convert to an elec. transmission.
        g05 is class to be modified and the
 new class list;
INTEGER TABLE g5.L := 1, freq_resp_std;
BYTE TABLE g05.L :=
                  1, 4, 0, 0, 0, 0, 0, 0;   &
 freq_resp_std&

COMMENT g6 is number of classes to modify in
 current cal kit to
        convert to an elec. transmission.
        g06 is class to be modified and the
 new class list;
INTEGER TABLE g6.L := 1, freq_resp_std;
BYTE TABLE g06.L :=
                  2, 1, 2, 0, 0, 0, 0, 0;   &
 freq_resp_std&


& The following values reflect the current data
 found in the HP 8510A &
```

```
& (their file is also sstddata).  Changed 9/2
 4/86 Doug Bender         &

& Changed for new 3.5 mm cal kits  4/23/87  Doug
& Changed to a double table to allow for new
 8510B cal coefficients,  &
& which would not "fit" as integers.  10/20/8
 7 Doug                   &

GLOBAL DOUBLE TABLE ee_ck :=
          700,            & 7 mm B.1
    loss in Mohm/s &
          8720,                          &  std
  2 open c0 * 100  &
          169500,                        &  std
  2 open c1 * 100  &
          -15050,                        &  std
  2 open c2 * 100  &
          889,                           &  std
  2 open c3 * 100  &
          0,                             &  std
  2 delay in fsec  &
          0,                             &  std
  1 delay in fsec  &

          1300,           &  3.5 mm  B.1
    loss in Mohm/s &
          4345,                          &  std
  2 open c0 * 100  &
          81870,                         &  std
  2 open c1 * 100  &
          -4893,                         &  std
  2 open c2 * 100  &
          125,                           &  std
  2 open c3 * 100  &
          29240,                         &  std
  2 delay in fsec  &
          31783,                         &  std
  1 delay in fsec  &
           2999,                         &  std
  5 fmin in MHz    &
           3001,                         &  std
  6 fmax in MHz    &

                          & * = Modified from R
 ev. 1.00          &
          800,            &  N 50    B.1
    loss in Mohm/s*&
          8831,                          &  std
  2 open c0 * 100 *&
          166720,                        &  std
  2 open c1 * 100  &
```

```
        -14661,                          &  std
 2 open c2 * 100  &
        975,                             &  std
 2 open c3 * 100  &
        22905,                           &  std
 2 delay in fsec  &
        27990,                           &  std
 1 delay in fsec  &
        8831,                            &  std
 8 open c0 * 100 *&
        166720,                          &  std
 8 open c1 * 100  &
        -14661,                          &  std
 8 open c2 * 100  &
        975,                             &  std
 8 open c3 * 100  &
        57993,                           &  std
 8 delay in fsec  &
        63078;                           &  std
 7 delay in fsec  &


PROCEDURE i_Nkit;
                  ENTRY;
  BEGIN
    BYTE POINTER iptr1, iptr2;
    STPNTR( iptr1, ADRS( b01 ) );
    STPNTR( iptr2, ADRS( cal_kit_ary ) + std_
 class_1 );
    MOVE iptr2 := iptr1, +( std_class_label1
 - std_class_1 - 1 );
  END;

PROCEDURE i_kit(addr);
  VALUE addr; DOUBLE addr;
  BEGIN
  BYTE POINTER bptr1, bptr2;
  INTEGER POINTER iptr;
  INTEGER i;

  STPNTR( iptr, addr );  & set to bX or gX table &
  STPNTR( bptr1, ADRS( iptr[ iptr[0]+1 ] ) );
  & set to b0x or g0x &

  FOR i := 1 TO iptr[0] DO BEGIN
     STPNTR( bptr2, ADRS(cal_kit_ary) + std_class_
 1 +
                                iptr[i]*class_list_
 size );
     MOVE bptr2 := bptr1, +(class_list_size);
```

```
    STPNTR( bptr1, ADRS(bptr1[0]) + class_list_
size );
    END for;
  END i_kit;


COMMENT
                 set_cal_kit
***************************************************
* Prepare cal kit for lightwave measurements      *
***************************************************
;
;
PROCEDURE set_cal_kit( type );
   VALUE type; INTEGER type;
            ENTRY;
   BEGIN

   CASE type OF BEGIN
      BEGIN END; & ELECTRICAL &
      i_kit( ADRS(b3) );  & OPTICAL    &
      i_kit( ADRS(b4) );   & E/O        &
      i_kit( ADRS(b5) );   & O/E        &
   END;
END;

PROCEDURE set_gcal_kit( type );
   VALUE type; INTEGER type;
                     ENTRY;
   BEGIN

   CASE type OF BEGIN
   i_kit( ADRS(g0) );    & O refl &
   i_kit( ADRS(g1) );    & O/O trans &
   i_kit( ADRS(g2) );    & O/E trans &
   i_kit( ADRS(g3) );    & E/O trans &
   i_kit( ADRS(g4) );    & E/O refl sens &
   i_kit( ADRS(g5) );    & E refl &
   i_kit( ADRS(g6) );    & E/E trans &
   END;
END;

PROCEDURE preset_elec_kit_tbl;
  BEGIN
    BYTE POINTER iptr1, iptr2;
    STPNTR( iptr1, ADRS( a00 ) );
    STPNTR( iptr2, ADRS( cal_kit_ary ) );
    MOVE iptr2 := iptr1, +(elec_kit_size);
  END;

PROCEDURE preset_opt_kit_tbl;
  BEGIN
```

```
    BYTE POINTER iptr1, iptr2;
    STPNTR( iptr1, ADRS( a09 ) );
    STPNTR( iptr2, ADRS( cal_kit_ary )+elec_kit_
 size );
    MOVE iptr2 := iptr1, +(opt_kit_size);
    dirty_opt_kit := FALSE;
  END;

PROCEDURE preset_eo_kit_tbl;
  BEGIN
    BYTE POINTER iptr1, iptr2;
    STPNTR( iptr1, ADRS( a12 ) );
    STPNTR( iptr2, ADRS( cal_kit_ary )+elec_kit_
 size+opt_kit_size );
    MOVE iptr2 := iptr1, +(eo_kit_size);
  END;

PROCEDURE preset_oe_kit_tbl;
  BEGIN
    BYTE POINTER iptr1, iptr2;
    STPNTR( iptr1, ADRS( a15 ) );
    STPNTR( iptr2, ADRS( cal_kit_ary )+elec_kit_
 size+opt_kit_size

          +eo_kit_size );
    MOVE iptr2 := iptr1, +(oe_kit_size);
  END;

PROCEDURE preset_kit_tbl(type);
  VALUE type; INTEGER type;
                 ENTRY;
  BEGIN
  CASE type OF BEGIN
     preset_elec_kit_tbl;
     preset_opt_kit_tbl;
     preset_eo_kit_tbl;
     preset_oe_kit_tbl;
     END of case;
  END;

END$
```

The following comprises a table of softkeys for selecting the desired type of error correction.

```
.CAL_TYPE_MENU
--------
"CALIBRATE:"
"NONE"
\011
```

```
,corr_off( curr_e_ch );
[Ccal_none
|
--------
"RESPONSE"
\000
[Cresponse_type
,set_cal_type( response );
|
--------
"RESPONSE"
q+" ISOL'N"
\000
[Ctwo_term_type
,BEGIN
,set_cal_type( two_term );
,END;
|
--------
"S11"
"1-PORT"
\000
[C1_port_1_type
,set_cal_type( one_port_on_1 );
|
--------
"S22"
"1-PORT"
\000
[C1_port_2_type
,set_cal_type( one_port_on_2 );
|
--------
"FULL"
"2-PORT"
\000
[C2_port_type
,set_cal_type( two_port );
--------
"RESPONSE"
q+" MATCH"
[Ceo_match_type
,set_cal_type( eo_match );
--------
"RESPONSE"
q+" MATCH"
[Coe_match_type
,set_cal_type( oe_match );
--------


.EO_MATCH_MENU
```

```
--------
"REFLECTION"
[Ccal_eo_refl
\000
^S_REFLECTION_MENU
,check_refl_status;
|
--------
"FWD.TRANS."
sk_fwd_trans
\000
?
]Cfwd_trans
|
--------
"ISOLATION"
\000
[Ccal_eo_isol
^S_ISOLATION_MENU
,tell( isolate_ports );
--------
--------
--------
--------
--------
"DONE"
"E/O CAL"
[Cdone_eo_match
,cal_done(done_eo_match);
--------

.OE_MATCH_MENU
--------
"REFLECTION"
[Ccal_oe_refl
\000
^REFLECTION_MENU
,check_refl_status;
|
--------
"TRANS-"
"MISSION"
\000
[Ccal_oe_thru
^S_TRANSMISSION_MENU
,tell( connect_thru );
|
--------
"ISOLATION"
\000
[Ccal_oe_isol
^S_ISOLATION_MENU
```

```
,tell( isolate_ports );
--------
--------
--------
--------
--------
"DONE"
"O/E CAL"
[Cdone_oe_match
,cal_done( done_oe_match );
--------
```

The following instructions control acquisition of data for standards to be measured during calibration.

```
M68KL,P,"stds"
BEGIN

#FILE cchtable;
#FILE ccontvar;
#FILE cchars;
#FILE cmenu;
#FILE cactive;
#FILE ceeprom8;     & for ee_7mm, ee_35mm, ee_
 N50 &
#FILE feeprom;
#FILE factv1;
#FILE fcommand;
  & for cmd_token &
#FILE cstds;
#FILE cstds2;
#FILE ccal;
  & for std_... types &
#FILE fcal;
   & for acq_data &
#FILE ccalmenu;       & for Ccal_type_menu and
 Cclass_done &
#FILE cstdmenu;
#FILE cparams;      & for Co_port, Ce_port &

#FILE fmenu;
 & for change_softkey &
#FILE cmessag1;
#FILE cmsgcal;
#FILE futil3;
     & for tell, warn &
#FILE cmessag0;
#FILE fchdata;                              & for
 curr_e_ch   &
#FILE fstimul4;
```

```
#FILE fchtable;                          & for
 set_entry_ch_int &
#FILE fscreen1;
    & for title_ary &
#FILE cparam;      & elec_device,opt_device,
 eo_device,oe_device &
#FILE fparam;                        & for new_
 param, dev_type &
#FILE crins;                             & for
  act_fcn_rin &
#FILE fkernel;                             &
 for acquire, release &
#FILE fstddata;                            &
 for preset_kit_tbl &
#FILE facttbl2;
    & for get_param   &
#FILE fcmos;
#FILE fiocnfig;                            &
 for cmos_top        &
#FILE fchdata1;
#FILE frecall;
#FILE fstring;                          & app_
 str, clr_str, app_ch &
#FILE ftitle;                      & wrt_title,
 restore_sys_title  &
#FILE ffmt;                             & fmt_
 int    &
#FILE cguid;       & Cgstd1, Cgstd2, thru Cgs
 td5 &


EXTERNAL INTEGER slid_load_used;   & 1    if
 sliding load used in cal, &
                                  &   0   if not
 ... for stestlc, the    &
                                  & system
 verification routines        &
                                  & initialized
 to   0   in set_cal_type&
                                  & in scal &
BYTE ARRAY cal_kit_lbl[-1:10] = cmos_top - total_
 cal_kit_size;
BYTE ARRAY std_classes[ 0:14, 0:class_size ]
 = cal_kit_lbl[11];
BYTE ARRAY std_class_labels[0:14,-1:10] = std_
 classes[15,0];
BYTE ARRAY std_data[1:max_stds, 1:std_size] =
  std_class_labels[15,-1];
BYTE ARRAY gclass[0:5];
GLOBAL
BOOLEAN dirty_opt_kit = std_data[max_stds+1,1 ];
```

```
BOOLEAN new_element_list;

GLOBAL
BYTE ARRAY cal_kit_ary.L[0:cal_kit_ary_size-1
 ] = cal_kit_lbl[-1];


#EJECT;
INTEGER current_class;
         & class   # (0-7) &
GLOBAL ALPHA  curr_class_label;
INTEGER current_element;
         & element # (1-7) &
GLOBAL INTEGER last_class_element;
GLOBAL INTEGER curr_std_id;
      & standard number &
ALPHA   current_std_label;

BYTE TABLE class_param_ee.L :=
   s11-1,  & port1_1st_std &
   s11-1,  & port1_2nd_std &
   s11-1,  & port1_3rd_std &
   s21-1,  & isoln_fwd_std &
   s11-1,  & match_fwd_std &
   s21-1,  & trans_fwd_std &
   s22-1,  & port2_1st_std &
   s22-1,  & port2_2nd_std &
   s22-1,  & port2_3rd_std &
   s12-1,  & isoln_rev_std &
   s22-1,  & match_rev_std &
   s12-1;  & trans_rev_std &
   COMMENT not used
   0,      & freq_resp_std &
   0,      & two_term_resp &
   0;      & two_term_offs &

BYTE TABLE class_param_eo1.L :=
   s11-1,  & port1_1st_std &
   s11-1,  & port1_2nd_std &
   s11-1,  & port1_3rd_std &
   eo1_parm,  & isoln_fwd_std &
   s11-1,  & match_fwd_std &
   eo1_parm,  & trans_fwd_std &
   s22-1,  & port2_1st_std &
   s22-1,  & port2_2nd_std &
   s22-1,  & port2_3rd_std &
   s12-1,  & isoln_rev_std &
   s22-1,  & match_rev_std &
   s12-1;  & trans_rev_std &

BYTE TABLE class_param_eo2.L :=
```

```
   s11-1,  & port1_1st_std &
   s11-1,  & port1_2nd_std &
   s11-1,  & port1_3rd_std &
   eo2_parm,  & isoln_fwd_std &
   s11-1,  & match_fwd_std &
   eo2_parm,  & trans_fwd_std &
   s22-1,  & port2_1st_std &
   s22-1,  & port2_2nd_std &
   s22-1,  & port2_3rd_std &
   s12-1,  & isoln_rev_std &
   s22-1,  & match_rev_std &
   s12-1;  & trans_rev_std &

BYTE TABLE class_param_oe1.L :=
   s11-1,  & port1_1st_std &
   s11-1,  & port1_2nd_std &
   s11-1,  & port1_3rd_std &
   oe1_parm,  & isoln_fwd_std &
   s11-1,  & match_fwd_std &
   oe1_parm,  & trans_fwd_std &
   s22-1,  & port2_1st_std &
   s22-1,  & port2_2nd_std &
   s22-1,  & port2_3rd_std &
   s12-1,  & isoln_rev_std &
   s22-1,  & match_rev_std &
   s12-1;  & trans_rev_std &

BYTE TABLE class_param_oe2.L :=
   s11-1,  & port1_1st_std &
   s11-1,  & port1_2nd_std &
   s11-1,  & port1_3rd_std &
   oe2_parm,  & isoln_fwd_std &
   s11-1,  & match_fwd_std &
   oe2_parm,  & trans_fwd_std &
   s22-1,  & port2_1st_std &
   s22-1,  & port2_2nd_std &
   s22-1,  & port2_3rd_std &
   s12-1,  & isoln_rev_std &
   s22-1,  & match_rev_std &
   s12-1;  & trans_rev_std &

INTEGER TABLE class_elements.L :=
   std_class_1 + port1_1st_std * class_list_size,
   std_class_1 + port1_2nd_std * class_list_size,
   std_class_1 + port1_3rd_std * class_list_size,
   std_class_1 + isoln_fwd_std * class_list_size,
   std_class_1 + match_fwd_std * class_list_size,
   std_class_1 + trans_fwd_std * class_list_size,
   std_class_1 + port2_1st_std * class_list_size,
   std_class_1 + port2_2nd_std * class_list_size,
   std_class_1 + port2_3rd_std * class_list_size,
   std_class_1 + isoln_rev_std * class_list_size,
```

```
  std_class_1 + match_rev_std * class_list_size,
  std_class_1 + trans_rev_std * class_list_size,
  std_class_1 + freq_resp_std * class_list_size,
  std_class_1 + two_term_response_std * class_
list_size,
  std_class_1 + two_term_offset_std * class_
list_size;

INTEGER TABLE celement.L :=
                0,
  Cclass_std1,
  Cclass_std2,
  Cclass_std3,
  Cclass_std4,
  Cclass_std5,
  Cclass_std6,
  Cclass_std7,
  Cgstd1,
  Cgstd2,
  Cgstd3,
  Cgstd4,
  Cgstd5;

INTEGER TABLE std_class_label.L :=
  std_class_label1 + port1_1st_std * (label_
size+2),
  std_class_label1 + port1_2nd_std * (label_
size+2),
  std_class_label1 + port1_3rd_std * (label_
size+2),
  std_class_label1 + isoln_fwd_std * (label_
size+2),
  std_class_label1 + match_fwd_std * (label_
size+2),
  std_class_label1 + trans_fwd_std * (label_
size+2),
  std_class_label1 + port2_1st_std * (label_
size+2),
  std_class_label1 + port2_2nd_std * (label_
size+2),
  std_class_label1 + port2_3rd_std * (label_
size+2),
  std_class_label1 + isoln_rev_std * (label_
size+2),
  std_class_label1 + match_rev_std * (label_
size+2),
  std_class_label1 + trans_rev_std * (label_
size+2),
  std_class_label1 + freq_resp_std * (label_
size+2),
  std_class_label1 + two_term_response_std *
  (label_size+2),
```

```
  std_class_label1 + two_term_offset_std *
  (label_size+2);

INTEGER TABLE Cclass.L   :=
   Cport1_std1,       & port1_1st_std &
   Cport1_std2,       & port1_2nd_std &
   Cport1_std3,       & port1_3rd_std &
   Cfwd_isol,         & isoln_fwd_std &
   Cfwd_match,        & match_fwd_std &
   Cfwd_trans,        & trans_fwd_std &
   Cport2_std1,       & port2_1st_std &
   Cport2_std2,       & port2_2nd_std &
   Cport2_std3,       & port2_3rd_std &
   Crev_isol,         & isoln_rev_std &
   Crev_match,        & match_rev_std &
   Crev_trans,        & trans_rev_std &
   Cresponse_type,    & freq_resp_std &
   C2T_response,      & two_term_response_std &
   C2T_offset;        & two_term_offset_std &


INTEGER TABLE Cload_type.L :=
      Cfixed_load,
      Csliding_load;

INTEGER TABLE Coffset_type.L :=
      Ccoax,
      Cwaveguide;

INTEGER TABLE Cstd_type.L :=
      Cdef_open,
      Cdef_short,
      Cdef_load,
      Cdef_air_line,
      Cdef_z;

DOUBLE  cal_kit;                          & addr
 ess of cal kit descriptor &
GLOBAL ALPHA   cal_kit_label;
BYTE POINTER type2;
GLOBAL DOUBLE cal_std_addr;               & addr
 ess of cal std descriptor &

INTEGER ARRAY max_measured_std[ port1_1st_std
 :two_term_offset_std ];
DOUBLE  ARRAY cal_std_addrs[ port1_1st_std:two_
 term_offset_std,
                              1:class_size
                             ];
```

```
#EJECT;

SUBROUTINE set_ptr_type2;
      STPNTR( type2, cal_std_addr + type2_off
 set );


COMMENT
         h_offset_type
***************************************************
***************************************************
SUBROUTINE  h_offset_type;
   BEGIN & h_offset_type &

      set_ptr_type2;
      h_key( Coffset_type[ type2 AND %0001 ],

                   Ccoax,
                   Cwaveguide
                 );
   END;  & h_offset_type &


#EJECT;
COMMENT
           hilight_load_type
***************************************************
***************************************************
;
SUBROUTINE  hilight_load_type;
   BEGIN & hilight_load_type &

      set_ptr_type2;
      h_key( Cload_type[ ARIGHT(type2,1) AND
 %0001 ],
                   Cfixed_load,
                   Csliding_load
                 );
   END;  & hilight_load_type &


#EJECT;
COMMENT
            hilight_std_type
***************************************************
***************************************************
;
PROCEDURE  hilight_std_type;
   BEGIN & hilight_std_type &
      BYTE POINTER std_type;
```

```
     STPNTR( std_type, cal_std_addr + type_
offset );
     h_key( Cstd_type[ std_type ],
                  Cdef_open,
                  Cdef_z
                );
   END;  & hilight_std_type &


#EJECT;
COMMENT
          h_last_class
***************************************************
***************************************************
;
SUBROUTINE h_last_class;
                ENTRY;
   BEGIN & h_last_class &
      h_cmd( Cclass[current_class] );
   END;  & h_last_class &


#EJECT;
COMMENT
        h_last_element
***************************************************
***************************************************
;
SUBROUTINE h_last_element;
                ENTRY;
   BEGIN & h_last_element &
      h_cmd( celement[current_element] );
   END;  & h_last_element &


#EJECT;
COMMENT
                set_std_addr
***************************************************
***************************************************
;
PROCEDURE  set_std_addr( std_no );
   VALUE   std_no;
   INTEGER std_no;
   BEGIN & set_std_addr &
      cal_std_addr := cal_kit +
                      std_def_1 +
                      (std_no - 1) * std_size ;
   END;  & set_std_addr &
```

```
#EJECT;
COMMENT
                      std_id
***************************************************
*                                                 *
* Selects the specified (id) standard for sub-    *
* sequent modification of its values.             *
*                                                 *
***************************************************
;
PROCEDURE  std_id( id );
   VALUE   id;
   INTEGER id;
                      ENTRY;
   BEGIN & std_id &
      curr_std_id := id;
      set_std_addr( curr_std_id );
      current_std_label := cal_kit + std_def_
 1 + label_offset +
                           (std_size * (curr_
 std_id-1));
      hilight_std_type;
      COMMENT
      gen_menu( MODIFY_STDS_MENU );

   END;  & std_id &


#EJECT;
COMMENT
                  define_std
***************************************************
*                                                 *
* Specify standard type                           *
*                                                 *
***************************************************
;
PROCEDURE  define_std( std_type );
   VALUE   std_type;
   BYTE    std_type;
   BEGIN & define_std &
   BYTE POINTER bptr;
      select_act_fcn( active_off );
      h_on( Cdef_open, Cdef_z );
      & bptr now points to the "old" (current)
standard definition. &
      STPNTR( bptr, cal_std_addr + type_offset );
      IF std_type <> std_load THEN
```

```
      bptr[1] := RBIT(bptr[1],1);
    bptr := std_type;
    hilight_load_type;
    h_offset_type;
  END;  & define_std &

PROCEDURE  define_opt_std( std_type );
  VALUE   std_type; BYTE    std_type;
                   ENTRY;
  BEGIN & define_std &
    select_act_fcn( active_off );
    curr_std_id := std_type;
    set_std_addr( curr_std_id );
    dirty_opt_kit := TRUE;
  END;  & define_opt_std &



#EJECT;
COMMENT
                define_type2
**************************************************
**************************************************
;
PROCEDURE  define_type2( type2_data  , mask);

  VALUE   type2_data , mask;
  BYTE    type2_data , mask;
  BEGIN & define_type2 &

    set_ptr_type2;
    type2 := TURN( type2, type2_data , mask );
    hilight_load_type;
                  & DEBUG?&
    h_offset_type;
            & DEBUG?&
  END;  & define_type2 &


#EJECT;
COMMENT
          write_element_list
**************************************************
**************************************************
;
PROCEDURE  write_element_list;
  BEGIN
    BYTE POINTER element_ptr;
    INTEGER element;
    BYTE ARRAY str[-1:3];
    BYTE str_length = str[-1];
```

```
   str_length:=3;
   STPNTR( element_ptr,cal_kit + class_elements
[current_class] );
   clr_str( title );

   element:=1;
   WHILE element <= element_ptr[0] DO
     BEGIN
       app_str ( title,
          fmt_int(element_ptr[element],ADRS
(str),%01000300));
       IF element # element_ptr[0] THEN app_
ch( title,',);
       element:=element + 1;
     END;

   wrt_title;
 END  write_element_list ;



#EJECT;
COMMENT
                   std_class
***************************************************
*                                                 *
* Selects the specified class (id) for entering a *
* list of standards.  Clears any existing list    *
* for the specified class.                        *
*                                                 *
***************************************************
;
PROCEDURE  std_class( id );
   VALUE   id;
   INTEGER id;
   BEGIN & std_class &
   BYTE POINTER bptr;

      current_class := id;
      write_element_list;
      curr_class_label := std_class_label[current_
class] + cal_kit;
      new_element_list:=TRUE;
      tell( specify_std_class );
      select_act_fcn( active_std_class );

   END;  & std_class &


#EJECT;
```

```
COMMENT
           std_class_element
***************************************************
*                                                 *
* Adds the specified standard (id) to the list of *
* elements that make up the current class.        *
*                                                 *
***************************************************
;
PROCEDURE  std_class_element( id );
   VALUE   id;
   INTEGER id;
                      ENTRY;
   BEGIN & std_class_element &
      INTEGER index;
      BYTE POINTER class_element;

      STPNTR( class_element,
              cal_kit + class_elements[current_
 class]  );

      IF new_element_list THEN index:=1
      ELSE index := 1 + class_element[0];
      new_element_list:=FALSE;

      IF index <= class_size THEN
         BEGIN & if &
            class_element[index] := id;
            class_element[0] := index;
         END   & if &
      ELSE
         warn( exceeded_std_class_limit );

      write_element_list;
   END;  & std_class_element &


#EJECT;
COMMENT
             cal_kit_defined
***************************************************
***************************************************
;
SUBROUTINE cal_kit_defined;
   BEGIN & cal_kit_defined &
      curr_std_id := 1;
   END;  & cal_kit_defined &


#EJECT;
```

```
COMMENT
                  set_element
**************************************************
*                                                *
* Select the element of a class (1-7) to be      *
* subsequently measured.  Look up the appropriate *
* standard number.                               *
*                                                *
**************************************************
;
PROCEDURE  set_element( element );
   VALUE   element;
   INTEGER element;
                      ENTRY;
   BEGIN & set_element &
      BYTE POINTER std_type,
                   class_element;
      INTEGER temp_menu;

    IF element <= last_class_element THEN
      BEGIN

      current_element := element;

      STPNTR( class_element,
              cal_kit + class_elements[current_
 class]
            );

      set_std_addr( class_element[element] );


      STPNTR( std_type, type_offset + cal_std_
 addr );

      IF std_type[0] = std_source THEN
         acq_data_eo
      ELSE IF std_type[0] = std_receiver THEN

         acq_data_oe
      ELSE IF (std_type[1] AND sliding) = 0 THEN
         & not sliding &
         acq_data
      ELSE
                 & sliding &
         BEGIN
         temp_menu := prior_menu;
         gen_menu( SLIDING_LOAD_MENU );
         prior_menu := temp_menu;
         tell( slide_load );
         slid_load_used:=1;
                                & 1    if
```

```
sliding load used in cal,    &
                                  & 0     if
not... for stestlc, the    &
                                  & system
verification routines        &
                                  & initialized
to   0   in set_cal_type&
                                  & in scal &
            END;
         END
         ELSE
           warn( out_of_range );

      END;  & set_element &

PROCEDURE set_gelement( element );
  VALUE element; INTEGER element;
                    ENTRY;
  BEGIN
       BYTE POINTER std_type,
                    class_element;
       INTEGER temp_menu;

     IF element <= gclass[0] THEN
       BEGIN

       current_element := element+7;  & uses by
 h_last_element &

       set_std_addr( gclass[element] );

       STPNTR( std_type, type_offset + cal_std_
 addr );

       IF std_type[0] = std_source THEN
          acq_data_eo
       ELSE IF std_type[0] = std_receiver THEN

          acq_data_oe
       ELSE IF (std_type[1] AND sliding) = 0 THEN
          & not sliding &
          acq_data
       ELSE
                  & sliding &
          BEGIN
          temp_menu := prior_menu;
          gen_menu( SLIDING_LOAD_MENU );
          prior_menu := temp_menu;
          tell( slide_load );
          slid_load_used:=1;
                                  & 1    if
 sliding load used in cal,    &
```

```
                                         & 0     if
 not... for stestlc, the    &
                                         & system
 verification routines        &
                                         & initialized
 to   0   in set_cal_type&
                                         & in scal &
        END;
     END
     ELSE
       warn( out_of_range );

  END;

COMMENT
            std_class_title
***************************************************
*                                                 *
* Returns the alpha label for the specified class *
*                                                 *
***************************************************
;
ALPHA PROCEDURE std_class_title(n);
  VALUE n;
  INTEGER n;
                   ENTRY;
  BEGIN
    std_class_title := std_class_label[n] + cal_
 kit ;
  END;


COMMENT
           standard_title
***************************************************
*                                                 *
* Returns the alpha label for the specified       *
* standard                                        *
*                                                 *
***************************************************
;
ALPHA PROCEDURE standard_title( std );
  VALUE std;
  INTEGER std;
                   ENTRY;
  BEGIN
    BYTE POINTER class_element;

    STPNTR( class_element,
              cal_kit + class_elements[current_
 class] );
```

```
    IF std > last_class_element THEN
           standard_title := " "
        ELSE
           standard_title := cal_kit + std_def_1
 + label_offset +
                              (std_size * (class_
 element[std]-1));

END standard_title;


#EJECT;
COMMENT
                set_std_class
**************************************************
*                                                *
* Specifies the class from which standards will  *
* be selected during cal.                        *
*                                                *
**************************************************
;
PROCEDURE  set_std_class( class );
   VALUE   class;
   INTEGER class;
                       ENTRY;
   BEGIN & set_std_class &
      BYTE POINTER class_element;


      current_class := class;
      curr_class_label := std_class_label[current_
 class] + cal_kit;

      COMMENT changed so it does not change
 pramter if S parameters
              are not presently selected;

      IF ( current_class < freq_resp_std ) THEN
       BEGIN
        IF ( ( cal_type = two_port ) OR ( cal_
 type = s_two_port )
        ) THEN
         new_param( class_param_ee[current_class] )
      ELSE IF cal_type = eo_match THEN
         BEGIN
         IF e_ch_bit( Co_port )=0 THEN
           new_param( class_param_eo1[current_
 class] )
         ELSE
           new_param( class_param_eo2[current_
 class] );
         END
```

```
    ELSE IF cal_type = oe_match THEN
        BEGIN
        IF e_ch_bit( Ce_port )=0 THEN
          new_param( class_param_oe1[current_
class] )
        ELSE
          new_param( class_param_oe2[current_
class] );
        END;
    END;

    STPNTR( class_element,
            cal_kit + class_elements[current_
class]
          );
    last_class_element := INTEGER( class_
element[0] );

    max_measured_std[current_class] := 0;

    IF last_class_element > 1 OR current_class=
freq_resp_std THEN
        BEGIN & more than one std in this class &
          h_off( Cclass_std1, Cclass_std7 ) ;
          gen_menu( STD_CLASS_MENU );
          tell( connect_std );
        END   & more than one std in this class &
    ELSE & single standard &
        BEGIN
        set_element( 1 );                 &
set-up and measure it &
        END;

  END;  & set_std_class &

PROCEDURE set_gstd_class(class);
  VALUE class; INTEGER class;
                  ENTRY;
  BEGIN
  BYTE POINTER bptr, class_element;
  INTEGER element, gelement, std_no, std_type,
          g_meas_type;

  current_class := class;
  curr_class_label := std_class_label[current_
class] + cal_kit;
  max_measured_std[current_class] := 0;
  STPNTR( class_element, cal_kit + class_
elements[class] );
  last_class_element := INTEGER( class_element
[0] );
  gelement := 0;
```

```
  IF last_class_element > 5 THEN last_class_
 element := 5;
  FOR element := 1 TO last_class_element DO
     BEGIN
     std_no := class_element[element];
     set_std_addr( std_no );
     gelement := gelement+1;
     gclass[gelement] := std_no;
     END;
  gclass[0] := gelement;
  h_off( Cgstd1, Cgstd5 );
  gen_menu( STDg_MENU );
  END;

#EJECT;
COMMENT
               get_..._label
***************************************************
***************************************************
;
SUBROUTINE get_cal_kit_label;
                      ENTRY;
   BEGIN & get_cal_kit_label &
      BYTE POINTER label_ptr = cal_kit_label;

      MOVE title_ary[-1] := label_ptr[-1], +(
  2 + label_size );
   END;  & get_cal_kit_label &



SUBROUTINE get_std_class_label;
                      ENTRY;
   BEGIN & get_std_class_label &
      BYTE POINTER label_ptr = curr_class_label;
      & must add class labelling selection &
      MOVE title_ary[-1] := label_ptr[-1], +(
  2 + label_size );
   END;  & get_std_class_label &



SUBROUTINE get_std_label;
                      ENTRY;
   BEGIN & get_std_label &
      BYTE POINTER label_ptr = current_std_label;
      MOVE title_ary[-1] := label_ptr[-1], +(
  2 + label_size );
   END;  & get_std_label &
```

```
#EJECT;
COMMENT
                  put_..._label
**************************************************
**************************************************
;
SUBROUTINE put_cal_kit_label;
                      ENTRY;
   BEGIN & put_cal_kit_label &
      MOVE cal_kit_label := title;
   END;  & put_cal_kit_label &


SUBROUTINE dirty_cal_kit_label;
   BEGIN & dirty_cal_kit_label &
      BYTE POINTER label_ptr = cal_kit_label;

      label_ptr[ label_ptr[0] ] := '*;
   END;  & dirty_cal_kit_label &

SUBROUTINE put_std_class_label;
                      ENTRY;
   BEGIN & put_std_class_label &
      MOVE curr_class_label := title;
   END;  & put_std_class_label &



SUBROUTINE put_std_label;
                      ENTRY;
   BEGIN & put_std_label &
      MOVE current_std_label := title;
   END;  & put_std_label &



#EJECT;
COMMENT
                  label_class
**************************************************
**************************************************
;
PROCEDURE  label_class( id );
   VALUE   id;
   INTEGER id;
   BEGIN & label_class &
      current_class := id;
      curr_class_label := std_class_label[cur
 rent_class] + cal_kit;
      select_act_fcn( active_std_class_label );
   END;  & label_class &
```

```
#EJECT;
COMMENT
                   std_measd
***************************************************
*                                                 *
* Add the current standard to the list of stan-   *
* dards measured.  Return its f_min and f_max.    *
*                                                 *
***************************************************
;
INTEGER PROCEDURE std_measd( f_min, f_max, class );
   & by reference &
   REAL    f_min, f_max;
   INTEGER class;
                        ENTRY;
   BEGIN & std_measd &
      BOOLEAN move_stds;
      INTEGER i;
      REAL POINTER std;
      BYTE POINTER byte_ptr = std;

      & check if this std has already been
 measured &
      move_stds := FALSE;
      IF max_measured_std[current_class] >= 1 THEN
         FOR i := 1 UNTIL max_measured_std[current_
 class] DO
            IF move_stds THEN
               cal_std_addrs[current_class,(i-1)]
 :=
                                             cal_
 std_addrs[current_class,i]
            ELSE IF cal_std_addrs[current_class,
 i] = cal_std_addr
                  THEN
               move_stds := TRUE;
      IF NOT move_stds THEN
         max_measured_std[current_class] :=
                                        max_measured_
 std[current_class] + 1;

      & place this standard in the list of
 measured standards &
      cal_std_addrs[current_class,max_measured_
 std[current_class]] :=

               cal_std_addr;

      & return the frequency limits of this
 standard &
```

```
      STPNTR( std, cal_std_addr );
      f_min := std[ f_min_index ];
      f_max := std[ f_max_index ];
      class := current_class;
      set_ptr_type2;
      COMMENT return std type and type2 packed
 as an integer;
      std_measd := LEFT(INTEGER(type2[-1]),8)
  + INTEGER(type2[0]);

   END;  & std_measd &


#EJECT;
COMMENT
           freq_covered
***************************************************
*                                                 *
* Returns TRUE if the current frequency range has *
* been covered by standards measured since the    *
* most recent set_std_class(), FALSE otherwise.   *
*                                                 *
***************************************************
;
BOOLEAN PROCEDURE freq_covered;
                 ENTRY;
   BEGIN & freq_covered &
      BYTE    used;
      BOOLEAN covered;
        & temporary result &
      INTEGER i,
              j;
      REAL    min,
              max,
              band_start,
              band_stop,
              temp_min,
              temp_max;
      QUAD    temp_quad;
      REAL POINTER std;

      covered := FALSE;
      used := 0;

      IF max_measured_std[current_class] > 0  THEN
         BEGIN & if &

            temp_quad := e_ch_quad( ch_start_
  frequency );
            band_stop := REAL( temp_quad +
                              e_ch_quad( ch_
```

```
frequency_span ) );
           band_start := temp_quad;

           j := 0;
           min := 1.0@37;
      & a very big_number &
           FOR i := 1 UNTIL max_measured_std
[current_class] DO
              BEGIN & for &
                 STPNTR( std, cal_std_addrs[
current_class,i] );
                 temp_min := std[f_min_index ];
                 temp_max := std[f_max_index ];
                 IF ( (temp_min < min)
  AND
                      (temp_min < band_stop)
  AND
                      (temp_max > band_start )
                    ) THEN      & part of
standard is in current band &
                    BEGIN & if &
                       j := i;
                       min := temp_min;
                       max := temp_max;
                    END;  & if &
              END;  & for &

           & check for coverage &
           IF min <= band_start THEN
              BEGIN & if &
                 used := SBIT( used, j );

                 & cumbersome, but smaller than
a sort &
                 FOR i := 1 UNTIL max_measured_
std[current_class] DO
                    FOR j := 1 UNTIL max_
measured_std[current_class] DO
                       IF NOT TBIT(used,j) THEN
                           BEGIN & if &
                             STPNTR( std, cal_
std_addrs[

         current_class,

         j

           ]
                                             );
                                 IF std[f_min_index]
< max THEN
                                    BEGIN & if &
```

```
temp_max := std[f_max_index];
IF temp_max > max THEN
   max := temp_max;
used := SBIT(used,j);
END;  & if &

END;  & if &

IF max >= band_stop THEN
   covered := TRUE;
END;  & if &
END;  & if &

freq_covered := covered;

END;  & freq_covered &


#EJECT;
COMMENT
             standard_specs
**************************************************
*                                                *
* Returns the address of the REAL ARRAY contain- *
* ing the specifications of the standard in the  *
* class for the specified frequency.  Individual *
* specifications are indexed by the ..._index    *
* constants in cstds.                            *
*                                                *
**************************************************
;
DOUBLE PROCEDURE standard_specs( frequency, class);
   VALUE   frequency, class;
   REAL    frequency;
   INTEGER class;
                      ENTRY;
   BEGIN & standard_specs &
      INTEGER i;
      BOOLEAN done;
      REAL POINTER std;

      done := FALSE;
      i := max_measured_std[class];
      WHILE ( (i > 0) AND (NOT done) ) DO
         BEGIN & while &
            STPNTR( std, cal_std_addrs[class, i] );
```

```
                   & take_data must use the same
banding rules &
           IF ( (std[f_min_index] <= frequency)
AND
                (std[f_max_index] >= frequency)
              ) THEN
              done := TRUE
           ELSE
              i := i - 1;
        END;  & while &

     standard_specs := cal_std_addrs[class,i ];

   END;  & standard_specs &

#EJECT;
COMMENT
               mod_standard
***************************************************
***************************************************
;
PROCEDURE mod_standard( std_no, offset, r_value );
  VALUE std_no, offset, r_value;
  INTEGER std_no, offset; REAL r_value;
  BEGIN
    REAL POINTER rptr;
    STPNTR( rptr, cal_kit + std_def_1 + (std_
 no - 1)*std_size + offset);
    rptr := r_value;
  END;

PROCEDURE mod_std_label( std_no, label );
  VALUE std_no, label; INTEGER std_no; ALPHA
 label;
  BEGIN
    ALPHA temp_label;
      temp_label := cal_kit + std_def_1 + label_
 offset +
                           ( std_size * (std_
 no - 1));
      MOVE temp_label := label;
  END;

COMMENT
***************************************************
*                                                 *
* An inelegant, specific purpose routine to       *
* change the 7mm cal kit into a generic TYPE N    *
* cal kit.  There may be a more efficient table   *
* driven technique - but for now   --             *
*                                                 *
***************************************************
```

```
;
PROCEDURE preset_type_N_kit ;
  BEGIN
    BYTE POINTER bptr;
    INTEGER i_std_no;
    COMMENT change OPEN and SHORT to OPENS and
 SHORTS in class labels;
    STPNTR( bptr, cal_kit + std_class_label1 );
    bptr[5] := bptr[18] := bptr[77] := bptr[9
 0] := 'S;
    bptr[0] := bptr[12] := bptr[72] := bptr[8
 4] := 6;

    COMMENT change class lists of standards;
    i_Nkit;

    COMMENT change std labels on open and shorts;
    mod_std_label( 1, "SHORT (M)" );
    mod_std_label( 2, "OPEN (M)" );
    mod_std_label( 7, "SHORT (F)" );
    mod_std_label( 8, "OPEN (F)" );

  END;

#EJECT;
COMMENT
                  load_ee_ck
***************************************************
***************************************************
;
PROCEDURE load_ee_ck( type );
  VALUE type; INTEGER type;
  BEGIN

  & type = 0 ... 7 mm &
  & type = 1 ... 3.5 mm &
  & type = 2 ... Type N &
  & type = 3 ... User kit, not stored in eeprom
 nor used here &

    INTEGER i_std_no,
            c_offset,
            offset;

    INTEGER TABLE ck_offset.L :=
          ee_7mm,
          ee_35mm,
          ee_N50;

    SUBROUTINE get_open_c;
      BEGIN
        mod_standard( i_std_no, c_offset, ee_
```

```
doub( offset )*1.@-2 );
       offset := offset + 4;
     END;

   SUBROUTINE get_delay;
     BEGIN
       mod_standard( i_std_no, delay_offset,
ee_doub( offset )*1.@-15 );
       offset := offset + 4;
     END;

   SUBROUTINE get_open;
     BEGIN
       c_offset := c0_offset; get_open_c;
       c_offset := c1_offset; get_open_c;
       c_offset := c2_offset; get_open_c;
       c_offset := c3_offset; get_open_c;
       get_delay;
     END;

   SUBROUTINE get_loss;
     BEGIN
      FOR i_std_no := 1 TO 8 DO
       mod_standard( i_std_no, loss_offset,
ee_doub( offset )*1.@6 );
      offset := offset + 4;
     END;

   IF type = 2 THEN preset_type_N_kit;

   offset := ck_offset[ type ];
   get_loss;
   i_std_no := 2; get_open;
   i_std_no := 1; get_delay;

   IF type = 1 THEN   & 3.5 mm  &
   BEGIN
     i_std_no := 5;
     mod_standard( i_std_no, f_min_offset, ee_
doub( offset )*1.@6 );
     offset := offset + 4;
     i_std_no := 6;
     mod_standard( i_std_no, f_max_offset, ee_
doub( offset )*1.@6 );
   END;

   IF type = 2 THEN   & type N 50 ohm &
     BEGIN
       i_std_no := 8; get_open;
       i_std_no := 7; get_delay;
     END;
```

```
  END load_ee_ck;

#EJECT;
COMMENT
                    sel_ck
***************************************************
*                                                 *
* Selects one of the 4 possible cal kits as the   *
* present active kit.  Not an elegant approach -  *
* but it gives the flexibility to eventually      *
* transfer the coefficients to EEPROM easily.     *
* The table approach would be more difficult.     *
*                                                 *
* Modified 9/25/86 by Doug Bender                 *
*   deleted the type N 75 ohm cal kit (now on     *
*   ly 4 kits as shown above) simplified to a     *
*   single case statement for readibility and     *
*   future cal kits                               *
*                                                 *
* One of 5  8/21/87 db                            *
* One of 4 10/20/87 db                            *
*                                                 *
***************************************************
;
PROCEDURE sel_ck( kit );
 VALUE kit; INTEGER kit;
                       ENTRY;
 BEGIN
   ALPHA temp_alpha;
   INTEGER i_std_no;
   REAL POINTER rptr;

   IF cal_in_progress THEN
      terminate_cal;   & stop cal if in progress &
   cal_kit := ADRS( cal_kit_ary );
   cal_kit_label := cal_kit + std_kit_label;

   CASE kit OF BEGIN
     BEGIN
     & set up 7 mm B.1 kit &
       set_e_ch_real( 50., ch_system_z0 );
       preset_kit_tbl(elec_device);
       load_ee_ck( kit );    & see file sstddata,
 table ee_ck &
     END;

     BEGIN
   & set up 3.5 mm B.1 kit &
       set_e_ch_real( 50., ch_system_z0 );
       preset_kit_tbl(elec_device);
       load_ee_ck( kit );    & see file sstddata,
 table ee_ck &
```

```
        temp_alpha := "3.5mm";
        MOVE cal_kit_label := temp_alpha;
      END;

      BEGIN                                   & setup
 Type N, 50 ohm cal kit &
        set_e_ch_real( 50., ch_system_z0 );
        preset_kit_tbl(elec_device);
        load_ee_ck( kit );     & see file sstddata,
 table ee_ck &
        temp_alpha := "N 50"+ohm_char;
        MOVE cal_kit_label := temp_alpha;
      END;

      BEGIN
     & user defined cal kit &
        move_block( ADRS( cmos_top ) - user_cal_
 kit_size,
                                  cal_kit, user_cal_
 kit_size/2 );
        set_e_ch_real( user_system_z0, ch_system_
 z0 );
      END;
    END case;

    & The following does the underlining on the
 softkey menu. &
    h_key( Cck7mm + kit, Cck7mm, Cckud );

 END sel_ck;


COMMENT
                   save_uck
***************************************************
*                                                 *
* Procedure to save the user's cal kit into cmos  *
* memory                                          *
*                                                 *
***************************************************
;
SUBROUTINE save_uck;
 BEGIN
  move_block( cal_kit, ADRS( cmos_top ) - user_
 cal_kit_size,
                                          user_
 cal_kit_size/2 );
  user_system_z0 := e_ch_real( ch_system_z0 )
 ;
  beep_done;
 END;
```

```
#EJECT;
COMMENT
                   i_stds
**************************************************
**************************************************
;
PROCEDURE  i_stds;
                   ENTRY;
   BEGIN & i_stds &

      curr_std_id := 1;
      sel_ck( e_ch_bitmap( Cck7mm ));
      preset_kit_tbl( opt_device );
      preset_kit_tbl( elec_device );
      preset_kit_tbl( eo_device );
      preset_kit_tbl( oe_device );
      dirty_opt_kit := FALSE;
      IF recall_type = power_lost_recall THEN
  save_uck;

   END;  & i_stds &

#FILE fstdmenu;

END$
```

The following instructions are executed in a multi-tasking operating system that processes measured data. This data processing includes error correction.

```
COMMENT
                ary_upd
**************************************************
*                                                *
*    upper      lower                            *
*  XXXX XXXX  XXXX XXXX                          *
* \____/  \/ \_________/                         *
*    |     |      |                              *
*    |     |      ------- source of data for     *
*                         update (see ctrace2)   *
*    |     -------------- channel to be updated  *
*    -------------------- type of update to be   *
*                         performed (see carray) *
*                                                *
**************************************************
;
PROCEDURE  ary_upd;       & a process &
                 ENTRY;
   BEGIN & ary_upd &
```

```
LABEL   loop;
INTEGER fifo_word,
        ch;
BYTE    channel,
        upd_type,
        fifo_word_upper = fifo_word,
        fifo_word_lower = fifo_word+1;
BYTE ARRAY accum[1:2];
BOOLEAN respond;
BOOLEAN temp = ch;

time_update_pending := 3;       & first
time: update ch1 and ch2 &
graticule_update_pending := TRUE;
        & first time &

loop:
     accum[1] := 0;
     accum[2] := 0;

     DO
        BEGIN & do &

           fifo_word := read_ff( ary_upd_fifo );

           channel := fifo_word_upper AND array_
ch_mask;

           IF (channel AND %0001) <> 0 THEN
              accum[1] := accum[1] OR fifo_word_
lower;
           IF (channel AND %0002) <> 0 THEN
              accum[2] := accum[2] OR fifo_word_
lower;

           IF (fifo_word_upper AND time_update_
mask) <> 0 THEN
              time_update_pending := SBIT(time_
update_pending,channel);
           IF (fifo_word_upper AND graticule_
update_mask) <> 0 THEN
              graticule_update_pending := TRUE;
           IF (fifo_word_upper AND ary_upd_mask)
<> 0 THEN
              ary_upd_pending := SBIT(ary_upd_
pending,
channel
                                              );

           preempt;

           respond := awaited( ap_fini );
```

```
        END   & do &
     UNTIL ( ( empty_ff( ary_upd_fifo )     )
 AND
               ( NOT awaited( array_fifo_not_full
 ) AND  build_done )
            );       & wait for fifo empty and
no pending wrt_ff's &

     COMMENT IF respond is true, then someone
is waiting for array
             to finish everything it has
already read from the fifo,
             despite whatevery additional
commands may be put into
             the fifo before array completes
 the processing section;

     acquire( processing_variables );

     IF graticule_update_pending THEN
        BEGIN & if &
           set_trace_mem_both;  & update trace
memory requirements &
           IF (text_on = 0) AND disp_on THEN

              part_trace_and_grat;
           graticule_update_pending := FALSE ;
           rst_dp_ptrs;        & trace pointers
may have changed  &
           rst_datap;
           IF (text_on = 0) AND disp_on THEN

              upd_limit_lines;
        END;  & if &

     COMMENT to make sure the off channel
doesn't get done;

     IF trace_mode = single_ch THEN accum[ 3
 - curr_e_ch ] := 0;

     FOR ch := 1 UNTIL 2 DO
        IF accum[ch] <> 0 THEN
           BEGIN & if &
              IF TBIT( ary_upd_pending, ch )
 THEN
                 BEGIN & if &
                    cont_datap( ch );
                    ary_upd_pending := RBIT(
 ary_upd_pending,

      ch );
```

```
                END;  & if &
             IF TBIT( time_update_pending,
 ch ) THEN
                BEGIN & if &
                   cont_datap_time( ch );
                   time_update_pending := R
 BIT(time_update_pending,

      ch  );
                END;  & if &
             IF (accum[ch] AND update_m) <>
  0 THEN
                BEGIN & if &
COMMENT The following instructions perform data
processing.
                   upd_datap( ch, update_m );
                   accum[ch] := accum[ch]
 XOR update_m;
                END;  & if &
             IF (accum[ch] AND update_l) <>
  0 THEN
                BEGIN & if &
                  limit_lines( ch );
                  accum[ch] := accum[ch]
 XOR update_l;
                END;  & if &
             upd_type := accum[ch] AND update_
 raw;  &includes d and f&
             IF upd_type <> 0 THEN
                BEGIN
COMMENT The following instructions perform data
processing.
                   upd_datap( ch, upd_type );
                   accum[ch] := accum[ch]
 XOR upd_type;
                END;
             IF (accum[ch] AND update_t) <>
  0 THEN
                BEGIN & if &
                  IF ( NOT TBIT( dirty, ch
 ) OR
                     ( num_of_groups[ ch ]
 = hold )) AND
                     ( recall_type = done_
 recall ) THEN
                  limit_test( ch );
                END;  & if &
           END;  & if &

      list_values;

      release( processing_variables );
```

```
    IF ( NOT TBIT( dirty, ch ) OR
       ( num_of_groups[ ch ] = hold )) AND
       ( recall_type = done_recall ) THEN
      upd_mkrs;    & move markers, update-mark,
1st point, ch mark &

     IF ( temp := (( empty_ff( ary_upd_fifo
)    ) AND
                   ( NOT awaited( array_fifo_
not_full ))) ) THEN
          ary_dirty := FALSE;

     IF awaited( ap_fini ) AND ( temp  OR
respond ) THEN
          send( ap_fini );

     preempt;

     GO TO loop;

   END;  & ary_upd &
```

The following instructions control error correction parameters used during processing of measured data.

```
COMMENT
          cont_datap
***************************************************
*                                                 *
* EXTERNAL SPECIFICATION FOR cont_datap           *
* FUNCTION:                                       *
* This routine will convert user variables into   *
* internal variables needed for data processing.  *
* This routine will not distrub any of the data   *
* pointers.                                       *
*                                                 *
*                                                 *
* DECLARATION INFORMATION:                        *
*                                                 *
* INPUT:  ch        Channel (1/2) to be effected  *
*                                                 *
* OUTPUT:                                         *
*                                                 *
* EXTERNAL EFFECTS:                               *
*                                                 *
***************************************************
*                                                 *
* LOGIC INFORMATION FOR cont_datap                *
*                                                 *
```

```
* MODULES CALLED:                                                *

*                                                                *
* INITIAL REFINEMENT:                                            *
*                                                                *
*                                                                *
******************************************************************
#EJECT end of comment;
INTEGER PROCEDURE cont_datap(ch); VALUE ch;
 INTEGER ch;

          ENTRY;
BEGIN
DOUBLE  dp_vars_adrs,
        dp_ptrs_adrs;
BYTE    POINTER dp_byte_ptr = dp_vars_adrs;
INTEGER POINTER dp_int_ptr  = dp_vars_adrs;
REAL    POINTER dp_real_ptr = dp_vars_adrs;
DOUBLE  POINTER dp_double_ptr=dp_vars_adrs;
DOUBLE  POINTER dp_ptrs=dp_ptrs_adrs;
INTEGER POINTER grat_specs;
INTEGER POINTER iptr;
INTEGER basis_s_param,
        param_type,
        cal_type;

REAL     x_div_size, y_div_size,
         x_grad_ref, y_grad_ref;

REAL ref_val;

INTEGER  format_code, format, math_index;

 dp_vars_adrs :=  ch_dp_vars[ch];
 dp_ptrs_adrs :=  ch_dp_ptrs[ch];
 IF  ch = 1 THEN
    STPNTR(grat_specs,ADRS(grat1_specs))
  ELSE
    STPNTR(grat_specs,ADRS(grat2_specs));

 format      := ch_bitmap( Cmag, ch);
 format_code := fmt_map[format];

 dp_int_ptr[dp_y_min] := grat_specs[min_y];
 dp_int_ptr[dp_y_max] := grat_specs[max_y];
 y_div_size := REAL(grat_specs[div_y]);

 cont_datap_freq(ch);


   system_z0 := ch_real( ch_system_z0, ch );
      & assumes that z0 is always coulped --
```

```
what if test set different&

dp_real_ptr[dp_y_gain] := y_div_size/ch_real
(ch_scale,ch);

IF TBIT(format_code, polar_bit) THEN
   BEGIN
   dp_int_ptr[dp_x_min] := grat_specs[min_x] ;
   dp_int_ptr[dp_x_max] := grat_specs[max_x] ;
   dp_double_ptr[dp_x_offset] := DOUBLE(grat_
specs[grat_x]);
   dp_double_ptr[dp_y_offset] := DOUBLE(grat_
specs[grat_y]);
   dp_real_ptr[dp_x_gain] := dp_real_ptr[dp_
y_gain] * aspect_ratio;
   END of polar
 ELSE
   BEGIN

   ref_val := ch_real(ch_ref_val,ch);

   IF format = fmt_log_mag THEN
      BEGIN
      ref_val := ref_val * inv_log2_db;
      dp_real_ptr[dp_y_gain] :=  dp_real_ptr
[dp_y_gain] * log2_to_db;
      END
   ELSE IF format = fmt_phase THEN
      BEGIN
      dp_double_ptr[dp_phase_ref] := DOUBLE(
-ref_val*inv_ph_scale);
      ref_val := 0.0;
      dp_real_ptr[dp_y_gain] := dp_real_ptr[
dp_y_gain] * phase_scale;
      END
   ELSE IF format = fmt_delay THEN
      BEGIN
      ref_val := ref_val/ dp_real_ptr[dp_grp_
dly_scal];
      dp_real_ptr[dp_y_gain] := dp_real_ptr[dp_
y_gain] *
                               dp_real_ptr[dp_
grp_dly_scal]
      END;

   y_grad_ref := (ch_real(ch_ref_pos,ch) *
                               y_div_size)
+ REAL(grat_specs[grat_y]);
   dp_real_ptr[dp_y_offset] := (y_grad_ref/dp_
real_ptr[dp_y_gain])
                               - ref_val;
```

```
  IF format = fmt_log_mag OR format = fmt_phase
THEN
     BEGIN
     dp_double_ptr[dp_y_gain] := DOUBLE( 4096.
* 4096 *
                                                    dp
_real_ptr[dp_y_gain] );
     COMMENT gain factor is over scaled by 256,
data must be
        scaled down by 256 after multiplying
 by gain factor;
     dp_double_ptr[dp_y_offset] := DOUBLE(dp_
real_ptr[dp_y_offset]);
     END;

   END of rectangular;

IF ch_bit(Ccorrection, ch) = 1   THEN    & d
ds &
   BEGIN
   cal_type := ch_bitmap( Ccal_none, ch );
   param_type := get_param( ch );
   basis_s_param := IF ((cal_type = two_port ) OR
                        (cal_type = s_two_port))
AND
                       ( param_type <= 3 &s2
2&  ) THEN
                      param_type + 1 ELSE 1;


   IF cal_type=eo_match AND param_type=0 &s1
1& THEN
      cal_type := one_port_on_1
   ELSE IF cal_type=oe_match AND param_type=3
&s22& THEN
      cal_type := one_port_on_2;

   dp_double_ptr[dp_correct_sw] := corr_tbl[ cal_
 type ];

   dp_int_ptr[dp_corr_offset] := 6*(num_mpts
[ch]-1);

   STPNTR( iptr, zoom_addr(ch) );
   IF ADRS( iptr ) <> 0 THEN
      dp_int_ptr[dp_corr_offset] := 6*(iptr[
hd_num_of_pts]-1)
   ELSE IF ch_bit ( Cdsp_sing_seg, ch ) AND
           ch_bit ( Clist_freq, ch )   THEN
         dp_int_ptr[dp_corr_offset] := 6*(list_
pts-1);
```

```
  dp_double_ptr[dp_corr_select] := ADRS(s_coeff
[ basis_s_param ] );
  END of correction
 ELSE
  dp_double_ptr[dp_correct_sw] := corr_tbl[0];

dp_double_ptr[dp_para_conv_sw] := conv_tbl[
                                  ch_bitmap( C
conv_off, ch) ];&dds&
                              &  ch_int( ch_param_
conversion, ch) ]; &

 IF ch_bit( Cd_div_m, ch ) THEN math_index : = 1
    ELSE IF ch_bit( Cd_minus_m, ch ) THEN ma
th_index := 2
        ELSE math_index := 0;
dp_double_ptr[dp_trac_math_sw] := math_tbl[math_
index];

dp_ptrs[dp_m_ptr] := 6*dp_int_ptr[dp_pos] +
ch_dbl(ch_m_base,ch);

IF (format = fmt_log_mag) THEN
   BEGIN
   param_type := get_param( ch );
   COMMENT if optical parameter then set to
optical db
           optical dB is placed right after
regular formats
           by using max_format+1
           ;
   IF (param_type >= LW_param) AND
      (param_type <= 14 &O/O2&) THEN
      dp_double_ptr[dp_format_sw]    := fmt_
table[max_format+1]
    ELSE
      dp_double_ptr[dp_format_sw]    := fmt_
table[format];
   END
 ELSE
   dp_double_ptr[dp_format_sw]    := fmt_tab
le[format];
dp_double_ptr[dp_smoo_inc_sw]  := inc_smoo_t
bl[format];
dp_double_ptr[dp_smoo_dec_sw]  := dec_smoo_t
bl[format];
dp_double_ptr[dp_smoo_scal_sw] := scal_smoo_
tbl[format];
dp_double_ptr[dp_smoo_exit_sw] := exit_smoo_
tbl[format];
dp_int_ptr[dp_fini_signal] := ch_int( ch_
finished_signal, ch);
```

```
cont_datap := 0;

END of cont_datap;
```

The following instructions update processing of measured data, including error correction.

```
#EJECT;
COMMENT
            upd_datap
**************************************************
*                                                *
* EXTERNAL SPECIFICATION FOR upd_datap           *

*                                                *
* FUNCTION:                                      *
*                                                *
* Starting from a specificed intermediate storage *
* array (i.e., D or M or F), this routine will   *
* place on the display a complete trace. All     *
* pointers to data, and conditions of the        *
* processing will be setup elsewhere.            *
*                                                *
*                                                *
* DECLARATION INFORMATION:                       *
*
* INPUT:  update_ch    The channel ( 1/2 ) to be  *
*         updated                                 *
*         update_block The degree of update       *
*         ( start at  D, M or F )                 *
*                                                 *
*    OUTPUT: none                                 *
*                                                 *
* EXTERNAL EFFECTS:                               *
*                                                 *
* The display and various intermediate arrays are *
* update.                                         *
**************************************************
*                                                 *
* LOGIC INFORMATION FOR upd_datap                 *
*                                                 *
* MODULES CALLED:                                 *
*                                                 *
* INITIAL REFINEMENT:                             *
*                                                 *
* The address of the start of the needed update   *
* routine is found, with the twist that update    *
* from f is different if the display is in polar  *
* or rectangluar.  The pointers to memory         *
```

```
* pointers and variables are setup in registers   *
* for 'compute'.  The trace math switch needs to  *
* store if updating M in case group delay is       *
* selected ( normally trace math is skipped ).     *
*                                                  *
* A loop for the correct number of points is       *
* then done.                                       *
*                                                  *
**************************************************

#EJECT end of comment;
PROCEDURE upd_datap(update_ch,update_block);
                         VALUE   update_ch,
 update_block ;
                         INTEGER update_ch,
 update_block ;      ENTRY;
BEGIN
DOUBLE     ch_byte_dbl,
           update_switch;
INTEGER    point,
           ch_trace,
           update_subtype,
           format;

DOUBLE  POINTER dp_dbl_ptr = vars_base;
INTEGER POINTER dp_int_ptr = vars_base;
BYTE POINTER   dp_byte_ptr = vars_base,
               ch_byte_ptr = ch_byte_dbl;

 format := mkr_fmt( update_ch );  & mgh &
 IF update_block = update_f THEN
    IF format < 0 THEN update_subtype := update_
 f_polar
     ELSE IF format = fmt_log_mag THEN
            update_subtype := update_f_rect_dbl
     ELSE IF format = fmt_phase THEN
            update_subtype := update_f_rect_ph
      ELSE update_subtype := update_f;

 cont_datap_sm( update_ch, update_block );

   set_vars_ptrs_base( 0 );
   ch_byte_dbl    :=       ch_dp_vars[ update_
 ch ] ;


   MOVE dp_byte_ptr := ch_byte_ptr ,+( last_dp_
 vars );

   init_scr;                        & only needs
 to done at power up &
   reset_dp_vars( 0 );
```

```
  IF update_block = update_m THEN
     BEGIN
        ch_trace :=  0 & ch_m_trace_base &;
        dp_dbl_ptr[dp_trac_math_sw] := math_
tbl; &math off&
     END
   ELSE ch_trace :=  1 & ch_trace_base & ;

set_dp_ptrs( update_ch, 0, ch_trace );

 l_mode := ch_bit(Clist_freq, update_ch) OR
           ch_bit(Clog_freq,  update_ch);
 num_pt := num_pts[ update_ch ];

IF update_block = update_f THEN
   BEGIN
    update_switch := upd_table[ update_subtype -
1 ];
    set_vars_ptrs_base( 0 );
    REPEAT num_pt DO
       ASSEMBLE( MOVE.L   update_switch, R8;

                 JSR      (R8)
   );
    END
  ELSE
    BEGIN
    f_list := mem_id_addr[ list_id[update_ch ] ];
    d_list := f_list + 8*num_mpts[update_ch] ;

COMMENT The following instruction processes the array of
data, including error correction.

    ary_datap( update_block, update_ch );
    END

END upd_datap;
```

The following instructions call the error correction subroutine to process the array of measured data.

```
PROCEDURE ary_datap( update_block, ch );
   VALUE update_block, ch;
   INTEGER update_block, ch;
                     ENTRY;
BEGIN
  DOUBLE ptrs_base  = REGISTER 11;
  DOUBLE vars_base  = REGISTER 12;
```

```
DOUBLE POINTER dp_ptrs = ptrs_base;
DOUBLE POINTER dp_vars = vars_base;
INTEGER index, num_pts_freq, demod;
DOUBLE  dp_d,dp_m;


compute_xform := ch_bit( Ctransform, ch );
compute_gate  := ch_dm_bit( Cgate, ch,
           IF update_block = update_m THEN
0 ELSE 1 );
num_fpts := num_pts_freq := num_mpts[ ch ];

num_tpts := num_pts[ ch ];
fft_size := size_of_fft;
fft_pts := ALEFT(1, fft_size );
IF ( td_sts AND compute_mask ) <> 0 THEN
        ary_sz := fft_pts
  ELSE ary_sz :=  num_mpts[ ch ] + 1;
ary_sz := ary_sz * 6;
mem_stolen( dp_scr_array_time, td_scr_arrays_
id, ary_sz );

IF  dp_scr_array_time  # 0  THEN
BEGIN
  chan := ch;

  dp_scr_array_freq := dp_scr_array_time;
  IF ch_bit( Ccw_time, chan )  THEN
  BEGIN
    tdr_mode := 0;
    demod := ch_bitmap( Cdemod_off, ch );
    Fo := 0.0;
    Fs := ch_real( ch_sweep_time, chan ) /
               REAL( num_mpts[ chan ] - 1 );
  END
  ELSE
  BEGIN
    demod := 0;
    Fo   := REAL( ch_quad( ch_start_frequency,
chan ));
    Fs   := freq_step( chan );
  END;

  IF (( td_sts AND compute_mask ) <> 0 ) AND
 ( demod = 0 ) AND
     ( ch_bitmap( Ctdr_impulse, chan ) <= step_
tdr ) THEN
  BEGIN
    Fo       := 0.0 ;
    tdr_mode := 1;
    num_fpts := num_fpts + extrapts;
    dp_scr_array_freq := dp_scr_array_freq
```

```
+ 6*extrapts;
   END  low pass
   ELSE tdr_mode := 0;


   IF update_block = update_raw THEN
   BEGIN
     IF ch_bit ( Ccorrection, ch ) = 0  THEN

     BEGIN
       set_vars_ptrs_base( 0 );
            &restore&
       dp_vars[ dp_correct_sw ]:= corr_tbl[ 0 ];
     END
     ELSE
       set_dp_ptrs(ch, 0, 1 );  & ch_trace_base &

     set_vars_ptrs_base( 0 );
               & restore &
     dp_d := dp_ptrs[ dp_d_ptr ];

     ASSEMBLE( MOVE num_pts_freq, R7;
               MOVE.L dp_scr_array_freq, R13

             );

COMMENT The following instruction performs error
correction on the data array.

      ary_corr;
      copy_user3( dp_scr_array_freq,  dp_d, num_
 pts_freq );
    END;


    IF update_block = update_m THEN
    BEGIN
      set_dp_ptrs(ch, 0, 0 & ch_m_trace_base &);
      set_vars_ptrs_base( 0 );
      dp_m := dp_ptrs[ dp_m_ptr ];
      copy_user3( dp_m, dp_scr_array_freq, num_
 pts_freq );
    END
    ELSE
    BEGIN & update_raw OR update_d &
      set_dp_ptrs( ch, 0, 1 & ch_trace_base & );
      set_vars_ptrs_base( 0 );
      ASSEMBLE(  MOVE   num_pts_freq, R7;
                 MOVE.L dp_scr_array_freq, R1 3 );
      ary_trace_math;
    END;
```

```
   IF tdr_mode THEN compute_dc_value;

   IF demod > 0 THEN
            do_demod( dp_scr_array_time, num_
fpts, demod );

   IF compute_gate THEN do_gating;

   set_vars_ptrs_base( 0 );
            &restore&

   IF tdr_mode THEN
   BEGIN
     ASSEMBLE ( MOVE.W  extrapts,R7 );
     set_dc_elec_length;
   END;

   ASSEMBLE( MOVE num_fpts, R7;
             MOVE.L dp_scr_array_time, R13 ) ;
   ary_elec_length;

   IF compute_xform  THEN    & dds mod 6-2-8
8 for gating offset &
   BEGIN
     do_time_domain;
     & need to make # pts same for output &
     IF tdr_mode THEN
       dp_scr_array_freq := dp_scr_array_freq -
6*extrapts;
   END;


   set_vars_ptrs_base( 0 );
   ASSEMBLE( MOVE.L dp_scr_array_freq, R13 ) ;
   REPEAT num_tpts DO
   BEGIN
     ASSEMBLE( MOVE.L  (R13)+, R0;
               MOVE.W  (R13)+, R1;
               MOVE.L  R13,-(S);
               MOVE.L  dp_format_sw(R12),R10 ;
               JSR     (R10);
               MOVE.L  (S)+, R13       );
   END;

   flag := 0;
   release_mem( td_scr_arrays_id );
  END
  ELSE
   warn( exceeded_available_memory );


END ary_datap;
```

END$

The following subroutines actually perform error correction on measured data.

```
*
cpx_1 HEX 0000,4000    imag part = 0  real part =
 1/2
      HEX 0000,0001     exp part = 1
 ORR
 ENT comp_datap
 ENT logE,magE,mag2E,angE,realE,logEopt
 ENT LOG10
 ENT fmt_table,corr_tbl,conv_tbl,math_tbl,upd_
 table
 ENT inc_smoo_tbl,dec_smoo_tbl,scal_smoo_tbl,
 exit_smoo_tbl
 ENT ary_corr,ary_elec_length,set_dc_elec_length
 ENT ary_trace_math
 ENT conv_to_z,conv_to_y
*    external software
 EXT MPYE_ptr,DIVE_ptr,DVRE_ptr,SUBE_ptr,ADDE_
 ptr
 EXT DVRE,ADDE,SUBE,MPYE,DIVE
 EXT MPY2,DIV2,DVR2,DIV3,CNV24,CNVA2,CNV32
 EXT exp_overflow,fst_trig,fst_sqrt
*    external data
 EXT system_z0
 EXT log_tbl,atn_tbl                  in long
 address space
 EXT l_mode,f_list,d_list,num_pt
*    needed for segmented cal
 EXT prev_segs_pts,special_corr,freq_order
          declared in slists
 EXT text_on
        declared in sparmtbl
*
max_numb_points EQU 801
*
$gsp_addr EQU 1048576           100000 hex
$gsp_data EQU 1048582           100006 hex
*
*
R0  REG 0
R1  REG 1
R2  REG 2
R3  REG 3
R4  REG 4
R5  REG 5
R6  REG 6
```

```
R7   REG 7
R8   REG 8
R9   REG 9
R10  REG 10
R11  REG 11
R12  REG 12
R13  REG 13
G    REG 13
M    REG 14
S    REG 15
*
*EJECT
************* chtable_start *********
dp_m_ptr  EQU  0
dp_d_ptr  EQU  4
dp_f_ptr  EQU  8
dp_trace_ptr    EQU  12
dp_raw_get      EQU  16
dp_raw11_get    EQU  16
dp_raw21_get    EQU  20
dp_raw12_get    EQU  24
dp_raw22_get    EQU  28
dp_correct_ptr       EQU  32
dp_format_sw    EQU  0
dp_correct_sw   EQU  4
dp_trac_math_sw      EQU  8
dp_para_conv_sw      EQU  12
dp_smoo_inc_sw       EQU  16
dp_smoo_dec_sw       EQU  20
dp_smoo_scal_sw      EQU  24
dp_smoo_exit_sw      EQU  28
dp_length_init       EQU  32
dp_length_inc   EQU  36
dp_length_shift      EQU  40
dp_scr_base     EQU  44
dp_scr_head     EQU  48
dp_scr_tail     EQU  52
dp_scr_end      EQU  56
dp_grp_dly_mem       EQU  60
dp_corr_select       EQU  64
dp_ph_sm_adjust      EQU  68
dp_dbl_sm_scale      EQU  72
dp_phase_ref    EQU  76
dp_gsp_trace    EQU  80
dp_x_gain       EQU  84
dp_x_offset     EQU  88
dp_y_gain       EQU  92
dp_y_offset     EQU  96
dp_smooth_scale      EQU  100
dp_smooth_sum   EQU  104
dp_smooth_sum2       EQU  108
dp_grp_dly_scal      EQU  112
```

```
dp_x_min  EQU  116
dp_x_max  EQU  118
dp_y_min  EQU  120
dp_y_max  EQU  122
dp_pos    EQU  126
dp_flg    EQU  128
dp_smooth_aper      EQU  130
dp_smooth_delay     EQU  132
dp_smooth_corr      EQU  134
dp_corr_offset      EQU  136
dp_dsp_flg     EQU  138
************** chtable_end ***************
```

The following comprises a table of coded error correction algorithms.

```
*EJECT
corr_tbl DEF.L null_rtr correction off
         DEF.L freq_resp response
         DEF.L two_term  two_term
         DEF.L one_port  one_port
         DEF.L one_port  one_port  on port 2
         DEF.L two_port  two_port  12_term
         DEF.L two_port  two_port ( simple )
         DEF.L eo_match
         DEF.L oe_match
conv_tbl DEF.L null_rtr  no conversion
         DEF.L conv_to_z
         DEF.L conv_to_zt
         DEF.L conv_to_y
         DEF.L conv_to_yt
         DEF.L conv_to_recip
math_tbl DEF.L math_off
         DEF.L DIVE_ptr  math_div
         DEF.L SUBE_ptr  math_minus
fmt_table  DEF.L log_mag
           DEF.L phase
           DEF.L delay
           DEF.L smoothing     z_smith
           DEF.L smoothing     log_polar
           DEF.L lin_mag
           DEF.L real
           DEF.L swr
           DEF.L log_mag_opt
upd_table DEF.L update_f_rect_loop
        array processing
            DEF.L update_f_polar_loop
            DEF.L update_f_dbl_loop
            DEF.L update_f_ph_loop
inc_smoo_tbl DEF.L inc_dbl_smooth
```

```
                DEF.L inc_phase_smooth
                DEF.L inc_smoothing
                DEF.L inc_pol_smooth
                DEF.L inc_pol_smooth
                DEF.L inc_smoothing
                DEF.L inc_smoothing
                DEF.L inc_smoothing
dec_smoo_tbl DEF.L dec_dbl_smooth
                DEF.L dec_dbl_smooth
                DEF.L dec_smoothing
                DEF.L dec_pol_smooth
                DEF.L dec_pol_smooth
                DEF.L dec_smoothing
                DEF.L dec_smoothing
                DEF.L dec_smoothing
*EJECT
scal_smoo_tbl DEF.L scal_dbl_smooth
                 DEF.L scal_ph_smooth
                 DEF.L scale_smoothing
                 DEF.L scal_pol_smooth
                 DEF.L scal_pol_smooth
                 DEF.L scale_smoothing
                 DEF.L scale_smoothing
                 DEF.L scale_smoothing
exit_smoo_tbl DEF.L exit_dbl_smooth
                 DEF.L exit_ph_smooth
                 DEF.L exit_smoothing
                 DEF.L exit_pol_smooth
                 DEF.L exit_pol_smooth
                 DEF.L exit_smoothing
                 DEF.L exit_smoothing
                 DEF.L exit_smoothing
*EJECT
* "ptr_adjust"
* This is the entry point for special correction
* adjustment of the address already loaded in
* dp_correct_ptr(R11) to allow overlapping segments
* in list frequency mode, or allow normal,
* incremental correction.
*
* R13 is previously loaded with the address of
* dp_correct_ptr(R11).  R7 which is a loop counter
* in ary_corr added 12/31/87--see below.
*
* dp_pos(R12) is an integer that provides the
* current measurement position.
*
* Registers used:  R2, R10
*
* The global prev_segs_pts contains the current
* number of points previous to that of the current
* segment selected.
```

```
*
* The integer array freq_order (created and
* updated in slists) contains the re-ordered
* position of the calibration data for that point.
*
* See also file slists (sort_stim_list and build_
* stim_list) for more info.  12/17/87 Doug Bender
*
* Added short portion to test for LIST VALUES
*  mode... the dp_pos(R12) integer value is not
* updated during this mode...hence the need to
* generate the current measurement point position
* (num_corr_pts) from the R7 value in "ary_corr"
* below.   12/31/87 Doug Bender
*
ptr_adjust EQU *
 TST.W      special_corr          declared in
  slists...segmented cal
 BEQ        normal_corr           branch for
 normal, increment corr.
 MOVE.W     text_on,R2
 CMP.W      =H2,R2                check to see
 if list values mode on
 BEQ        list_val_adj          if so,
 different position adjustment
 MOVE.W     dp_pos(R12),R2        current meas.
 pt. position --> R2
 BRA        continue_adj
list_val_adj EQU *
 MOVE.W     num_corr_pts,R2
 SUB.W      R7,R2
continue_adj EQU *
 ADD.W      prev_segs_pts,R2      previous #
 pts ahead of current seg.
 ADD.W      R2,R2                 double result
 for INTEGER ARRAY offset
 LEA.L      freq_order,R10        load address
 of freq_order int. array
 ADD.W      R2,R10                R2 acts as
 index into the array
 MOVE.W     (R10),R2              R10 points
 to "ordered" value
 MULU.W     #6,R2                 cal data is
  stored as 6 byte type
 ADD.W      R2,R13                R13 now points
 to proper position
 MOVE.L     R13,  R8
 BRA        ptr_adjust_exit
normal_corr EQU *
 MOVE.L     R13,  R8
 ADD.W      #6,   R13
 MOVE.L     R13,dp_correct_ptr(R11)
```

```
ptr_adjust_exit EQU *
 RTS
*
*
```

The following are coded error correction algorithms.

```
*EJECT

COMMENT The following is a coded frequency response
correction algorithm.

freq_resp EQU *
 MOVE.L     dp_correct_ptr(R11),R13
 BSR        ptr_adjust
 JMP        DIVE_ptr
*

COMMENT The following is a coded frequency response and
isolation algorithm.

two_term EQU *
 MOVE.L     dp_correct_ptr(R11),R13
 BSR        ptr_adjust
 MOVE       dp_corr_offset(R12),R10
 JSR        SUBE_ptr
 ADD.W      R10,R8
 JMP        MPYE_ptr
 implied return
*
*
*********************************************
 ***************************
* one_port correction  assumes R8 constains a
* ptr to the first error coeff and R10 has the
* offset needed to get each of the others
*          R0/R1 has the measured value and
* this will exit with the
*          corrected value in R0/R1
*
*          ( meas - directivity)
*   s11 actual   =   -----------------------
 --------------------------
*                    tracking  +  source
 match * ( meas - directivity )
*********************************************
 ***************************
```

COMMENT The following is a coded one-port error correction algorithm.

```
one_port EQU *
 MOVE.L     dp_correct_ptr(R11),R13
 BSR        ptr_adjust
 MOVE       dp_corr_offset(R12),R10
one_port_correc EQU *
 JSR        SUBE_ptr          directivity
 MOVE.L     R0,   R5
 MOVE.W     R1,   R6          save a copy of
 measured-directivity for later
*
 ADD.W      R10,   R8
 JSR        MPYE_ptr          source match
*
 ADD.W      R10,   R8
 JSR        ADDE_ptr          tracking
*
*
 MOVE.L     R5,   R2
 MOVE.L     R6,   R3
*
 JMP        DVRE
*RTS        rts is implied in DVRE
*
*
*EJECT
*
*
```

COMMENT The following is a coded full two-port error correction algorithm using four S-parameters.

```
two_port EQU *
 MOVE.L     dp_correct_ptr(R11),R13
 BSR        ptr_adjust
 MOVE.L     dp_raw21_get(R11),R10
 MOVE.L     (R10)+,R2
 MOVE.W     (R10)+,R3
 MOVE.L     R10,dp_raw21_get(R11)
      restore ptr
 MOVE.L     dp_raw12_get(R11),R10
 MOVE.L     (R10)+,R4
 MOVE.W     (R10)+,R5
 MOVE.L     R10,dp_raw12_get(R11)
      restore ptr
 MOVE.L     dp_raw22_get(R11),R10
 MOVE.L     (R10)+,R6
 MOVE.W     (R10)+,R7
 MOVE.L     R10,dp_raw22_get(R11)
      restore ptr *
```

```
 MOVE.L    dp_corr_select(R12),R13
 MOVE.W    dp_corr_offset(R12),R10
*********************************************
 ***************************
*two_port_correc
 run time 1 mS/pt
*                              5 cpx div,8 cp
 x mult,6 cmp sub,2 real add
* R0/R1 = S11,   R2/R3 = S21,   R4/R5 = S12,
   R6/R7 = S22
* R8 has ptr to error terms,  R10 has offset
 between error terms
* R11/R12 have data that must be saved
* R8/R9 is used by math routines  (data in R0
 /R3)
* R12 will used as ptr to processed error terms
 * R13 contains the index descirbing the S
 parameter to output
* and R0/R1 on exit has result
* Order (structure) of error coeffs is VERY
 important  ( see scal )
*  e     e     e     e     e     e      e
 e     e     e     e     e
*   DF    SF    RF    XF    LF    TF    DR
  SR    RR    XR    LR    TR
*********************************************
 ***************************
* MOVEM of a's / b's and the cpx_1  would be
 faster with MOVE.L/MOVE.W
*********************************************
 ***************************
*
*                      compute the interdemeniate
 terms ie a's and b's
*
*                                     Measured
  -  Leakage
*                         b term  =  -----------
 ------------
*                                         Tracking
*
*                         a term  =  b term   *
   Match
*                                     NOTE: In a
  term 11,22 a +1 is added
two_port_correc EQU *
 MOVEM.L  R2/R3/R11/R12,-(S)             save
  for later
 LEA      coeff, R12
*
 BSR      comp_coeff                      b11
```

```
 MOVEM.L  cpx_1 ,R2/R3
 JSR      ADDE
 MOVE.L   R0,(R12)+                              a11

 MOVE.L   R1,(R12)+
*
 MOVEM.L  (S)+,R0/R1
 BSR      comp_coeff                             b21

 MOVE.L   R0,(R12)+                              a21

 MOVE.L   R1,(R12)+
*
 MOVE.L   R6,  R0
 MOVE.W   R7,  R1
 BSR      comp_coeff                             b22

 MOVEM.L  cpx_1 ,R2/R3
 JSR      ADDE
 MOVE.L   R0,(R12)+                              a22

 MOVE.L   R1,(R12)+
*
 MOVE.L   R4,  R0
 MOVE.W   R5,  R1
 BSR      comp_coeff                             b12

 MOVE.L   R0,(R12)+                              a12

 MOVE.L   R1,(R12)+
*
*
 MOVEM.L  det_coeff,R6/R7
 BSR      use_coeff                              det

 MOVEM.L  R0/R1,det
 MOVEM.L  (R13),R6/R7                          R13
 has addr of item in s_coeff
 BSR      use_coeff
 selected parameter
 MOVEM.L  det,R2/R3
 MOVEM.L  (S)+,R11/R12
 JMP      DIVE
 result
*RTS  is implied in DIVE
*EJECT
*
*                    compute the interdemeniate
 terms ie a's and b's
*
*                                         Measured
  -  Leakage
```

```
*                       b term   =  -----------
 ------------
*                                            Tracking
*
*                       a term   =  b term    *
  Match
*                                        NOTE: In a
 term 11,22 a +1 is added
*
comp_coeff EQU *
 AND.W     =HFF, R1
 JSR       SUBE_ptr
 ADD.W     R10 , R8
 MOVE.L    R8,    R11
 ADD.W     #6,    R8
 ADD.W     R10 , R8
 JSR       DIVE_ptr
 MOVE.L    R0,(R12)+
 save b term
 MOVE.L    R1,(R12)+
 ADD.W     R10 , R8
 MOVE.L    (R11)+,R2
 MOVE.W    (R11), R3
 JMP       MPYE
 compute a term
*RTS       rts is implied in mpye
*
*
*                      compute a product difference
 (w*x)-(y*z)
*                      where the terms are the
 a's and b's terms
*                      R6 and R7 hold indexes to
 which term to use
*                      R6  upper half is w index,
 R6 lower half is x index
*                      R7  upper half is y index,
 R7 lower half is z index
*                      R12 holds the pointer to
  first coeff
use_coeff EQU *
 LEA       coeff, R12
 MOVEM.L   0(R12,R7.W),R0/R1
 SWAP      R7
 MOVEM.L   0(R12,R7.W),R2/R3
 JSR       MPYE
 y*z term
 MOVE.L    R0,    R4
 save
 MOVE.W    R1,    R5
 MOVEM.L   0(R12,R6.W),R0/R1
 SWAP      R6
```

```
MOVEM.L  0(R12,R6.W),R2/R3
JSR      MPYE
w*x term
MOVE.L   R4,   R2
restore y*z
MOVE.W   R5,   R3
JMP      SUBE
result
*RTS     rts is implied in sube
*
*
*********************************************
 ***************************
* eo_match correction assumes R8 constains a
 ptr to the first error
*          coeff and R10 has the offset needed
 to get each of the others
*          R0/R1 has s11 for input and will exit
 with the corrected
*          s21 value
*
*                            (s21-crosstalk)/tracking
*   s21 actual  = -------------------------
 ---------------------
* (eo transmission)     (1 + [(s11-directivity)*
 match/tracking])
*
*********************************************
 ***************************
* Order (structure) of error coeffs is VERY
 important  ( see scal )
*  e     e     e     e     e
*   DF    SF    RF    XF    TF
*********************************************
 ***************************

COMMENT The following is a coded frequency response and
source match correction algorithm using S11 and S21.

eo_match EQU *
 MOVE.L     dp_correct_ptr(R11),R13
 BSR        ptr_adjust
 MOVE.L     dp_raw21_get(R11),R10
 MOVE.L     (R10)+,R5
     s21 in R4/R5
 MOVE.W     (R10)+,R6
 MOVE.L     R10,dp_raw21_get(R11)
 MOVE.W     dp_corr_offset(R12),R10
 JSR        SUBE_ptr
     s11-directivity
 ADD.W      R10,R8
 JSR        MPYE_ptr                     *
```

```
    (s11-direct.)*match
ADD.W       R10,R8
JSR         DIVE_ptr                    * [(s
11-direct)*match/tracking]
MOVEM.L     cpx_1,R2/R3
JSR         ADDE                          1
+ [    ]
MOVE.W      R1,R3                       save
one port denom in R5/R6
MOVE.W      R6,R1                       move s
21 to R0/R1
MOVE.W      R3,R6
MOVE.L      R0,R2
MOVE.L      R5,R0
MOVE.L      R2,R5
ADD.W       R10,R8
JSR         SUBE_ptr                      s
21-crosstalk
ADD.W       R10,R8
JSR         DIVE_ptr          *           (s
21-crosstalk)/tracking
MOVE.L      R5,R2
MOVE.W      R6,R3             *  (s21-cross)
/tracking/(1+[ ])
JMP         DIVE                return
implied in DIVE
*
*
*********************************************
 ***************************
* oe_match correction assumes R8 constains a
* ptr to the first error coeff and R10 has the
* offset needed to get each of the others
*         R0/R1 has s22 for input and will
* exit with the corrected
*         s21 value
*
*              [1 + ((s22-EDR)/ERR)(ESR-EL
 F)]((s21-EXT)/ETF)
*   s21 actual  = --------------------------
 ---------------------
* (oe transmission)     (1 + [((s11-EDR)/ERR)
 *ESR])
*
*
*********************************************
 ***************************
* Order (structure) of error coeffs is VERY
 important  ( see scal )
*  e     e     e     e     e     e
*   DR    SR    RR    XF    LF    TF
*********************************************
```

```
***************************

COMMENT The following is a coded frequency response and
load match correction algorithm using S21 and S22.

oe_match EQU *
 MOVE.L      dp_correct_ptr(R11),R13
 BSR         ptr_adjust
 MOVE.L      dp_raw21_get(R11),R10
 MOVE.L      (R10)+,-(S)
    save s21 on stack
 MOVE.W      (R10)+,-(S)
 MOVE.L      R10,dp_raw21_get(R11)
 MOVE.W      dp_corr_offset(R12),R10
 JSR         SUBE_ptr
    s11 - directivity
 ADD.W       R10,R8
 MOVE.L      0(R8,R10.W),R2
 get ERR (reflection tracking)
 MOVE.W      4(R8,R10.W),R3
 JSR         DIVE
 s11-direct.  / tracking
 MOVE.L      R0,-(S)
   save intermed. on stack
 MOVE.W      R1,-(S)
 MOVE.L      (R8),-(S)
 save ESR on stack (match)
 MOVE.W      4(R8),-(S)
 JSR         MPYE_ptr
 s11-dirct. / track * match
 MOVEM.L     cpx_1,R2/R3
 add one
 JSR         ADDE
 MOVE.L      R0,R5
  move denom to R5/R6
 MOVE.W      R1,R6
 ADD.W       R10,R8
 MOVE.W      (S)+,R1
 recall ESR from stack
 MOVE.L      (S)+,R0
 MOVE.L      0(R8,R10.W),R2
 get ELF
 MOVE.W      4(R8,R10.W),R3
 JSR         SUBE
  match - load match
 MOVE.W      (S)+,R3
 MOVE.L      (S)+,R0
 JSR         MPYE
 MOVEM.L     cpx_1,R2/R3
 JSR         ADDE
 MOVE.L      R5,R0
 MOVE.W      R6,R1
```

```
JSR          DIVE
MOVE.L       R0,R5
MOVE.W       R1,R6
MOVE.W       (S)+,R1
MOVE.L       (S)+,R0
JSR          SUBE_ptr
ADD.W        R10,R8
ADD.W        R10,R8
JSR          DIVE_ptr
MOVE.L       R5,R2
MOVE.W       R6,R3
JMP          MPYE                   return
 implied in MPYE
*
* entrys for array driven data processing
*
*  R11 must be preloaded with a ch ptr base
*  R12 must be preloaded with a ch var base
*  R13 must be preloaded with the adr to store
*  the result
*  R7  is   number of points to process
*
*
```

COMMENT The following instructions execute the selected error correction algorithm on each data value in the array of measured data.

```
ary_corr EQU *
 SUBQ.W      =H1,R7
 MOVE.W      R7,num_corr_pts
 ADDQ.W      =H1,R7
 BRA         ary_corr2
*
```

COMMENT The correction switch is set by the subroutine 'cont_datap'. It points to one of the coded algorithms in the table labeled 'corr_tbl'.

```
array_loop EQU *
 MOVE.L      R7,-(S)
 MOVE.L      R13,-(S)
 MOVE.L      dp_raw_get(R11),R10
 MOVE.L      (R10)+,R0
 MOVE.W      (R10)+,R1
 AND.W       =HFF,  R1
 MOVE.L      R10,dp_raw_get(R11)
    restore ptr
*
 MOVE.L      dp_correct_sw(R12),R10
 JSR         (R10)
 MOVE.L      (S)+,R13
```

```
 MOVE.L     (S)+,R7
 MOVE.L     R0,   (R13)+
 MOVE.W     R1,   (R13)+
*
ary_corr2 EQU *
 DBRA        R7, array_loop
 RTS
*
```

Another embodiment of a lightwave component analyzer, generally indicated by the numeral 10', is shown in Figs. 3 and 4. The lightwave component analyzer 10' is similar to the lightwave component analyzer 10 shown in Figs. 1 and 2 in most respects. Like elements of the lightwave component analyzer 10' are assigned like numerals. The differences between the lightwave component analyzer 10' and the lightwave component analyzer 10 are as follows.

With reference to Figs. 1 and 3, the lightwave component analyzer 10 shown in Fig. 1 comprises an internal instrument controller. In contrast, the lightwave component analyzer 10' shown in Fig. 3 comprises an external instrument controller which can be an HP Series 217 instrument controller which drives an HP 3488 switch controller to appropriately configure the RF switch matrix. Additionally, the lightwave component analyzer 10 shown in Fig. 1 comprises the lightwave test port $12_3$. The lightwave component analyzer 10' shown in Fig. 3 does not.

With reference to Figs. 2 and 4, the modulation amplifiers have a slightly different configuration in the lightwave component analyzer 10 and the lightwave component analyzer 10'. The lightwave component analyzer 10 shown in Fig. 2 comprises one attenuator between an optical second lightwave receiver and the RF switch S6 and another attenuator between the RF switch S7 and the sampler 30. The lightwave component analyzer 10' shown in Fig. 4 does not. The attenuator at the RF input from the electrical test set 18 to the lightwave test set 12 provides one of three attenuation values in the lightwave component analyzer 10 shown in Fig. 2, but a single value attenuator is utilized in the lightwave component analyzer 10' shown in Fig. 4.

With reference to Figs. 2 and 4, the lightwave test set 12 of the lightwave component analyzer 10 shown in Fig. 2 comprises the lightwave test port $12_3$ and the optical switch 32. The lightwave test set 12' of the lightwave component analyzer 10' shown in Fig. 4 does not. The optical isolator of the lightwave component analyzer 10 shown in Fig. 2 is between the Fabry-Perot laser and the polarization controller, whereas the optical isolator of the lightwave component analyzer 10' shown in Fig. 4 is between the Mach-Zehnder optical modulator and the lightwave test port $12_1$. Finally, the lightwave component analyzer 10 shown in Fig. 2 comprises an attenuator between the RF detector and the power splitter in the lightwave test set 12. The lightwave component analyzer 10' shown in Fig. 4 does not.

In the case of the lightwave component analyzer 10' shown in Figs. 3 and 4, the RF switches are controlled through an external instrument controller in the form of an off-board desk-top computer in response to keystrokes entered by a user in response to user selection of various calibration and test measurements. Factory calibration data can be resident on the disc for the HP Series 217 instrument controller. A user selects a user calibration by means of the keyboard of the HP Series 217 instrument controller which drives an HP 3488 switch controller to appropriately configure the RF switch matrix for the calibration. Next, the HP Series 217 instrument controller takes the user calibration data and combines this with the factory calibration data.

Then it downloads the resultant error correction data to the internal instrument memory of the lightwave component analyzer 10'. These calibration data are entered into the lightwave component analyzer 10' through an HP-IB (Hewlett-Packard Company's implementation of the IEEE-488 instrument bus) rear panel connection.

The lightwave component analyzer 10' can be controlled by the HP Series 217 instrument controller with a software routine. The HP Series 217 instrument controller downloads error correction information into the internal instrument memory for access by the HP 8720A vector network analyzer firmware. A user selects a test measurement by means of the keyboard of the HP Series 217 instrument controller which drives the HP 3488 switch controller to appropriately configure the switch matrix for the measurement. Other features of operation, such as display of data, as shown in Figs. 8, 10, 12, and 14 are accomplished through the HP 8720A vector network analyzer firmware.

The HP Series 217 instrument controller software incorporates coded instructions to perform the needed RF switch connections for the calibration process and while measuring the response characteristics of a DUT during desired test measurements. A calibration or measurement can be performed easily and quickly by user selection of the desired calibration or measurement by actuation of a key on the keyboard of the HP Series 217 instrument controller. The following contains a copy of the software for the HP Series 217 instrument controller connected to the lightwave component analyzer 10', which is executed to perform calibration and test measurements in accordance with the embodiment of the invention shown in Figs. 3 and 4.

```
5 !   RE-STORE "/USERS/E_JAMES/MOXIE/Moxxie:REMOTE
```

```
 21,0;LABEL NPI"
10!   RE-STORE "/MOXIE/TEST/Moxxie:REMOTE 21,0;LAB
EL NPI"
15!   RE-STORE "Moxxie:HP9153,700,1,0"
20 !
25 !NOTE: TO GET NEWEST FACTORY CORRECTION DATA LOAD
 AND RUN:  (DATA_REVIEW)
30 !      "/MOXIE/TEST/NEW_DEMO_DISC:REMOTE 21,0;LABEL
 NPI"
35  !
40  ! Subprograms
45  !
50  ! Moxxie_parms
55  ! Moxxie_setup
60  ! Moxxie_test
65  ! Moxxie_select
70  ! Text_on_vna_crt
75  !
80  !
85    COM /Cal_data/ Srce_cal_data(1:1,1:2,1:401),
Rcvr_cal_data(1:1,1:2,1:401),Opt_cal_data(1:1,1:2,
1:401)
90  !
95    Mass_store$=":HP9153,700,1,0"
100   LOOP
105      Serial$="XXXXA00001"
110      CALL Moxxie(Serial$,Mass_store$)
115   END LOOP
120   END
125   SUB Moxxie(Serial$,Mass_store$)
130 Moxxie:!
135   !=========================================
140   ! The purpose of this test is to simulate customer
measurement of the
145   ! 8703A.
150   !-----------------------------------------
155   !     AA.00.00      14 Jan 89     Evelyn James
160   !=========================================
165      DIM Device$[30],Message$[160]
170      REAL Rf_power
175      INTEGER Num_freqs,Sw_addr,Dut_addr
180      DIM Rf_freq(1:1601)
185      !
190      CALL Clr_scr
195      CALL Shift_user
200      ON KEY FNLive_key("ABORT") LABEL "ABORT"
RECOVER Abort_test
205      !
210      Dut_addr=FNAddress("DUT")
215      Sw_addr=FNAddress("SW")
220      !
225      CALL Moxxie_parms(Rf_freq(*),Rf_power,Num
```

```
_freqs)
230      REDIM Rf_freq(1:Num_freqs)
235      !
240      Message$="CALIBRATE ?"
245      CALL Prompt_keys("NO,,YES",Cal$,Message$)
250      IF Cal$="YES" THEN
255         LOAD KEY "KEYS"
260         CALL Moxxie_setup(Device$,Rf_freq(*),R
f_power,Sw_addr,Dut_addr,Num_freqs)
265         CALL Moxxie_test(Device$,Serial$,Mass_
store$,Num_freqs,Dut_addr,Sw_addr)
270      END IF
275      CALL Moxxie_select(Rf_power,Rf_freq(*),Sw
_addr,Dut_addr,Num_freqs)
280      !
285 Exit_test:       !
290 Abort_test:      !
295      OFF KEY
300   SUBEND
305   !
310   !*******************************************
315   !
320   SUB Moxxie_setup(Device$,Rf_freq(*),Rf_power
,INTEGER Sw_addr,Dut_addr,Num_freqs)
325 Moxxie_setup:          !
330      DIM Setup$[160],Error$[160],Message$[160]
,Control$[160]
335      REAL Setup_min,Setup_max,Setup_ck
340      INTEGER Equip_correct,Looping,Yes,No
345      !
350      Yes=1
355      No=0
360      Setup_min=-9999
365      Setup_max=9999
370      Equip_correct=No
375      Looping=No
380      LOOP
385         OUTPUT Dut_addr;"INTE0" !INTENSITY DOWN
390         CALL Vna_preset(Dut_addr)
395         !
400         Control$="ELECTRICAL TO ELECTRICAL"
405         CALL Moxie_et_drvr(Sw_addr,Control$)
410         !
415         GOSUB Show_setup  !PRESETS AND TURNS
INTENSITY UP
420         IF Device$="LOCAL" THEN GOTO Exit_test
425         !
430         CALL Vna_points(Dut_addr,VAL$(Num_freqs))
435         CALL Vna_measure(Dut_addr,"S21")
440            CALL Vna_power(Dut_addr,"POWER LEVEL",Rf_
power)
```

```
445              CALL  Vna_freq(Dut_addr,"START  FREQ",
Rf_freq(1))
450          CALL Vna_freq(Dut_addr,"STOP FREQ",Rf_freq
(Num_freqs))
455         CALL Vna_scale_ref(Dut_addr,"PER DIVISION",
,5)
460             CALL  Vna_scale_ref(Dut_addr,"REFERENCE
VALUE",15)
465         !
470         CALL Vna_swp_cont(Dut_addr,"SINGLE")
475         CALL Vna_mkr(Dut_addr,"MAX SEARCH")
480         CALL Vna_marker_read(Dut_addr,"AMPLITUDE",
Setup_ck)
485         !
490           IF Setup_ck>Setup_min AND Setup_ck<Setup_
max THEN Equip_correct=Yes
495      EXIT IF Equip_correct=Yes
500           Error$="MEASURED POWER = "&VAL$(Setup_ck)
&",  EXPECTED  POWER  >  "&VAL$(Setup_min)&",    <  "&VAL$
(Setup_max)
505         Looping=Yes
510      END LOOP
515      CALL Vna_swp_cont(Dut_addr,"SWEEP TIME",1
5)      !23
520      CALL Vna_filter(Dut_addr,"IF BW",30)
525      !
530 Exit_test:      !
535                 !
540      SUBEXIT    !Moxxie_setup
545      !
550 Show_setup:      !
555      CALL Vna_swp_cont(Dut_addr,"CONTINUOUS")
560      IF Looping=Yes THEN
565         Message$="SETUP CHECK FAILED, check setup"
570         Control$="REPEAT"
575         CALL Show_message(Error$,16)
580         Error$=""
585      END IF
590      CALL Clr_scr
595      CALL Text_on_vna_crt(Dut_addr,Device$)
600      RETURN
605   SUBEND
610   !
615   !*******************************************
620   !
625   SUB Moxxie_parms(Rf_freq(*),Rf_power,INTEGER
 Num_freqs)
630 Moxxie_parms:   !
635      REAL Start_freq,Stop_freq,Freq_step
640      INTEGER Freq_num
645      !
650      Rf_power=-20           !dBm
```

```
655      !
660      Num_freqs=401
665      Start_freq=1.3E+8
670      Stop_freq=2.0E+10    !1.99985E+10
675      Freq_step=(Stop_freq-Start_freq)/(Num_freqs-1)
680      !
685      FOR Freq_num=1 TO Num_freqs
690         Rf_freq(Freq_num)=Start_freq+(Freq_num
-1)*Freq_step
695      NEXT Freq_num
700   SUBEND
705   !
710   !*******************************************
715   !
720   SUB Moxxie_test(Device$,Serial$,Mass_store$,
INTEGER Num_freqs,Dut_addr,Sw_addr)
725 Moxxie_test:   !
730      DIM Control$[160],Message$[160],Setup$[16
0],Data_name$[6]
735         ALLOCATE  Opt_cal(1:Num_freqs),Rf_cal(1:Num_
freqs)
740      ALLOCATE Mod_rf_cal(1:Num_freqs)
745      ALLOCATE Srce_factory(1:1,1:1,1:Num_freqs),
Rcvr_factory(1:1,1:1,1:Num_freqs)
750      INTEGER Freq_num
755      !
760      DISP "Calibrating"
765      !
770      COM /Cal_data/ Srce_cal_data(*),Rcvr_cal_
data(*),Opt_cal_data(*)
775      !
780      OUTPUT Dut_addr;"TITR1""EO"""
785      OUTPUT Dut_addr;"TITR2""OE"""
790      OUTPUT Dut_addr;"TITR3""OPT1P"""
795      OUTPUT Dut_addr;"TITF1""EO"""
800      OUTPUT Dut_addr;"TITF2""OE"""
805      OUTPUT Dut_addr;"TITF3""OPT1P"""
810      !
820      ! electrical thru cal
825      CALL Vna_swp_cont(Dut_addr,"TAKE SWEEP")
830      CALL Vna_read_array(Dut_addr,"FORMATTED TRACE",
Rf_cal(*))
835      !
840      ! optical thru cal
845      Control$="OPTICAL TO OPTICAL"
850      CALL Moxie_et_drvr(Sw_addr,Control$)
855      CALL Vna_swp_cont(Dut_addr,"TAKE SWEEP")
860      CALL Vna_read_array(Dut_addr,"FORMATTED TRACE",
Opt_cal(*))
865      !
870      ! modulator rf path cal
875      Control$="MOD RF TO CH B"     ! expects O/O
```

```
 from last measurement
880      CALL Moxie_et_drvr(Sw_addr,Control$)
885      CALL Vna_swp_cont(Dut_addr,"TAKE SWEEP")
890      CALL Vna_read_array(Dut_addr,"FORMATTED TRACE",
Mod_rf_cal(*))
895      !
900      GOSUB Get_factory_cal
905      !
910      FOR Freq_num=1 TO Num_freqs
915         X=(Opt_cal(Freq_num)+Rf_cal(Freq_num)-
Mod_rf_cal(Freq_num)-Srce_factory(1,1,Freq_num))/20
920         Srce_cal_data(1,1,Freq_num)=10^X
925         !
930         Y=(Opt_cal(Freq_num)+Rf_cal(Freq_num)-
Rcvr_factory(1,1,Freq_num))/20
935         Rcvr_cal_data(1,1,Freq_num)=10^Y
940      NEXT Freq_num
945      !
950      Control$="ELECTRICAL TO OPTICAL"
955      CALL Moxie_et_drvr(Sw_addr,Control$)
960      CALL Vna_write_cal(Dut_addr,"RESPONSE",Srce_
cal_data(*))
965      Type_num$="1"
970      GOSUB Store_to_disc
975      !
980      Control$="OPTICAL TO ELECTRICAL"
985      CALL Moxie_et_drvr(Sw_addr,Control$)
990         CALL Vna_write_cal(Dut_addr,"RESPONSE",Rcvr_
cal_data(*))
995      Type_num$="2"
1000     GOSUB Store_to_disc
1005     !
1015     Control$="OPTICAL TO OPTICAL"
1020     CALL Moxie_et_drvr(Sw_addr,Control$)
1025     Message$="Connect OPTICAL SOURCE OUTPUT to
 OPTICAL COUPLER INPUT."
1030     CALL Show_message(Message$,6)
1035     Message$="Connect OPTICAL COUPLER COUPLED
 to OPTICAL RECEIVER INPUT 1."
1040     CALL Show_message(Message$,8)
1045     Message$="Connect optical cable to OPTICAL
 COUPLER TEST PORT."
1050     CALL Show_message(Message$,10)
1055     Message$="Please connect, then press 'CONTINUE'
 when ready."
1060     CALL Vna_scale_ref(Dut_addr,"REF VAL",-40)
1065     CALL Vna_swp_cont(Dut_addr,"CONTINUOUS")
1070     CALL Prompt_keys("CONTINUE",Key_pressed$,
Message$)
1075     CALL Vna_swp_cont(Dut_addr,"SINGLE")
1080     CALL Clr_scr
1085     CALL Vna_scale_ref(Dut_addr,"REF VAL",-20)
```

```
1090      CALL Vna_calibrate(Dut_addr,Control$,
"RESPONSE","THRU")
1095      CALL Vna_read_cal(Dut_addr,"RESPONSE",Opt_
cal_data(*))
1100      !
1105      MAT Opt_cal_data= Opt_cal_data/(.035)
1110      !
1115      CALL Vna_write_cal(Dut_addr,"RESPONSE",Opt_
cal_data(*))
1210      Type_num$="3"
1215      GOSUB Store_to_disc
1220      !
1225 Exit_test:    !
1230      SUBEXIT
1235      !
1240 Store_to_disc:    !
1241      CALL Vna_swp_cont(Dut_addr,"TAKE SWEEP")
1245      OUTPUT Dut_addr;"DISCUNIT1;"
1250      OUTPUT Dut_addr;"SAVE"&Type_num$&";"
1260      OUTPUT Dut_addr;"USEPASC;"
1265      OUTPUT Dut_addr;"STOR"&Type_num$&";"
1270      SEND 7;TALK 16 CMD 9
1275 Sit:STATUS 7,6;Stat
1280      IF NOT BIT(Stat,6) THEN Sit
1290      RETURN
1295      !
1300 Get_factory_cal:    !
1305      Data_name$="Calsrc"
1310      ON ERROR GOSUB Ck_err
1315      ASSIGN @Io_path TO Data_name$&Mass_store$
1320      ENTER @Io_path;Srce_factory(*)
1325      ASSIGN @Io_path TO *
1330      Data_name$="Calrcr"
1335      ASSIGN @Io_path TO Data_name$&Mass_store$
1340      ENTER @Io_path;Rcvr_factory(*)
1345      ASSIGN @Io_path TO *
1350      RETURN
1355      !
1360 Ck_err:    !
1365      OFF ERROR
1370      SELECT ERRN
1375      CASE 80
1380         DISP "INSERT CORRECT DISC INTO DRIVE 1,
 Press Continue"
1385         PAUSE
1390         DISP ""
1395      CASE ELSE
1400         DISP "Moxxie found "&ERRM$&" please fix
 and press 'CONTINUE'"
1405         PAUSE
1410         DISP ""
1415      END SELECT
```

```
1420     ON ERROR GOSUB Ck_err
1425     RETURN
1430     !
1435  SUBEND   ! Moxxie_test
1440  !
1445  !*******************************************
1450  SUB Moxxie_select(Rf_power,Rf_freq(*),INTEGER
 Sw_addr,Dut_addr,Num_freqs)
1455 Moxxie_select:          !
1460     DIM Device$[60],Message$[160]
1465     !
1470     COM /Cal_data/ Srce_cal_data(*),Rcvr_cal_
data(*),Opt_cal_data(*)
1475     !
1480     LOOP
1485        CALL Clr_scr
1490        Message$="Select device type."
1495        CALL Prompt_keys("E/O,O/E,OPT1P,E/E,O/O",
Key_pressed$,Message$)
1500        !
150        OUTPUT Dut_addr;"CORROFF;"  ! TURN
CORRECTION OFF
1510        !
1515        SELECT Key_pressed$
1520        CASE "E/O"
1525           CALL Vna_swp_cont(Dut_addr,"HOLD")
1530           CALL Moxie_et_drvr(Sw_addr,"ELECTRICAL
 TO OPTICAL")
1535           Type_num$="1"
1540           GOSUB Retrieve_data
1541           CALL Vna_scale_ref(Dut_addr,"REF VAL",
-35)
1542                   CALL  Vna_scale_ref(Dut_addr,"PER
DIVISION",5)
1550        CASE "O/E"
1555           CALL Vna_swp_cont(Dut_addr,"HOLD")
1560           CALL Moxie_et_drvr(Sw_addr,"OPTICAL
 TO ELECTRICAL")
1565           Type_num$="2"
1570           GOSUB Retrieve_data
1571           CALL Vna_scale_ref(Dut_addr,"REF VAL",0)
1572                   CALL  Vna_scale_ref(Dut_addr,"PER
DIVISION",10)
1580        CASE "OPT1P"
1585           CALL Vna_swp_cont(Dut_addr,"HOLD")
1590              CALL Moxie_et_drvr(Sw_addr,"OPTICAL TO
OPTICAL")
1595           Type_num$="3"
1600           GOSUB Retrieve_data
1601              CALL Vna_scale_ref(Dut_addr,"REF VAL",
-20)
1602           CALL Vna_scale_ref(Dut_addr,"PER
```

```
DIVISION",5)
1625         CASE "E/E"
1630            CALL Vna_swp_cont(Dut_addr,"HOLD")
1635            CALL Moxie_et_drvr(Sw_addr,"ELECTRICAL
 TO ELECTRICAL")
1640         CASE "O/O"
1645            CALL Vna_swp_cont(Dut_addr,"HOLD")
1650            CALL Moxie_et_drvr(Sw_addr,"OPTICAL
 TO OPTICAL")
1655         END SELECT
1660         !
1670         CALL Vna_swp_cont(Dut_addr,"CONTINUOUS")
1680         OUTPUT Dut_addr;"MENUSCAL;"
1685         OUTPUT Dut_addr;"ENTO;"
1690         LOCAL Dut_addr
1695      END LOOP
1700      !
1705 Retrieve_data:  !
1710      IF SUM(Opt_cal_data)=0 THEN
1720         OUTPUT Dut_addr;"USEPASC;"
1725         OUTPUT Dut_addr;"REFT;"
1730         OUTPUT Dut_addr;"LOAD"&Type_num$&";"
1735         SEND 7;TALK 16 CMD 9
1740 Sit:    STATUS 7,6;Stat
1745         IF NOT BIT(Stat,6) THEN Sit
1755      ELSE
1760         OUTPUT Dut_addr;"RECA"&Type_num$&";"
1761         SELECT Key_pressed$
1762         CASE "E/O"
1763            CALL Vna_write_cal(Dut_addr,"RESPONSE",
Srce_cal_data(*))
1765         CASE "O/E"
1766            CALL Vna_write_cal(Dut_addr,"RESPONSE",
Rcvr_cal_data(*))
1768         CASE "OPT1P"
1769            CALL Vna_write_cal(Dut_addr,"RESPONSE",
Opt_cal_data(*))
1773         END SELECT
1774      END IF
1775      RETURN
1776   SUBEND
1780   !*******************************************

1785   SUB Clr_scr
1790  Doc_on:GOTO Doc_off   !  D.1       Clr_scr
1795   !==========================================
1800   !  PART OF : DISPLAY TOOLS
1805   !------------------------------------------
1810   !  PURPOSE : Clear the controller CRT.
1815   !------------------------------------------
1820   !
1825   !  This subprogram outputs to the keyboard a
```

```
clear screen command.
1830  !-------------------------------------------
1835  !  PASS PARAMETERS :  NONE
1840  !-------------------------------------------
1845  !  CONSIDERATIONS :
1850  !-------------------------------------------
1855  !  CALLS :             NONE
1860  !-------------------------------------------
1865  !  REVISIONS :
1870  !
1875  !     B  02/27/86  cfa  updated documentation
format.
1880  !     A  01/30/84  cfa  GENERAL RELEASE
1885  !===========================================
1890 Doc_off: !
1895 Clr_scr:  ! no pass parameters
1900  !===========================================
1905     OUTPUT 2;CHR$(255)&"K";
1910     GRAPHICS OFF
1915     !
1920  SUBEND
1925  !
1930  !*******************************************
1935  !
1940  SUB Vna_calibrate(INTEGER Vna_addr,Device$,Cal
_type$,Cal_std$)
1945 Doc_on:GOTO Doc_off   ! Vna_calibrate
1950  !===========================================
1955  !  PURPOSE:  To perform calibration on the
Lightwave Network Analyzer.
1960  !-------------------------------------------
1965  !  INPUT PARAMETERS:
1970  !
1975  !     Vna_addr        An INTEGER that specifies
 the address
1980  !                     of the Vector Analyzer
 to be controlled.
1985  !
1990  !     Device$         A string variable that
 specifies the type
1995  !                     of device that the
calibration is for.
2000  !
2005  !                     |"1 PORT ELECTRICAL"|
"1 PORT OPTICAL"
2010  !                     |"ELECTRICAL TO ELECTRICAL"
|"ELECTRICAL TO OPTICAL"
2015  !                     |"OPTICAL TO ELECTRICAL"
|"OPTICAL TO OPTICAL"
2020  !
2025  !
2030  !     Cal_type$       A string variable that
```

```
 specifies the calibration
2035  !                        to be performed. Cal_
type is dependent on Device$.
2040  !
2045  !                        |"PORT 1"|"1 PORT S11
"|"RESPONSE"|
2050  !              ***       |"RESPONSE AND ISOLATION"
|"RESPONSE AND ISOL"
2055  !
2060  !     Cal_std$           A string variable that
 specifies the calibration
2065  !                        standard to be used Cal
_std is dependent on Device$
2070  !                        and Cal_type$.
2075  !
2080  !                        |"OPEN/SHORT/LOAD"|
"REFLECTOR","FRESNEL"
2085  !                        |"OPEN"|"SHORT"|"THRU"
|"RECEIVER"|"SOURCE"
2090  !                        |"THRU/RCVR"|"LOAD"
2095  !
2100  !
2105  !-----------------------------------------
2110  !  FOR MODULE BEHAVIOR FOR DIFFERENT COMMANDS
 SEE VNA MANUAL
2115  ! The following is the allowable combinations
 of input parameters at
2120  ! this time. Please feel free to add cases as
 required.
2125  !
2130  !       Device$
2135  !       I. "1 PORT ELECTRICAL"
2140  !              Cal_type$
2145  !              i. "1 PORT S11"
2150  !                     Cal_std$
2155  !                     a. "OPEN/SHORT/LOAD"
2160  !
2165  !       II. "1 PORT OPTICAL"
2170  !              Cal_type$
2175  !              i. "RESPONSE"
2180  !                     Cal_std$
2185  !                     a. "REFLECTOR"
2190  !                     b. "FRESNEL"
2195  !                     c. "THRU"
2200  !
2205  !      III. "ELECTRICAL TO ELECTRICAL"
2210  !              Cal_type$
2215  !              i. "RESPONSE"
2220  !                     Cal_std$
2225  !                     a. "SHORT"
2230  !                     b. "OPEN"
2235  !                     c. "THRU"
```

```
2240 !     ***     ii. "RESPONSE AND ISOL" or "RESPONSE AND ISOLATION"
2245 !                      Cal_std$
2250 !                      a. "THRU"  for RESPONSE
2255 !                      b. "LOAD"  FOR ISOLATION
2260 !
2265 !        IV. "OPTICAL TO ELECTRICAL"
2270 !               Cal_type$
2275 !               i. "RESPONSE"
2280 !                      Cal_std$
2285 !                      a. "RECEIVER"
2290 !
2295 !         V. "ELECTRICAL TO OPTICAL"
2300 !               Cal_type$
2305 !               i. "RESPONSE"
2310 !                      Cal_std$
2315 !                      a. "SOURCE"
2320 !                      b. "THRU/RCVR"
2325 !
2330 !        VI. "OPTICAL TO OPTICAL"
2335 !               Cal_type$
2340 !               i. "RESPONSE"
2345 !                      Cal_std$
2350 !                      a. "REFLECTOR"
2355 !                      b. "FRESNEL"
2360 !                      c. "THRU"
2365 !     ***       i. "RESPONSE AND ISOL" or "RESPONSE AND ISOLATION"
2370 !                      Cal_std$
2375 !                      a. "THRU"  for RESPONSE
2380 !                      b. "LOAD"  FOR ISOLATION
2385 !
2390 !     NOTE This subprogram will do the data transfer with form 3.
2395 !
2400 ! *** RESPONSE AND ISOLATION or RESPONSE AND ISOL requires two calls,
2405 ! one with Cal_std$="THRU" and one with Cal_std$="LOAD" so that test
2410 ! can set averaging etc. before isolation standard is measured.
2415 !
2420 !---------------------------------------------
2425 !  MODULE BEHAVIOR WHEN GIVEN OUT OF RANGE VALUES;
2430 !
2435 !     NO OUT OF RANGE TRAPPING DONE.
2440 !
2445 !---------------------------------------------
2450 !  CONSIDERATIONS;
2455 !
2460 !---------------------------------------------
```

```
2465  !  OTHER SUBPROGRAMS CALLED;
2470  !
2475  ! Error_manager
2480  !-----------------------------------------
2485  !  REVISIONS;
2490  !
2495  !     AA          Evelyn James          14 Dec  88
2500  !=========================================
2505 Doc_off:  !
2510 Vna_calibrate:    ! (Vna_addr,Device$,Cal_type$,
Cal_std$)
2515  !=========================================
2520      DIM Error_msg$[80]
2525      DIM Cal_command$[20],Std_command$(3)[20],
Std_name$(3)[7]
2530      INTEGER Num_stds
2535      !
2540      Num_stds=1 !initialize to 1
2545      !
2550      SELECT UPC$(TRIM$(Device$))
2555      CASE "1 PORT ELECTRICAL"
2560         SELECT UPC$(TRIM$(Cal_type$))
2565         CASE "1 PORT S11"
2570            Cal_command$="CALIS111"
2575            SELECT UPC$(TRIM$(Cal_std$))
2580            CASE "OPEN/SHORT/LOAD"
2585               Num_stds=3
2590               Std_command$(1)="CLASS11A"
2595               Std_command$(2)="CLASS11B"
2600               Std_command$(3)="CLASS11C"
2605               Std_name$(1)="OPEN"
2610               Std_name$(2)="SHORT"
2615               Std_name$(3)="LOAD"
2620            CASE ELSE
2625               Error_msg$="Unrecognized Cal_std
$ parameter; """&Cal_std$&""""
2630               GOTO Param_error
2635            END SELECT                    ! Cal_
std$
2640            Done_command$="SAV1"
2645         CASE ELSE
2650            Error_msg$="Unrecognized Cal_type$
parameter; """&Cal_type$&""""
2655            GOTO Param_error
2660         END SELECT                    ! Cal_type$
2665         !
2670      CASE "1 PORT OPTICAL"
2675         SELECT UPC$(TRIM$(Cal_type$))
2680         CASE "RESPONSE"
2685            Cal_command$="CALIRESP"
2690            SELECT UPC$(TRIM$(Cal_std$))
2695            CASE "REFLECTOR"
```

```
2700                Std_command$(1)="STANA"
2705             CASE "FRESNEL"
2710                Std_command$(1)="STANB"
2715             CASE "THRU"
2720                Std_command$(1)="STANC"
2725             CASE ELSE
2730                Error_msg$="Unrecognized Cal_std
$ parameter; """&Cal_std$&""""
2735                GOTO Param_error
2740             END SELECT                   ! Cal_
std$
2745             Done_command$="RESPDONE"
2750          CASE ELSE
2755             Error_msg$="Unrecognized Cal_type$
parameter; """&Cal_type$&""""
2760             GOTO Param_error
2765          END SELECT                   ! Cal_type$
2770          !
2775       CASE "ELECTRICAL TO ELECTRICAL"
2780          SELECT UPC$(TRIM$(Cal_type$))
2785          CASE "RESPONSE"
2790             Cal_command$="CALIRESP"
2795             SELECT UPC$(TRIM$(Cal_std$))
2800             CASE "SHORT"
2805                Std_command$(1)="STANA"
2810             CASE "OPEN"
2815                Std_command$(1)="STANB"
2820             CASE "THRU"
2825                Std_command$(1)="STANC"
2830             CASE ELSE
2835                Error_msg$="Unrecognized Cal_std
$ parameter; """&Cal_std$&""""
2840                GOTO Param_error
2845             END SELECT                   ! Cal_std$
2850             Done_command$="RESPDONE"
2855             !
2860          CASE "RESPONSE AND ISOL","RESPONSE AND
 ISOLATION"
2865                                       !requires two
 calls to this driver. One
2870                ! with Cal_std$="THRU" and one with
 Cal_std$="LOAD" so that
2875                ! the test can set averages etc for
 isol & still resume cal
2880             SELECT UPC$(TRIM$(Cal_std$))
2885             CASE "THRU"
2890                Cal_command$="CALIRAI"
2895                OUTPUT Vna_addr;Cal_command$
2900                Cal_command$="RAIRESP"
2905                Std_command$(1)="STANC"
2910                Done_command$="RESPDONE"
2915             CASE "LOAD"
```

```
2920            Cal_command$="RESC"
2925            Std_command$(1)="RAIISOL"
2930            Done_command$="RAID"
2935         CASE ELSE
2940            Error_msg$="Unrecognized Cal_std
$ parameter; """&Cal_std$&""""
2945            GOTO Param_error
2950         END SELECT
2955      CASE ELSE
2960         Error_msg$="Unrecognized Cal_type$
parameter; """&Cal_type$&""""
2965         GOTO Param_error
2970      END SELECT                 ! Cal_type$
2975      !
2980   CASE "OPTICAL TO ELECTRICAL"
2985      SELECT UPC$(TRIM$(Cal_type$))
2990      CASE "RESPONSE"
2995         Cal_command$="CALIRESP"
3000         SELECT UPC$(TRIM$(Cal_std$))
3005         CASE "RECEIVER"
3010            Std_command$(1)="STANA"
3015         CASE ELSE
3020            Error_msg$="Unrecognized Cal_std
$ parameter; """&Cal_std$&""""
3025            GOTO Param_error
3030         END SELECT                 ! Cal_std$
3035         Done_command$="RESPDONE"
3040      CASE ELSE
3045         Error_msg$="Unrecognized Cal_type$
parameter; """&Cal_type$&""""
3050         GOTO Param_error
3055      END SELECT                 ! Cal_type$
3060      !
3065   CASE "ELECTRICAL TO OPTICAL"
3070      SELECT UPC$(TRIM$(Cal_type$))
3075      CASE "RESPONSE"
3080         Cal_command$="CALIRESP"
3085         !
3090         SELECT UPC$(TRIM$(Cal_std$))
3095         CASE "SOURCE"
3100            Std_command$(1)="STANA"
3105         CASE "THRU/RCVR"
3110            Std_command$(1)="STANB"
3115         CASE ELSE
3120            Error_msg$="Unrecognized Cal_std
$ parameter; """&Cal_std$&""""
3125            GOTO Param_error
3130         END SELECT                 ! Cal_std$
3135         Done_command$="RESPDONE"
3140      CASE ELSE
3145         Error_msg$="Unrecognized Cal_type$
parameter; """&Cal_type$&""""
```

```
3150            GOTO Param_error
3155         END SELECT                    ! Cal_type$
3160         !
3165      CASE "OPTICAL TO OPTICAL"
3170         SELECT UPC$(TRIM$(Cal_type$))
3175         CASE "RESPONSE"
3180            Cal_command$="CALIRESP"
3185            SELECT UPC$(TRIM$(Cal_std$))
3190            CASE "REFLECTOR"
3195               Std_command$(1)="STANA"
3200            CASE "FRESNEL"
3205               Std_command$(1)="STANB"
3210            CASE "THRU"
3215               Std_command$(1)="STANC"
3220            CASE ELSE
3225               Error_msg$="Unrecognized Cal_std
$ parameter; """&Cal_std$&""""
3230               GOTO Param_error
3235            END SELECT                    ! Cal_std$
3240            Done_command$="RESPDONE"
3245            !
3250         CASE "RESPONSE AND ISOL","RESPONSE AND
 ISOLATION"
3255                                     !requires two
 calls to this driver. One
3260               ! with Cal_std$="THRU" and one with
 Cal_std$="LOAD" so that
3265               ! the test can set averages etc for
 isol & still resume cal
3270            SELECT UPC$(TRIM$(Cal_std$))
3275            CASE "THRU"
3280               Cal_command$="CALIRAI"
3285               OUTPUT Vna_addr;Cal_command$
3290               Cal_command$="RAIRESP"
3295               Std_command$(1)="STANC"
3300               Done_command$="RESPDONE"
3305            CASE "LOAD"
3310               Cal_command$="RESC"
3315               Std_command$(1)="RAIISOL"
3320               Done_command$="RAID"
3325            CASE ELSE
3330               Error_msg$="Unrecognized Cal_std
$ parameter; """&Cal_std$&""""
3335               GOTO Param_error
3340            END SELECT
3345         CASE ELSE
3350            DISP Cal_type$&" is an invalid Cal_
type, this is Vna_calibrate"
3355            GOTO Param_error
3360         END SELECT                    ! Cal_type$
3365         !
3370      CASE ELSE
```

```
3375        Error_msg$="Unrecognized Device$ parameter;
 """&Device$&""""
3380        GOTO Param_error
3385     END SELECT              ! Device$
3390     !
3395     OUTPUT Vna_addr;Cal_command$
3400     !
3405     FOR Std_num=1 TO Num_stds
3410        IF Num_stds>1 THEN
3415           DISP "Connect "&Std_name$(Std_num)&"
 to cal port then press continue"
3420           PAUSE
3425           DISP ""
3430        END IF
3435        !
3440        OUTPUT Vna_addr;"OPC?"
3445        OUTPUT Vna_addr;Std_command$(Std_num)
3450        ENTER Vna_addr;Dummy
3455     NEXT Std_num
3460     !
3465     OUTPUT Vna_addr;"OPC?"
3470     OUTPUT Vna_addr;Done_command$
3475     ENTER Vna_addr;Dummy
3480     !
3485     SUBEXIT
3490     !
3495 Param_error:     !
3500     CALL Error_manager("Vna_calibrate",Error_msg$)
3505     PAUSE
3510     !Stop
3515     STOP
3520  SUBEND   !Vna_calibrate
3525  !
3530  !-------------------------------------------
3535  !
3540  SUB Vna_read_cal(INTEGER Vna_addr,Cal_type$,
Cal_data(*))
3545 Doc_on:GOTO Doc_off    ! Vna_read_cal
3550  !===========================================
3555  !  PURPOSE:  To read a cal data array from the
 network analyzer.
3560  !-------------------------------------------
3565  !  INPUT PARAMETERS:
3570  !
3575  !     Vna_addr          An INTEGER that specifies
 the address
3580  !                       of the Vector Analyzer
 to be controlled.
3585  !
3590  !     Cal_type$         A string variable that
 specifies the
3595  !                       trace data to be passed.
```

```
3600  !
3605  !                       |"FULL 2 PT"|"FULL 2
PORT"|"PORT 1"|"1 PORT S11"
3610  !                       |"PORT 2"|"1 PORT S22"
|"RESPONSE"|
3615  !                       |"ONE PATH"|"ONE PATH
 2 PORT"
3620  !                       |"RESPONSE AND ISOLATION"
|"RESPONSE AND ISOL"
3625  !
3630  !-------------------------------------------
3635  !     OUTPUT PARAMETERS:
3640  !
3645  !  Cal_data(*)  Cal_data is a three (3)
dimensional array dimensioned
3650  !         as follows; (1:Num_error_terms,1:2,
1:Num_trace_points)
3655  !         or (0:Num_error_terms-1,0:1,0:Num_
trace_points-1)
3660  !
3665  ! where the second dimension contains the Real
 part and then the Imag part
3670  !-------------------------------------------
3675  !  MODULE BEHAVIOR FOR DIFFERENT COMMANDS;
3680  !
3685  !     COMMAND          MODULE ACTIONS TAKEN
3690  !     -------------    ---------------------
3695  !     FULL 2 PORT      Outputs the current full
 two port, 12 term error
3700  !  or FULL 2 PT        correction array.
3705  !
3710  !     1 PORT S11       Outputs current one port,
 reflection only 3 term
3715  !  or PORT 1           error correction array
 from Vna.
3720  !
3725  !     1 PORT S22      Outputs the current one
 port, reflection only 3 term
3730  !  or PORT 2          error correction array
 in reverse direction.
3735  !
3740  !     ONE PATH        Outputs the current one
 path two port 12 term
3745  !  or ONE PATH 2 PORT  error correction array.
3750  !
3755  !     RESPONSE        Outputs the current
frequency response 1 term
3760  !                     error correction array.
3765  !
3770  ! RESPONSE AND ISOL   Outputs the current
frequency response and isolation
3775  !or RESPONSE AND ISOLATION   2 term error
```

```
correction array.
3780  !
3785  !     NOTE This subprogram will do the data
transfer with form 3.
3790  !
3795  !----------------------------------------
3800  !  MODULE BEHAVIOR WHEN GIVEN OUT OF RANGE VALUES;
3805  !
3810  !     NO OUT OF RANGE TRAPPING DONE.
3815  !
3820  !----------------------------------------
3825  !  CONSIDERATIONS;
3830  !
3835  !----------------------------------------
3840  !  OTHER SUBPROGRAMS CALLED;
3845  !
3850  ! Vna_read_array
3855  ! FNVna_numcalterms
3860  !----------------------------------------
3865  !  REVISIONS;
3870  !
3875  !     AA          Evelyn James          14 Dec
 88
3880  !========================================
3885 Doc_off:  !
3890 Vna_read_cal:    ! (Vna_addr,Cal_type$,Cal_data(*))
3895  !========================================
3900     DIM Error_msg$[80]
3905     INTEGER Term_num,Num_terms
3910     !
3915     Lowerbound=BASE(Cal_data,3)
3920     Upperbound=BASE(Cal_data,3)+SIZE(Cal_data,3)-1
3925     !
3930     ALLOCATE Real_data(Lowerbound:Upperbound)
3935     ALLOCATE Imag_data(Lowerbound:Upperbound)
3940     !
3945     Num_terms=FNVna_numcalterms(Cal_type$)
3950     !
3955     FOR Term_num=1 TO Num_terms
3960        Trace$="CAL"&VAL$(Term_num)
3965        CALL Vna_read_array(Vna_addr,Trace$,Real_
data(*),Imag_data(*))
3970        IF Lowerbound=0 THEN
3975           MAT Cal_data(Term_num-1,0,*)= Real_data
3980           MAT Cal_data(Term_num-1,1,*)= Imag_data
3985        ELSE
3990           MAT Cal_data(Term_num,1,*)= Real_data
3995           MAT Cal_data(Term_num,2,*)= Imag_data
4000        END IF
4005     NEXT Term_num
4010     !
4015  SUBEND
```

```
4020  !
4025  !******************************************
4030  !
4035  SUB Vna_power(INTEGER Vna_addr,Power_cont$,
OPTIONAL Power,Pwr_mod_parm$,Mod_pwr)
4040 Doc_on:GOTO Doc_off   ! POWER CONTROL (internal
 leveling source
4045  !                           output power control)
4050  !==========================================
4055  !  PURPOSE; To provide for controlling the power
 output of
4060  !             the hp 8753B.
4065  !------------------------------------------
4070  !  INPUT PARAMETERS;
4075  !
4080  !     Vna_addr          An INTEGER that specifies
the address of
4085  !                         Network Analyzer to be
controlled.
4090  !
4095  !     Power_cont$         A string variable that
passes in the
4100  !                     power control parameter to
be set.
4105  !
4110  !                     [ "RF ON" | "RF OFF" ]
4115  !                      [ "CENTER"|"CENTER POWER"
]
4120  !                     [ "SPAN"|"POWER SPAN" ]
4125  !                     [ "START"|"START POWER" ]
4130  !                     [ "STOP"|"STOP POWER" ]
4135  !                     [ "POWER SWEEP ON"|"
POWER SWEEP OFF" ]
4140  !                      [ "POWER SLOPE ON"|"POWER
SLOPE OFF" ]
4145  !                        [ "OUTPUT POWER"|"POWER
LEVEL" ]
4150  !                         [ "POWER SWEEP"|"POWER
SLOPE" ]
4155  !
4160  !     Power             Only used with second set
of arguments.
4165  !                     Units are;
4170  !
4175  !                     "OUTPUT POWER" (dbm)
4180  !                     "POWER SWEEP"  (dB)
4185  !                     "POWER SLOPE"  (dB/G
Hz)
4190  !
4195  !     Pwr_mod_parm$     For some programming modes
two parameters
```

```
4200  !                              are needed to fully
program the power
4205  !                   for operation.  This
 optional parameter
4210  !                   can be used to provide the
second
4215  !                   parameter name.
4220  !
4225  !    Mod_pwr        A REAL variable that
 specifies the value
4230  !                           to set the second
parameter to.
4235  !
4240  !  NOTES;    1) This driver will set the network
analyzer into the
4245  !               power sweep mode with any of the
following values
4250  !                   for 'Power_cont$'; ["CENTER"
|"SPAN"|"START"|"STOP"
4255  !               |"POWER SWEEP ON"]
4260  !
4265  !             2) ["POWER SWEEP OFF"|"RF OFF"|"RF
ON"] will do
4270  !             nothing.
4275  !
4280  !            3) If the network analyzer is not in
the CW freq mode
4285  !               programming power sweep will set
the analyzer to
4290  !             CW freq = 1 GHz.
4295  !
4300  !-------------------------------------------
4305  !  MODULE BEHAVIOR FOR DIFFERENT COMMANDS;
4310  !
4315  !     COMMAND            MODULE ACTIONS TAKEN
4320  !     -------------      ---------------------
4325  !
4330  !      CENTER              Sets the center frequency
of a subsweep.
4335  !
4340  !     SPAN                Sets the frequency span of
a subsweep
4345  !                           about a specified center
frequency.
4350  !
4355  !     START              Sets the start frequency of
a subsweep.
4360  !
4365  !      STOP                Sets the stop frequency of
a subsweep.
4370  !
4375  !     POWER SWEEP ON   Turns on power sweep
```

```
4380  !     [POWER SWEEP]
4385  !
4390   !        NOTE:      Using the above values for'
Power_cont$'
4395  !               will set the network analyzer into
the
4400  !               power sweep mode.
4405  !
4410  !     POWER SLOPE ON   Turns on power slope.
4415  !
4420  !     POWER SLOPE OFF  Turns off power slope.
4425  !
4430  !     OUTPUT POWER     Sets the output power
 level to the value
4435  !     [POWER LEVEL]    provided by the input
 parameter 'Value'
4440  !                      in dBm.
4445  !
4450   !      POWER SLOPE        Set the amount of power
correction that is
4455  !                        to be added to the output
power for every
4460   !                             GHz of increase in
frequency and turns on
4465  !                      power slope in dB/GHz.
4470  !
4475  !       RF ON          \   Will do nothing as you
cannot turn off
4480  !     RF OFF         >  the source for an 8753B.
4485  !                    /
4490  !
4495  !-------------------------------------------
4500  !  MODULE BEHAVIOR WHEN GIVEN OUT OF RANGE VALUES;
4505  !
4510   !      Selecting  RF ON, RF OFF, POWER SWEEP or
will do nothing
4515  !     and will display an error message.
4520  !
4525  !-------------------------------------------
4530  !  CONSIDERATIONS;
4535  !
4540  !     Selecting POWER SWEEP OFF while in the power
sweep mode
4545   !      will set power span to 0.  If not in the
power sweep mode
4550  !     will do nothing.
4555  !
4560  !-------------------------------------------
4565  !  OTHER SUBPROGRAMS CALLED;
4570  !
4575  !-------------------------------------------
4580  !  REVISIONS;
```

```
4585  !
4590  !        05/07/88  cfa  initial test & debug
4595   !          03/09/88  cfa  added case for "OUTPUT
POWER"
4600  !        03/08/88  cfa  code review
4605  !        03/07/88  mc   initial code.
4610   !      0   02/19/88  cfa  outline documentation
form.
4615  !==========================================
4620 Doc_off:  !
4625 Vna_power: !(Vna_addr,Power_cont$,OPTIONAL Power,
Pwr_mod_parm$,Mod_pwr)
4630  !==========================================
4635     DIM Error_msg$[80],Err_msg2$[80],Units$[4]
4640  !------------------------------------------
4645     SELECT UPC$(TRIM$(Power_cont$))
4650     CASE "RF ON","RF OFF"
4655        PRINT RPT$("*",80)
4660        PRINT "INVALID ARGUMENT PASSED TO 'Vna
_power'; "&Power_cont$
4665        PRINT "This command will do nothing as
 the SOURCE of an"
4670        PRINT "8703A cannot be turned (OFF/ON)."
4675        PRINT RPT$("*",80)
4680     CASE "CENTER","CENTER POWER"
4685        IF NPAR=5 THEN
4690           SELECT UPC$(TRIM$(Pwr_mod_parm$))
4695           CASE "SPAN","POWER SPAN"
4700              OUTPUT Vna_addr;"POWS; CENT";Power;"
; SPAN";Mod_pwr
4705           CASE ELSE
4710              OUTPUT Vna_addr;"POWS; CENT";Power
4715              GOSUB Bad_secondary
4720              !stop
4725              STOP
4730           END SELECT
4735        ELSE
4740           IF NPAR>2 THEN
4745              OUTPUT Vna_addr;"POWS; CENT";Power
4750           ELSE
4755              Units$="dBm"
4760              GOSUB Missing_value
4765              !stop
4770              STOP
4775           END IF
4780        END IF
4785     CASE "SPAN","POWER SPAN"
4790        IF NPAR>2 THEN
4795        ELSE
4800           Units$="dB"
4805           GOSUB Missing_value
4810           !stop
```

```
4815            STOP
4820         END IF
4825      CASE "START","START POWER"
4830         IF NPAR=5 THEN
4835            SELECT UPC$(TRIM$(Pwr_mod_parm$))
4840            CASE "STOP","STOP POWER"
4845               OUTPUT Vna_addr;"POWS; STAR";Power;"
; STOP";Mod_pwr
4850            CASE ELSE
4855               OUTPUT Vna_addr;"POWS; STAR";Power
4860               GOSUB Bad_secondary
4865               !stop
4870               STOP
4875            END SELECT
4880         ELSE
4885            IF NPAR>2 THEN
4890               OUTPUT Vna_addr;"POWS; STAR";Power
4895            ELSE
4900               Units$="dBm"
4905               GOSUB Missing_value
4910               !stop
4915               STOP
4920            END IF
4925         END IF
4930      CASE "STOP","STOP POWER"
4935         IF NPAR>2 THEN
4940            OUTPUT Vna_addr;"POWS; STOP";Power
4945         ELSE
4950            Units$="dBm"
4955            GOSUB Missing_value
4960            !stop
4965            STOP
4970         END IF
4975      CASE "OUTPUT POWER","POWER LEVEL"
4980         IF NPAR>2 THEN
4985            OUTPUT Vna_addr;"POWE";Power
4990         ELSE
4995            Units$="dBm"
5000            GOSUB Missing_value
5005            !stop
5010            STOP
5015         END IF
5020      CASE "POWER SWEEP ON"
5025         IF NPAR=2 THEN
5030            OUTPUT Vna_addr;"POWS"
5035         ELSE
5040            OUTPUT Vna_addr;"POWS; SPAN";Power
5045         END IF
5050      CASE "POWER SWEEP OFF"
5055         OUTPUT Vna_addr;"POWS";"SPAN";0;"db"
5060      CASE "POWER SLOPE"
5065         IF NPAR<3 THEN
```

```
5070          Units$="dB/GHz"
5075          GOSUB Missing_value
5080          !STOP
5085          STOP
5090       ELSE
5095          OUTPUT Vna_addr;"SLOPE";Power
5100          OUTPUT Vna_addr;"SLOPOON"
5105       END IF
5110    CASE "POWER SLOPE ON"
5115       OUTPUT Vna_addr;"SLOPOON"
5120    CASE "POWER SLOPE OFF"
5125       OUTPUT Vna_addr;"SLOPOOFF"
5130    CASE ELSE
5135       Error_msg$="Unrecognized Power_cont$
parameter; """&Power_cont$&""""
5140       Error_manager("Vna_power",Error_msg$)
5145       PAUSE
5150       !stop
5155       STOP
5160    END SELECT
5165    !
5170    SUBEXIT
5175  !=============================================
5180 Missing_value: !
5185    Error_msg$="Missing optional pass parameter."
5190    Err_msg2$=Power_cont$&" function needs a
value in "&Units$
5195    Error_manager("Vna_power",Error_msg$,Err_msg2$)
5200    PAUSE
5205    RETURN
5210    !
5215 Bad_secondary:   !
5220    Error_msg$="Pwr_mod_parm$ = """&Pwr_mod_parm$&"
""which is NOT consistent"
5225    Err_msg2$="with the Power_cont$ parameter """
&Power_cont$&""""
5230    Error_manager("Vna_power",Error_msg$,Err_msg2$)
5235    PAUSE
5240    RETURN
5245    !
5250  !
5255  SUBEND
5260  !
5265  !********************************************
5270  !
5275  SUB Vna_preset(INTEGER Vna_addr)
5280 Doc_on:GOTO Doc_off   ! VECTOR ANALYZER PRESET
 DRIVER
5285  !=============================================
5290  !  PURPOSE:  To preset the hp 8753B.
5295  !---------------------------------------------
5300  !  REVISIONS;
```

```
5305 !
5310 !      AA  27 Dec 88 Evelyn James   added HOLD as
preset condition
5315 !          05/07/88  cfa  initial test
5320 !          03/09/88  cfa  debugging
5325 !          03/08/88  cfa  code review
5330 !          03/07/88  mc   initial code.
5335 !      0   02/25/88  cfa  initial definition.
5340 !============================================
5345 Doc_off:  !
5350 Vna_preset:    !(Vna_addr)
5355 !============================================
5360    INTEGER Select_code
5365 !--------------------------------------------
5370    DIM Error_msg$[80],Err_msg2$[80]
5375 !--------------------------------------------
5380    Debug=1
5385 !
5390     Error_msg$="hp 8700 family network analyzer at
bus address "&VAL$(Vna_addr)&" is not responding."
5395          Err_msg2$="Fix  the  problem  then  press
""CONTINUE"" when ready."
5400    Select_code=Vna_addr DIV 100
5405    !
5410    ON TIMEOUT Select_code,4 GOTO No_net_anal
5415    CLEAR Vna_addr
5420 Preset_net_anal:OUTPUT Vna_addr;"OPC?;PRES"
5425    ENTER Vna_addr;Junk
5430    IF Debug=1 THEN
5435       OUTPUT Vna_addr;"DEBU"
5440    END IF
5445    OUTPUT Vna_addr;"HOLD"
5450    OFF TIMEOUT Select_code
5455    SUBEXIT
5460 !============================================
5465 No_net_anal: !
5470    OFF TIMEOUT Select_code
5475       Error_manager("Vna_preset",Error_msg$,Err
_msg2$)
5480    SIGNAL FNSignal_num("TIMEOUT")
5485    ON TIMEOUT Select_code,4 GOTO No_net_anal
5490    GOTO Preset_net_anal
5495    !
5500 SUBEND
5505 !
5510 !*******************************************
5515 !
5520  SUB Vna_filter(INTEGER Vna_addr,Filter$,OPTIONAL
Filter_value)
5525 Doc_on:GOTO Doc_off   ! SIGNAL FILTERING
5530 !============================================
```

```
5535   !   PURPOSE:   To provide control parameters for
SIGNAL
5540  !           FILTERING used by the hp 8753B.
5545  !
5550  !------------------------------------------
5555  !  INPUT PARAMETERS:
5560  !
5565  !      Vna_addr          An INTEGER that specifies
the address
5570  !                        of the Vector Analyzer to
be controlled.
5575  !
5580  !      Filter$             A string  variable that
asses the type
5585  !                     filtering to be done.
5590  !
5595  !                           [["AVERAGE ON"|"AVERAGE
OFF"]
5600  !                     |["SMOOTHING ON"|"SMOOTHING
OFF"]
5605  !                     |"AVERAGE RESTART"
5610  !                          |["SET AVERAGING"|"SET
SMOOTHING"|"SET BW"]]
5615  !
5620  !        Filter_value        A  real  variable  that
specifies the value to
5625  !                     set the parameter to and is
only used for
5630  !                     "SET..." family.
5635  !                     SET AVERAGING     0 TO
 999 integers
5640  !                     SET SMOOTHING     0.05
 to 20% of span.
5645  !                     SET BW            10,3
0,100,300,1000,3000
5650  !
5655  !------------------------------------------
5660  !  MODULE BEHAVIOR FOR DIFFERENT COMMANDS;
5665  !
5670  !     COMMAND           MODULE ACTIONS TAKEN
5675  !     -------------     ---------------------
5680  !       AVERAGE  ON         Turns  on  the  averaging
function.
5685  !
5690  !      AVERAGE OFF       Turns off   the averaging
function.
5695  !
5700  !       SMOOTHING  ON       Turns  on  the  smoothing
function.
5705  !
5710  !       SMOOTHING OFF      Turns off the smoothing
function.
```

```
5715  !
5720  !      AVERAGE RESTART  Resets the sweep-to-sweep
averaging and
5725  !                       restarts the sweep count at
1 at the
5730  !                          beginning of the  next
sweep.
5735  !
5740  !      SET AVERAGING    Sets the averaging to the
value specified.
5745  !     AVERAGING
5750  !
5755  !      SET SMOOTHING    Sets the smoothing to the
value specified.
5760  !     SMOOTHING
5765  !
5770  !      SET BW           Sets the bandwidth to the
value specified.
5775  !     IF BW
5780  !-------------------------------------------
5785  !  MODULE BEHAVIOR WHEN GIVEN OUT OF RANGE VALUES;
5790  !
5795  !          Any argument for bandwidth below 10Hz
will cause
5800  !        an error message.
5805  !         Any argument from 10 up will set the IF
bandwidth to
5810  !          widest bandwidth that is less than or
equal to the
5815  !        argument.
5820  !
5825  !
5830  !-------------------------------------------
5835  !  CONSIDERATIONS;
5840  !
5845  !-------------------------------------------
5850  !  OTHER SUBPROGRAMS CALLED;
5855  !
5860  !-------------------------------------------
5865  !  REVISIONS;
5870  !
5875  !        05/07/88  cfa  testing & debugging
5880   !          03/29/88   cfa   restructured & added
missing parameter
5885  !                        trapping
5890  !        03/25/88  mmc  code review
5895  !        03/07/88  mmc  initial code
5900   !       0   02/19/88   cfa   outline documentation
form.
5905  !==========================================
5910 Doc_off:  !
```

```
5915 Vna_filter:      !(Vna_addr,Filter$,OPTIONAL Filter_value)
5920  !=========================================
5925     DIM Error_msg$[80]
5930  !-----------------------------------------
5935     SELECT UPC$(TRIM$(Filter$))
5940     CASE "SET AVERAGING","AVERAGING"
5945        IF NPAR=3 THEN
5950           OUTPUT Vna_addr;"AVERFACT";Filter_value
5955        ELSE
5960           Units$="count"
5965           GOSUB Missing_value
5970           !stop
5975           STOP
5980        END IF
5985     CASE "SET SMOOTHING","SMOOTHING"
5990        IF NPAR=3 THEN
5995           OUTPUT Vna_addr;"SMOOAPER";Filter_value
6000        ELSE
6005           Units$="% span"
6010           GOSUB Missing_value
6015           !stop
6020           STOP
6025        END IF
6030     CASE "SET BW","IF BW"
6035        IF NPAR=3 THEN
6040           OUTPUT Vna_addr;"IFBW";Filter_value
6045        ELSE
6050           Units$="Hz"
6055           GOSUB Missing_value
6060           !stop
6065           STOP
6070        END IF
6075     CASE "AVERAGE ON"
6080        OUTPUT Vna_addr;"AVEROON"
6085     CASE "AVERAGE OFF"
6090        OUTPUT Vna_addr;"AVEROFF"
6095     CASE "SMOOTHING ON"
6100        OUTPUT Vna_addr;"SMOOOON"
6105     CASE "SMOOTHING OFF"
6110        OUTPUT Vna_addr;"SMOOOOFF"
6115     CASE "AVERAGE RESTART"
6120        OUTPUT Vna_addr;"AVERREST"
6125     CASE ELSE
6130         Error_msg$="Unrecognized Filter$ parameter; """&Filter$&""""
6135        Error_manager("Vna_filter",Error_msg$)
6140        PAUSE
6145        !stop
6150        STOP
6155     END SELECT
6160     !
```

```
6165     SUBEXIT
6170   !=========================================
6175 Missing_value: !
6180     Error_msg$="Missing optional pass parameter."
6185      Err_msg2$=Filter$&" function needs a value in
"&Units$
6190         Error_manager("Vna_filter",Error_msg$,Err
_msg2$)
6195     PAUSE
6200     RETURN
6205     !
6210   SUBEND
6215   !
6220   !*******************************************
6225   !
6230    SUB Vna_mkr(INTEGER Vna_addr,Mkr_cont$,OPTIONAL
Mkr_set_data)
6235 Doc_on:GOTO Doc_off    ! MARKER CONTROL
6240   !=========================================
6245   !  PURPOSE:  To provide for controlling the
MARKER parameters
6250   !             of the hp 8753B.
6255   !  INPUT PARAMETERS:
6260   !
6265   !      Vna_addr         An INTEGER that specifies
the address
6270   !                       of the Vector Analyzer to
be controlled.
6275   !
6280   !      Mkr_cont$          A string variable that
specifies the
6285   !                            marker mode to be
programmed.
6290   !
6295   !                        ["1"|"2"|"3"|"4"|"BUCKET"
|"OFF"
6300   !                       |["PEAK SEARCH"|"MAX
SEARCH"]|"MIN SEARCH"
6305   !                          |["ZERO"|"DELTA"|"DELTA
ON"]|"DELTA OFF"
6310   !                       |["CONTINUOUS"|"INTERPOLATE
ON"]
6315   !                        |["DISCRETE"|"INTERPOLATE
OFF"]
6320   !                       |"STATS ON"|"STATS OFF"]
6325   !
6330   !     Mkr_set_data      Is used only when Mkr_cont$
is
6335   !                       ["1"|"2"|"3"|"4"|"BUCKET"].
For specified
6340   !                           marker, number is in
stimulus units.
```

```
6345  !                          For 'BUCKET' it is a trace
point number.
6350  !
6355  !----------------------------------------
6360  !  MODULE BEHAVIOR FOR DIFFERENT COMMANDS;
6365  !
6370  !     COMMAND              MODULE ACTIONS TAKEN
6375  !     -------------        ---------------------
6380  !      1,2,3,4              Makes the specified marker
the active
6385  !                              marker.  When optional
parameter is provided
6390  !                             then also positions the
marker.
6395  !
6400  !       BUCKET                 Is a trace point number
defining a single
6405  !                           piece of data representing
a measurement
6410  !                          at a single stimulus value.
6415  !
6420  !     OFF                  Turns off all markers.
6425  !
6430  !     PEAK SEARCH          Positions the active marker
to the maximum
6435  !     [MAX SEARCH]         value portion of the trace.
6440  !
6445  !      MIN SEARCH           Position the active marker
to the minimum
6450  !                          value of the trace.
6455  !
6460  !       ZERO                    Puts a fixed reference
marker at the present
6465  !                          active marker position.
6470  !
6475  !      DELTA ON              Turns on the DELTA marker
mode.
6480  !     [DELTA]
6485  !
6490  !      DELTA OFF            Turns off the DELTA marker
mode.
6495  !
6500   !        CONTINUOUS             Interpolates between
measured points to allow
6505  !                          the markers to be placed at
any point on the
6510  !                          trace.
6515  !
6520   !       DISCRETE               Places markers only on
measured trace points
6525  !                           determined by the stimulus
settings.
```

```
6530  !
6535  !     STATS ON          Turns on statistic values.
6540  !
6545  !     STATS OFF         Turns off statistic values.
6550  !
6555  !-------------------------------------------
6560  !  MODULE BEHAVIOR WHEN GIVEN OUT OF RANGE VALUES;
6565  !
6570  !     NO OUT OF RANGE TRAPPING DONE.
6575  !
6580  !-------------------------------------------
6585  !  CONSIDERATIONS;
6590  !
6595  !-------------------------------------------
6600  !  OTHER SUBPROGRAMS CALLED;
6605  !
6610  !-------------------------------------------
6615  !  REVISIONS;
6620  !
6625  !          05/09/88  cfa  debugging marker delta
stuff
6630  !          05/07/88  cfa  fixed NPAR test in
'BUCKET'
6635  !          03/29/88  cfa  restructured NPAR testing
6640  !          03/25/88  mmc  code review
6645  !          03/07/88  mmc  initial code
6650  !       0  02/19/88  cfa  outline documentation
form.
6655  !===========================================
6660 Doc_off:  !
6665 Vna_mkr:    ! (Vna_addr,Mkr_cont$,OPTIONAL Mkr_
set_data)
6670  !===========================================
6675     DIM Error_msg$[80],Err_msg2$[80],Marker$[20]
6680  !-------------------------------------------
6685     SELECT UPC$(TRIM$(Mkr_cont$))
6690     CASE "1","2","3","4"
6695        Marker$=TRIM$(Mkr_cont$)
6700        IF NPAR=2 THEN
6705           OUTPUT Vna_addr;"MARK"&Marker$
6710        ELSE
6715           OUTPUT Vna_addr;"MARK"&Marker$;Mkr_
set_data
6720        END IF
6725     CASE "BUCKET"
6730        IF NPAR=3 THEN
6735           OUTPUT Vna_addr;"MARKBUCK";Mkr_set_
data
6740        ELSE
6745                  Error_msg$="Missing optional pass
parameter."
```

```
6750            Err_msg2$="BUCKET function needs a trace point number."
6755            Error_manager("Vna_mkr",Error_msg$,Err_msg2$)
6760            PAUSE
6765            !stop
6770            STOP
6775         END IF
6780      CASE "DELTA ON","DELTA"
6785         IF NPAR=3 THEN
6790            Mkr_num$=VAL$(1+INT((Mkr_set_data-1) MOD 4))
6795            OUTPUT Vna_addr;"DELR"&Mkr_num$
6800         ELSE
6805                  Error_msg$="Missing optional pass parameter."
6810                  Err_msg2$="DELTA function needs a REFERENCE MARKER number."
6815            Error_manager("Vna_mkr",Error_msg$,Err_msg2$)
6820            PAUSE
6825            !stop
6830            STOP
6835         END IF
6840      CASE "OFF"
6845         OUTPUT Vna_addr;"MARKOFF"
6850      CASE "PEAK SEARCH","MAX SEARCH"
6855         OUTPUT Vna_addr;"SEAMAX"
6860      CASE "MIN SEARCH"
6865         OUTPUT Vna_addr;"SEAMIN"
6870      CASE "ZERO"
6875         OUTPUT Vna_addr;"MARKZERO"
6880      CASE "DELTA OFF"
6885         OUTPUT Vna_addr;"DELO"
6890      CASE "CONTINUOUS","INTERPOLATE ON"
6895         OUTPUT Vna_addr;"MARKCONT"
6900      CASE "DISCRETE","INTERPOLATE OFF"
6905         OUTPUT Vna_addr;"MARKDISC"
6910      CASE "STATS ON"
6915         OUTPUT Vna_addr;"MEASTATON"
6920      CASE "STATS OFF"
6925         OUTPUT Vna_addr;"MEASTATOFF"
6930      CASE ELSE
6935                  Error_msg$="Unrecognized Mkr_cont$ parameter; """&Mkr_cont$&""""
6940         Error_manager("Vna_mkr",Error_msg$)
6945         PAUSE
6950         STOP
6955      END SELECT
6960      !
6965   SUBEND
6970   !
```

```
6975  !*******************************************
6980  !
6985  SUB Vna_measure(INTEGER Vna_addr,Measurement$)
6990 Doc_on:GOTO Doc_off   ! MEASUREMENT TYPE CONTROL
6995  !
7000  !===========================================
7005  !  PURPOSE:  To provide control for selecting the
parameters
7010  !              or inputs to be measured on the hp
8753B.
7015  !-------------------------------------------
7020  !  INPUT PARAMETERS:
7025  !
7030  !      Vna_addr         An INTEGER that specifies
the address
7035  !                       of the Vector Analyzer to
be controlled.
7040  !
7045  !      Measurement$       A string variable that
specifies the
7050  !                          measurement mode to be
programmed.
7055  !
7060  !                      ["A"|"B"|"R"|"A/R"|"B
/R"|"A/B"|"S11"|"S12"
7065  !                      |"S21"|"S22"|"A BUS"]
7070  !
7075  !-------------------------------------------
7080  !  MODULE BEHAVIOR FOR DIFFERENT COMMANDS;
7085  !
7090  !     COMMAND            MODULE ACTIONS TAKEN
7095  !     -------------      --------------------
7100  !     A                  Measures the absolute power
amplitude
7105  !                        at input A.
7110  !
7115  !     B                  Measures the absolute power
amplitude
7120  !                        at input B.
7125  !
7130  !     R                  Measures the absolute power
amplitude
7135  !                        at input R.
7140  !
7145  !     A/R                Calculates the ratio of the
signal at
7150  !                          input A to the reference
signal at
7155  !                        input R.
7160  !
7165  !     B/R                Calculates the ratio of the
signal at
```

```
7170  !                      input B to the reference signal at
7175  !                    input R.
7180  !
7185  !    A/B             Calculates the ratio of the signal at
7190  !                      input A to the reference signal at
7195  !                    input B.
7200  !
7205  !    S11                Configures the S-parameter test set for
7210  !                    a measurement of S11.
7215  !
7220  !    S12                Configures the S-parameter test set for
7225  !                    a measurement of S12.
7230  !
7235  !    S21                Configures the S-parameter test set for
7240  !                    a measurement of S21.
7245  !
7250  !    S22                Configures the S-parameter test set for
7255  !                    a measurement of S22.
7260  !
7265  !    ABUS               Displays a DC or low freq AC auxiliary
7270  !                         voltage using the REAL format.
7275  !
7280  !-------------------------------------------
7285  !  MODULE BEHAVIOR WHEN GIVEN OUT OF RANGE VALUES;
7290  !
7295  !     NO OUT OF RANGE TRAPPING DONE.
7300  !
7305  !-------------------------------------------
7310  !  CONSIDERATIONS;
7315  !
7320  !-------------------------------------------
7325  !  OTHER SUBPROGRAMS CALLED;
7330  !
7335  !-------------------------------------------
7340  !  REVISIONS;
7345  !
7350  !         03/29/88  cfa  combined "A","B" & "R" cases, and
7355  !                        combined "S11","S12","S21" & "S22" cases.
7360  !         03/07/88  mmc  initial code
7365  !       0  02/19/88  cfa  outline documentation form.
```

```
7370  !=========================================
7375 Doc_off:  !
7380 Vna_measure:    ! (Vna_addr,Measurement$)
7385  !=========================================
7390      DIM Error_msg$[80]
7395  !-----------------------------------------
7400      SELECT UPC$(TRIM$(Measurement$))
7405      CASE "A","B","R"
7410                    OUTPUT  Vna_addr;"MEAS"&UPC$(TRIM$
(Measurement $))
7415      CASE "A/R"
7420         OUTPUT Vna_addr;"AR"
7425      CASE "B/R"
7430         OUTPUT Vna_addr;"BR"
7435      CASE "A/B"
7440         OUTPUT Vna_addr;"AB"
7445      CASE "S11","S12","S21","S22"
7450         OUTPUT Vna_addr;UPC$(TRIM$(Measurement
$))
7455      CASE "A BUS"
7460         OUTPUT Vna_addr;"ANAI"
7465      CASE ELSE
7470         Error_msg$="Unrecognized Measurement$
parameter; """&Measurement$&""""
7475         Error_manager("Vna_measure",Error_msg$)
7480         PAUSE
7485         !stop
7490         STOP
7495      END SELECT
7500      !
7505  SUBEND
7510  !
7515  !*****************************************
7520  !
7525  SUB Vna_points(INTEGER Vna_addr,Points$)
7530 Doc_on:GOTO Doc_off    ! TRACE POINTS
7535  !=========================================
7540  !  PURPOSE:  To provide the controlling parameters
for the
7545  !              selection of data points per sweep of
the hp 8753B.
7550  !-----------------------------------------
7555  !  INPUT PARAMETERS:
7560  !
7565  !      Vna_addr          An INTEGER that specifies
the address
7570  !                        of the Vector Analyzer to
be controlled.
7575  !
7580  !      Points$             A string variable that
passes the number
```

```
7585  !                      of trace points to set the
sweep to.
7590  !
7595  !                      ["3"|"11"|"26"|"51"|"101"|
"201"|"401"|"801"
7600  !                      |"1601"]
7605  !
7610  !-------------------------------------------
7615  !  MODULE BEHAVIOR FOR DIFFERENT COMMANDS;
7620  !
7625  !     COMMAND                MODULE ACTIONS TAKEN
7630  !     -------------          -------------------
7635  !     3,11,26,51,101,    \ The number of data points
per sweep
7640   !       201,401,801,1601  /  to  be  measured  and
displayed.
7645  !
7650  !-------------------------------------------
7655  !  MODULE BEHAVIOR WHEN GIVEN OUT OF RANGE VALUES;
7660  !
7665  !            Any argument from 1 to 1600 will set
the number of trace
7670  !              points to the smallest value above
that is equal to or
7675  !              greater than the argument.  Values
greater than 1601
7680  !            will display an error message.
7685  !
7690  !-------------------------------------------
7695  !  CONSIDERATIONS;
7700  !
7705  !-------------------------------------------
7710  !  OTHER SUBPROGRAMS CALLED;
7715  !
7720  !-------------------------------------------
7725  !  REVISIONS;
7730  !
7735  !       03/07/88  mmc  initial code
7740   !      0   02/19/88   cfa   outline documentation
form.
7745  !===========================================
7750 Doc_off:  !
7755 Vna_points:    ! (Vna_addr,Points$)
7760  !===========================================
7765    DIM Error_msg$[80]
7770  !-------------------------------------------
7775    SELECT (VAL(Points$))
7780    CASE <=3
7785       OUTPUT Vna_addr;"POIN";3
7790    CASE 4 TO 11
7795       OUTPUT Vna_addr;"POIN";11
7800    CASE 12 TO 26
```

```
7805        OUTPUT Vna_addr;"POIN";26
7810     CASE 27 TO 51
7815        OUTPUT Vna_addr;"POIN";51
7820     CASE 52 TO 101
7825        OUTPUT Vna_addr;"POIN";101
7830     CASE 102 TO 201
7835        OUTPUT Vna_addr;"POIN";201
7840     CASE 202 TO 401
7845        OUTPUT Vna_addr;"POIN";401
7850     CASE 402 TO 801
7855        OUTPUT Vna_addr;"POIN";801
7860     CASE 802 TO 1601
7865        OUTPUT Vna_addr;"POIN";1601
7870     CASE ELSE
7875         Error_msg$="Unrecognized Points$ parameter;
"""&Points$&""""
7880        Error_manager("Vna_points",Error_msg$)
7885        PAUSE
7890        !stop
7895        STOP
7900     END SELECT
7905     !
7910  SUBEND
7915  !
7920  !*******************************************
7925  !
7930  SUB Vna_marker_read(INTEGER Vna_addr,Mkr_data$,
Value_1,OPTIONAL Value_2,Value_3)
7935 Doc_on:GOTO Doc_off   ! READING MARKERS
7940  !=========================================
7945  !  PURPOSE:  To read the 8753B markers.
7950  !-----------------------------------------
7955  !  INPUT PARAMETERS:
7960  !
7965  !      Vna_addr         An INTEGER that specifies
the address
7970  !                       of the Vector Analyzer to
be controlled.
7975  !
7980  !       Mkr_data$         A string variable that
specifies the
7985  !                          marker reading to be
passed.
7990  !
7995  !                      ["ACTIVE"|"AMPLITUDE"]
8000  !                      ["STATS"|"STATISTICS"]
8005  !
8010  !-----------------------------------------
8015  !  MODULE BEHAVIOR FOR DIFFERENT COMMANDS;
8020  !
8025  !     COMMAND          MODULE ACTIONS TAKEN
8030  !     -------------    --------------------
```

```
8035  !      ACTIVE               Outputs the active marker
values.
8040  !     AMPLITUDE
8045  !
8050  !     STATISTICS         Outputs marker statistics.t
linear de
8055  !
8060  !-----------------------------------------
8065  !  OUTPUT PARAMETERS:
8070  !
8075  !       Value_1 \           These output parameters
return different
8080  !      Value_2  >         information depending on
the value of
8085  !      Value_3 /         Mkr_data$ input parameter.
The different
8090  !                        call lines are provided in
the index.
8095  !-----------------------------------------
8100  !  MODULE BEHAVIOR WHEN GIVEN OUT OF RANGE VALUES;
8105  !
8110  !     NO OUT OF RANGE TRAPPING DONE.
8115  !
8120  !-----------------------------------------
8125  !  CONSIDERATIONS;
8130  !
8135  !-----------------------------------------
8140  !  OTHER SUBPROGRAMS CALLED;
8145  !
8150  !-----------------------------------------
8155  !  REVISIONS;
8160  !
8165  !        03/29/88  cfa  added  NPAR handling
8170  !        03/07/88  mmc  initial code
8175  !       0   02/19/88   cfa   outline documentation
form.
8180  !=========================================
8185 Doc_off:  !
8190 Vna_marker_read:    ! (Vna_addr,Mkr_data$,Value_1,
OPTIONAL Value_2,value_3)
8195  !=========================================
8200      DIM Error_msg$[80]
8205      REAL V_2,V_3
8210  !-----------------------------------------
8215      SELECT UPC$(TRIM$(Mkr_data$))
8220      CASE "ACTIVE","AMPLITUDE"
8225         OUTPUT Vna_addr;"OUTPMARK"
8230         ENTER Vna_addr;Value_1,V_2,V_3
8235      CASE "STATS","STATISTICS"
8240         OUTPUT Vna_addr;"OUTPMSTA"
8245         ENTER Vna_addr;Value_1,V_2,V_3
8250      CASE ELSE
```

```
8255                  Error_msg$="Unrecognized  Mkr_data$
parameter; """&Mkr_data$&""""
8260          Error_manager("Vna_marker_read",Error_
msg$)
8265          PAUSE
8270          !stop
8275          STOP
8280       END SELECT
8285       !
8290       IF NPAR>3 THEN LET Value_2=V_2
8295       IF NPAR>4 THEN LET Value_3=V_3
8300       !
8305    SUBEND
8310    !
8315    !******************************************
8320    !
8325     SUB  Error_manager(Error_sub$,Error_msg$,OPTIONAL
Err_msg2$,Err_msg3$)
8330 Doc_on:GOTO Doc_off    !
8335    !=========================================
8340    !   PURPOSE ; This is just a patch job for use
until the approved
8345    !            TAIPAN II module is available.
8350    !=========================================
8355 Doc_off: !
8360 Error_manager: !
8365    !=========================================
8370       Save_screen
8375       Show_message("ERROR in subprogram;  "&Error_
sub$,8)
8380       Show_message(Error_msg$,10)
8385       !
8390       IF NPAR>2 THEN
8395          Show_message(Err_msg2$,11)
8400       END IF
8405       !
8410       IF NPAR>3 THEN
8415          Show_message(Err_msg3$,12)
8420       END IF
8425       !
8430       BEEP
8435       PAUSE
8440       Restore_screen
8445    SUBEND
8450    !
8455    !******************************************
8460    !
8465     SUB Vna_read_array(INTEGER Vna_addr,Trace$,Real_
data(*),OPTIONAL Imag_data(*))
8470 Doc_on:GOTO Doc_off    ! Vna_read_array
8475    !=========================================
```

```
8480  !  PURPOSE:  To read a data array from the network
analyzer using
8485   ! Vna_read_trace module and splitting the data
array into a real array
8490  ! and a imaginary array.
8495  !------------------------------------------
8500  !  INPUT PARAMETERS:
8505  !
8510  !      Vna_addr          An INTEGER that specifies
the address
8515  !                        of the Vector Analyzer to
be controlled.
8520  !
8525  !      Trace$               A string variable that
specifies the
8530  !                        trace data to be passed.
8535  !
8540  !                          ["CAL " + [1|2|3|4|5|6|7|
8|9|10|11|12]
8545  !                          |"RAW DATA"|"TRACE DATA"|
"FORMATTED TRACE"
8550  !                        |"MEMORY"]
8555  !
8560  !------------------------------------------
8565  !     OUTPUT PARAMETERS:
8570  !
8575    !    Real_data(*)    Real_data   is   a   one   (1)
dimensional array dimensioned
8580  !                 as follows; (1:Number_of_trace_
points)
8585  !               OR (0:Number_of_trace_points-1)
8590  !
8595    !    Imag_data(*)    Imag_data   is   a   one   (1)
dimensional array dimensioned
8600  !                 as follows; (1:Number_of_trace_
points)
8605  !               OR (0:Number_of_trace_points-1)
8610  !------------------------------------------
8615  !  MODULE BEHAVIOR FOR DIFFERENT COMMANDS;
8620  !
8625  !     COMMAND            MODULE ACTIONS TAKEN
8630  !     -------------      --------------------
8635  !      CAL                Outputs the selected error
coefficient from
8640  !                        the active channel.
8645  !
8650  !     RAW DATA           Output the uncorrected data
arrays from the
8655  !                           active channel into Real
and Imag data arrays.
8660  !
```

```
8665  !     TRACE DATA       Output the error corrected
data from the
8670  !                       active channel intosReal
and Imag data arrays.
8675  !
8680  !     FORMATTED TRACE  Output the formatted trace
data from
8685  !                       the active channel in to
Real data array only.
8690  !
8695  !      MEMORY           Outputs the memory trace
data from the
8700  !                       active channel into Real
and Imag data arrays.
8705  !
8710   !        NOTE This subprogram will do the data
transfer with form 3.
8715  !
8720  !-----------------------------------------
8725  !  MODULE BEHAVIOR WHEN GIVEN OUT OF RANGE VALUES;
8730  !
8735  !     NO OUT OF RANGE TRAPPING DONE.
8740  !
8745  !-----------------------------------------
8750  !  CONSIDERATIONS;
8755  !
8760  !-----------------------------------------
8765  !  OTHER SUBPROGRAMS CALLED;
8770  !
8775  ! Vna_read_trace
8780  !-----------------------------------------
8785  !  REVISIONS;
8790  !
8795  !     AA          Evelyn James          14 Dec
 88
8800  !=========================================
8805 Doc_off:  !
8810 Vna_read_array:    ! (Vna_addr,Trace$,Real_data(*),
Imag_data(*))
8815  !=========================================
8820      Lowerbound=BASE(Real_data,1)
8825         Upperbound=BASE(Real_data,1)+SIZE(Real_data,
1)-1
8830      !
8835      ALLOCATE Trace_data(Lowerbound:Upperbound,
Lowerbound:Lowerbound+1)
8840      !
8845           CALL  Vna_read_trace(Vna_addr,Trace$,Trace
_data(*))
8850      !
8855      MAT Real_data= Trace_data(*,Lowerbound)
8860      IF NPAR=4 THEN
```

```
8865        MAT Imag_data= Trace_data(*,Lowerbound+1)
8870     END IF
8875  SUBEND
8880  !
8885  !*****************************************
8890  !

8895  SUB Vna_write_cal(INTEGER Vna_addr,Cal_type$,
Cal_data(*))
8900 Doc_on:GOTO Doc_off    ! Vna_write_cal
8905  !=========================================
8910   !   PURPOSE:  To write a cal data array to the
network analyzer.
8915  !-----------------------------------------
----------------------
8920  !  INPUT PARAMETERS:
8925  !
8930   !      Vna_addr          An INTEGER that specifies
the address
8935  !                         of the Vector Analyzer to
be controlled.
8940  !
8945   !      Cal_type$           A string variable that
specifies the
8950  !                       trace data to be passed.
8955  !
8960  !                        |"FULL 2 PT"|"FULL 2 PORT"
|"PORT 1"|"1 PORT S11"
8965   !                          |"PORT 2"|"1 PORT S22"
|"RESPONSE"|
8970   !                         |"ONE PATH"|"ONE PATH 2
PORT"
8975   !                       |"RESPONSE AND ISOLATION"
|"RESPONSE AND ISOL"
8980  !
8985    !    Cal_data(*)    Cal_data  is  a  three  (3)
dimensional array dimensioned
8990  !         as follows; (1:Num_error_terms,1:2,1:Num_
trace_points)
8995   !          or (0:Num_error_terms-1,0:1,0:Num_trace_
points-1)
9000  !
9005   ! where the second dimension contains the Real
part and then the Imag part
9010  !-----------------------------------------
9015  !  MODULE BEHAVIOR FOR DIFFERENT COMMANDS;
9020  !
9025  !     COMMAND            MODULE ACTIONS TAKEN
9030  !     -------------      ---------------------
9035   !     FULL 2 PORT        Outputs the current full
two port, 12 term error
9040  !  or FULL 2 PT          correction array.
```

```
9045  !
9050  !     1 PORT S11       Outputs current one port,
reflection only 3 term
9055  !  or PORT 1         error correction array from
Vna.
9060  !
9065   !      1 PORT S22      Outputs the current one
port, reflection only 3 term
9070  !  or PORT 2          error correction array in
reverse direction.
9075  !
9080  !     ONE PATH       Outputs the current one path
two port 12 term
9085  !  or ONE PATH 2 PORT  error correction array.
9090  !
9095   !       RESPONSE             Outputs the current
frequency response 1 term
9100  !                          error correction array.
9105  !
9110    !  RESPONSE  AND  ISOL     Outputs  the  current
frequency response and isolation
9115    !or  RESPONSE  AND  ISOLATION     2  term  error
correction array.
9120  !
9125   !       NOTE This subprogram will do the data
transfer with form 3.
9130  !
9135  !-----------------------------------------
9140  !  MODULE BEHAVIOR WHEN GIVEN OUT OF RANGE VALUES;
9145  !
9150  !     NO OUT OF RANGE TRAPPING DONE.
9155  !
9160  !-----------------------------------------
9165  !  CONSIDERATIONS;
9170  !
9175  !-----------------------------------------
9180  !  OTHER SUBPROGRAMS CALLED;
9185  !
9190  ! Vna_write_array
9195  ! Vna_cal_type
9200  ! FNVna_numcalterms
9205  !-----------------------------------------
9210  !  REVISIONS;
9215  !
9220  !     AA         Evelyn James         14 Dec 88
9225  !=========================================
9230 Doc_off:  !
9235 Vna_write_cal:      !  (Vna_addr,Cal_type$,Cal_data
(*))
9240  !=========================================
9245     INTEGER Term_num,Num_terms
9250     !
```

```
9255      Lowerbound=BASE(Cal_data,3)
9260      Upperbound=BASE(Cal_data,3)+SIZE(Cal_data,3)-1
9265      !
9270      ALLOCATE Real_data(Lowerbound:Upperbound)
9275      ALLOCATE Imag_data(Lowerbound:Upperbound)
9280      !
9285      CALL Vna_cal_type(Vna_addr,Cal_type$)
9290      Num_terms=FNVna_numcalterms(Cal_type$)
9295      !
9300      FOR Term_num=1 TO Num_terms
9305         IF Lowerbound=0 THEN
9310            MAT Real_data= Cal_data(Term_num-1,0,*)
9315            MAT Imag_data= Cal_data(Term_num-1,1,*)
9320         ELSE
9325            MAT Real_data= Cal_data(Term_num,1,*)
9330            MAT Imag_data= Cal_data(Term_num,2,*)
9335         END IF
9340         Trace$="CAL"&VAL$(Term_num)
9345         CALL Vna_write_array(Vna_addr,Trace$,Real_
data(*),Imag_data(*))
9350      NEXT Term_num
9355      !
9360      OUTPUT Vna_addr;"OPC?"
9365      OUTPUT Vna_addr;"SAVC"
9370      ENTER Vna_addr;Dummy
9375   SUBEND
9380   !
9385   !*******************************************
9390   !
9395   SUB Vna_cal_type(INTEGER Vna_addr,Cal_type$)
9400  Doc_on:GOTO Doc_off  !   Vna_cal_type
9405   !===========================================
9410   !  PURPOSE: To set the type of calibration to be
done.
9415   !-------------------------------------------
9420   !  REVISIONS:
9425   !
9430   !     AA       Evelyn James       15 Dec 88
9435   !===========================================
9440  Doc_off: !
9445  Vna_cal_type: !(INTEGER Vna_addr,Cal_type$)
9450   !===========================================
9455   !
9460      DIM Error_msg$[80]
9465      !
9470      SELECT UPC$(TRIM$(Cal_type$))
9475      CASE "FULL 2 PT","FULL 2 PORT"
9480         OUTPUT Vna_addr;"CALIFUL2"
9485      CASE "PORT 1","1 PORT S11"
9490         OUTPUT Vna_addr;"CALIS111"
9495      CASE "PORT 2","1 PORT S22"
9500         OUTPUT Vna_addr;"CALIS221"
```

```
9505      CASE "RESPONSE"
9510         OUTPUT Vna_addr;"CALIRESP"
9515      CASE "ONE PATH","ONE PATH 2 PORT"
9520         OUTPUT Vna_addr;"CALIONE2"
9525         CASE "RESPONSE AND ISOLATION","RESPONSE AND
ISOL"
9530         OUTPUT Vna_addr;"CALIRAI"
9535      CASE ELSE
9540                  Error_msg$="Unrecognized Cal_type$
parameter; """&Cal_type$&""""
9545         Error_manager("Vna_cal_type",Error_msg$)
9550         PAUSE
9555         !
9560         STOP
9565      END SELECT
9570      !
9575   SUBEND
9580   !
9585   !*******************************************
9590   !
9595   DEF FNVna_numcalterms(Cal_type$)
9600 Doc_on:GOTO Doc_off  !  Vna_numcalterms
9605   !==========================================
9610    !    PURPOSE: To return the number of error
correction coefficient
9615   !           terms of the hp 8703A for a particular
cal type.
9620   !------------------------------------------
9625   !  INPUT PARAMETERS:
9630   !
9635    !       Cal_type$          A string variable that
specifies the
9640   !                           trace data to be passed.
9645   !
9650   !                           |"FULL 2 PT"|"FULL 2
PORT"|"PORT 1"|"1 PORT S11"
9655   !                           |"PORT 2"|"1 PORT S22"
|"RESPONSE"|
9660    !                              |"ONE PATH"|"ONE PATH 2
PORT"
9665   !                            |"RESPONSE AND ISOLATION"
|"RESPONSE AND ISOL"
9670   !
9675   !  RETURN PARAMETER:
9680   !                           Real variable that contains
the number of
9685   !                           error coefficient terms for
the Cal_type$
9690   !
9695   !------------------------------------------
9700   !  REVISIONS:
9705   !
```

```
9710 !        Evelyn James                    16 Dec 88
9715 !==========================================
9720 Doc_off: !
9725 Vna_numcalterms: !(Cal_type$)
9730 !==========================================
9735    DIM Error_msg$[80]
9740    !
9745    SELECT UPC$(TRIM$(Cal_type$))
9750    CASE "FULL 2 PT","FULL 2 PORT"
9755       Num_terms=12
9760    CASE "PORT 1","1 PORT S11"
9765       Num_terms=3
9770    CASE "PORT 2","1 PORT S22"
9775       Num_terms=3
9780    CASE "RESPONSE"
9785       Num_terms=1
9790    CASE "ONE PATH","ONE PATH 2 PORT"
9795       Num_terms=12
9800      CASE "RESPONSE AND ISOLATION","RESPONSE AND
ISOL"
9805       Num_terms=2
9810    CASE ELSE
9815             Error_msg$="Unrecognized Cal_type$
parameter; """&Cal_type$&""""
9820       Error_manager("Vna_numcalterms",Error_msg$)
9825       PAUSE
9830       !Stop
9835       STOP
9840    END SELECT
9845    !
9850    RETURN Num_terms
9855 FNEND
9860 !
9865 !------------------------------------------
9870 !
9875  SUB Vna_read_trace(INTEGER Vna_addr,Trace$,Data
(*))
9880 Doc_on:GOTO Doc_off   ! Vna_read_trace
9885 !==========================================
9890 ! PURPOSE: To read a data array from the network
analyzer.
9895 !------------------------------------------
9900 ! INPUT PARAMETERS:
9905 !
9910 !     Vna_addr          An INTEGER that specifies
the address
9915 !                       of the Vector Analyzer to
be controlled.
9920 !
9925 !     TRACE$               A string variable that
specifies the
9930 !                      trace data to be passed.
```

```
9935  !
9940  !                         ["CAL " + [1|2|3|4|5|6|7|
8|9|10|11|12]
9945  !                          |"RAW DATA"|"TRACE DATA"
|"FORMATED TRACE"
9950  !                        |"MEMORY"]
9955  !
9960  !----------------------------------------
9965  !     OUTPUT PARAMETERS:
9970  !
9975     DATA(*)       Data is a two (2) dimension array
dimensioned
9980  !                  as follows; (0:number_of_trace_
points - 1,0:1)
9985  !                OR (1:number_of_trace_points,1:2)
9990  !
9995  !----------------------------------------
10000 !  MODULE BEHAVIOR FOR DIFFERENT COMMANDS;
10005 !
10010 !     COMMAND           MODULE ACTIONS TAKEN
10015 !     -------------     ---------------------
10020 !      CAL               Outputs the selected error
coefficient
10025 !                        from the active channel.
10030 !
10035 !      RAW DATA            Outputs uncorrected data
arrays for the
10040 !                        active channel.
10045 !
10050 !     TRACE DATA        Outputs the error corrected
data from
10055 !                        the active channel.
10060 !
10065 !     FORMATTED TRACE   Outputs the formatted trace
data from
10070 !                        the active channel.
10075 !
10080 !      MEMORY              Outputs the memory trace
data from the
10085 !                        active channel.
10090 !
10095  !       NOTE This subprogram will do the data
transfer with form 3.
10100 !
10105 !----------------------------------------
10110 !  MODULE BEHAVIOR WHEN GIVEN OUT OF RANGE VALUES;
10115 !
10120 !     NO OUT OF RANGE TRAPPING DONE.
10125 !
10130 !----------------------------------------
10135 !  CONSIDERATIONS;
10140 !
```

```
10145 !-----------------------------------------
10150 !  OTHER SUBPROGRAMS CALLED;
10155 !
10160 !-----------------------------------------
10165 !  REVISIONS;
10170 !
10175 !        03/29/88  cfa  combined "CAL" cases, and
combined "RAW"
10180 !                      cases.
10185 !        03/07/88  mmc  initial code
10190 !      0  02/19/88   cfa   outline documentation
form.
10195 !=========================================
10200 Doc_off: !
10205 Vna_read_trace:   ! (Vna_addr,Trace$,Data(*))
10210 !=========================================
10215    DIM Error_msg$[80],Trace_select$[36]
10220    INTEGER Preamble,Size
10225 !-----------------------------------------
10230    ASSIGN @Data TO Vna_addr;FORMAT OFF
10235    OUTPUT Vna_addr;"FORM3"
10240    !
10245    Trace_select$=FNVna_trace_sel$(Trace$)
10250    !
10255    IF Trace_select$="" THEN
10260       Error_msg$="Unrecognized Trace$ parameter;
"""&Trace$&""""
10265       Error_manager("Vna_read_trace",Error_msg$)
10270       PAUSE
10275       !stop
10280       STOP
10285    END IF
10290    !
10295    OUTPUT Vna_addr;"OUTP"&Trace_select$
10300    ENTER Vna_addr USING "#,W,W";Preamble,Size
10305    ENTER @Data;Data(*)
10310    !
10315 SUBEND
10320 !
10325 !*****************************************
10330 !
10335 DEF FNVna_trace_sel$(Trace$)
10340 Doc_on:GOTO Doc_off !   FNVna_trace_sel$
10345 !=========================================
10350 !  FUNCTION: To convert program trace specifiers
to the form used
10355 !              by the vector network analyzer.
10360 !-----------------------------------------
10365 !  INPUT PARAMETER:
10370 !
10375 !     Trace$              A string variable that
specifies a trace
```

```
10380 !                              in the network analyzers
memory.
10385 !
10390 !
10395 !  RETURN PARAMETER:
10400 !
10405 !                                A string variable that
specifies a trace
10410 !                              in the network analyzers
memory in the
10415 !                              form used by the network
analyzer.
10420 !
10425 !----------------------------------------
10430 !  REVISIONS:
10435 !
10440 !        05/13/88  cfa  debugging
10445 !        04/15/88  cfa  debugging
10450 !     0  04/04/88  cfa  separated from Vna_read_
trace.
10455 !========================================
10460 Doc_off:!
10465 Vna_trace_sel:!FN$(Trace$)
10470 !========================================
10475    DIM T$[32],Ts$[32],Nm$[20]
10480    INTEGER Nm,Ok
10485 !----------------------------------------
10490    T$=UPC$(TRIM$(Trace$))
10495    Ts$=T$
10500    !
10505    IF T$[1,3]="CAL" THEN
10510       Nm$=FNNumber$(T$)
10515       IF Nm$="" THEN
10520          Ok=0
10525       ELSE
10530          Nm=VAL(Nm$)
10535          Ok=1
10540       END IF
10545       !
10550       IF Ok AND 1<=Nm AND Nm<=12 THEN
10555          OUTPUT Ts$ USING "#,4A,2Z";"CALC",Nm
10560          RETURN Ts$
10565       ELSE
10570          RETURN ""
10575       END IF
10580    END IF
10585    !
10590    IF T$[1,3]="RAW" THEN
10595       IF T$="RAW DATA" THEN
10600          RETURN "RAW1"
10605       ELSE
10610          Nm$=FNNumber$(T$)
```

```
10615           IF Nm$="" THEN
10620              Ok=0
10625           ELSE
10630              Nm=VAL(Nm$)
10635              Ok=1
10640           END IF
10645           !
10650           IF Ok AND 1<=Nm AND Nm<=4 THEN
10655              OUTPUT Ts$ USING "#,3A,D";"RAW",Nm
10660              RETURN Ts$
10665           ELSE
10670              RETURN "RAW1"
10675           END IF
10680        END IF
10685     END IF
10690     !
10695     IF T$="TRACE DATA" THEN
10700        RETURN "DATA"
10705     END IF
10710     !
10715      IF T$[1,4]="FORM" THEN    ! "FORMATTED DATA",
"FORMATTED TRACE"
10720        RETURN "FORM"
10725     END IF
10730     !
10735     IF T$="MEMORY" THEN
10740        RETURN "MEMO"
10745     END IF
10750     !
10755     RETURN ""
10760     !
10765 FNEND
10770 !
10775 !*******************************************
10780 !
10785 DEF FNNumber$(String$)
10790 Doc_on:GOTO Doc_off !   FNNumber$
10795 !==========================================
10800 !  FUNCTION: To read a number from a string when
the starting
10805 !               position of the numeric characters
is not known.
10810 !------------------------------------------
10815 !  CONSIDERATIONS:
10820 !
10825 !     Will ONLY read the first valid number in the
string.
10830 !
10835 !     The first of the following characters in the
string will
10840 !  mark the start of the number field to be read;
10845 !
```

```
10850 !  [ + | - | 0 | 1 | 2 | 3 | 4 | 5 | 6 | 7 | 8 |
9 ]
10855 !  The period will also be used to start a number
if the character
10860 !  that immediately follows the period is a digit.
10865 !
10870 !     RETURNS THE NUMBER READ IN STRING FORM
10875 !     NULL STRING RETURNED IF NO NUMBER FOUND
10880 !
10885 !-------------------------------------------
10890 !  REVISIONS:
10895 !
10900 !        04/15/88  cfa  changed to string function
10905 !     0  04/04/88  cfa  initial
10910 !===========================================
10915 Doc_off:!
10920 Number:!fn(String$)
10925 !===========================================
10930    INTEGER C,L,P,D
10935 !-------------------------------------------
10940    L=LEN(String$)
10945    !
10950    REPEAT
10955       P=P+1
10960       C=NUM(String$[P])
10965       IF 48<=C AND C<=57 OR C=43 OR C=45 THEN
10970          Found_num=1
10975       END IF
10980       IF C=46 AND P<L THEN
10985          Nc=NUM(String$[P+1])
10990          IF 48<=Nc AND Nc<=57 THEN
10995             Found_num=1
11000          END IF
11005       END IF
11010    UNTIL Found_num OR P>=L
11015    !
11020    IF Found_num THEN
11025       RETURN VAL$(VAL(String$[P]))
11030    ELSE
11035       RETURN ""
11040    END IF
11045    !
11050 FNEND
11055 !
11060 !*******************************************
11065 !
11070 SUB Vna_write_array(INTEGER Vna_addr,Trace$,
Real_data(*),OPTIONAL Imag_data(*))
11075 Doc_on:GOTO Doc_off  ! Vna_write_array
11080 !===========================================
11085 !  PURPOSE:  To load a data array into the network
analyzer using
```

```
11090 !  two data arrays, one with the real part and one with the imaginary
11095 !  part.
11100 !-------------------------------------------
11105 !  INPUT PARAMETERS:
11110 !
11115 !      Vna_addr          An INTEGER that specifies the address
11120 !                        of the Vector Analyzer to be controlled.
11125 !
11130 !      Trace$              A string variable that specifies the
11135 !                        trace data to be passed.
11140 !
11145 !                        ["CAL " + [1|2|3|4|5|6|7|8|9|10|11|12]
11150 !                         |"RAW DATA"|"TRACE DATA"|"FORMATED TRACE"
11155 !                        |"MEMORY"]
11160 !
11165  !    Real_data(*)    Real_data  is  a  one  (1) dimensional array dimensioned
11170 !                    as follows; (1:Number_of_trace_points)
11175 !                  OR (0:Number_of_trace_points-1)
11180 !
11185  !    Imag_data(*)    Imag_data  is  a  one  (1) dimensional array dimensioned
11190 !                    as follows; (1:Number_of_trace_points)
11195 !                  OR (0:Number_of_trace_points-1)
11200 !-------------------------------------------
11205 !  MODULE BEHAVIOR FOR DIFFERENT COMMANDS;
11210 !
11215 !     COMMAND          MODULE ACTIONS TAKEN
11220 !     -------------    ---------------------
11225 !     CAL               Inputs the selected error coefficient to
11230 !                      the active channel.
11235 !
11240  !      RAW  DATA         Input uncorrected data arrays to the
11245 !                       active channel, fills Real and Imag data arrays.
11250 !
11255 !     TRACE  DATA       Inputs the error corrected data to the
11260 !                       active channel, fills Real and Imag data arrays.
11265 !
```

```
11270 !      FORMATTED TRACE  Inputs the formatted trace
data to
11275 !                            the active channel in to
Real data array only.
11280 !
11285 !      MEMORY               Inputs the memory trace
data to the
11290 !                            active channel into Real
and Imag data arrays.
11295 !
11300 !        NOTE This subprogram will do the data
transfer with form 3.
11305 !
11310 !----------------------------------------
11315 !  MODULE BEHAVIOR WHEN GIVEN OUT OF RANGE VALUES;
11320 !
11325 !     NO OUT OF RANGE TRAPPING DONE.
11330 !
11335 !----------------------------------------
11340 !  CONSIDERATIONS;
11345 !
11350 !----------------------------------------
11355 !  OTHER SUBPROGRAMS CALLED;
11360 !
11365 ! Vna_load_trace
11370 !----------------------------------------
11375 !  REVISIONS;
11380 !
11385 !     AA          Evelyn James         14 Dec 88
11390 !========================================
11395 Doc_off: !
11400 Vna_write_array:   ! (Vna_addr,Trace$,Real_data
(*),Imag_data(*))
11405 !========================================
11410 !
11415    Lowerbound=BASE(Real_data,1)
11420       Upperbound=BASE(Real_data,1)+SIZE(Real_data,
1)-1
11425    !
11430    ALLOCATE Trace_data(Lowerbound:Upperbound,
Lowerbound:Lowerbound+1)
11435    !
11440    MAT Trace_data(*,Lowerbound)= Real_data
11445    IF NPAR=4 THEN
11450       MAT Trace_data(*,Lowerbound+1)= Imag_data
11455    END IF
11460    !
11465     CALL Vna_load_trace(Vna_addr,Trace$,Trace_data
(*))
11470    !
11475 SUBEND
11480 !
```

```
11485 !*******************************************
11490 !
11495  SUB  Vna_load_trace(INTEGER  Vna_addr,Trace$,Data
(*))
11500 Doc_on:GOTO Doc_off  !  Vna_load_trace
11505 !===========================================
11510 !  PURPOSE: To load the network analyzer with a
data array.
11515 !-------------------------------------------
11520 !  INPUT PARAMETERS:
11525 !
11530 !     Vna_addr          An INTEGER that specifies
the address
11535 !                       of the Vector Analyzer to
be controlled.
11540 !
11545 !     Trace$              A string variable that
specifies the
11550 !                      trace data to be passed.
11555 !
11560 !                      ["CAL " + [1|2|3|4|5|6|7|8|
9|10|11|12]
11565 !                        |"RAW DATA"|"TRACE DATA"|
"FORMATED TRACE"
11570 !                      |"MEMORY"]
11575 !
11580 !
11585 !     Data(*)          Data is a two (2) dimension
array
11590 !                      dimensioned as follows;
11595 !                       (1:number_of_trace_points,
1:2)  or
11600 !                      (0:number_of_trace_points -
1,0:1)
11605 !
11610 !-------------------------------------------
11615 !  MODULE BEHAVIOR FOR DIFFERENT COMMANDS;
11620 !
11625 !     COMMAND          MODULE ACTIONS TAKEN
11630 !     -------------    ---------------------
11635 !     CAL                Inputs the selected error
coefficient to
11640 !                      the active channel.
11645 !
11650 !     RAW DATA            Inputs uncorrected data
arrays to the
11655 !                      active channel.
11660 !
11665 !     TRACE DATA        Inputs the error corrected
data to the
11670 !                      active channel.
11675 !
```

```
11680 !     FORMATTED TRACE  Inputs the formatted trace
data to the
11685 !                       active channel.
11690 !
11695 !     MEMORY               Inputs the memory trace
data to the
11700 !                       active channel.
11705 !
11710 !       NOTE This subprogram will do the data
transfer with form 3.
11715 !
11720 !--------------------------------------
11725 !  MODULE BEHAVIOR WHEN GIVEN OUT OF RANGE VALUES;
11730 !
11735 !     NO OUT OF RANGE TRAPPING DONE.
11740 !
11745 !--------------------------------------
11750 !  CONSIDERATIONS;
11755 !
11760 !--------------------------------------
11765 !  OTHER SUBPROGRAMS CALLED;
11770 !
11775 !--------------------------------------
11780 !  REVISIONS;
11785 !
11790 !       0   04/04/88   cfa   outline documentation
form.
11795 !======================================
11800 Doc_off: !
11805 Vna_load_trace:!(INTEGER Vna_addr,Trace$,Data(*))
11810 !======================================
11815    INTEGER Preamble,Size,S
11820 !--------------------------------------
11825    DIM Error_msg$[80]
11830    S=SIZE(Data,1)
11835    Preamble=9025  ! EQUIVALENT TO ASCII "#A"
11840    Size=S*16      ! 16 BYTES PER DATA POINT
11845    !
11850    Trace_select$=FNVna_trace_sel$(Trace$)
11855    !
11860    IF Trace_select$="" THEN
11865        Error_msg$="Unrecognized Trace$ parameter;
"""&Trace$&""""
11870       Error_manager("Vna_load_trace",Error_msg$)
11875       PAUSE
11880       !stop
11885       STOP
11890    END IF
11895    !
11900    ASSIGN @Trace TO Vna_addr;FORMAT OFF
11905    Vna_swp_cont(Vna_addr,"HOLD")
11910    !
```

```
11915     OUTPUT Vna_addr;"INPU"&Trace_select$
11920     !
11925     OUTPUT Vna_addr;"FORM3;"
11930     OUTPUT Vna_addr USING "#,W,W";Preamble,Size
11935     OUTPUT @Trace;Data(*)
11940     !
11945 SUBEND
11950 !
11955 !*******************************************
11960 !
11965  SUB  Show_message(Message$,OPTIONAL  INTEGER
Line,Column)
11970 Doc_on:GOTO Doc_off  !  D.2.1    Show_message
11975 !==========================================
11980 !  PART OF : DISPLAY TOOLS
11985 !------------------------------------------
11990 !  PURPOSE : Print a message on the hp series 200
computer CRT
11995 !------------------------------------------
12000 !  DESCRIPTION :
12005 !
12010 !  This subprogram will print 'Message$' centered
on the CRT of
12015  !   a  hp  series  200  computer  if  no  optional
parameters passed.
12020 !  (CRT line 11)
12025 !
12030 !  If the optional parameter 'Line' is passed this
subprogram will
12035  !   print  the  message  centered  on  the  CRT  line
specified by 'Line'.
12040 !
12045  !   If  the  optional  parameter  'Column'  is  NOT
passed this
12050 !  subprogram will first print a full screen line
of blanks to
12055 !  erase the specified line.
12060 !
12065  !   If  the  optional  parameter  'Column'  is  passed
the first
12070  !   character of 'Message$' will be placed in the
column specified by
12075 !  'Column'.
12080 !
12085 !  If the length of 'Message$' is greater than the
CRT with the
12090 !  message will be placed starting at column 1 and
the message will
12095 !  wrap around to the next line.
12100 !
12105  !   If  the  optional  parameter  'Column'  is  passed
the length of
```

```
12110 !   'Message$' may cause the message to wrap around to the next
12115 !  line.
12120 !-----------------------------------------
12125 !  PASS PARAMETERS: (Message$, OPTIONAL INTEGER Line,Column)
12130 !
12135 !-----------------------------------------
12140 !  CONSIDERATIONS :
12145 !
12150 !      1) If wrap around does occur the portion that is
12155 !         printed on the following line may be overwritten and
12160 !            lost by subsequent calls to this subprogram.
12165 !
12170 !     2) This subprogram does NOT trim the leading or trailing
12175 !            spaces when making positioning or centering
12180 !       calculations.
12185 !-----------------------------------------
12190 !  CALLS :              Pritn_tabxy
12195 !-----------------------------------------
12200 !  REVISIONS :
12205 !
12210 !      B   02/21/86   cfa   REMOVED DEPENDENCY ON 'PRINTER IS' SETTING
12215 !     A  02/07/84  cfa  GENERAL RELEASE
12220 !=========================================
12225 Doc_off:!
12230 Show_message:!(Message$,OPTIONAL INTEGER Line, Column)
12235 !=========================================
12240    INTEGER Column_tab,Line_tab,Screen_width
12245 !-----------------------------------------
12250    SELECT NPAR
12255    CASE 1
12260       Line_tab=11
12265       GOSUB Centering
12270    CASE 2
12275       Line_tab=Line
12280       GOSUB Centering
12285    CASE 3
12290       Line_tab=Line
12295       Column_tab=Column
12300    END SELECT
12305    Print_tabxy(Column_tab,Line_tab,Message$)
12310    SUBEXIT
12315    !
12320 Centering:    !
```

```
12325 !------------------------------------------
12330 !   This subroutine reads the screen status
register to determine
12335 !  the screen width. Once the screen width is
known the line
12340 !  starting location is computed so that the line
will be centered
12345 !  on the screen. This routine will also clear the
line that the
12350 !  message is to be displayed on.
12355 !------------------------------------------
12360    DIM All_spaces$[80]
12365 !------------------------------------------
12370    STATUS 1,9;Screen_width
12375    OUTPUT All_spaces$ USING "#,"&VAL$(Screen_width
)&"X"
12380    Print_tabxy(1,Line_tab,All_spaces$)
12385    !
12390        Column_tab=((Screen_width-LEN(Message$))DIV
2)+1
12395    IF Column_tab<1 THEN Column_tab=1
12400    RETURN
12405    !
12410 SUBEND
12415 !
12420 !******************************************
12425 !
12430 SUB Save_screen
12435 Doc_on:GOTO Doc_off  !  D.2.2     Save_screen
12440 !==========================================
12445 !  PART OF : DISPLAY TOOLS
12450 !------------------------------------------
12455 !  PURPOSE : To allow a screen to be saved so that
it can be
12460 !             recovered after displaying another
screen
12465 !------------------------------------------
12470 !  DESCRIPTION :
12475 !
12480 !   This subprograms work by writing to the CRT
control registers
12485 !  to cause the screen to be scrolled up.
12490 !
12495 !   The series 200 computers CRT buffer only has
room for 57 lines
12500 !   or 3 screens so if more than two screens are
stored the top
12505 !  screens will be lost.
12510 !
12515 !   The series 300 computers CRT buffer only has
room for 39 lines
```

```
12520 !  or 2 screens so if more than one screen is
stored the top
12525 !  screens will be lost.
12530 !-------------------------------------------
12535 !  PASS PARAMETERS :    NONE
12540 !-------------------------------------------
12545 !  CONSIDERATIONS :
12550  !          The number of screens recallable is
dependent on the type
12555 !  of computer used.
12560 !-------------------------------------------
12565 !  CALLS :              NONE
12570 !-------------------------------------------
12575 !  REVISIONS :
12580 !
12585 !        B   03/17/86   cfa   updated documentation
format.
12590 !      A  02/22/84  cfa  GENERAL RELEASE
12595 !===========================================
12600 Doc_off:!
12605 Save_screen:!  no pass parameters
12610 !===========================================
12615    INTEGER Screen_width
12620 !-------------------------------------------
12625    STATUS 1,9;Screen_width
12630    CONTROL 1,1;37
12635    CONTROL 1,0;Screen_width
12640    PRINT
12645    !
12650 SUBEND
12655 !
12660 !*******************************************
12665 !
12670 SUB Restore_screen
12675 Doc_on:GOTO Doc_off  !  D.2.3    Restore_screen
12680 !===========================================
12685 !  PART OF : DISPLAY TOOLS
12690 !-------------------------------------------
12695 !  PURPOSE : To restore a screen that had been
previously saved.
12700 !-------------------------------------------
12705 !  DESCRIPTION :
12710 !
12715 !  This subprograms work by writing to the CRT
control registers
12720 !  to cause the screen to be scrolled down.  The
CRT buffer is
12725 !  limited on the number of lines that can be
stored. If more
12730 !  screens are stored than there is room for in
the buffer the top
```

```
12735 !  screens will be lost and a screen lost message will be
12740 !  displayed on the screen display line.
12745 !-------------------------------------------
12750 !  PASS PARAMETERS :     NONE
12755 !-------------------------------------------
12760 !  CONSIDERATIONS :
12765 !          The number of screens recallable is dependent on the type
12770 !  of computer used.
12775 !-------------------------------------------
12780 !  CALLS :               NONE
12785 !-------------------------------------------
12790 !  REVISIONS :
12795 !
12800 !       B   03/17/86   cfa   updated documentation format.
12805 !     A  02/22/84  cfa  GENERAL RELEASE
12810 !===========================================
12815 Doc_off:!
12820 Restore_screen:!  no pass parameters
12825 !===========================================
12830    INTEGER Screen_width,Lines_above
12835 !-------------------------------------------
12840    STATUS 1,9;Screen_width
12845    STATUS 1,3;Lines_above
12850    IF Lines_above<18 THEN
12855       DISP "SCREEN LOST"
12860       BEEP 200,.3
12865       BEEP 100,.5
12870       WAIT 1.5
12875       DISP
12880    ELSE
12885 !!    CONTROL 1,1;-18
12890       PRINT
12895    END IF
12900    !
12905 SUBEND
12910 !
12915 !*******************************************
12920 !
12925 SUB Print_tabxy(INTEGER Col,Lne,Stg$)
12930 Doc_on:GOTO Doc_off  !  D.3       Print_tabxy
12935 !===========================================
12940 !  PART OF : DISPLAY TOOLS
12945 !-------------------------------------------
12950 !  PURPOSE : To replace the 'PRINT TABXY' command which is
12955 !            depends on the current 'PRINTER IS' setting.
12960 !-------------------------------------------
12965 !  DESCRIPTION :
```

```
12970 !
12975 !          This subprogram will output to the CRT
control registers the
12980 !       necessary values to mimic the 'PRINT TABXY'
function, with
12985 !        the exception that the output string will
always goto the
12990 !       CRT regardless of the current 'PRINTER IS'
setting.
12995 !------------------------------------------------
13000 !  INPUT PARAMETERS :
13005 !
13010 !       Col                An integer that specifies the
desired printout
13015 !
13020 !                       column.
13025 !       Lne                An integer that specifies the
desired printout
13030 !
13035 !                       line.
13040 !       Stg$             A string variable that contains
the text that
13045 !
13050 !------------------  is desired to be output.
13055 !  CONSIDERATIONS :
13060 !------------------------------------------------
13065 !  CALLS :            NONE
13070 !------------------------------------------------
13075 !  REVISIONS :
13080 !
13085 !       A  02/21/86  cfa  INITIAL RELEASE
13090 !================================================
13095 Doc_off:!
13100 Print_tabxy:    !(INTEGER Col,Lne,Stg$)
13105 !================================================
13110     CONTROL 1,0;Col
13115     CONTROL 1,1;Lne
13120     OUTPUT 1;Stg$
13125 SUBEND
13130 !
13135 !**************************************************
13140 !
13145 DEF FNSignal_num(Signal_name$)
13150 Doc_on:GOTO Doc_off!
13155 !================================================
13160 !   PURPOSE; To define the signal numbers used in
the test system
13165 !================================================
13170 Doc_off:!
13175 Signal_num:!
13180 !================================================
13185    SELECT UPC$(TRIM$(Signal_name$))
```

```
13190    CASE "TIMEOUT"
13195       RETURN 15
13200    CASE ELSE
13205         Error_manager("FNSignal_num","Unrecognized
argument;  "&Signal_name$)
13210       !stop
13215       STOP
13220    END SELECT
13225    !
13230    RETURN 0
13235    !
13240 FNEND
13245 !
13250 !******************************************
13255 !
13260 SUB Moxie_et_drvr(INTEGER Sw_addr,Control$)
13265 Moxie_et_drvr:!
13270 !------------------------------------------
13275 !    Evelyn James                         11 Sep 87
13280 !
13285 !  This is the setup driver for the MOXIE test ET.
The ET is driven
13290 !  by a 3488 switch driver.
13295 !
13300 !  INPUT PARAMETER
13305 ! Control$              String containing commands
separated by commas
13310 !
13315 !------------------------------------------
13320    DIM Command$[160],Error_message$[160],Delimiter
$[2],Value$[60]
13325    INTEGER Last_command,Select_code,Place
13330    REAL Atten
13335    ALLOCATE Rest_of_control$[LEN(Control$)]
13340    Error_message$="OK"
13345    CALL Shift_user
13350    !
13355 Setupswitch:!
13360    Rest_of_control$=Control$
13365    Select_code=Sw_addr DIV 100
13370    ON TIMEOUT Select_code,4 GOTO Timeout_switch
13375    REPEAT
13380       Delimiter$=","
13385       CALL Universal_parse(Delimiter$,Rest_of_
control$,Command$,Last_command)
13390       IF POS(Command$,"=")>0 THEN
13395          Delimiter$="="
13400          Value$=Command$
13405          CALL Universal_parse(Delimiter$,Value$,
Command$,Place)
13410       END IF
13415       GOSUB Execute_command
```

```
13420    UNTIL Last_command=1
13425    OFF TIMEOUT Select_code
13430    SUBEXIT
13435    !
13440 Timeout_switch:!
13445    Error_message$="TIMEOUT 3488 "
13450    GOSUB Not_yet  !%
13455    SUBEXIT        !%
13460!%   GOSUB Disp_error
13465!%   GOTO Setupswitch
13470    ! --------------------
13475    !
13480 Execute_command:!
13485    SELECT UPC$(TRIM$(Command$))
13490    !
13495    CASE "PRESET"
13500       OUTPUT Sw_addr;"OPEN 501,502,503,504,5
05,506"
13505       !
13510    CASE "ELECTRICAL TO ELECTRICAL"
13515       OUTPUT Sw_addr;"OPEN 501,503,506"
13520       !
13525    CASE "OPTICAL TO OPTICAL"
13530       OUTPUT Sw_addr;"CLOSE 503,504,505,506"
13535       !
13540    CASE "ELECTRICAL TO OPTICAL"
13545       OUTPUT Sw_addr;"OPEN 501,506"
13550       OUTPUT Sw_addr;"CLOSE 503,504"
13555       !
13560    CASE "OPTICAL TO ELECTRICAL"
13565       OUTPUT Sw_addr;"OPEN 503"
13570       OUTPUT Sw_addr;"CLOSE 505,506"
13575       !
13580    CASE "2 TONE SRCE"
13585       OUTPUT Sw_addr;"OPEN 505"
13590       OUTPUT Sw_addr;"CLOSE 506"
13595       !
13600    CASE "MOD RF TO CH B"
13605       OUTPUT Sw_addr;"OPEN 504"
13610       OUTPUT Sw_addr;"CLOSE 503"
13615       !
13620    CASE ELSE
13625          Error_message$=Command$&" is an INVALID
COMMAND"
13630       GOSUB Disp_error
13635    END SELECT! Command$
13640    !
13645    WAIT 2  ! SETTLING TIME 3488
13650    !
13655     RETURN     ! ----------  From Execute_comm and
--------------
13660    !
```

```
13665    !
13670 Disp_error:  !
13675    DISP Error_message$&" in Moxie_et_drvr"
13680    BEEP
13685    PAUSE
13690    RETURN
13695 Not_yet:   !
13700    DISP Command$
13705    PAUSE
13710    RETURN
13715 SUBEND
13720 !
13725 !*******************************************
13730 !
13735 SUB Beeper(OPTIONAL Type_of_beep$)
13740 Doc_on:GOTO Doc_off  !
13745 !|------------------------------------------|
13750 !|
                    |
13755 !|          HP P/N :
                    |
13760 !|        Revision :    A.00.00      May, 1987
                 |
13765 !|
                    |
13770 !|------------------------------------------|
13775 !|  PROGRAM:    Beeper
13780 !|------------------------------------------|
13785 !|  CREATOR:    MICHAEL MCANDREWS
                    |
13790 !|------------------------------------------|
13795 !|  REVISIONS:         (most recent revision info
listed at the top)      |
13800 !|     0  050387:1652.00      CREATED mjm
                    |
13805 !|------------------------------------------|
13810 !|  PURPOSE:    PROVIDES SELECTED BEEPS
                    |
13815 !|------------------------------------------|
13820 !|  DESCRIPTION:
                    |
13825 !|   BEEP         STANDARD BEEP
                    |
13830 !|   BEEP(0)      STANDARD BEEP
                    |
13835 !|   BEEP(1)      VERIFY ACTION
                    |
13840 !|   BEEP(2)      ERROR WARNING
                    |
13845 !|   BEEP(3)      IDLE TICKS
                    |
13850 !|   BEEP(4)      GET ATTENTION
```

```
13855 !|  BEEP(5)      FAIL A TEST

13860 !|  BEEP(6)

13865 !|  BEEP(7)

13870 !|  BEEP(8)

13875 !|  BEEP(9)

13880 !|

13885 !|------------------------------------------|
13890 !| INPUT PARAMETERS :

13895 !| ==================

13900 !|    Type_of_beep AN INTEGER VARIABLE THAT
SELECTS THE TYPE OF BEEP
13905 !|

13910 !|------------------------------------------|
13915 !| CONSIDERATIONS :

13920 !|------------------------------------------|
13925 !| CALLS:

13930 !|------------------------------------------|
13935 !| MODIFIES:   <NONE AT THIS TIME>

13940 !|------------------------------------------|
13945 !| ERROR MESSAGES:  <NONE AT THIS TIME>

13950 !|------------------------------------------|
13955 Doc_off:!
13960 Beeper:  !(OPTIONAL Type_of_beep$)
13965 !|------------------------------------------|
13970    IF NPAR<1 THEN
13975       BEEP
13980       SUBEXIT
13985    END IF
13990    SELECT TRIM$(UPC$(Type_of_beep$))
13995     CASE "STD","STANDARD"                !   STANDARD
BEEP
14000       BEEP
14005     CASE "VERIFY"                          !   VERIFY
ACTION
14010       BEEP 3000,.2
14015      CASE  "ERROR","WARNING"                !   ERROR
WARNING
14020       BEEP 1500,.3
```

```
14025       BEEP 1200,.3
14030     CASE "TICK","TIC"                  !  TICKS
14035       BEEP 5000,.0001
14040       CASE  "ATTENTION","ATTEN"               !   GET
ATTENTION
14045       BEEP 5000,.5
14050     CASE "FAIL"                        !  FAIL A TEST
14055       BEEP 800,.5
14060       BEEP 900,.2
14065       BEEP 1000,.5
14070       BEEP 800,.5
14075     CASE "CURLY SHUFFLE"
14080       FOR I=1 TO 4
14085          BEEP 1000+I*100,.01
14090       NEXT I
14095       WAIT .17
14100       FOR I=1 TO 15
14105          FOR J=1 TO 4
14110             BEEP 1000+J*100-50*I,.01
14115          NEXT J
14120          WAIT .02+.1/(I)
14125       NEXT I
14130     END SELECT
14135 SUBEND
14140 !|-----------------------------------------|
14145 !

14150 SUB Prompt_keys(Key_labels$,Key_pressed$,
OPTIONAL Message$,Seconds)
14155 Prompt_keys:        !
14160     !
14165     !--------------------------------------!
14170     ! This sub loads the sfk array Keys$(*),
and then lights the keys  !
14175     ! and sets up appropriate interupts.
                          !
14180     ! Programmed by: Bill Simmons
     Date: 02/28/84       !
14185     ! Modified by: Bill Simmons
     Date: 3 Nov 1984
14190     !   Changed message location to kbd
lines ; Allowed to lines of text
14195     !   to be in message.
14200     !   Allowed extensible key label list.
14205     ! Modified by: Bill Simmons
     Date: 18 Nov 1984
14210     !   Allowed key labels to contain '='
within the label.
14215     ! PASSED PARAMETERS:
                          !
14220     !      Key_labels$ is a string array
containing the labels of the  !
```

```
14225    !                   keys separated by
commas.                                 !
14230    !      Message$  A message to be
displayed on line 18 if provided  !
14235    !      Seconds   The time after which
the key specified as          !
14240    !                the default will self
execute.                      !
14245    ! RETURN VARIABLES:
                              !
14250    !      Key_pressed$ is the label of the
key pressed.                  !
14255    !-------------------------------------!
14260    DIM Keys$(1:4,0:8)[25]
14265    DIM Kbd_key$[5],Kbd_msg$[160],Top_line$
[80],Key_label$[25]
14270    DIM Bot_line$[80],Msg$[80],Sequence
(1:8),Default_key$[25],Default$[25]
14275    INTEGER Key_num,Default_key_num,Timer_
set,Last_key
14280    INTEGER Key_count,Key_layer,Lf_pos
14285    ALLOCATE Rest_key_labels$[LEN(Key_
labels$)]
14290    Rest_key_labels$=Key_labels$
14295    Key_pressed$=" "
14300    ON KBD ALL,10 GOSUB Do_nuthin  !
PREVENTS KEY STROKES PRIOR TO KEYS
14305                                  ! BEING
DEFINED FROM CAUSING ANY ACTION
14310    !
14315    !-------------------------------------!
14320    !                  DISPLAY MESSAGE(s) ON
KBD LINES
14325    Kbd_msg$=RPT$(" ",160)
14330    IF NPAR>2 THEN
14335       IF LEN(Message$)>160 THEN
14340          Msg$="ERROR: PROMPT KEY MESSAGE
EXCEEDS 160 CHARS; IS "&VAL$(LEN(Message$))&"CHARS
LONG"
14345          GOTO Drop_dead
14350       END IF
14355       Lf_pos=POS(Message$,"")
14360       IF Lf_pos>0 THEN
14365          IF Lf_pos>81 THEN
14370             Msg$="ERROR: PROMPT KEY
MESSAGE LINE FEED HAS MORE THAN 80 CHARACTERS
BEFORE IT"
14375             GOTO Drop_dead
14380          END IF
14385          IF LEN(Message$)-Lf_pos>80 THEN
14390             Msg$="ERROR: PROMPT KEY
MESSAGE LINE FEED HAS MORE THAN 80 CHARACTERS
```

```
AFTER IT"
14395             GOTO Drop_dead
14400          END IF
14405          Top_line$=TRIM$(Message$[1,Lf_
pos-1])
14410          Bot_line$=TRIM$(Message$[Lf_
pos+1])
14415          Kbd_msg$[INT(41-(LEN(Top_line$)
/2))]=Top_line$
14420          Kbd_msg$=Kbd_msg$&RPT$(" ",160-
LEN(Kbd_msg$))
14425          Kbd_msg$[81+(40-(LEN(Bot_line$)
/2))]=Bot_line$
14430       ELSE
14435          IF LEN(Message$)<80 THEN
14440             Kbd_msg$[41-(LEN(Message$)
/2)]=Message$
14445          ELSE
14450             Kbd_msg$=Message$
14455          END IF   ! is it shorter than 80
chars
14460       END IF      ! does it contain a
linefeed
14465       OUTPUT KBD;Kbd_msg$;
14470    END IF         ! was a message passed
in
14475    !
14480    !-------------------------------------!
14485    ! PARSE ALL LABELS AND PLACE IN LABEL
ARRAY
14490    RESTORE Key_sequence
14495    Key_layer=0
14500    REPEAT
14505       Key_count=0
14510       Key_layer=Key_layer+1
14515       IF Key_layer=1 OR Key_layer=2 THEN
14520          READ Sequence(*)
14525       END IF
14530       REPEAT
14535          CALL Command_parser(Rest_key_
labels$,Key_label$,Default_key$,Last_key)
14540          Key_count=Key_count+1
14545          IF Key_label$="DEFAULT" THEN
14550             Keys$(Key_layer,Sequence(Key_
count))=Default_key$
14555             Default_key_num=Sequence(Key_
count)
14560             Default_layer=Key_layer
14565             Default$=Default_key$
14570          ELSE
14575             IF Default_key$<>"" THEN
14580                Key_label$=Key_label$&"="
```

```
&Default_key$
14585              END IF
14590              Keys$(Key_layer,Sequence(Key_
count))=Key_label$
14595           END IF
14600        UNTIL Key_count=8 OR Last_key=1
14605     ! If all the key labels won't fit on
layer 1 then change the last
14610     ! key label to 'MORE KEYS' and place
the last label on the beggining
14615     ! of the rest_key_labels.  It will be
the first key of layer 2.
14620        IF Key_layer=1 AND Last_key=0 THEN
14625           Rest_key_labels$=Keys$(1,4)&","
&Rest_key_labels$
14630           Keys$(1,4)="MORE KEYS     X"
14635        END IF
14640        IF Key_layer>1 THEN
14645           Keys$(Key_layer,4)="MORE KEYS
     X"
14650        END IF
14655     UNTIL Last_key=1
14660    !---------------------------------------!
14665    ! ALL UNDEFINED KEYS ARE TO BLANKS"
14670     FOR I=0 TO 7
14675        FOR J=1 TO Key_layer
14680           IF Keys$(J,I)="" THEN Keys$(J,I)
=""
14685        NEXT J
14690     NEXT I
14695    !---------------------------------------!

14700    !                DEFINE KEY SEQUENCES FOR
EACH LAYER
14705 Key_sequence:    !
14710     DATA 1,2,3,4,5,6,7,8    ! Key label
sequence FIRST LAYER
14715     DATA 1,2,3,4,5,6,7,8    ! KEY LABEL
SEQUENCE ALL OTHER LAYERS
14720    !---------------------------------------!
14725    ! ACTIVATE FIRST LAYER KEYS
14730     Current_layer=1
14735     GOSUB Light_keys
14740     IF NPAR=4 AND Default$<>"" THEN !
DEFAULT KEY EXISTS
14745        GOSUB Setup_default
14750     ELSE
14755        DISP "Press a softkey"
14760     END IF
14765     ON KBD ALL,11 GOSUB Key_service
14770     LOOP
14775     EXIT IF Key_pressed$<>" "
```

```
14780     END LOOP
14785     !
14790     DISP ""
14795     IF NPAR>2 THEN                  ! CLEAR KBD LINES
14800        OUTPUT KBD;"#";
14805     END IF
14810     SUBEXIT
14815     !
14820     !----------------------------------!
14825     !
14830 Light_keys:  !  LIGHT UP CURRENT LAYER OF KEY_LABELS
14835     FOR I=0 TO 7
14840        ON KEY I LABEL Keys$(Current_layer,I)GOSUB Do_nuthin
14845     NEXT I
14850     RETURN
14855     !----------------------------------!
14860 Setup_default:    !
14865     ON KEY 6 LABEL "HALT" GOSUB Do_nuthin
14870     Timer_set=1
14875     GOSUB Dis_X" THEN
15140              Current_layer=Current_layer+1
15145              IF Current_layer>Key_layer THEN Current_layer=1
15150              GOSUB Light_keys
15155              Key_pressed$=" "
15160           END IF
15165        CASE "S"
15170              OUTPUT KBD;Kbd_key$
15175        CASE "P"
         !Pause key pressed.
15180              PAUSE
15185        CASE ELSE
15190        END SELECT
15195     END SELECT
15200     ENABLE
15205     RETURN
15210     !
15215 Drop_dead:  !
15220     CALL Beeper
15225     DISP Msg$
15230     PAUSE
15235     STOP
15240 Do_nuthin:  !
15245     RETURN
15250 SUBEND
15255 !
15260 !*******************************!
15265 !
```

```
15270 DEF FNLive_key(Key_position$)
15275 Live_key:! <EDIT LABEL>
15280    REM
15285    REM ==================================
15290    REM      SOFTWARE ARCHITECTURE LIBRARY
  / /
15295    REM      COPYRIGHT @ 1987 BY THE
HEWLETT-PACKARD COMPANY
15300    REM      REVISION: 870215:0100.gs
15305    REM ==================================
15310    REM
15315 ! ---------------------------------------
15320 ! CREATOR         gil     /HP5300/??
15325 ! ---------------------------------------
15330 ! REVISION        870215:0100.gs
<CREATED>
15335 !
15340 !----------------------------------------
15345 ! FUNCTION        RETURN A KEY NUMBER GIVEN
A POSITIONAL NAME
15350 !----------------------------------------
15355 ! DESCRIPTION     THIS MODULE RETURNS A
NUMBER FOR A LIVE KEY OPERATION
15360 !                 THAT IS NUMERICALLY
VARIABLE DEPENDING ON WHAT
15365 !                 KEYBOARD IS PRESENT.
15370 !
15375 !----------------------------------------
15380 ! INPUT PARAMETERS
15385 ! (REQUIRED)
15390 !                 <Key_position$> THE
LOGICAL POSITION OF THE DESIRED KEY
15395 !                 IN CALLING CONTEXT.
15400 !----------------------------------------
15405 ! CONSIDERATIONS <NONE AT THIS TIME>
15410 !----------------------------------------
15415 ! CALLS           FNKbd_type_ut$
15420 !                 Beeper_ut
15425 !----------------------------------------
15430 ! MODIFIES        <NONE AT THIS TIME>
15435 !----------------------------------------
15440 ! ERROR MESSAGES <NONE AT THIS TIME>
15445 !----------------------------------------
15450 !
15455    DIM Kbd_type$[32]
15460    INTEGER Key_pattern(1:10)
15465 !
15470 !----------------------------------------
15475 Key_numbers:  !
15480    DATA 0,1,2,3,4,5,6,7,8,9
15485    DATA 1,2,3,4,5,6,7,8,1,2
15490   !
```

```
15495    RESTORE Key_numbers
15500    READ Key_pattern(*)
15505   !
15510 Main:  ! --> MAIN FLOW
15515    SELECT FNKbd_type_ut$
15520    CASE "46020A"
15525       Key_type$="ITF"
15530    CASE "46020A/236"
15535       Key_type$="NIMITZ"
15540    CASE "98203A"
15545       Key_type$="NIMITZ"
15550    CASE "OTHER"
!HOPEFULLY A 98023B
15555       Key_type$="NIMITZ"
15560    CASE ELSE
15565       Key_type$="ITF"
15570    END SELECT
15575   !
15580    IF Key_type$="ITF" THEN READ Key_
pattern(*)         !TO GET ITF PATTERN
15585   !
15590 Choose_again:!
15595    SELECT Key_position$
15600    CASE "ABORT"
15605       IF Key_type$="NIMITZ" THEN RETURN 9
15610       IF Key_type$="ITF" THEN RETURN 8
15615    CASE "FIRST KEY"
15620       Choice=1
15625    CASE "SECOND KEY"
15630       Choice=2
15635    CASE "THIRD KEY"
15640       Choice=3
15645    CASE "FOURTH KEY"
15650       Choice=4
15655    CASE "FIFTH KEY"
15660       Choice=5
15665    CASE "SIXTH KEY"
15670       Choice=6
15675    CASE "SEVENTH KEY"
15680       Choice=7
15685    CASE "EIGHTH KEY"
15690       Choice=8
15695    CASE ELSE
15700    !  CALL Beeper_ut("WARNING")
15705       BEEP
15710       DISP Key_position$&" IS AN INVALID
KEY_CHOICE FOR FNLive_key"
15715       PAUSE
15720       PAUSE
15725       STOP
15730    END SELECT
15735    RETURN Key_pattern(Choice)
```

```
15740  !
15745 FNEND              ! FNLive_key
15750 !
15755 !========================================
15760 !
15765 DEF FNAddress(Device$)
15770 Address:!FN
15775 !========================================
15780    SELECT UPC$(TRIM$(Device$))
15785    CASE "CRT","SCREEN"
15790       RETURN CRT
15795    CASE "KBD","KEYBOARD"
15800       RETURN KBD
15805    CASE "HP-IB"
15810       RETURN 7
15815    CASE "REMOTE",":REMOTE"
15820       RETURN 21
15825    CASE "DISC","CS80",":CS80"
!(address assignment only)
15830       RETURN 700
15835    CASE "PRINTER"
15840       RETURN 701
15845    CASE "SIGNAL GENERATOR","SIG GEN"
15850       RETURN 704
15855    CASE "PLOTTER"
!(address assignment only)
15860       RETURN 705
15865    CASE "ET DRIVER","SW"
15870       RETURN 709
15875    CASE "PWR MTR","POWERMETER"
           !(hp-436A)
15880       RETURN 713
15885    CASE "VNA DISPLAY"           !(hp-
8753B graphics display HP-GL)
15890       RETURN 714
15895    CASE "VNA","NETWORK ANALYZER"
           !(hp-8703A)
15900       RETURN 716!715
15905    CASE "DUT"
           !hp-8703A)
15910       RETURN 716
15915    CASE "DUT DISPLAY"
!(graphics display HP-GL)
15920       RETURN 717
15925    CASE "SPECTRUM ANALYZER","SA"
           !(hp-8566B)
15930       RETURN 718
15935    CASE "SWEEPER","SWP"
           !(hp-8341B)
15940       RETURN 719
15945    CASE "CONTROLLER"
           !(hp-9920A)
```

```
15950       RETURN 721
15955    CASE "DMM","DVM","VOLTMETER"
           !(hp-3456A)
15960       RETURN 722
15965    CASE "POWER SUPPLY","PS"
           !(hp-6038A)
15970       RETURN 725
15975    CASE ELSE
15980       CALL Clr_scr
15985       Show_message("UNKNOWN ADDRESS
REQUEST",8)
15990       Show_message("====================
==",9)
15995       Show_message("Address was requested
for;  "&Device$,11)
16000       BEEP
16005       PAUSE
16010       !
16015       RETURN -1
16020    END SELECT
16025    !
16030 FNEND
16035 !
16040 !****************************************
16045 !
16050 DEF FNKbd_type_ut$
16055 Kbd_type_ut: ! <EDIT LABEL>
16060    REM
16065    REM ==================================
16070    REM      SOFTWARE ARCHITECTURE LIBRARY
 / /  5010-5133
16075    REM      COPYRIGHT @ 1986 BY THE
HEWLETT-PACKARD COMPANY
16080    REM      REVISION: 860717:1510.WCR
16085    REM ==================================
16090    REM
16095 ! ----------------------------------------
16100 ! CREATOR        BILL RICHTER /HP5000/80
16105 ! ----------------------------------------
16110 ! REVISIONS      860620:1550.WCR
<CREATED>
16115 !
16120 !                860717:1510.WCR
<ASSIGNED> HP INTERNAL PART NUMBER
16125 !
16130 !                870215:1800.gil
<CHANGED>  "96023A" TO "98023A"
16135 !
16140 !                870409:1640.mf
<ADDED> SUPPORT FOR 98203C KEYBOARD
16145 !----------------------------------------
16150 ! FUNCTION       RETURN A STRING
```

```
INDICATING KEYBOARD TYPE
16155 !---------------------------------------
16160 ! DESCRIPTION    THIS FUNCTION RETURNS A
STRING INDICATING KEYBOARD
16165 !                TYPE AS FOUND IN KBD
REGISTER 9.  THIS STRING CAN BE
16170 !                USED TO DETERMINE SOFTKEY
PLACEMENT OR LABELING, AND
16175 !                THE TYPE(S) OF USER
MENU(S) AVAILABLE.  USE OF THIS
16180 !                MODULE SHOULD MAKE
SOFTWARE MODULES USING SOFTKEYS
16185 !                DIRECTLY TRANSPORTABLE
BETWEEN SERIES 200 AND SERIES
16190 !                300 CONTROLLERS.  (ALSO
SEE SUBPROGRAM MODULES
16195 !                Select_sftky_ut and Show_
sftky_ut).
16200 !
16205 !---------------------------------------
16210 ! INPUT PARAMETERS
16215 ! (REQUIRED)     <NONE AT THIS TIME>
16220 !---------------------------------------
16225 ! RETURN PARAMETER
16230 !
16235 !                   STRING
KEYBOARD TYPE
16240 !
16245 !                "46020A"
HP46020A KEYBOARD
16250 !
16255 !                "46020A/236"
HP46020A KEYBOARD; MODEL 236
16260 !
EMULATION MODE
16265 !
16270 !                "98203A"
HP98203A KEYBOARD
16275 !
16280 !                "98203C"
HP98203C KEYBOARD
16285 !
16290 !                "OTHER"
NONE OF THE ABOVE
16295 !
16300 !                "NONE"
NOKEYBOARD
16305 !
16310 !---------------------------------------
16315 ! CONSIDERATIONS <NONE AT THIS TIME>
16320 !---------------------------------------
16325 ! CALLS          <NONE AT THIS TIME>
```

```
16330 !----------------------------------------
16335 ! MODIFIES       <NONE AT THIS TIME>
16340 !----------------------------------------
16345 ! BINARIES       <NONE AT THIS TIME>
16350 !----------------------------------------
16355 ! ERROR MESSAGES <NONE AT THIS TIME>
16360 !----------------------------------------
16365 !
16370    INTEGER Reg_value,Emulate
16375    REAL Value
16380 !
16385    STATUS KBD,9;Reg_value
! READ REGISTER 9
16390 !
16395    IF BIT(Reg_value,1) THEN RETURN
"98203C" !  98203C KEYBOARD
16400 !
16405    IF BIT(Reg_value,5) THEN
! 46020A KEYBOARD
16410       Value=VAL(SYSTEM$("VERSION: BASIC"))
16415 !
16420       IF Value>=4 THEN         ! BASIC 4.0
OR HIGHER; REGISTER 15 EXISTS
16425          STATUS KBD,15;Emulate
16430          IF Emulate THEN RETURN "46020A/
236" ! EMULATION MODE
16435       END IF
16440 !
16445       RETURN "46020A"
 ! NORMAL MODE
16450    END IF
16455 !
16460    IF BIT(Reg_value,0) THEN RETURN
"98203A"
16465 !
16470    IF BIT(Reg_value,4) THEN RETURN "NONE"
16475 !
16480    RETURN "OTHER"
! UNIDENTIFIED KEYBOARD
16485 !
16490 FNEND                  ! FNKbd_type_ut$
16495 !
16500 !========================================
16505 !
16510 SUB Universal_parse(Delimiter$,In_n_out$,
String_parsed$,INTEGER Last_match)
16515 Universal_parse:!
16520    INTEGER Delim_loc,Len_delim
16525    Len_delim=LEN(Delimiter$)
16530    Delim_loc=POS(In_n_out$,Delimiter$)
16535    IF Delim_loc=0 THEN
16540       String_parsed$=In_n_out$
```

```
16545       Last_match=1
16550    ELSE
16555       String_parsed$=TRIM$(In_n_out$[1,
Delim_loc-1])
16560       In_n_out$=TRIM$(In_n_out$[Delim_
loc+Len_delim])
16565       Last_match=0
16570    END IF
16575 SUBEND
16580 !**************************************
16585 !
16590 SUB Shift_user
16595    REM                  HP P/N    :
xxxxxxxxx
16600    REM                  Revision AA.00.00
 28 Sep 87     Evelyn James
16605 Doc_on:GOTO Doc_off
16610 !======================================
16615 ! PROGRAM:    Shift_user
16620 !--------------------------------------
16625 ! CREATER:    Evelyn James   NMD
16630 !--------------------------------------
16635 ! REVISIONS:      (most recent revision
listed above)
16640 !   AA.00.00     28 Sep 87    Evelyn James
16645 !--------------------------------------
16650 !  PURPOSE:    pushes softkeys to user 1
16655 !--------------------------------------
16660 ! CALLS: none
16665 !--------------------------------------
16670 Doc_off:!
16675 !======================================
16680 Shift_user:    !
16685    OUTPUT KBD;"{#";
16690 SUBEND
16695 SUB Command_parser(Control$,Command$,
Value_n_unit$,INTEGER Last_command)
16700    REM                  HP P/N    :
xxxxxxxxx
16705    REM                  Revision AA.00.00
 30 Sep 87     Evelyn James
16710    REM
originaly from SAD, by ??
16715 Doc_on:GOTO Doc_off
16720 !======================================
16725 ! PROGRAM:    Command_parser
16730 !--------------------------------------
16735 ! CREATER:   ??? SAD,  Evelyn James  NMD
16740 !--------------------------------------
16745 ! REVISIONS:      (most recent revision
listed above)
16750 !   AA.00.00    30 Sep 87    Evelyn James
```

```
16755 !----------------------------------------
16760 !    PURPOSE:  PARSES INPUT STRING
16765 !----------------------------------------
16770 ! CALLS: none
16775 !----------------------------------------
16780 Doc_off:!
16785 Command_parser:  !
16790    INTEGER Comma_loc,Equals_loc
16795    Comma_loc=POS(Control$,",")
16800    IF Comma_loc=0 THEN
!  No more commas in the string
16805       Command$=Control$
! Last or only command in the string
16810       Last_command=1
16815    ELSE
16820       Command$=Control$[1,Comma_loc-1]
16825       Control$=Control$[Comma_loc+1]
16830       Last_command=0
16835    END IF
!  End of Parser
16840   !
16845    Equals_loc=POS(Command$,"=")
!  If a Value is included in
16850    IF Equals_loc<>0 THEN
!  Command$ then separate
16855       Value_n_unit$=Command$[Equals_loc+1]
 ! the value and units from
16860       Command$=Command$[1,(Equals_loc-1)]
!  the command
16865    ELSE
16870       Value_n_unit$=""
16875    END IF
16880   !
16885 SUBEND
16890 !
16895 !****************************************
16900 !
16905 SUB Text_on_vna_crt(INTEGER Dut_addr,
Device$)
16910 Text_on_vna_crt:    !
16915    DIM Line$(7)[160]
16920    !
16925    Dut_crt_addr=Dut_addr+1
16930    GINIT
16935    PLOTTER IS Dut_crt_addr,"HPGL"
16940    OUTPUT Dut_crt_addr;"CS;"!CLEAR GRAPH
16945    OUTPUT Dut_crt_addr;"SI";.41,.49
!SET CHARACTER SIZE
16950    OUTPUT Dut_crt_addr;"SP3;"  !pen number
16955    RESTORE Text
16960 !          X1,Y1, X2,Y2, X3,Y3,  X4,Y4,
X5,Y5
```

```
16965 Text:DATA 550,3390,0,2640,0,2180,0,1760,
0,1550
16970    !
16975    Line$(1)="LB CALIBRATION SEQUENCE"
&CHR$(3)
16980    Line$(2)="LB1. Connect OPTICAL OUTPUT
to OPTICAL INPUT."&CHR$(3)
16985    Line$(3)="LB2. Connect RF PORT 1 to RF
PORT 2."&CHR$(3)
16990    Line$(4)="LB3. Push softkey to start
calibration."&CHR$(3)
16995    !
17000    FOR Line_num=1 TO 4
17005       IF Line_num=2 THEN
17010          OUTPUT Dut_crt_addr;"SI";.25,.30
! SET CHARACTER SIZE
17015          OUTPUT Dut_crt_addr;"SP2;"!PEN
NUMBER
17020       END IF
17025       READ X,Y
17030       OUTPUT Dut_crt_addr;"PA";X,Y  ! MOVE
X,Y
17035       OUTPUT Dut_crt_addr;Line$(Line_num)
17040    NEXT Line_num
17045    OUTPUT Dut_crt_addr;"PU;SP0;"  !PEN UP
17050    !
17055    ! SETUP USER SOFTKEYS
17060    OUTPUT Dut_addr;"CLES;ESE64;"  !CLEAR
STATUS BYTE, ENABLE USER RQS
17065    OUTPUT Dut_addr;"MENUDISP;"
17070    OUTPUT Dut_addr;"MENUOFF;"
17075    OUTPUT Dut_addr;"WRSK5 ""CALIBRATE"""
17080    OUTPUT Dut_addr;"INTE80"    !INTENSITY
UP
17085 Sit:Stat=SPOLL(Dut_addr)
17090    IF NOT BIT(Stat,5) THEN Sit
17095    OUTPUT Dut_addr;"ESR?;"
17100    ENTER Dut_addr;Estat
17105    OUTPUT Dut_addr;"KOR?;"
17110    ENTER Dut_addr;Key_press
17115    SELECT Key_press
17120    CASE 4
17125    CASE 42
17130       Device$="LOCAL"
17135    CASE ELSE
17140       GOTO Sit
17145    END SELECT
17150    OUTPUT Dut_crt_addr;"AF"  !CLEAR
LABELS
17155    OUTPUT Dut_addr;"PRES;"
17160 SUBEND
17165 SUB Vna_scale_ref(INTEGER Vna_addr,Scale$,
```

```
OPTIONAL Scale_set_data)
17170 Doc_on:GOTO Doc_off  ! SCALE AND REFERENCE
CONTROL
17175 !======================================
17180 !  PURPOSE:  To provide control parameters
for viewing
17185 !            trace data on the display of
the hp 8753B.
17190 !--------------------------------------
17195 !  INPUT PARAMETERS:
17200 !
17205 !     Vna_addr        An INTEGER that
specifies the address
17210 !                     of the Vector
Analyzer to be controlled.
17215 !
17220 !     Scale$          A string variable
that specifies the
17225 !                     SCALING mode to be
programmed.
17230 !
17235 !                     ["AUTO SCALE"|
"MARKER TO REF"]
17240 !                     ["PER DIVISION"|
["REF VAL"|"REFERENCE VALUE"]
17245 !                     |["REF POS"|
"REFERENCE POSITION"]]
17250 !                     |"ELECTRICAL DELAY"
|"MARKER TO DELAY"
17255 !
17260 !     Scale_set_data  A real variable
that is used to provide
17265 !                     the numeric
information for the REFERENCE
17270 !                     CONTROL.
17275 !
17280 !             PER DIVISION     \   units
appropriate to the
17285 !             REF VAL           >
display vertical scale
17290 !             REFERENCE VALUE  /
determined by measurement mode
17295 !
17300 !             REFERENCE POSITION \
integer that specifies the
17305 !             REF POS            /
graticule line that is to be
17310 !
used as the reference line
17315 !                                0 to 10
17320 !
17325 !             ELECTRICAL DELAY
```

```
in seconds
17330 !----------------------------------------
17335 !  MODULE BEHAVIOR FOR DIFFERENT COMMANDS;
17340 !
17345 !     COMMAND            MODULE ACTIONS
TAKEN
17350 !     -------------      ------------------
17355 !     AUTO SCALE         Brings the trace
data in view on the CRT.
17360 !
17365 !     PER DIVISION       Sets the response
value scale per division of
17370 !                        the displayed
trace.
17375 !
17380 !     REFERENCE VAL      Sets the value of
the  reference line.
17385 !
17390 !     REFERENCE POS      Sets the position
of the reference line.
17395 !
17400 !     MARKER TO REF      Sets the reference
level to the marker level.
17405 !
17410 !     MARKER TO DELAY  Sets the electrical
length so group delay is
17415 !                        zero at the marker
stimulus.
17420 !
17425 !     ELECTRICAL DELAY Sets the electrical
delay offset.
17430 !----------------------------------------
17435 !  MODULE BEHAVIOR WHEN GIVEN OUT OF RANGE
VALUES;
17440 !
17445 !     NO OUT OF RANGE TRAPPING DONE.
17450 !
17455 !----------------------------------------
17460 !  CONSIDERATIONS;
17465 !
17470 !----------------------------------------
17475 !  OTHER SUBPROGRAMS CALLED;
17480 !
17485 !----------------------------------------
17490 !  REVISIONS;
17495 !
17500 !       21 Dec 88  Evelyn James  added
ELECRICAL DELAY and MARKER TO DELAY
17505 !        04/15/88  cfa  debugging
17510 !        03/29/88  cfa  restructured NPAR
testing
17515 !        03/25/88  mmc  code review
```

```
17520 !         03/07/88  mmc  initial code
17525 !      0  02/19/88  cfa  outline
documentation form.
17530 !===============================================
17535 Doc_off: !
17540 Vna_scale_ref:    ! (Vna_addr,Scale$,
OPTIONAL Scale_set_data)
17545 !===============================================
17550    DIM Error_msg$[80]
17555 !-----------------------------------------------
17560    SELECT UPC$(TRIM$(Scale$))
17565    CASE "PER DIVISION"
17570       IF NPAR=3 THEN
17575          OUTPUT Vna_addr;"SCAL";Scale_
set_data
17580       ELSE
17585          Error_msg$="Misssing parameter
to set ""PER DIVISION"""
17590       END IF
17595    CASE "REF VAL","REFERENCE VALUE"
17600       IF NPAR=3 THEN
17605          OUTPUT Vna_addr;"REFV";Scale_
set_data
17610       ELSE
17615          Error_msg$="Missing parameter
to set ""REFERENCE VALUE"""
17620       END IF
17625    CASE "REF POS","REFERENCE POSITION"
17630       IF NPAR=3 THEN
17635          OUTPUT Vna_addr;"REFP";Scale_
set_data
17640       ELSE
17645          Error_msg$="Missing parameter
to set ""REFERENCE POSITION"""
17650       END IF
17655    CASE "AUTO SCALE"
17660       OUTPUT Vna_addr;"AUTO"
17665    CASE "MARKER TO REF"
17670       OUTPUT Vna_addr;"MARKREF"
17675    CASE "MARKER TO DELAY"
17680       OUTPUT Vna_addr;"MARKDELA"
17685    CASE "ELECTRICAL DELAY"
17690       IF NPAR=3 THEN
17695          OUTPUT Vna_addr;"ELED";Scale_
set_data
17700       ELSE
17705          Error_msg$="Missing parameter
to set ""ELECTRICAL DELAY"""
17710       END IF
17715    CASE ELSE
17720       Error_msg$="Unrecognized Scale$
parameter; """&Scale$&""""
```

```
17725    END SELECT
17730    !
17735    IF Error_msg$<>"" THEN
17740       Error_manager("Vna_scale_ref",Error_
msg$)
17745       PAUSE
17750       !STOP
17755       STOP
17760    END IF
17765    !
17770 SUBEND
17775 !
17780 !****************************************
17785 !
17790 SUB Vna_freq(INTEGER Vna_addr,Freq_mode$,
Freq_parm,OPTIONAL Freq_modifer$,Freq_mod_parm)
17795 Doc_on:GOTO Doc_off!  Vna_freq  FREQUENCY
CONTROL
17800 !=========================================
17805 !  PURPOSE; To provide for controlling
the frequency parameters of
17810 !            the hp 8753B.
17815 !-----------------------------------------
17820 !
17825 !     Vna_addr           An INTEGER that
specifies the address of
17830 !                        Network Analyzer
to be controlled.
17835 !
17840 !     Freq_mode$         A string variable
that specifies the
17845 !                        primary frequency
control parameter.
17850 !
17855 !                        ["CENTER"|"CENTER
FREQ"|"CENTER FREQUENCY"]
17860 !                        ["SPAN"|"FREQ
SPAN"|"FREQUENCY SPAN"]
17865 !                        ["START"|"START
FREQ"|"START FREQUENCY"]
17870 !                        ["STOP"|"STOP
FREQ"|"STOP FREQUENCY"]
17875 !                        ["CW"]
17880 !
17885 !     Freq_parm          A REAL number that
provides the value in Hz
17890 !                        that the primary
frequency control parameter
17895 !                        is to be set to.
17900 !
17905 !     Freq_modifier$     For some
programming modes two parameters
```

```
17910 !                              are needed to
fully program the frequency
17915 !                              of operation.
This optional parameter can
17920 !                              be used to provide
the second parameter name.
17925 !
17930 !                              ["SPAN"|"FREQ
SPAN"|"FREQUENCY SPAN"]
17935 !                              ["STOP"|"STOP
FREQ"]"STOP FREQUENCY"]
17940 !
17945 !      Freq_mod_parm           A REAL variable
that  specifies the value
17950 !                              to set the second
frequency parameter to.
17955 !
17960 !----------------------------------------
17965 !  CONSIDERATIONS;
17970 !
17975 !      The secondary frequency  control
parameter that is used depends
17980 !      on the primary frequency control
parameter used.  This is
17985 !      because the primary parameter
determines the programming
17990 !      mode that the network analyzer is
placed in.
17995 !
18000 !      PRIMARY PARAMETER
18005 !      ------------------------------------
18010 !      1) ["CENTER"|"CENTER FREQ"|"CENTER
FREQUENCY"]
18015 !      2) ["SPAN"|"FREQ SPAN"|"FREQUENCY
SPAN"]
18020 !      3) ["START"|"START FREQ"|"START
FREQUENCY"]
18025 !      4) ["STOP"|"STOP FREQ"|"STOP
FREQUENCY"]
18030 !      5) ["CW"]
18035 !
18040 !      GOOD SECONDARY PARAMETERS
18045 !      ------------------------------------
18050 !      1) ["SPAN"|"FREQ SPAN"|"FREQUENCY
SPAN"]
18055 !      2) none
18060 !      3) ["STOP"|"STOP FREQ"|"STOP
FREQUENCY"]
18065 !      4) none
18070 !      5) none
18075 !
18080 !  This program should work with both
```

```
UPPER and lower case string
18085 !  arguments.  Where 'FREQ' appears in
the argument definitions the
18090 !  full word 'FREQUENCY' is also allowed.
18095 !
18100 !----------------------------------------
18105 !  OTHER SUBPROGRAMS CALLED;
18110 !
18115 !----------------------------------------
18120 !  REVISIONS;
18125 !
18130 !        04/15/88  cfa  debugging
18135 !        03/09/88  cfa  debugging
18140 !        03/08/88  cfa  code review
18145 !        03/07/88  mc   initial code
18150 !     0  02/19/88  cfa  outline
documentation form.
18155 !========================================
18160 Doc_off: !
18165 Vna_freq:    !(Vna_addr,Freq_mode$,Freq_
parm,
18170 !              OPTIONAL Freq_modifier$,
Freq_mod_parm)
18175 !========================================
18180    DIM Error_msg$[80],Error_msg2$[80]
18185 !----------------------------------------
18190    SELECT UPC$(TRIM$(Freq_mode$))
18195    CASE "CENTER","CENTER FREQ","CENTER
FREQUENCY"
18200       IF NPAR=5 THEN
18205          SELECT UPC$(TRIM$(Freq_modifer$))
18210          CASE "SPAN","FREQ SPAN",
"FREQUENCY SPAN"
18215             OUTPUT Vna_addr;"LINFREQ;
CENT";Freq_parm;"; SPAN";Freq_mod_parm
18220          CASE ELSE
18225             OUTPUT Vna_addr;"LINFREQ;
CENT";Freq_parm
18230             GOSUB No_parms_match
18235             !stop
18240             STOP
18245          END SELECT
18250       ELSE
18255          OUTPUT Vna_addr;"LINFREQ; CENT";
Freq_parm
18260       END IF
18265    CASE "SPAN","FREQ SPAN","FREQUENCY
SPAN"
18270       OUTPUT Vna_addr;"LINFREQ; SPAN";
Freq_parm
18275    CASE "START","START FREQ","START
FREQUENCY"
```

```
18280        IF NPAR=5 THEN
18285           SELECT UPC$(TRIM$(Freq_
modifer$))
18290           CASE "STOP","STOP FREQ","STOP
FREQUENCY"
18295              OUTPUT Vna_addr;"LINFREQ;
STAR";Freq_parm;"; STOP";Freq_mod_parm
18300           CASE ELSE
18305              OUTPUT Vna_addr;"LINFREQ;
STAR";Freq_parm
18310              GOSUB No_parms_match
18315              !stop
18320              STOP
18325           END SELECT
18330        ELSE
18335           OUTPUT Vna_addr;"LINFREQ; STAR";
Freq_parm
18340        END IF
18345     CASE "STOP","STOP FREQ","STOP
FREQUENCY"
18350        OUTPUT Vna_addr;"LINFREQ; STOP";
Freq_parm
18355     CASE "CW"
18360        OUTPUT Vna_addr;"CWFREQ";Freq_parm
18365     CASE ELSE
18370        Error_msg$="Unrecognized Freq_mode$
parameter; """&Freq_mode$&""""
18375        Error_manager("Vna_freq",Error_msg$)
18380        PAUSE
18385        !stop
18390        STOP
18395     END SELECT
18400     !
18405     SUBEXIT
18410 !=========================================
18415 No_parms_match:!
18420     Error_msg$="Freq_modifer$ = """&Freq_
modifer$&"""which is NOT consistant"
18425     Error_msg2$="with the Freq_mode$
parameter """&Freq_mode$&""""
18430     Error_manager("Vna_freq",Error_msg$,
Error_msg2$)
18435     PAUSE
18440     RETURN
18445     !
18450 SUBEND
18455 !
18460 !*****************************************
18465 !
18470 SUB Vna_swp_cont(INTEGER Vna_addr,Swp_
mode$,OPTIONAL Value)
18475 Doc_on:GOTO Doc_off !    SWEEP CONTROL
```

```
18480 !======================================
18485 !  PURPOSE; To provide for controlling
the sweep parameters of
18490 !           the hp 8753B.
18495 !--------------------------------------
18500 !  INPUT PARAMETERS;
18505 !
18510 !     Vna_addr          An INTEGER that
specifies the address of
18515 !                       Network Analyzer
to be controlled.
18520 !
18525 !     Swp_mode$         A string variable
that specifies the sweep
18530 !                       mode to be
programmed.
18535 !
18540 !                       TRIGGER ARMING
COMMANDS
18545 !
18550 !                       [ "SINGLE" |
"AUTO" | "TAKE SWEEP" | "NUM SWEEPS"
18555 !
18560 !                       TRIGGER SOURCE
COMMANDS
18565 !
18570 !                       [ "LINE TRIGGER"
| "EXT TRIGGER" |
18575 !                       [ "FREE RUN" ]
18580 !
18585 !                       SWEEP TIME CONTROL
COMMANDS
18590 !
18595 !                       [ "SWEEP TIME" ]
18600 !
18605 !     Value is used only with the "SWEEP
TIME" and "NUM SWEEPS" arguments.
18610 !
18615 !--------------------------------------
18620 !  MODULE BEHAVIOR FOR DIFFERENT COMMANDS;
18625 !
18630 !     COMMAND           MODULE ACTIONS
TAKEN
18635 !     ------------      ----------------
18640 !     SINGLE            Sets the network
analyzer to the single sweep
18645 !     [TAKESWEEP]       mode and arms the
network analyzer to sweep on
18650 !                       the next trigger.
If the network analyzer is
18655 !                       the "FREE RUN"
trigger mode a sweep is
```

The lightwave component analyzer 10 or 10' allows the measurement of the analog portion of the lightwave source 14 or 14' (transmitter) separately from the lightwave receiver 16, or visa versa. The measurements are fast and accurate, and the measurement process is convenient and easy to use. This provides the modulation/-demodulation transfer measurement capability for assuring precise test measurements.

A DUT can then be measured when it is connected to the test ports of the electrical test set 18 or 18' and/or the lightwave test set 12 or 12' in a given measurement setup. The lightwave component analyzer 10 or 10' uses the error correction data when the electrical, E/O, O/E, or optical characteristics of the DUT are measured.

The test measurements on a DUT initially require the user to select a measurement. Then, the characteristics of the DUT are measured. Finally, the lightwave component analyzer 10 or 10' compensates the test measurements on the DUT using the error correction data. The lightwave component analyzer 10 or 10' facilitates user calibration and measurements for E/Om O/E, and O Reflection (one port optical). Additionally, the firmware of the lightwave component analyzer 10 or the software of the HP Series 217 instrument controller of the lightwave component analyzer 10' will set up the RF switches for E/E, O/O, and E Reflection (one port electrical).

The lightwave component analyzer 10 or 10' measures modulation (demodulation) bandwidth, modulation (demodulation) transfer functions, loss, delay, dispersion, and reflections of fiber optic system components, such as modulators, demodulators, optical fiber cables, and fiber components, based on frequency domain measurements. For optical components (such as optical fiber cable, couplers, and connectors), the lightwave component analyzer 10 or 10' can measure such parameters as modulation bandwidth, optical insertion loss, pulse dispersion, optical reflections, and length. Additionally, single and multiple reflections can be resolved in time and distance with very high resolution. This enables precise location of one or more discontinuities and measurement of optical fiber cable length.

Insofar as optical measurements are concerned, typical optical components are optical fiber cable, modulators, and passive devices, such as switches, splitters, combiners, and attenuators. The input and output signals for testing these devices are light, and the key parameters measured are attenuation versus modulation frequency, modulation bandwidth, delay, modal pulse dispersion, location of discontinuities, and length.

The dynamic range of optical measurements is typically greater than 40 dB. The two-event resolution of discontinuities measured in distance is less than 1 cm.

Additionally, the modulation transfer characteristics of electro-optical (E/O) transmitters and opto-electrical (O/E) receivers can also be precisely measured. For example, the responsivity of a PIN diode or laser diode can be measured, not only at one modulation frequency, but also as a function of modulation frequency from 130 MHz to 20 GHz.

Representative E/O devices are optical modulators and sources (such as laser diodes and LEDs). Examples of O/E devices are PIN or avalanche photodiode detectors in optical receivers. The key parameters for these devices are the same for both types, except that the independent and dependent variables are reversed; i.e., for E/O devices, optical power out is measured as a function of electrical (RF) drive, whereas RF power out as a function of optical drive is measured for O/E devices. Typical measurements for these devices are sensitivity (including the noise threshold/floor), as well as responsivity versus modulating frequency. Also, the lightwave component analyzer 10 or 10' can test reflection performance of electrical and optical device ports.

The RF (or electrical) elements of the fiber optic system under test can also be characterized utilizing the lightwave component analyzer 10 or 10'Examples of RF devices are amplifiers, filters, and cables used in a fiber optic system. The RF measurements include bandwidth, insertion loss/gain, phase, group delay, and complex impedance.

Electrical measurements can be performed on such RF components as amplifiers, filters, and cables, or a complete fiber optic repeater (comprising an optical transmitter, optical fiber cable, and optical receiver). Typical measurements include loss/gain versus modulation frequency, modulation bandwidth, modulation phase shift or phase delay, distortion (e.g., group delay or deviation from linear phase), complex impedance (magnitude and phase), and electrical length (including discontinuity location).

For example, one set of calibrated measurements is opto-electrical device sensitivity (responsivity) versus modulation frequency and modulation bandwidth measurements. The RF switch matrix is configured for an O/E user calibration, as indicated in FIGS. 2 or 4 and 5. The RF power into the lightwave source 14 or 14' is held at a constant power level [f(t)], and the modulation frequency is varied over some frequency range, $f_1$ to $f_2$.

The total modulation frequency response of the lightwave component analyzer 10 or 10'is measured. The measurement is operated upon by factory calibration data.

The resultant error correction data are then stored for later use. The calibration is now complete, and the next step is to measure an unknown device, i.e., the DUT.

To perform the measurement on the DUT, the DUT is connected diagonally to one electrical test port $18_1$ or $18_2$ of the electrical test set 18 or 18' and to one lightwave test port $12_1$ or $12_2$ of the lightwave test set 12 or 12'. A display of receiver responsivity versus modulation frequency is then obtained. The information obtained from the display provided by the CRT 20 is the absolute receiver responsivity in amperes per watt (in a 50-ohm impedance system), the modulation bandwidth of the DUT, and the responsivity variation from a constant level over the modulation frequency range (or responsivity variation over modulation frequency).

The corresponding measurements can be performed for sources or electro-optical devices. For the source case, the responsivity is in terms of watts per ampere; other comments made for the receiver apply for these measurements.

Considered in more detail, one parameter set is the demodulation bandwidth measurement for a demodulator (or receiver). The lightwave (or carrier) frequency is fixed, for example, at 1300 nm, and the modulation frequency is varied over some frequency range, such as 130 MHz to 20 GHz, by the modulation source 22. The lightwave source 14 or 14' outputs an amplitude modulated lightwave, where the lightwave is a constant frequency, but the modulation frequency varies over some frequency range.

The demodulator (or receiver), typically a photodiode and pre-amp, strips away the carrier frequency and recovers the modulated signal, g(w). The lightwave component analyzer 10 or 10' forms the ratio of g/f for each modulation frequency and operates on that ratio (g/f) and displays the transfer characteristic versus modulation frequency.

The foregoing description is offered primarily for purposes of illustration. Various modifications can be made. For example, the described embodiments comprise a Fabry-Perot laser as the internal source of light to be modulated. However, any type of CW diode laser can be utilized, such as a distributed feedback (DFB) laser. It will be readily apparent to those skilled in the art that numerous other modifications and variations not mentioned above can still be made without departing from the spirit and scope of the invention as claimed below.

What is claimed is:

1. A method for performing test measurements on one of an electro-optical, opto-electrical, and optical device under test, comprising the steps of:

providing a switch matrix for effecting switchable connections;

providing an electrical signal source having an electrical output;

connecting the electrical output of the electrical signal source to a first input of a tuned vector receiver;

providing at least one electrical test port;

switchably connecting the at least one electrical test port to one of the electrical output of the electrical signal source and a second input of the tuned vector receiver;

providing an optical source, the optical source having an electrical input and an optical output;

connecting the optical output of the optical source to a first optical test port;

providing at least one optical receiver, the at least one optical receiver having an optical input and an electrical output;

connecting the optical input of the at least one optical receiver to a second optical test port; and performing one of an electro-optical measurement on an electro-optical device under test, an opto-electrical measurement on an opto-electrical device under test, and an optical measurement on an optical device under test;

the electro-optical measurement on an electro-optical device under test being performed by connecting an electrical input of the electro-optical device under test to the at least on electrical test port, connecting an optical output of the electro-optical device under test to the second optical test port, switchably connecting the electrical output of the electrical signal source to the at least one electrical test port, and switchably connecting the electrical output of the at least one optical receiver to a second input of the tuned vector receiver;

the opto-electrical measurement on an opto-electrical device under test being performed by connecting an optical input of the opto-electrical device under test to the first optical test port, connecting an electrical output of the opto-electrical device under test to the at least one electrical test port, switchably connecting the electrical input of the optical source to the electrical output of the electrical signal source, and switchably connecting the at least one electrical test port to the second input of the tuned vector receiver;

the optical measurement on an optical device under test being performed by connecting an optical input of the optical device under test to the first optical test port, connecting an optical output of the optical device under test to the second optical test port, switchably connecting the electrical input of the optical source to the electrical output of the electrical signal source, and switchably connecting the electrical output of the at least one optical receiver to the second input of the tuned vector receiver.

2. The method of claim 1 wherein the optical source is an external optical source.

3. The method of claim 1 wherein the switch matrix is configurable by means of an external instrument controller.

4. The method of claim 1 wherein the electrical signal source produces a modulation signal having a swept frequency and the stp of performing an opto-electrical measurement comprises measuring responsivity versus modulating frequency for an opto-electrical device under test.

5. The method of claim 1 wherein the electrical signal source produces a modulation signal having a swept frequency and the stp of performing an electro-optical measurement comprises measuring responsivity versus modulating frequency for an electro-optical device under test.

6. The method of claim 1, further comprising the steps of:

providing a second electrical test port: and performing an electrical measurement on an electrical device under test;

the electrical measurement on an electrical device under test being performed by connecting an electrical input of the electrical device under test to the at least one electrical test port, connecting an electrical output of the electrical device under test to the second electrical test port, switchably connecting the electrical output of the electrical signal source to the at least one electrical test port, and switchably connecting the second electrical test port to the second input of the tuned vector receiver.

7. The method of claim 1, further comprising the steps of:

establishing an initial calibration reference based on known characteristics of the optical source and the at least one optical receiver prior to performing a measurement on one of an electro-optical, opto-electrical, and optical device under test;

performing a measurement on the calibration reference to produce error correction data prior to performing a measurement on the device under test; and using the error correction data when one of the electro-optical, opto-electrical, and optical characteristics of the device under test is measured.

8. The method of claim 7, further comprising the step of storing the error correction data after performing a measurement on the calibration reference.

9. The method of claim 1 wherein the optical source has known electro-optical characteristics and the optical receiver has known opto-electrical characteristics, further comprising the steps of:

providing optical connection means for interconnecting the first optical test port and the second optical test port;

performing an optical calibration prior to performing an optical measurement on an optical device under test by switchably connecting the electrical input of the optical source to the electrical output of the electrical signal source, connecting the first optical test port to the second optical test port, and switchably connecting the electrical output of the at least one optical receiver to the second input of the tuned vector receiver for producing optical error correction data; and using the optical error correction data when the optical measurement is performed on an optical device under test.

10. The method of claim 9, further comprising the steps of:

providing a second electrical test port;

providing electrical connection means for interconnecting the at least one electrical test port and the second electrical test port;

performing an electrical calibration prior to performing one of an electro-optical measurement on an electro-optical device under test and an opto-electrical measurement on an opto-electrical device under test by switchably connecting the electrical output of the electrical signal source to the at least one electrical test port, connecting the at least one electrical test port to the second electrical test port, and switchably connecting the second electrical test port to the second input of the tuned vector receiver for producing electrical error correction data; and using the optical error correction data and the electrical error correction data when one of the electro-optical measurement is performed on an electro-optical device under test and the opto-electrical measurement is performed on an opto-electrical device under test.

11. A lightwave component analyzer system for performing a measurement on one of an electro-optical, opto-electrical, and optical devices under test for measuring performance of fiber optic systems, subsystems, and associated components, comprising:

a plurality of switches for providing switchable connections;

an electrical signal source for generating an electrical signal;

a tuned vector receiver having a first input connected to the electrical signal source, the tuned vector receiver being internal to the lightwave component analyzer system, the tuned vector receiver also having a second input;

at least one electrical test port, the at least one electrical test port being switchably connected by a first switch to one of the electrical signal source and the second input of the tuned vector receiver;

an optical source having an electrical input switchably connected by a second switch to the electrical signal source, the optical source including an electro-optical transducer for converting the electrical signal generated by the electrical signal source to an optical signal, the optical source having optical output;

a first optical test port connected to the optical output of the optical source;

a second optical test port;

at least one optical receiver having an optical input connected to the second optical test port, the at least one optical receiver including an opto-electrical transducer for converting a received optical signal to an electrical signal, the at least one optical receiver having an electrical output, the at least one optical receiver being internal to the lightwave component analyzer system;

the electrical output of the opto-electrical transducer being switchably connected by a third switch to the second input of the tuned vector receiver; and instrument control means for configuring the switches to perform one of an electro-optical measurement on an opto-electrical device under test, and an optical measurement on an optical device under test;

the electro-optical measurement on an electro-optical device under test being performed by the instrument control means configuring the plurality of switches so that the first switch connects the electrical signal source to the at least one electrical test port and the third switch connects the electrical output of the at least one optical receiver to the second input of the tuned vector receiver, an electrical input of the electro-optical device under test being connected to the at least one electrical test port and an optical output of the electro-optical device under test being connected to the second optical test port;

the opto-electrical measurement on the opto-electrical device under test being performed by the instrument control means configuring the plurality of switches to that the first switch connects the at least one electrical test port to the second input of the tuned vector receiver and the second switch connects the electrical signal source to the electrical input of the optical source, an optical input of the opto-electrical device under test being connected to the first optical test port and an electrical output of the opto-electrical device under test being connected to the at least one electrical test port;

the optical measurement on the optical device under test being performed by the instrument control means configuring the plurality of switches so that the second switch connects the electrical signal source to the electrical input of the optical source and the third switch connects the electrical output of the at least one optical receiver to the second input of the tuned vector receiver, an optical input of the optical device under test being connected to the first optical test port and an optical output of the optical device under test being connected to the second optical test port.

12. The lightwave component analyzer system of claim 11 wherein the electrical source is a modulation source which generates a 130 MHz to 20 GHz electrical signal.

13. The lightwave component analyzer system of claim 11 wherein the optical source is an external optical source.

14. The lightwave component analyzer system of claim 11, further comprising:

a second electrical test port;

an electrical measurement on an electrical device under test being performed by the instrument control means configuring the plurality of switches so that the first switch connects the electrical signal source to the at least one electrical test port and a fourth switch connects the second electrical test port to the second input of the tuned vector receiver, while an electrical input of the electrical device under test is connected to the at least one electrical test port and an electrical output of the electrical device under test is connected to the second electrical test port.

15. The lightwave component analyzer system of claim 11 wherein the optical source is internal to the lightwave component analyzer system.

16. The lightwave component analyzer system of claim 15 wherein the optical source comprises a first laser connected to the first optical test port, further comprising an optical switch positioned between the first laser and the first optical test port, a third optical test port, and a second laser connected to the third optical test port, the optical switch being configured by the instrument control means to select one of the first and second lasers.

17. The lightwave component analyzer system of claim 15 wherein the optical source comprises one of a Fabry-Perot laser and a distributed feedback laser.

18. The lightwave component analyzer system of claim 11 wherein the optical source has known electro-optical characteristics and the optical receiver has known opto-electrical characteristics, further comprising:

optical connection means for interconnecting the first optical test port and the second optical test port;

an optical calibration being performed prior to an optical measurement on an optical device under test by the instrument control means configuring the plurality of switches so that the second switch connects the electrical signal source to the electrical input of the optical source and the third switch connects the electrical output of the at least one optical receiver to the second input of the tuned vector receiver, while the optical connection means is connected between the first and second optical test ports, for producing optical error correction data; and means for compensating the optical measurement on an optical device under test using the optical error correction data when the optical measurement is performed.

19. The lightwave component analyzer system of claim 18, further comprising:

a second electrical test port;

electrical connection means for interconnecting the at least one electrical test port and the second electrical test port;

an electrical calibration being performed prior to one of an electro-optical measurement on an electro-optical device under test and an opto-electrical measurement on an opto-electrical device under test by the instrument control means configuring the plurality of switches so that the first switch connects the electrical signal source to the at least one electrical test port and a fourth switch connects the second electrical test port to the second input of the tuned vector receiver, while the electrical connection means is connected between the at least one electrical test port and the second electrical test port, for producing electrical error correction data; and means for compensating one of the electro-optical measurement on an electro-optical device under test and the opto-electrical measurement on a opto-electrical device under test using the optical error correction data and the electrical error correction data when the one of the electro-optical measurement and the opto-electrical measurement is performed.

20. The lightwave component analyzer system of claim 19, further comprising means for storing the error correction data.

* * * * *

UNITED STATES PATENT AND TRADEMARK OFFICE
CERTIFICATE OF CORRECTION

PATENT NO. : 5,041,997

DATED : August 20, 1991

INVENTOR(S) : Paul Hernday, Roger Wong and Hugo Vifian

It is certified that error appears in the above-identified patent and that said Letters Patent is hereby corrected as shown below:

Column 4, Line 35, "130kHZ" should read --130 MHz--

Column 6, Line 41, "is added to interface amplifier combination." should read --is added to interface with the new microwave modulator in the new modulator-amplifier combination.--

Column 453, Line 22, "measurements for E/Om" should read --measurements for E/O,--

Column 455, Line 63 "at least on electrical" should read --at least one electrical--

Column 456, Line 38, "and the stp of performing" should read --and the step of performing--

UNITED STATES PATENT AND TRADEMARK OFFICE

CERTIFICATE OF CORRECTION

PATENT NO. : 5,041,997

DATED : August 20, 1991

INVENTOR(S) : PAUL HENDAY, ROGER WONG AND HUGO VIFIAN

It is certified that error appears in the above-indentified patent and that said Letters Patent is hereby corrected as shown below:

Column 456, line 32, "and the stp of performing" should be --and the step of performing --.

Column 458, line 6, "source having optical output" should read --source having an optical output; --.

line 24, after "an" and before "opto-electrical should read --electro-optical device under test, and opto-electrical measurement on an --.

Signed and Sealed this

Sixth Day of September, 1994

Attest:

BRUCE LEHMAN

Attesting Officer

Commissioner of Patents and Trademarks